US011564266B1

(12) United States Patent
Kahn

(10) Patent No.: US 11,564,266 B1
(45) Date of Patent: Jan. 24, 2023

(54) PERMISSION-BASED CONTROLLING NETWORK ARCHITECTURES AND SYSTEMS, HAVING CELLULAR NETWORK COMPONENTS AND ELEMENTS MODIFIED TO HOST PERMISSION CONTROLLING SCHEMAS DESIGNED TO FACILITATES ELECTRONIC PEER-TO-PEER COMMUNICATION SESSIONS METHODS FOR USE THEREOF

(71) Applicant: Ari Kahn, Mt. Shasta, CA (US)

(72) Inventor: Ari Kahn, Mt. Shasta, CA (US)

(73) Assignee: STARKEYS LLC, New York, NY (US)

( * ) Notice: Subject to any disclaimer, the term of this patent is extended or adjusted under 35 U.S.C. 154(b) by 0 days.

(21) Appl. No.: 17/862,402

(22) Filed: Jul. 11, 2022

(51) Int. Cl.
*H04W 76/10* (2018.01)
*G06F 16/955* (2019.01)
(Continued)

(52) U.S. Cl.
CPC ........ *H04W 76/10* (2018.02); *G06F 16/9566* (2019.01); *H04M 15/41* (2013.01);
(Continued)

(58) Field of Classification Search
CPC ......... H04W 76/10; H04W 4/24; H04W 8/26; H04W 12/69; G06F 16/9566; H04M 15/41
See application file for complete search history.

(56) References Cited

U.S. PATENT DOCUMENTS 5,524,142 A 6/1996 Lewis et al.
6,381,317 B1 4/2002 Bala et al.
(Continued)

FOREIGN PATENT DOCUMENTS

| WO | 2014198745 A1 | 12/2014 |
| WO | 2016/141629 A1 | 9/2016 |
| WO | 2022/020690 A2 | 1/2022 |

OTHER PUBLICATIONS

Schulzrinne, Henning. "World Wide Web: whence, whither, what next?." IEEE Network 10.2 (1996): 10-17. (Year: 1996).*
(Continued)

*Primary Examiner* — Sharad Rampuria
(74) *Attorney, Agent, or Firm* — Greenberg Traurig, LLP

(57) ABSTRACT

In some embodiments, a method includes: generating, by a session controlling Internet platform, a personalized Universal Resource Locator link (PURL), including: where the PURL is: communicatively coupled to the permission controlling schema and configured to be utilized to establish a peer-to-peer communication session between a sender computing device and a recipient computing device; where the PURL includes: a domain name associated with the session controlling Internet platform hosting a permission controlling schema, and at least one first identity linked to the recipient computing device; transmitting, by the session controlling Internet platform, the PURL to the recipient computing device; receiving, by the session controlling Internet platform, after the transmitting the PURL to the recipient computing device, a mobile originating communication, having data including: a multi-part multi-functional address signaling sequence, including: a MICRO band part, corresponding to a MICRO band parameter and a MACRO band part.

26 Claims, 48 Drawing Sheets

(51) Int. Cl.
*H04M 15/00* (2006.01)
*H04W 4/24* (2018.01)
*H04W 12/69* (2021.01)
*H04W 8/26* (2009.01)

(52) U.S. Cl.
CPC .............. *H04W 4/24* (2013.01); *H04W 8/26* (2013.01); *H04W 12/69* (2021.01)

(56) References Cited

U.S. PATENT DOCUMENTS

| | | | |
|---|---|---|---|
| 6,487,602 | B1 | 11/2002 | Thakker |
| 6,868,267 | B1 | 3/2005 | Briggs et al. |
| 7,319,855 | B1 | 1/2008 | Brune et al. |
| 7,321,656 | B2 | 1/2008 | Bevente et al. |
| 7,403,603 | B2 | 7/2008 | Tikiks et al. |
| 7,487,213 | B2 | 2/2009 | Zager et al. |
| 7,502,455 | B2 | 3/2009 | Crockett et al. |
| 7,603,102 | B1 | 10/2009 | Pryor |
| 7,945,242 | B2 | 5/2011 | Kahn |
| 8,009,816 | B2 | 8/2011 | Syrjala et al. |
| 8,149,848 | B2 | 4/2012 | Karaoguz et al. |
| 8,275,119 | B2 | 9/2012 | Kahn |
| 8,725,637 | B2 | 5/2014 | Bixler et al. |
| 8,818,328 | B2 | 8/2014 | Kahn |
| 8,862,751 | B2 | 10/2014 | Faccin et al. |
| 8,874,635 | B2 | 10/2014 | Mustafa |
| 8,886,773 | B2 | 11/2014 | Papakostas et al. |
| 8,954,032 | B1 | 2/2015 | Staler |
| 9,264,552 | B2 | 2/2016 | Kahn |
| D778,269 | S | 2/2017 | Kahn et al. |
| 9,924,356 | B2 | 3/2018 | McQueen |
| 10,110,706 | B2 | 10/2018 | Chen et al. |
| 10,116,805 | B2 | 10/2018 | Lu et al. |
| 10,142,322 | B2 | 11/2018 | Thodupunoori et al. |
| 10,187,528 | B2 | 1/2019 | Kahn |
| 10,298,749 | B2 | 5/2019 | Mumick et al. |
| 10,311,413 | B2 | 6/2019 | Stroeh et al. |
| 10,341,498 | B2 | 7/2019 | Kahn |
| 10,728,385 | B2 | 7/2020 | Kahn |
| 10,986,504 | B1 | 4/2021 | Smith et al. |
| 11,388,601 | B1 * | 7/2022 | Kahn ................... H04L 9/3236 |
| 11,432,154 | B1 * | 8/2022 | Kahn ................... H04W 4/24 |
| 11,477,654 | B1 * | 10/2022 | Kahn ................ H04W 12/0431 |
| 2004/0042597 | A1 | 3/2004 | Atkins et al. |
| 2004/0053598 | A1 | 3/2004 | Book et al. |
| 2004/0067747 | A1 | 4/2004 | Carpenter et al. |
| 2004/0088347 | A1 * | 5/2004 | Yeager ................. H04L 67/107 709/227 |
| 2004/0199475 | A1 | 10/2004 | Rivest et al. |
| 2004/0213409 | A1 | 10/2004 | Murto et al. |
| 2005/0009500 | A1 | 1/2005 | Ear |
| 2005/0102242 | A1 | 5/2005 | Omidyar |
| 2005/0177506 | A1 | 8/2005 | Rissanen |
| 2005/0188010 | A1 | 8/2005 | Valk |
| 2006/0053293 | A1 | 3/2006 | Zager et al. |
| 2006/0256941 | A1 | 11/2006 | Kahn |
| 2007/0208864 | A1 | 9/2007 | Flynn et al. |
| 2008/0091489 | A1 | 4/2008 | Larock et al. |
| 2008/0177638 | A1 | 7/2008 | Butler |
| 2008/0229399 | A1 | 9/2008 | O'Neil et al. |
| 2008/0243650 | A1 | 10/2008 | Yoon |
| 2009/0070262 | A1 | 3/2009 | Olliphant et al. |
| 2009/0198619 | A1 | 8/2009 | Tripunitara et al. |
| 2009/0275307 | A1 | 11/2009 | Kahn |
| 2010/0069036 | A1 | 3/2010 | Pericas et al. |
| 2010/0293017 | A1 | 11/2010 | Merritt et al. |
| 2011/0077949 | A1 | 3/2011 | Olliphant et al. |
| 2012/0064860 | A1 | 3/2012 | O'Neil et al. |
| 2012/0083243 | A1 | 4/2012 | Kahn |
| 2014/0316982 | A1 | 10/2014 | Brown et al. |
| 2014/0323082 | A1 | 10/2014 | Browne et al. |
| 2014/0324696 | A1 | 10/2014 | Browne et al. |
| 2015/0143166 | A1 | 5/2015 | Shuster |
| 2015/0350459 | A1 | 12/2015 | Isobe et al. |
| 2015/0365512 | A1 | 12/2015 | MacKenzie et al. |
| 2016/0127902 | A1 | 5/2016 | Ciarniello et al. |
| 2016/0286393 | A1 | 9/2016 | Rasheed et al. |
| 2016/0345176 | A1 | 11/2016 | DeWitt et al. |
| 2016/0374132 | A1 | 12/2016 | Yerrabommanahalli et al. |
| 2017/0063925 | A1 | 3/2017 | Votaw et al. |
| 2017/0068947 | A1 | 3/2017 | Xie et al. |
| 2017/0126682 | A1 | 5/2017 | Wong et al. |
| 2017/0213404 | A1 | 7/2017 | Sivalingam et al. |
| 2017/0237822 | A1 | 8/2017 | Kahn |
| 2017/0257363 | A1 | 9/2017 | Franke et al. |
| 2017/0329615 | A1 | 11/2017 | Kahn |
| 2018/0315086 | A1 | 11/2018 | Morse et al. |
| 2020/0145384 | A1 * | 5/2020 | Chauhan ................. G06F 16/95 |
| 2021/0099441 | A1 | 4/2021 | Suraparaju |

OTHER PUBLICATIONS

Micropayments: A Viable Business Model?, 1 page (2011). https://cs.stanford.edu/people/eroberts/cs201 /projects/2010-11/MicropaymentsAndTheNet/history.html.

Thorpe, Esther Kezia, "Why micropayments aren't dead . . . yet," 16 pages (2020). https://whatsnewinpublishing.com/why-micropayments-arent-dead-yet/.

Nielsen, Jakob, "The Case for Micropayments," 5 pages (1998). https://www.nngroup.com/articles/the-case-for-micropayments/.

Rosenberg, Scott, "The micropayments mirage," Trent Micor, 9 pages (2021). https://www.google.com/amp/s/www.axios.com/micropayments-mirage-subscriptions-payments-online-84aff6f2-b24d-4f1f-afdf-e10a71104b17.html.

Lesk, Michaek, "Micropayments: An Idea Whose Time Has Passed Twice?," Digital Rights, 3 pages (2004). https://www.google.com/url?sa=t&source=web&rct=j&url=https://www.cpe.ku.ac.th/~mcs/courses/2005_02/214573/papers/micropayments.pdf&ved=2ahUKEwilt5Xes9j0AhVEbs0KHaFUCbgQFnoECAUQAQ&usg=AOvVaw120sw9ZhgKv4ZXITIdsWsL.

Case, Amber, "Who Killed the micropayment? A history." 16 pages (2003). https://caseorganic.medium.com/who-killed-the-micropayment-a-history-ec9e6eb39d05.

Shea, Ryan, "Micropayments, Abridged," 9 pages (2019). https://medium.com/radartech/micropayments-abridged-2f110302677c.

Birch, David G.W. "Micropayments Are a Macro Opportunity," 6 pages (2021). https://www.google.com/amp/s/www.forbes.com/sites/davidbirch/2021/05/16/micropayments-are-a-macro-opportunity/amp/.

Coinpedia, "The Road Not Taken: Browser-Based Micropayments and History of Error 402," 11 pages (2021).

Rivest, Robert L., "Peppercoin Micropayments," Proceedings Financial Cryptograhy, Springer, 8 pages (2004); http://www.springer.de/comp/lncs/index.html.

Nelson, Ted, "The Babbage of the web," The Economist, 9 pages (2000).

Tufekci, Zeynep, "Shouldn't We All Have Seamless Micropayments by Now?," 3 pages (2019).

https://finance.yahoo.com/news/elon-musk-twitter-ceo-poop-emoji-173348071.html.

https://www.fastcompany.com/90369697/googles-new-recaptcha-has-a-dark-side.

https://www.yahoo.com/video/click-farms-internet-china-154440209.html.

https://www.fastcompany.com/90415625/stop-giving-companies-your-phone-number-do-this-instead.

Youtube video,: May 16, 2022, All-In Podcast, (https://www.youtube.com/watch?v=CnxzrX9tNoc).

https://youtu.be/YZhlU2_YsPE.

https://youtu.be/W8KG9nOPdOo.

https://sms-man.com/blog/all-about-how-to-use-fake-phone-number-in-2021A.

https://www.pvacreater.com retrieved Jul. 11, 2022, pp. 1-23.

Maciej et al., "Multifactor authentication protocol in a mobile environment," IEEE Access, vol. 7, pp. 157185-157199 (2019).

* cited by examiner

|      | CELL SIGNALS | PARSE INT | MIN/MAX | TARIFF |
|------|--------------|-----------|---------|--------|
| 151A | *NN          | NN        | 0/99    | $0.NN  |
| 152A | *NNN         | NNN       | 0/999   | $N.NN  |
| 153A | *NNNN        | NNNN      | 0/9999  | $NN.NN |
| 154A | *NNNNN       | NNNNN     | 0/99999 | $NNN.NN|
| 155A | *NN...       | NN...     | 0/99... | $...N.NN |
| 156A | NN...        | NN...     | 0/99... | $...N.NN |

|      | SIGNALS NN | SIGNALS NNN | TARIFF |
|------|-----------|-------------|--------|
| 151B | *00       | *000        | 0¢     |
| 152B | *01       | *001        | 1¢     |
| 153B | *02       | *002        | 2¢     |
| 154B | *05       | *005        | 5¢     |
| 155B | *10       | *010        | 10¢    |
| 156B | *25       | *025        | 25¢    |
| 157B | *50       | *050        | 50¢    |
| 158B | *75       | *075        | 75¢    |
| 159B | *99       | *099        | 99¢    |

|  | DEC | HEX | OVERDECADIC TELEPHONY BCD | OVERDECADIC NATURAL BCD |
|---|---|---|---|---|
| 150C | 0 | 0000 |  |  |
|  | 1 | 0001 |  |  |
|  | 2 | 0010 |  |  |
|  | 3 | 0011 |  |  |
|  | 4 | 0100 |  |  |
|  | 5 | 0101 |  |  |
|  | 6 | 0110 |  |  |
|  | 7 | 0111 |  |  |
|  | 8 | 1000 |  |  |
| 151C | 9 | 1001 |  |  |
| 152C | 10 | 1010 | * | A |
| 153C | 11 | 1011 | # | B |
| 154C | 12 | 1100 | A | C |
| 155C | 13 | 1101 | B | D |
| 156C | 14 | 1110 | C | E |
| 157C | 15 | 1111 | STOP (ST) | F |

FIG. 15C

| SCHEMA | COLOR | ENTITY | CHANNEL |
|---|---|---|---|
|  | Gray | BOT | Generic, Uncategorized |
|  | Red | BOT | Health, Medical, Research etc. |
|  | Orange | BOT | News, Politics, Publications, Opinions, Polls, etc. |
|  | Green | BOT | Marketing, Products, Endorsements, etc. |
|  | Blue | HUMAN | Multi-Channel |
|  | Purple | BOT | Academic, Non-Profits, Governmental, etc. |

| | PAY PREFIX | FIXED MICRO | VARIABLE MACRO |
|---|---|---|---|
| 4101 | * | NNN | X ... |

| | CELL SIGNALS | MICRO (¢) | MACRO ($) | SWITCH FEE | TRANSFER AMOUNT |
|---|---|---|---|---|---|
| 4102 | *NNNX | NNN | X | NNN¢ | $X |
| 4103 | *NNNXX | NNN | XX | NNN¢ | $XX |
| 4104 | *NNNXXX | NNN | XXX | NNN¢ | $XXX |
| 4105 | *NNNXXXX... | NNN | XXXX... | NNN¢ | $...XX.XX |

| User (A) | Client Software (B) | Merchant Platform (C) | StarKey Platform (D) | Bank Platform (E) |
|---|---|---|---|---|
| [4501] Enter/Select Card Details at Checkout | [4502] Request StarKey Button with Transaction Details | | [4503] Return Button Script to Client | |
| [4504] Activate StarKey Button | | | [4505] Set Star Expectation (EXP) Record | |
| [4506] Emit Cell Signals OOB | | | [4507] Match Star EXP Request Payment | |
| | | | | [4508] Return Payment Method |
| | | | [4509] POST Payment | |
| | | | | [4510] Payment Success Return Transaction ID (TXID) & True |
| | | | [4511] Record Star Certificate (CERT) | |
| | [4513] Receive Payment Success | | [4512] Return CERT+TXID Redirect Client to Success URL | |
| | [4514] Request Redirect to Landing Page With CERT + TXID | [4515] Validate Star CERT Records TXID | | |
| | [4517] Transaction Verified Complete | [4516] Redirect Client to Final Landing Page | | |

FIG. 45

PERMISSION-BASED CONTROLLING NETWORK ARCHITECTURES AND SYSTEMS, HAVING CELLULAR NETWORK COMPONENTS AND ELEMENTS MODIFIED TO HOST PERMISSION CONTROLLING SCHEMAS DESIGNED TO FACILITATES ELECTRONIC PEER-TO-PEER COMMUNICATION SESSIONS METHODS FOR USE THEREOF

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software and data as described below and in drawings that form a part of this document: Copyright, Ari Kahn, All Rights Reserved.

FIELD OF TECHNOLOGY

This subject matter relates to permission-based controlling network architectures and systems, having cellular network components and elements modified to host permission controlling schemas designed to facilitates electronic peer-to-peer communication sessions between member computing devices based on cellular communication signals in accordance with novel cellular communications protocols, and methods for use thereof.

BACKGROUND

Typically, cellular communication signals associated with a cellular communication may utilize a Basic Call State Model (BCSM) and control points that may govern communication setup, progression and other call-related actions in an Intelligent Network (IN) (communications network). In one example, where the communication may be a mobile originated telephony call request, a network switching element (e.g. MSC) may receive a call setup request, and in turn request call processing instructions from a network controlling element (e.g. SCP/SCF) that may rely on one or more additional devices/systems (e.g. OCS) to determine various aspects of the call, including a decision to proceed with the call, including a decision to proceed with the call. Legacy and Analog User Name And Password (UNAP) based security is severely compromised, given that many users opt for convenience over security, choosing easier to remember passwords rather than stronger more cryptic ones, and moreover reusing the same password across multiple services. Large scale data security breaches and privacy concerns has undermined online trust, with increased risk and exposure further eroding the UNAP method for gaining access to services. Users have also become increasingly reluctant to disclose personal data to online entities.

In the digital universe, for example, without limitation, to access various networks, users are typically required to enter analog names and passwords in order to identify themselves, and thereby register and gain access to services. Typically, usernames, without limitations, may include actual names, pseudonyms, email addresses, screen names, and any other, relatively easy, discoverable personal information of users.

SUMMARY OF DESCRIBED SUBJECT MATTER

In some embodiments, the present disclosure provides various exemplary technically improved methods, one method may include, without limitation, at least steps of: causing, by a processor of a sender computing device, via an application program, to establish a peer-to-peer communication session with a recipient computing device, by at least: receiving a personalized Universal Resource Locator link (PURL), including: a domain name associated with a session controlling Internet platform hosting a permission controlling schema, and
    at least one first identity linked to a recipient computing device;
    where the PURL is communicatively coupled to the permission controlling schema of the session controlling Internet platform;
    executing at least one application program instruction to display, based on the PURL, a graphical user interface (GUI), including a plurality of GUI elements, each GUI element programmed to allow a user of the sender computing device to select or input a MACRO band parameter associated with the peer-to-peer communication session;
transmitting, based on a user interaction with the GUI and via an Internet protocol based communication, the MACRO band parameter and the at least one first identity linked to the recipient computing device to the session controlling Internet platform;
receiving, in response to transmitting the MACRO band parameter and the at least one first identity, from the session controlling Internet platform, a multi-part multi-functional address signaling sequence, including:
a MICRO band part, corresponding to a MICRO band parameter and
a MACRO band part, corresponding to the MACRO band parameter;
transmitting, within the peer-to-peer communication session and via a cellular communications network, a session request having data that includes:
the multi-part multi-functional address signaling sequence and
at least one second identity;
where the transmitting the session request causes, based on the domain name and the MACRO band parameter, an activity of the session controlling Internet platform between a first digital wallet associated with the at least one first identity and a second digital wallet associated with the at least one second identity after:
the MICRO band part of the multi-part multi-functional address signaling sequence has been accepted by the cellular communications network and at least one portion of the data is confirmed to match an expected session record associated with the session controlling Internet platform.

In some embodiments, the present disclosure provides various exemplary technically improved methods, one method may include, without limitation, at least steps of: generating, by a session controlling Internet platform, a personalized Universal Resource Locator link (PURL);
    where the PURL is:
        communicatively coupled to the permission controlling schema and configured to be utilized to establish a peer-to-peer communication session between a sender computing device and a recipient computing device;

where the PURL includes:
  a domain name associated with the session controlling Internet platform hosting a permission controlling schema, and
    at least one first identity linked to the recipient computing device;
  transmitting, by the session controlling Internet platform, the PURL to the recipient computing device;
  receiving, by the session controlling Internet platform, after the transmitting the PURL to the recipient computing device, a mobile originating communication, having data including:
    a multi-part multi-functional address signaling sequence, including:
      a MICRO band part, corresponding to a MICRO band parameter and
      a MACRO band part, corresponding to the MACRO band parameter, and
      at least one second identity;
  executing, by the session controlling Internet platform, based on the domain name and the MACRO band parameter, an activity between a first digital wallet associated with the at least one first identity and a second digital wallet associated with the at least one second identity after:
    the MICRO band part of the multi-part multi-functional address signaling sequence has been accepted by the cellular communications network and
    at least one portion of the data is confirmed to match an expected session record.

BRIEF DESCRIPTION OF THE DRAWINGS

Various embodiments of the present disclosure can be further explained with reference to the attached drawings, where like structures are referred to by like numerals throughout the several views. The drawings shown are not necessarily to scale, with emphasis instead generally being placed upon illustrating the principles of the present disclosure. Therefore, specific structural and functional details disclosed herein are not to be interpreted as limiting, but merely as a representative basis for teaching one skilled in the art to variously employ one or more illustrative embodiments.

FIG. 15C is an illustrative non-restrictive example of a telephony and a natural binary encoded address schema, in accordance with at least some embodiments of the present disclosure.

FIG. 45 is an illustrative non-restrictive example of a Star Cellular Authorized Bank Switched Session (e.g. transaction).

DETAILED DESCRIPTION

Figure 1:
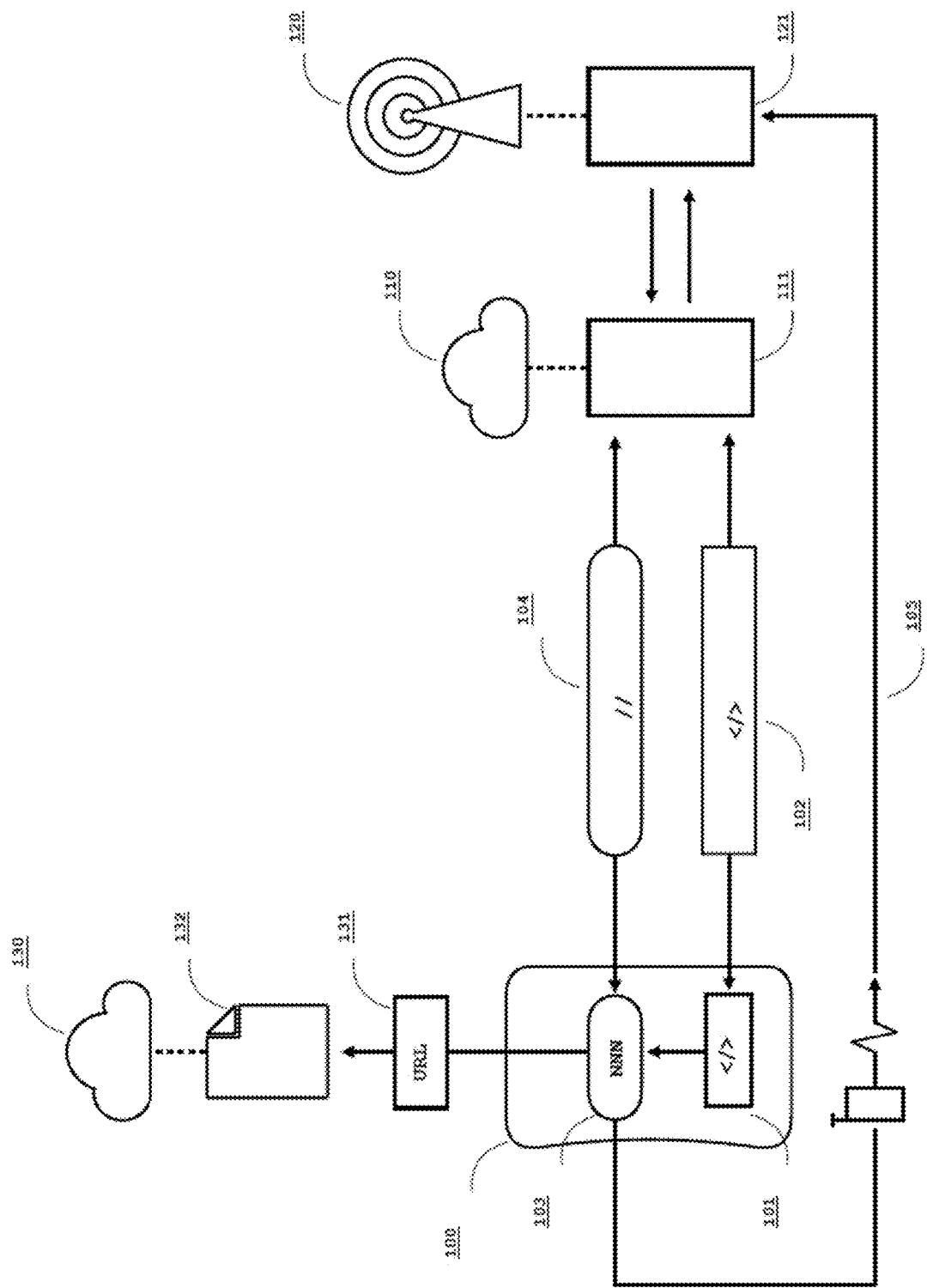
FIG. 1 is an illustrative non-restrictive example of a remote controlled access schema in accordance with at least some embodiments of the present disclosure.

Various detailed embodiments of the present disclosure, taken in conjunction with the accompanying figures, are disclosed herein; however, it is to be understood that the disclosed embodiments are merely illustrative. In addition, each of the examples given in connection with the various embodiments of the present disclosure is intended to be illustrative, and not restrictive.

Throughout the specification, the following terms take the meanings explicitly associated herein, unless the context clearly dictates otherwise. The phrases "in one embodiment" and "in some embodiments" as used herein do not necessarily refer to the same embodiment(s), though it may. Furthermore, the phrases "in another embodiment" and "in some other embodiments" as used herein do not necessarily refer to a different embodiment, although it may. Thus, as described below, various embodiments may be readily combined, without departing from the scope or spirit of the present disclosure.

All systems, platforms, devices (including cellular-service enabled computing device such as cell phones), components, element, and corresponding methods, rules, principles, codes, policies, as disclosed herein and programmed into associated hardware, software, or a combination of hardware and software, collectively formulate and can be interchangeably referenced herein as The STAR OPERATING SYSTEM (*OS or *O/S). For example, without limitation, the referenced herein STARKEY Platforms (also may be referenced herein as STAR Platforms and/or STARPAY Platforms), STARGATE Protocols, STAR BAND Signaling Protocols, STAR Cellular Access Controlling Rules/Codes/Policies, and other STAR components may be programmed to run the *O/S and/or operate in accordance with the *O/S. In some cases, the connection of one entity of the *O/S to another may be a physically or logically operational on the same network element or on a local area network, where two or more entities of the *O/S thus operate on a single hardware platform and or network. In other cases, the connections between star entities may be remote, between distinct network elements or over network connections spanning distance. Each embodiment may use different hardware, software, and interconnection architectures to achieve the described illustrative functions of the *O/S.

Some Illustrative Non-Limiting Technological Problems being Addressed Herein

One technological problem being addressed in the present disclosure is that user on-line experience is being subject to digital content (e.g. digital advertising) that has become increasingly invasive, interruptive, and universally detested. For example, some content providers purposely irritate online users with copious amounts of digital advertisements only to then to extort monthly payments from only users for software solutions that purport to free the online users from the very spam that providers of digital content have created.

Another technological problem being addressed in the present disclosure is that while many internet browsers (application programs) may offer digital ad blocking technology to suppress online advertising, some browser creators themselves may be conflicted since in suppressing unwanted digital content (e.g. digital adverts), browser creators may obfuscate and/or make it difficult for the online users to configure internet browsers to reduce and/or remove tracking of users' online activities and to obtain the same online experience without giving up their online privacy.

Yet another technological problem being addressed in the present disclosure is that digital advertisements may also innocently present themselves as "sponsored content," yet often take the form of "clickbait", images and/or links that look like they would lead to a newsworthy story and/or interesting video, when various online technologies in fact may allow unscrupulous actors to cleverly design deceptive digital advertisements to extract and/or steal personal information and/or conduct ransomware attacks which may result in undermining users' trust in online publishing.

Yet another technological problem being addressed in the present disclosure is that online users may have a perception of a lack of online privacy and increase feelings of mistrust to digital technologies due to, for example without limitation, a frequency of large scale data security breaches that may have dramatically decreased the level of trust users have that their data and/or activities (e.g. electronic payment activities) would be protected by digital security measures/technologies utilized by unknown and/or known third parties.

Yet another technological problem being addressed in the present disclosure is that online technologies typically lack any capability to effectively execute single online transactions such as, without limitation, execute digital payments for Single Service Units (SSUs), such as, without limitation, single online articles of interest rather than entire online publications, single music tracks rather than entire albums, and similar others units of digital content, and/or digital services, and/or real services having a digital component, and/or any combination thereof.

Yet another technological problem being addressed in the present disclosure is that the online experiences still currently lack micro commerce capabilities (e.g. digital transactions involving, for example without limitation, one or more minor units of one or more currencies that are defined by ISO 4217 standard published by International Organization for Standardization (e.g. one or more U.S. cents, etc.). For example, legacy bank switches which levy high transaction fees are not geared for micro billing.

For example, without limitation, the digital technologies related to Crypto Currencies also lack micro commerce capability. The technological problem of digital technologies related to Crypto Currencies being unable to execute micro commerce/payment/transaction capability that may be due to technological complexities in setting up and/or administering a Crypto Wallet which also typically requires users to be accountable for securing their digital keys, in addition to the complexities in actually transacting from such digital wallets due to, for example without limitation, computational intensity and/or digital resource demand (e.g. CPU/GPU processing power requirements, computer memory demand, electricity demand, etc.) involved in executing and/or recording digital transactions in Crypto Currencies.

Further, while the promise of Crypto is decentralization to democratize digital transactions (e.g. currency), the Crypto exchanges which facilitate trading, may be necessarily centralized and typically vulnerable to various cyberattacks. For example, it has been reported that one in three Crypto Exchanges have been hacked, resulting in the theft and loss of millions of crypto currency worth billions of dollars.

Yet another technological problem being addressed in the present disclosure is that the Crypto currencies may be more subject to the volatile swings in valuation and the potential for market manipulation by numerous bad actors utilizing various digital techniques which may translate in considerable real losses in fiat currencies.

Yet another technological problem being addressed in the present disclosure is that in accordance with the BCSM and control points/elements that may govern communication setup, progression and billing in a typical Intelligent Network (IN) (e.g. a network architecture specified in the ITU-T Q.1200 series recommendations), the typical IN is limited since the typical IN only applies a communication tariff on a pro-rata basis when the communication is a telephony call, where the total charge is calculated on the total call duration (e.g. a number of seconds or minutes consumed). In one case of such typical IN, billing and/or controlling elements is programmed to provide subsequent quotas as the call continues past an initial quota. Alternatively, in another case of such typical IN, the initial quota may also be the final quota, which once exhausted may result in the call being disconnected (released). For example, on determining that credit sufficiency exists in accordance with the BCSM and based on the tariff associated with a requested call destination, identified by the address signals (e.g. called party number (CdPN)), a processing element (e.g. billing element/system) of the typical IN may then respond to the controlling element with an Initial Service Quota (e.g. a maximum permitted call duration) and an instruction to CONTINUE switching and routing the call toward the destination.

Furthermore, in case of the typical IN, the controlling elements may arm certain Trigger Detection Points (TDP) that may be encountered during communication progression, in order to be alerted, for example, without limitation, arming a TDP-R (TDP armed as Request), which when encountered suspends a communication processing awaiting further instruction from the controlling element, or to be notified, for example arming a TDP-N (TDP armed as Notification), which simply notifies the controlling element when the event is encountered. In one embodiment, these trigger detection points may be statically armed and set in the subscriber profile (e.g. in the O-CSI).

In one embodiment, a typical controlling element of the typical IN may issue a Request Report BCSM Event (RRBE) to be notified when the originating call is answered (DP O_Answer), and when the call is released (DP O_Disconnect) in order to control and/or monitor the call, and thus control billing in substantially real-time, and to compute the total charge to be applied based on the call duration. Further, controlling and/or billing elements of the typical IN may be programmed to instruct the typical switching element to execute Apply Charging (ACH) function(s), where the typical switching element starts or continues to monitor the call duration, and when the initial quota is exhausted or when the call is released, the switching element may then furnish the typical controlling element with an Apply Charging Report (ACR). On receiving the ACR the typical controlling and/or billing element(s) may then compute the total charge, based on the call tariff, that is to be applied for the call by processing and generating a CDR (Call Data Record).

Consequently, yet another technological problem being addressed in the present disclosure is that there is a lack of a technological solution that would allow a cellular device (e.g. a smartphone) to signal to an operator of a cellular network (e.g. a typical IN billing element) a tariff to be applied to a call or service, and thereby control/cause a process of recording/generating/applying a charge (e.g. CDR) in an electronic data record associated with the cellular device.

Yet another technological problem being addressed in the present disclosure is that there is a lack of a mechanism to automatically recall and/or reverse a transaction once it has been submitted.

Yet another technological problem being addressed in the present disclosure is that many users may be entrapped into recurring subscriptions to services they did not intend to subscribe for, and/or did not understand subscription implication or terms, because, for example, without limitations, terms of services were not clearly presented and/or articulated, via a Premium Short Message Service (PSMS) communications since such communications are not technically indicative of the resultant tariff and charge to be applied. For example, for the typical IN network to apply a differentiated billing tariff, the typical IN network would need to utilize an alternate bearer and service, such as PSMS, where assigning a short address code to the messaging service which may then be associated and utilized to apply a different tariff, typically a premium rate, to users utilizing the messaging service. However, such Premium SMS (PSMS) rated billing element of the typical IN is not programmed to recognize short codes themselves as enumerating and being triggers indicative of the resultant tariff and charge to be applied. Consequently, one of technological shortcomings of PSMS rated billing element of the typical IN is a need for metadata, transported in an SMS body, in order to communicate to users what tariff is to be applied to the selected service. Typically, such metadata may be deficient in informing users. Moreover, another technological shortcoming of the typical PSMS model is that the desired tariff and charge to be applied is not being communicated from the cellular device associated with the user/consumer but by a third party PSMS platform provider that instructs the operator's IN billing system what charge to apply based on the service that is being requested, placing billing out of the user's control.

Yet another technological problem being addressed in the present disclosure is that the internet-originated cellular billing, such as, without limitation, Direct Carrier Billing (DCB) may permit third-party charges for digital content and services to be levied against a cellular account without control and transparency afforded to the user and without being originated from the cellular device associated with the user. DCB, for example, may be considered as an Internet backdoor to the Carrier Billing System permitting transactions that may thus be described as Internet Originated (IO) billing. For example, DCB authenticates cellular devices using a two-factor authentication (2FA) method such as 2FA SMS that may send a One Time Passcode (OTP) over a cellular network that is then required to be resubmitted by the user/customer via the internet connection back to the access control platform to verify an identify of the cellular device (e.g. MSISDN). While on the surface 2FA appears to offer additional layer(s) of security, as described herein, the use of 2FA may create a number of technological shortcomings by, for example, introducing additional steps and/or clicks (e.g. six (6) additional clicks required to process a single 2FA, including, without limitation: opening the SMS, entering the four (4) digits or more of the OTP into the Internet application (IAPP) and clicking submit). Further, additional technological shortcoming associated with the 2FA SMS is the use of the SS7 messaging network that may have inherent security vulnerabilities. For example, the SS7 signaling network may permit malicious actors with access to an SS7 peering point, to redirect and/or intercept these mobile terminating signals carrying authorization codes. Such security shortcomings associated with utilizing 2FA over the SS7 signaling network may typically be caused by a condition where the source of SS7 messages is not authenticated and critical network controlling messages may thus be injected into the SS7 network from entities masquerading as cellular devices (e.g. mobile phones) and/or switching and controlling elements. For example, a malicious actor may simply inject and thereby fake a cellular device's location update (or similarly overwrite subscriber profile information in an HLR, etc.), hijacking the cellular routing to surreptitiously intercept phone calls and/or SMSs.

For example, Man-In-The-Middle (MITM) attacks have led the US National Institute of Standards and Technology (NIST) to reverse their recommendation and support for such 2FA services. Thus, in at least some instances, while purporting to increase security, cellular 2FA may compromise security, given that anyone with sufficient knowledge in exploiting the SS7 vulnerabilities, may be able to present another person's MSISDN (MSISDN of a computing device (e.g., mobile phone, etc.) associated with another person), intercept the authentication code(s), and illegally transact on the now compromised (hijacked) cellular account.

Further, in at least some instances, while cellular operators/carriers may be able to probe their network traffic to extract the device identity of the cellular device, for example, by inspecting a cellular data source IP (Internet Protocol) address and correlating cellular data session identifier(s) with cellular device ownership and identity data (e.g. the MSISDN), being stored by network element(s), at least one technical shortcoming of such approach is due to a requirement on the part of the user to be connected to the Internet over the Mobile Packet Backbone Network (MPBN), using cellular packet data bearers which would be not available to those who use WIFI connections, where originating source traffic would not necessarily transit the cellular network and/or uniquely identify the transmitting cellular device.

For example, in at least some instance, an additional technological shortcoming being recognized herein is that once the cellular device is authenticated, DCB would be typically conducted using Premium Rate SMS communications (PSMS) which may be also vulnerable to abuse (e.g. security breaches, vishing attacks, etc.). For example, when the user selects an option to pay by cell/mobile phone (e.g. see FIG. 10), the DCB platform would typically send an SMS, originating from a Premium Rate Short Code Address (the address of the DCB messaging platform), to the cellular device of the user/consumer. Typically, the SMS would contain a transaction price in the SMS message body that would be programmed to request a recipient (e.g. the consumer) to reply in the affirmative (e.g. "Y") to confirm the transaction.

Moreover, an additional technological shortcoming being recognized herein is that when DCB platform receives the SMS reply confirmation, the DCB platform may not reliably determine that the SMS reply confirmation would have been sent from the cellular device, and the acceptance and trust by DCB platform that the SMS reply confirmation came from the cellular device and, thus, is representative of the consumer's explicit permission to complete the transaction, may be misplaced since the SMS reply confirmation itself may be compromised by trojans (malware) that intercept and respond in the background without alerting the consumer/user. On receiving an SMS reply confirmation to the PSMS, the DCB Platform may complete the access action by instructing a billing element of a cellular operator/carrier (e.g. Carrier Billing System) to, for example, without limitations, debit the transaction amount from a pre-paid cellular account associated with the user's cellular device or charge the transaction amount to cellular account associated with the user's cellular device. As detailed herein, at least some technological shortcomings are being addressed herein are due to a multitude of security vulnerabilities associated with one or more of the following steps of the typical DCB process:

1) The user must manually select a cellular billing as the payment method;
2) The user must manually enter, and thereby expose, their cellular phone number (e.g. MSIDN) to third parties;
3) The user must await a 2FA SMS code on their cell/mobile phone to verify their MSISDN;
4) The user must switch application context to open the SMS received and memorize the onetime passcode (OTP) contained therein;
5) The user must recall and manually reenter the OTP into the internet service application screen;
6) The user must then await a PSMS to accept the transaction price;
7) The user must manually reply to confirm the PSMS transaction amount; and
8) The user may only then consume the content or access the service.

For example, even in a case when the carrier network may utilize the packet probing to authenticate the cellular identity, the process would still utilize 2FA which would still result a cellular billing transactional sequence that may include over twenty (20) manual keystrokes and clicks. Even once the cellular device has been authenticated, subsequent DCB transactions may still require, at minimum, 6 or more manual user driven inputs. Further, the above steps 6 and 7 in DCB protocols are typically mandated to meet regulatory requirements governing user opt-in and purchase confirmation, when selecting payments for third party content and services directed to their cellular account.

Moreover, yet another technological shortcoming is that since the only detailed record of the transaction is the Internet Originated SMS body's messaging content which the cellular carrier does not typically store and/or report in itemized billing (e.g. account record), and given that the SMS reply confirmation may be unauthorized (e.g. hijacked by a bad actor) and does not encapsulate and carry the messaging content forward along the SMS transactional path (e.g. the DCB transaction record is transient and deficient), the typical IN of the cellular operator/carrier may be forced to rely on the third-party metadata. For example, the cellular account may simply itemize/describe the DCB transaction as an SMS incurring the said premium cost, without providing an authoritative and irrevocable cellular data record capturing the transaction amount as confirmed by the user at the time of the purchase. In at least in some instances, such incomplete billing record may result in many contested DCB transactions that would be recorded in the cellular accounts. Thus, being under 3rd party billing control, DCB is inherently vulnerable, requiring extensive fraud detection and prevention measures. Further, such security measures are typically predicated on users auditing their billing statements and reporting suspicious transactions.

Consequently, many fraudulent DCB deductions go undetected and unreported costing the consumer untold billions in unauthorized transactions, where relatively small amounts go undetected, affecting millions upon millions of unsuspecting online users in a practice known as "skimming".

Yet another technological problem being addressed in the present disclosure is that users are now typically required to provide their cell numbers in the clear, without any encryption, for delivery of 2FA codes in order to verify the cell number, and to register and gain access to services (e.g., FaceBook™ and WhatsApp™ by Meta, Twitter™, Signal™ (Signal Messenger LLC.), and others) which may compromise privacy and/or security. For example, since 2FA is predicated on sending mobile terminating (MT) signals to the associated device, which necessarily requires the cell ID (e.g. MSISDN) to be presented in the clear in order to address and deliver One Time Passcodes (OTP) to a user in order to verify their cell ID, the 2FA system stores and thereby may expose millions upon millions of real digital identities (cell phone numbers) to data breaches and/or other activities (e.g., spam, phishing) by nefarious actors, and may allow internet companies to data share the user's PI with a third party without the user's knowledge, control and/or consent.

Yet another technological problem being addressed in the present disclosure is that users, who want to avoid providing their cell numbers for registration, may be able to purchase fake phone numbers, or "burner" phone numbers. Typically, fake phone numbers are used once: after a user receives a verification code and then the number ceases to exist or is reassigned to another user.

Yet another technological problem being addressed in the present disclosure is that there are electronic services such as, without limitation, services offered by companies such as PVACreator (www.pvacreator.com) that may utilize a BOT to automatically bulk register and spawn fictitious accounts, potentially associated with other BOTs, for online services and social platforms.

Yet another technological shortcoming is that digital content publishers who wish to monetize their content may seek to entice their users into a recurring weekly, monthly or yearly subscriptions, since charging for any shorter subscription period, for any less quantum of content, typically is not technically beneficial for online content provider since it may require more complex technical setup and maintenance of electronic/digital resources, including access-restricted electronic/digital resources with an associated fixed cost that would make it prohibitive to operate electronic access on per SSU-basis, and prohibitive for a user/consumer/entity that does not have technological sophistication and/or is unable to build a required technological architecture. For example, individual and small entity content creators are typically forced to funnel their work through content curators and aggregators, who, in one music streaming service, may pay composers a pittance amounting to $0.00001 ($1000^{th}$ of a penny) per track.

Yet another technological shortcoming of the digital subscription technology is that paywalls' of digital subscription would typically have single digit conversions due to lacking sufficient technology-driven interactive experiences to convert and retain users (just 5% subscribe, according to a survey conducted by Digiday™). Thus, subscription based services are heavily skewed in favor of larger national and multinational news outlets and content producers, given their large base, further undermining the democratization of digital publishing.

Yet another example, a long felt, over at least the past three decades, but unsolved need for a technological development related to the present disclosure is identified, without limitations, by *Micropayments, Abridged* (Ryan Shea, medium.com/radartech/micropayments-abridged-2f110302677c): "A functional micropayments system, enabling instant, miniscule transactions under one US dollar, is widely regarded as the holy grail of web monetization . . . . In the past, fundamental issues pertaining to usability, psychology, and economics were neglected. These issues must be solved for micropayments to succeed."

Yet another example, a long felt, over at least the past three decades, but unsolved need for a technological development related to the present disclosure is identified, without limitations, by *The Babbage of the web* (Ted Nelson, The Economist, Dec. 7, 2000): " . . . [H]e hoped, [there] would be a democratization of publishing, because readers would pay only for what they read, and authors of the most popular documents would be rewarded accordingly."

Yet another example, a long felt, over at least the past three decades, but unsolved need for a technological development related to the present disclosure is identified, without limitations, by *Peppercoin Micropayments* (Ronald L. Rivest, Proceedings Financial Cryptography, 2004): "We view the introduction of efficient micropayments into the world of internet e-commerce as potentially as significant as the invention of metal coins by the Lydians in 640 B.C.".

Yet another example, a long felt, over at least the past three decades, but unsolved need for a technological development related to the present disclosure is identified, without limitations, by *Shouldn't We All Have Seamless Micropayments By Now*? (Alvaro Dominguez, wired.com/story/shouldnt-we-all-have-seamless-micropayments-by-now/): "The web's founders fully expected some form of digital payment to be integral to its functioning. But nearly three decades later, we're still waiting . . . . In the absence of a digital-native micropayment system Content creators have to rely on advertising to support themselves. This, too, is a losing game for all but the biggest players. Even the apparent winners of the digital ad economy—Facebook and YouTube—must operate at vast scale, engage in copious surveillance, and subject their systems to minimal human oversight to make ad financing work. Content creators are left chasing eyeballs and fractions of ad dollars on these giant platforms, whose business model favors virality, misinformation, and outrage . . . . As if all that weren't bad enough, intrusive and bloated layers of ad tech slow down the internet and serve as potential vectors for malware. Plus, the online ad business is rife with click fraud; the whole thing may be a house of cards".

Yet another technological problem being addressed in the present disclosure is that, typically, and often necessarily, electronic exchanges that trade in FIAT, Digital, and/or Crypto Currencies are centralized (CeFi—Centralized Finance), requiring instrument and/or wallet disclosure, and consequently vulnerable to cyberattacks (e.g., phishing, spam, etc.) from nefarious actors. In some embodiments, consequently, there may be a need for a simple, fast and secure method to switch and transfer digital currency directly between users, peer to peer.

Yet another technological problem being addressed in the present disclosure is a problem of the fraudulent use of stolen credit/debit cards (collectively "financial instruments" herein) in, for example, online transactions which may cost the industry and consumers significant amounts in risk management surcharges, levies and insurance. For example, a typical Artificial Intelligence (AI) based fraud detection system may identify what may appear to be a fraudulent or suspicious transaction, which may in fact be a legitimate transaction, which then may first be declined pending approval by the consumer (e.g. SMS Fraud Alert sent to the card owners cell phone requesting a YES/NO verification response) to permit the transaction, which may then require the legitimate customer to pause (e.g. wait several minutes) before submitting a second duplicate transaction. A typical, AI system may be inept in predicting legitimate albeit out of the ordinary purchases.

Some Illustrative Non-Limiting Technological Solutions Described Herein, Including Access Controlling Network Architectures and Systems, Having Cellular Network Components and Elements Modified to Host Access Controlling Schemas Designed to Transform and/or Facilitate Cellular Communication Signals in Accordance with Novel Cellular Communications Protocols with Multi-Part Multi-Functional Address Signaling, and Methods for Use Thereof As detailed herein, at least some embodiments of the present disclosure are directed to one or more technological solutions that are designed to address one or more of technological problems identified herein by utilizing access controlling network architectures and systems, having cellular network components and elements, such as, without limitation, controlling and/or billing elements, modified to host access controlling schemas designed to transform and/or facilitate cellular communication signals in accordance with novel cellular communications protocols with multi-part multi-functional addressing, and methods for use thereof. In at least some embodiments, access controlling schemas of the present disclosures may be designed to process mobile originating address signals that are transmitted/emitted in accordance with novel cellular communications protocols (also interchangeably referenced herein as STAR BAND Signaling Protocols) with multi-part multi-functional address signaling that includes a plurality of address signal parts designed for a plurality of functions. Various schemas (e.g., sequences, string, headers) of the multi-part multi-functional address signaling may be referenced collectively herein as "The STAR Cellular Access Controlling Protocols/Codes/Policies."

In at least some embodiments, as detailed below, an illustrative multi-part multi-functional address signaling sequence (also interchangeably referenced herein as STAR Band Signaling Sequence), emitted/transmitted by a computing device (e.g., device 100 of FIG. 1) with cellular signaling capability (e.g., cellular phone) when, for example, without limitation, a user dials and/or sends an SMS (via the computing device) such a multi-part multi-functional access control sequence, displayed to the user, may include at least three parts (considering from the first address signal within the address signal sequence), Part-1/Part-2/Part-3, that are designed to serve at least three respective different functions:

a first part (Part-1) designed to serve a first function,
a second part (Part-2) designed to serve a second function, and
a third part (Part-3) designed to serve a third function.

It should be understood that the symbol "/" is used in the above notation as a mere logical separator between parts of the above illustrative multi-part multi-functional access control sequence and parts may be dialed sequentially, without a separator signal, or are typed sequentially (e.g. as an address for a cellular communication (e.g. call, SMS, etc.). In at least some embodiments, at least two functions of the first function, the second function, and the third function are different. In at least some embodiments, the first function, the second function, and the third function are different.

Figure 2:
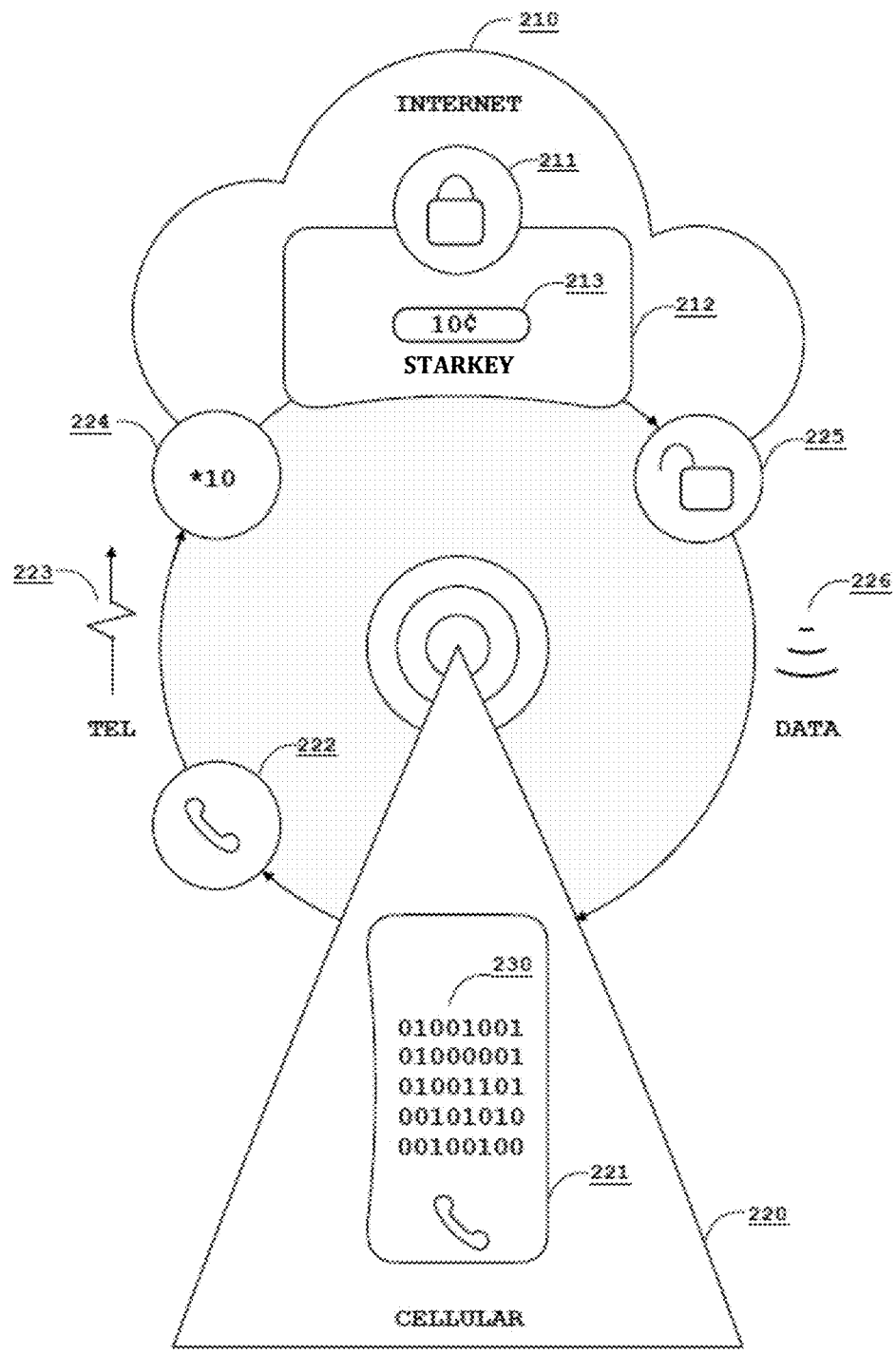
FIG. 2 is an illustrative non-restrictive example of a networking architecture, including at least one intelligent element, in accordance with at least some embodiments of the present disclosure.
Figure 26A:
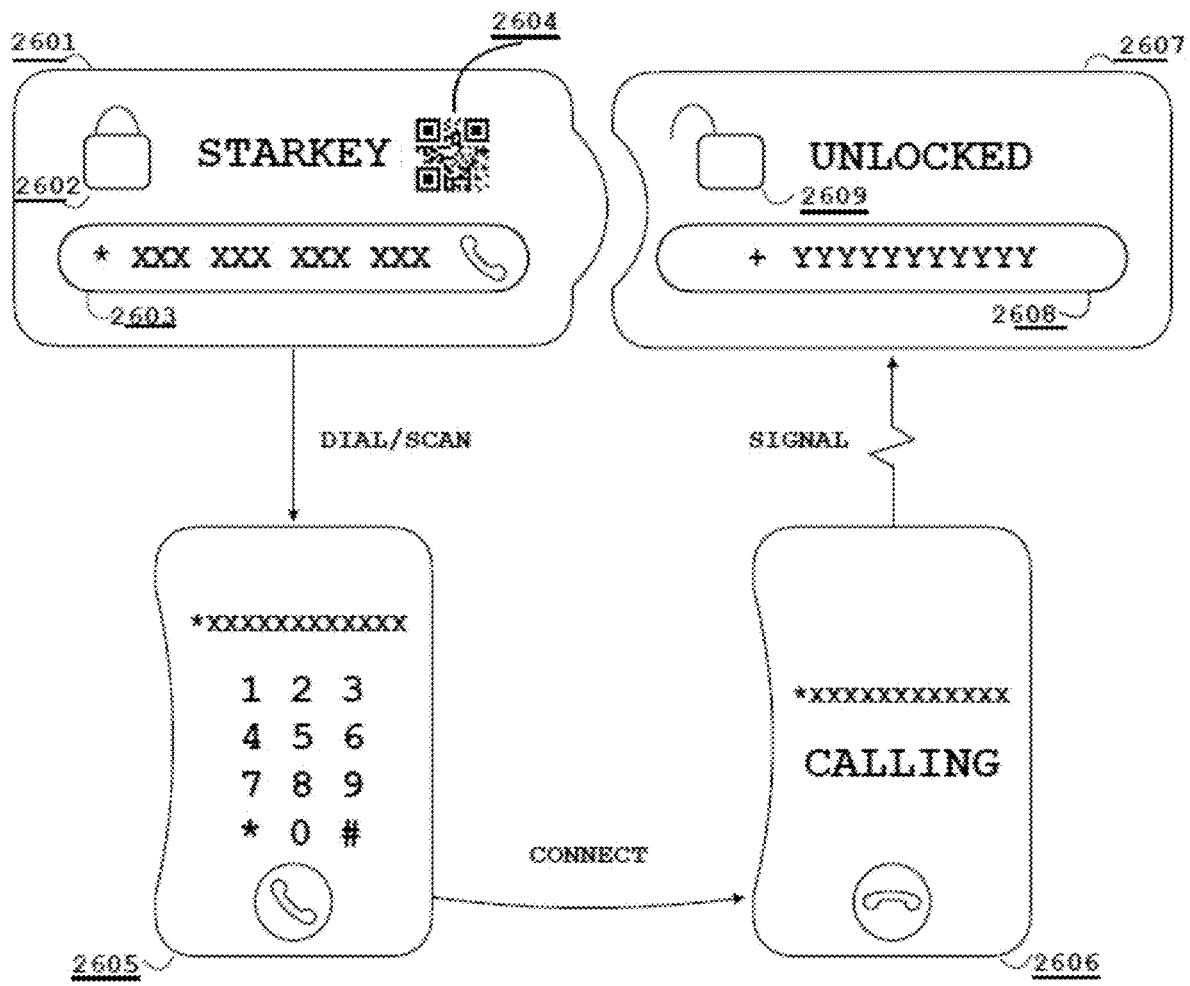
FIG. 26A is an illustrative non-restrictive example of access controlling network architecture(s) utilizing a cellular-signaled access control methodology with expected digital key(s) in accordance with novel communications protocol(s) of at least some embodiments of the present disclosure.

In at least some embodiments, without limitation, the first part (Part-1) may include an address signal corresponding to at least one symbolic routing prefix (e.g. the STAR ("*")), and thus, serving the first function (namely a network routing function) that element(s) (node(s)) of the cellular networks, transformed as detailed herein, may be programmed to recognize as the symbolic network routing prefix and to route the entire multi-part multi-functional address signaling sequence or a modified/parsed multi-part multi-functional address signaling sequence (e.g., a subsequence made of Part-2 and Part-3, a subsequence made of Part-2, a subsequence made of Part-3, a derived subsequence derived from at least one of Part-1, Part-2, or Par-3) to at least one network destination such as, without limitation, a computing platform that may be configured to at least function such as, without limitation, the access control platform 210 of FIG. 2 and/or the STARKEY Platform detailed with respect to FIG. 26A and other figures herein.

In at least some embodiments, an illustrative multi-part multi-functional address signaling sequence may, without limitation, correspond to, for example, without limitation, dialing the sequence of the illustrative multi-part multi-functional access control sequence (e.g., user dials utilizing the native cellular phone APP, or user grants permission for the native cellular phone APP to dial, e.g. with click-to-call functionality) and/or a destination address of a SMS, including Part-1/Part-2/Part-3, in a format of: *NNNXYXYXYXYXYXY, where the star symbol (*) corresponds to address signal(s) comprising Part-1, NNN corresponds to address signal(s) comprising Part-2, and XYXYXYXYXYXY corresponds to address signal(s) comprising Part-3. In at least some embodiments, reference(s) to users manually dialing various address signaling sequences/strings of the present disclosure are illustrative, since the multi-part signaling sequence may be automatically input and dial addressed (e.g. with click-to-call functionality, or via programmable SMS etc.) it is understood, that the same or sufficiently similar principals of operation and communication also applicable when a user enters the multi-part multi-functional access control sequence as a dial destination address or an SMS destination (e.g., user inputs using a SMS messaging app), particularly when the cellular capable device is distinct from the computer device (e.g. laptop, terminal without cellular signaling capability).

Figure 26B:
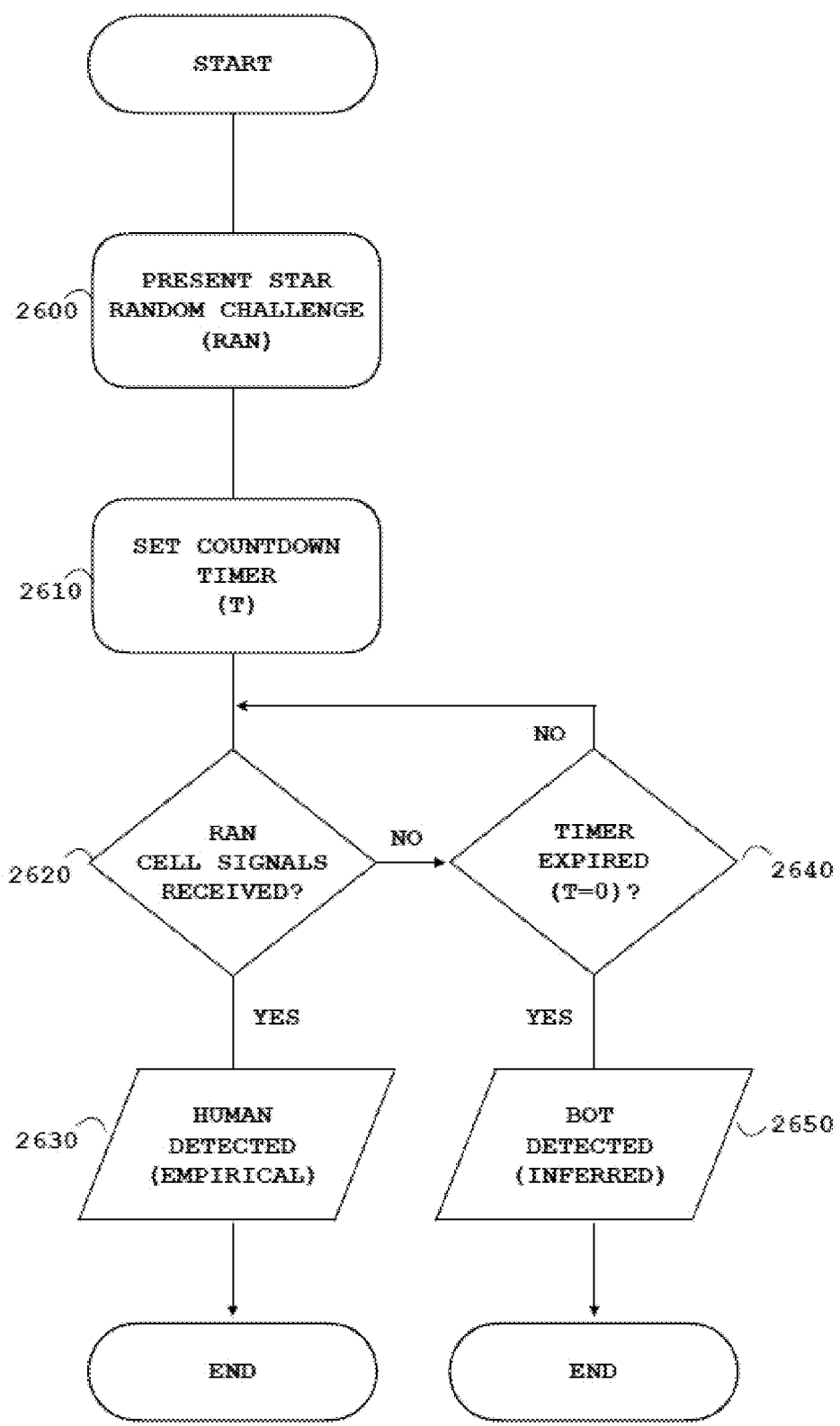
FIG. 26B is an illustrative non-restrictive example of a binary bot detection process by inference based at least in part on cellular communication signals in accordance with at least some embodiments of the present disclosure.

In at least some embodiments, an illustrative multi-part multi-functional address signaling sequence may, without limitation, correspond to an address sequence (e.g., cellular telephony address, SMS address) of an illustrative multi-part multi-functional access control sequence, including Part-1/Part-2/Part-3, in a format of:

routing symbol(s)/access code of FIG. 1/RAN sequence of FIGS. 26A and 26B, where, it should be understood, that the symbol "/" is used in the above notation as a mere logical separator between parts of the above illustrative multi-part multi-functional address signaling sequence and where parts may be dialed sequentially without a separator signal.

In at least some embodiment, the above illustrative multi-part multi-functional access control sequence may be presented as part of, for example, without limitation, the access controller interface element 103 of FIG. 1 as part of a process for accessing a restricted resource, or the Star Challenge 2603 of FIG. 26A as part of an access and authenticate process that would both be communicatively coupled to, for example, the cellular network controlling schema 121 of FIG. 1 which may be part of a cellular network (e.g. a typical IN billing element). Thus, when a mobile originating cellular communications protocol is activated by a cellular-service enabled computing device (e.g., cell/mobile phone) to transmit/emit an access request including the above illustrative multi-part multi-functional address signaling sequence, corresponding to multi-part multi-functional access control sequence, along a cellular signaling path 105 of FIG. 1, the cellular network hosted access controlling schema 121 may in turn recognize Part-2 of the above illustrative multi-part multi-functional access control sequence, also interchangeably referenced herein as a "MICRO BAND," as a tariff to be applied to at least one of a call, product, or service, and, thereby control/cause a process of recording/generating/applying a charge (e.g. CDR) in an electronic data record (e.g., data record in a cell wallet 490 of FIG. 4 (e.g. SIM associated pre-paid account)) associated with the cellular-service enabled computing device (e.g., cell/mobile phone) and/or control/cause a process of debiting the corresponding amount from the cell wallet. In at least some embodiments, Part-2 of the illustrative multi-part multi-functional access control sequence may correspond to one or more minor units of one or more currencies that are defined by ISO 4217 standard (e.g. one or more U.S. cents, etc.).

In some embodiments, in reference for example to FIG. 1, for example, without limitation after the cellular network controlling schema 121 of FIG. 1 performs or causes to perform action(s) in accordance with the desired function associated with Part-2 of the illustrative multi-part multi-functional address signaling sequence, the cellular network controlling schema 121 of FIG. 1 and/or one or more cooperating network elements may be programmed to route/ transport the entire or at least one particular part of the illustrative multi-part multi-functional address signaling sequence that corresponds to and includes Part-3 of the multi-part multi-functional access control sequence (e.g. Part-2 with Part-3, Part-3 only) and, for example, without limitation, at least one identity associated with the cellular-service enabled device (e.g. MSISDN) to at least one remote destination such as, without limitation, the remote internet access control server 111 of FIG. 1 or the STARKEY Platform detailed with respect to, for example, of FIGS. 26A-28, and other figures herein.

In at least some embodiments, the MICRO BAND (Part-2) address signaling may be formatted to support a zero charge option which may be signaled and recorded in a cellular CDR (certificate):

*000RAN (where RAN is Part-3).

In at least one non-limiting embodiment, the zero MICRO BAND Signaling may permit to perform at least one of: a reversal of billing, a reversal of payment authorization, a credit issuance (e.g. a company paying the micro charge/tab for all its users). For example, in at least one non-limiting embodiment, utilizing the function of the zero MICRO BAND signaling and/or Reverse-Billed Data services of mobile operators may allow a website or URL owner to carry the cost of the data used by visitors to their site so that consumers can visit, browse and/or transact with website and/or advertising at no cost to their cellular account balance—including customers being able to reach the website with no airtime/data balance whatsoever. For example, in at least one non-limiting embodiment, utilizing the function of the zero MICRO BAND Signaling and/or Reverse-Billed Data services of mobile operators, may allow, without limitation, for Reversed-Billed SMS messaging where replying to an SMS is charged to a business which sent the message rather than the consumer who is requested to respond to the SMS.

In at least some embodiments, Part-3 of the illustrative multi-part multi-functional access control sequence may include a sequence and series of randomly generated digits, the Star Random Challenge (e.g., RAN) and being processed at the at least one remote destination to perform or cause to perform action(s) in accordance with the desired function associated such as, without limitation, Star Random Challenge and Response, as detailed herein.

In at least some embodiments, Part-3 may include a sequence of randomly generated digits (e.g., The Star Challenge (e.g., RAN)) that the access controlling platform would generate and process as detailed herein. In at least some embodiments, the sequence of randomly generated digits of Part-3 may be generated based on a logarithmic function, where an exponent is a product of a length of Part-3 (X number of digits) (e.g., 10^X), interchangeably referenced herein as "The LOGARITHMIC Band."

In at least some embodiments, various aspects of the creation, processing, utilization, transmission and/or modification of the illustrative multi-part multi-functional access control sequence, including Part-1/Part-2/Part-3, may be performed in accordance with one or more methods/principals/rules disclosed herein and by one or more systems, platforms, access controlling network architectures, elements, and/or components disclosed herein. For example, signals may be determined on the following non-limiting logic: If the total signals (STOTAL) received is greater than a minimum expected length (SMICRO) (e.g. MICRO BAND signals comprising 3 digits) and less than a maximum expected length (SRAN) (e.g. MICRO BAND signals plus RAN signals comprising e.g. 15 digits) then such signals are interchangeably referenced herein as "MACRO BAND" signals. For example, in non-limiting embodiment, MACRO signals may be computed as presented when:

((STOTAL>SMICRO) && (STOTAL<SRAN)).

In at least some embodiments, an exemplary signal to tariff conversion in a packet switching network embodiment may be achieved by, for example, referencing the SIP URI/To String headers, and executing the string operations to parse each Part of the illustrative multi-part multi-functional access control sequence as in the following JavaScript code showing parsing Part-2, exemplary corresponding to fixed three digit notation (NNN) and knowing a particular exemplary STAR BAND signaling protocol such as shown in Table 1:

parseInt(SIP_To.sub string(1,4)).

TABLE 1

| PART-1 (PREFIX) SIGNAL: 0 | PART-2 (MICRO BAND) SIGNALS: 1-3 | PART-3 (RANDOM CHALLENGE DIGITS (10^12) SIGNALS: 4-15 AND BEYOND |
|---|---|---|
| * | NNN [=NNN¢] | XYX YXY XYX YXY |

For example, without limitation, assuming address signals of the illustrative multi-part multi-functional address signaling sequence correspond to a multi-part multi-functional access control sequence of S (e.g. S=*099927485617253), then appropriate substring extraction and integer conversion functions, as detailed herein and executed by, for example, the MNO billing element(s) may extract "099" and convert those MICRO BAND signals (e.g. from string to integer format) into the matching $0.99 charge (e.g. as a CDR) as disclosed herein.

In one non-limiting embodiment, the MNO element(s) may route all undefined Star dialed (e.g. "*" prefixed) numbers using a wildcard routing entry in the network switching element table(s) to the STARKEY access controlling platform while enabling the network billing element(s) to extract the MICRO BAND signaling for charging purposes and where all additional signals (e.g., Part-3), to the right of the MICRO BAND signals, may be transparently transported to the STARKEY access controlling platform for internal computation without MNO interpretation.

In at least some embodiments, the present disclosure of various string and numerical operations (may be referenced collectively herein as "The STAR Cellular Access Controlling Protocols/Codes/Policies") may thus permit the MNO elements(s) to deliver dynamic billing to the Internet, where, for example, without limitation, the disclosed buttons remotely control the core MNO process(es) (e.g., MNO billing procedure(s)).

In at least some embodiments, Part-2 and Part-3 of the multi-part multi-functional access control sequences of the present disclosure may be further delimited using one or more symbols (e.g. "*", "#", etc.), illustrated, without limitation below:

*099*099927485617253 (*Part-2*Part-3)
*000*099927485617253 (*Part-2*Part-3)
*9999*099927485617253 (*Part-2*Part-3)
*099#099927485617253 (*Part-2#Part-3) and so on.

Above illustrative schemas may provide both a visual and a computational marker(s) that separating multi-part signaling bands per the STAR Cellular Access Controlling Protocols/Codes/Policies, and also allowing for a fixed length, variable length, or both, signaling implementations that may be utilized to provide dynamic resource access for multi-resource authentication and authorization, including dynamic charging.

As detailed herein, at least some embodiments of the present disclosure are directed to one or more technological solutions that are designed to address one or more of technological problems identified herein by utilizing MICRO BAND and/or MACRO BAND communications between plurality (e.g., 2, 3, 5, 6, N, etc.) of digital wallets. In at least some embodiments, users may dial (and/or send an SMS or a USSD to) a symbolic routing prefix to digits enumerating a MICRO BAND, followed by digits enumerating a MACRO BAND, the former, for example, without limitation, being instantly deducted from their cellular wallet, for example, without limitation, as detailed herein, and the latter transferred from the sender internet wallet into the recipient internet wallet, where sender computing devices has been authenticated by, for example, one or more methods, detailed herein, that may result in an identity of the sending device being stored, in an internet application (e.g. IAPP, browser etc.), and thus, allowing systems/components/elements/devices of the present disclosure to utilize multi-part MICRO BAND (NNN)/MACRO BAND (XXX) address signaling.

As detailed herein, at least some embodiments of the present disclosure are directed to one or more technological solutions that are designed to address one or more of technological problems identified herein by utilizing, for example, without limitation, mobile originating FLASH HOOK signaling, whereby communications may be conducted on a sub-one second call that instantly connects and disconnects, generating, in one non-limiting embodiment, a session ticket (e.g. CDR) at the originating mobile switch for an amount equivalent to the MICRO BAND address signals (digits).

As detailed herein, at least some embodiments of the present disclosure are directed to one or more technological solutions that are designed to address one or more of technological problems identified herein by utilizing, for example, without limitation, an illustrative permission-based communication protocol of the present disclosure that may be configured to uniquely synchronize and correlate such a flash hook cellular communication session event, with a second internet wallet addressing a recipient, thus seamlessly and securely switching digital tokens (e.g. digital assets representing FIAT and/or Cryptocurrency) in a peer-to-peer signaling communication session, on a time-efficient (e.g. nanoseconds, millisecond, microseconds, etc.) signaling protocol at marginal cost using reduced computing and/or network resources.

As detailed herein, at least some embodiments of the present disclosure are directed to one or more technological solutions that are designed to address one or more of technological problems identified herein by utilizing, an illustrative Star TAP communication signaling protocol that may be configured to enable, without limitation, any Star recipient to instantly redeem their Star tokens for FIAT currency by transferring them to other people who are willing to trade tokens for cash and other services, using a permission-based controlling schema hosted in the cloud for use, by amongst, for example and without limitation, friends and family.

As detailed herein, at least some embodiments of the present disclosure are directed to one or more technological solutions that are designed to address one or more of technological problems identified herein by utilizing, an illustrative TAP communications signaling protocol that may be in a form of a social media-type network delivering nano-cell (i.e., down to the individual cellular phone) ATM styled communication sessions with capabilities that allow users to redeem Star digital assets (e.g., currency/tokens) for, for example, without limitation, FIAT currency, and further to settle, for example, invoices (i.e., digital receipts) for online and/or real world goods and/or services rendered in both the formal and informal sectors (e.g., housework, home repairs, babysitting, etc.).

As detailed herein, at least some embodiments of the present disclosure are directed to one or more technological solutions that are designed to address one or more of technological problems identified herein by utilizing, an illustrative Star TIP communications signaling protocol that may be configured to enable any service provider, in both the formal and/or informal sectors, to accept Star currency/tokens that may be earned, in numerous ways such as, without limitation, performing online activities as, without limitation, disclosed herein (e.g. digital content publishing), receiving as a gratuity, simply by displaying an Internet QR code that links directly to their Star Internet Wallet address (e.g. MSISDN-B).

As detailed herein, at least some embodiments of the present disclosure are directed to one or more technological solutions that are designed to address one or more of technological problems identified herein by utilizing, an illustrative so-called digital/virtual Star "tip jar" (Star Internet Wallet addressed on the recipients cellular phone number (i.e. MSISDN, hashed cellular identity XYM4, etc.)), allowing users to digitally receive tips for activities such as, without limitation, physical delivery of goods and/or services that may have been created by the online marketplace (e.g., FedEx, UPS, Uber Eats, Uber, Lyft, Craig's List, etc.).

As detailed herein, at least some embodiments of the present disclosure are directed to one or more technological solutions that are designed to address one or more of technological problems identified herein by utilizing, an illustrative Star INV (Invoicing) and communications signaling systems, network architectures, and methods disclosed herein, to enable any service provider to accept Star currency/tokens for instant invoice settlement capture and/or satisfaction/recordation, directly switched between Star Internet Wallets, that may be created to accept and/or record electronic activities (e.g. electronic payments/transactions) on the fly, without any registration procedure required, by simply addressing and directing payments to a cellular phone number (e.g. MSISDN, XYM4 etc.), encapsulated, in one embodiment, in a QR Code (e.g. URL encoding).

As detailed herein, at least some embodiments of the present disclosure are directed to one or more technological solutions that are designed to address one or more of technological problems identified herein by utilizing, illustrative Star TAP, TIP and INV protocols that may be configured to use personalized Payment URLS (PURLS) and/or QR codes to deliver frictionless permissive communication sessions based on novel mobile originating communication addressing signaling and associated activities (e.g. payments) as disclosed herein.

As detailed herein, at least some embodiments of the present disclosure may utilize one or more described embodiments to permit P2P (Peer to Peer) communication sessions that may involve, without limitation, payments and/or transfers of digital tokens (e.g. digital assets representing FIAT and/or Cryptocurrency.

Illustrative Non-Limiting Embodiments of Cellular Systems Having Elements Modified to Transform and/or Operate Cellular Communication Signals in Accordance with Novel Cellular Communications Protocols and Network Architectures Utilizing Cellular Network Hosted Access Controlling Schemas, and Methods for Use Thereof As detailed herein, at least some embodiments of the present disclosure are directed to one or more technological solutions that are designed to address one or more of technological problems identified herein by utilizing specifically programmed elements of cellular networks, such as controlling and/or billing elements. In some embodiments, controlling and billing routines may be programmed to be performed by the same element of the IN.

For example, as discussed herein, one technological shortcoming of a typical IN is that an operator/carrier could only apply a single published tariff to a single class of calls, for example, without limitations, a tariff for international calls by country, a tariff for national calls, a tariff for on/off net national calls, a tariff for fixed line terminating calls, a tariff for mobile terminating calls etc., such tariffs which themselves may be further differentiated, for example, by a user/customer's service agreement, profile, or by the time of day etc.). Moreover, another technological shortcoming of typical IN is that, where unlimited calls may be provided for certain call classes in return for a fixed subscription fee, calls may be metered without necessarily attracting additional charges.

As detailed herein, at least some embodiments of the present disclosure are directed to one or more technological solutions that are designed to address one or more of technological problems identified herein by utilizing one or more elements of cellular networks that may be specifically programmed to overcome, for example, without limitations, the technical shortcoming of utilizing a single published tariff to a single class of calls, by permitting a plurality of billing tariffs to be applied to a single class of call, for example, a plurality of tariffs for star calls (calls that are prefixed with a star symbol). In one embodiment, this plurality of tariffs is accomplished by pre-populating a rating table, stored in non-transitory memory of the specifically programmed element of a particular cellular network (e.g. IN), with amounts that directly map and match the symbolically prefixed address signals, which enumerate and encapsulate the desired billing tariff. In such an embodiment, a discrete (fixed) number of rating table entries may be populated to define a desired set of tariffs, as tabulated and described, for example, without limitations, in FIG. 15B.

As detailed herein, at least some embodiments of the present disclosure are directed to one or more technological solutions that are designed to address one or more of technological problems identified herein by utilizing one or more elements of cellular networks (e.g. operators' billing system and rating engine) that may be specifically programmed to support the present signaling disclosures, in order to dynamically determine the applicable tariff computationally, for example, without limitations, by parsing the symbolically prefixed address signals into an integer format which then equates to the monetary suitable and applicable billing charge (e.g. as applied to the CDR). For example, transforming an address signal string "*NNN" into an integer format of "NNN", equating for example to, a billing charge of NNN cents (¢) that would be recorded in the user's cellular account data record. In some embodiments, the computation may include a first step of extracting a fixed number of characters (e.g. three in an NNN signaling format) from the address signals string into a sub string enumerating the billing charge, in order to compute the integer value and monetary suitable, as described, for example, below with reference to FIG. 15B.

For example, before the present disclosure, if a user of a cellular device were to dial on a keypad, for example, "*009", the user would hear an error voice message such as "We are unable to complete the call.", since the operator would lack the requisite billing intelligence and routing modifications as disclosed herein. In contrast, As detailed herein, at least some embodiments of the present disclosure are directed to one or more technological solutions that are designed to capitalize on such a network exception (error) by reprogramming the network with new logic in order to successfully service and support such star calls, and thereby enable micro charges, directed by the mobile device, as disclosed herein. Such network error messages may be addressed, for example, without limitations, by programing one or more elements of cellular networks (e.g. controlling element(s) (e.g. SCP/SCF) of an IN, billing element(s) of an IN (e.g. OCS)) to process the sequence of "*009", recognizing (e.g. parsing out) "009" as a monetary suitable tariff, by example, nine (9) cents, and create or instruct to create a corresponding CDR in the amount of nine (9) cents to be applied to an account associated with the cellular device, and thereafter, route the communication to a servicing access control platform (e.g. Star Node or DCB of the present disclosure) in order to complete an associated internet transaction.

Notably, As detailed herein, at least some embodiments of the present disclosure are directed to one or more technological solutions that are designed to address one or more of technological problems identified herein by utilizing one or more elements of cellular networks (e.g. controlling element(s) (e.g. SCP/SCF) of an IN, billing element(s) of an IN (e.g. OCS)) that may be specifically programmed to apply the tariff in a unitary rather than a pro-rata fashion. That is, a fixed rather than a variable charge is applied as defined by the call tariff, regardless of the call duration.

As detailed herein, at least some embodiments of the present disclosure are directed to one or more technological solutions that are designed to address one or more of technological problems identified herein by utilizing, without limitation, a HOOK FLASH method which intentionally limits the call to a very short duration (e.g. one second), such a fixed charge billing protocol may be realized by programming to record the applicable charge as a per minute rather than a per second rating tariff Thus, in contrast to above detailed technological shortcomings associated with typical PSMS methods, at least some embodiments of the present disclosure are directed to one or more technological solutions that are designed to be transparent to users/consumers since the address signals (e.g. the dialed digits), equate directly to the tariff and billing charge to be recorded, in a one-to-one relationship (i.e., "what you dial is what you pay.").

As detailed herein, at least some embodiments of the present disclosure are directed to one or more technological solutions that are designed to address one or more of technological problems identified herein by utilizing one or more elements of cellular networks (e.g. IN controlling elements SCP/SCF and billing elements, OCS) that may be specifically programmed to execute micro payment service/charge/payment, by, for example, without limitations:
i) Restricting the maximum transaction amount,
ii) Removing additional payment confirmation step(s),
iii) Disallowing recurring subscriptions in favor of supporting only SSU, and
iv) Automatically switching micro payments to elements of cellular networks (e.g. cellular billing systems).

As detailed herein, at least some embodiments of the present disclosure are directed to one or more technological solutions that are designed to address one or more of technological problem of not being able to automatically reverse a transaction once it has been submitted by, for example, without limitations, creating the transparent and sustainable process with the sufficient transactional details in records of cellular carriers/operators to reduce or eliminate a burden of charge reversal on electronic payment processors based, at least in part, on practical, psychological and financial grounds, allowing to address and/or sidestep a hitherto unsolvable problem. For example, by restricting the maximum transaction to minor (micro) amounts, the systems and methods disclosed herein obviate the need to process reversals and refunds on such single service units (i.e., discrete) transactions, as they are perceived to be financially immaterial, and psychologically inconsequential.

As detailed herein, at least some embodiments of the present disclosure are directed to one or more technological solutions that are designed to address one or more of technological problems identified herein by utilizing one or more elements of cellular networks (e.g. controlling element(s) (e.g. SCP/SCF) of an IN, billing element(s) of an IN (e.g. OCS)) that may be specifically programmed to allow the cellular networks to leverage cellular telephony networks to conduct high frequency activities, for example, without limitation, micro billing on billions of existing mobile (e.g. cellular) wallets (e.g. digital account records at mobile communication companies/entities) holding trillions of dollars in digital airtime currency, to deliver seamless, frictionless, and trustworthy digital experiences that are related, without limitation, to, for example, online digital content and/or services. For example, As detailed herein, at least some embodiments of the present disclosure are directed to one or more technological solutions that are designed to address one or more of technological problems identified herein by utilizing one or more elements of cellular networks (e.g. controlling element(s) (e.g. SCP/SCF) of an IN, billing element(s) of an IN (e.g. OCS)) that may be specifically programmed to allow the cellular networks to provide micro commerce capability (e.g. digital transactions involving, for example without limitation, one or more minor units of one or more currencies that are defined by ISO 4217 standard (e.g. one or more U.S. cents, etc.).

As detailed herein, at least some embodiments of the present disclosure are directed to one or more technological solutions that are designed to address one or more of technological problems identified herein by utilizing one or more elements of cellular networks (e.g. controlling element(s) (e.g. SCP/SCF) of an IN, billing element(s) of an IN (e.g. OCS)) that may be specifically programmed to transform and/or operate cellular signals in accordance with novel communications protocols and network architectures so as to leverage the cellular networks (Mobile Telephony Networks) for software licensing, by, for example, without limitation, allowing users to secure (e.g. purchase) application time, much as one currently secures (e.g. purchases) mobile (e.g. cellular) air time, to rent an application for a short period of time (e.g. few minutes, an hour, few hours, a day, few days, etc.) rather than paying a higher perpetual monthly license fee for infrequent use, and, thus, without limitation, allowing users to control precisely what, when and how much to consume, rather than being force fed unwanted digital advertisements and locked into recurring digital subscription surcharges.

As detailed herein, at least some embodiments of the present disclosure are directed to one or more technological solutions that are designed to address one or more of technological problems identified herein by utilizing one or more elements of cellular networks (e.g. controlling element(s) (e.g. SCP/SCF) of an IN, billing element(s) of an IN (e.g. OCS)) that may be specifically programmed to transform and/or operate cellular signals in accordance with novel communications protocols and network architectures so as to provide an enhanced sense of Privacy and/or Trust in digital online experiences/transactions/interactions to users, that their data is safe and their privacy is protected.

As detailed herein, at least some embodiments of the present disclosure are directed to one or more technological solutions that are designed to address one or more of technological problems identified herein by utilizing one or more elements of cellular networks (e.g. controlling element(s) (e.g. SCP/SCF) of an IN, billing element(s) of an IN (e.g. OCS)) that may be specifically programmed to transform and/or operate cellular signals in accordance with novel communications protocols and network architectures so as to allow processing transactions of micro monetary value (minor units of currencies) to perform low cost, highly scalable micro payment activities/transactions/interactions, switched directly in the dial stream.

As detailed herein, at least some embodiments of the present disclosure are directed to one or more technological solutions that are designed to address one or more of technological problems identified herein by utilizing one or more elements of cellular networks (e.g. controlling element(s) (e.g. SCP/SCF) of an IN, billing element(s) of an IN (e.g. OCS)) that may be specifically programmed to transform and/or operate cellular signals in accordance with novel communications protocols and network architectures so as to allow for micro billing to be executed during a short time duration (e.g. milliseconds) of Mobile Originating Signaling that is emitted during a call setup phase, which may follow a switching logic and one or more billing rules that may be defined by the Originating Basic Call State Model (OBCSM).

As detailed herein, at least some embodiments of the present disclosure are directed to one or more technological solutions that are designed to address one or more of technological problems identified herein by utilizing one or more elements of cellular networks (e.g. controlling element(s) (e.g. SCP/SCF) of an IN, billing element(s) of an IN (e.g. OCS)) that may be specifically programmed to transform and/or operate cellular signals in accordance with novel communications protocols and network architectures so as to allow telephony calls to progress through a Basic Call State Model (BCSM), with standardized Points in Call (PICS) and Trigger Detection Points (TDP) and/or Initial Filter Criteria (IFC), and Service Trigger Points (STP), collectively defining sequential steps where a network logic of present description may be applied during an initial call setup and ongoing call state management. For example, without limitation, one or more communications protocols detailed herein may utilize a finite state machine feature of the BCSM and PICS to permit a switching element (e.g. MSC) configured as detailed herein, to interact with one or more controlling and billing elements of cellular networks (e.g. Intelligent Network Nodes as per ITU-T Q.1200 series recommendations (International Communication Union)), to notably perform/execute one or more of Authentication, Authorization, and/or Accounting (AAA) procedures, delivering billing verification, real-time account balance management and call progress monitoring as detailed herein.

In some embodiments, during one such billing verification step, the requested call may be paused to determine whether an account associated with the caller has sufficient credit to continue and complete the call. That is to determine whether the call can be permitted to advance and mature to ringing state and be answered. Similarly, one or more communications protocols detailed herein may involve one or more billing systems that utilize rating engines and/or tables, and Call Data Records (CDRS) which may record transactions and apply charges on a digital network.

As detailed herein, at least some embodiments of the present disclosure are directed to one or more technological solutions that are designed to address one or more of technological problems identified herein by utilizing one or more elements of cellular networks (e.g. controlling element(s) (e.g. SCP/SCF) of an IN, billing element(s) of an IN (e.g. OCS)) that may be specifically programmed to transform and/or operate cellular signals in accordance with novel communications protocols and network architectures so as to allow to quantify the monetary value, and thereby the billing, of a communication, by encapsulating the discrete charge itself in the address signals (e.g. digit for decimal digit) so that the dialed telephony address of a communication enumerates the actual cost of the communication and, consequently, the billing charge applied in a data record (e.g. database) of an operator/administrator/carrier associated with the cellular network.

In some embodiments, one or more novel communications protocols detailed herein are designed to configure/modify/utilize various components of cellular communications networks to allow to quantify the monetary value, and thereby the billing, of a communication, by encapsulating the tariff itself in a message (e.g. SMS) address signals (e.g. digit for decimal digit) so that the address of a communication, enumerates the actual cost of the communication.

As detailed herein, at least some embodiments of the present disclosure are directed to one or more technological solutions that are designed to address one or more of technological problems identified herein by utilizing one or more elements of cellular networks (e.g. controlling element(s) (e.g. SCP/SCF) of an IN, billing element(s) of an IN (e.g. OCS)) that may be specifically programmed to transform and/or operate cellular signals in accordance with novel communications protocols and to uniquely map the dialed digits to the monetary suitable (e.g. on a rating table lookup), so as to deliver technological transparency to related activities by, for example, explicitly and emphatically highlighting the cost in the actual dialed digits.

As detailed herein, at least some embodiments of the present disclosure are directed to one or more technological solutions that are designed to address one or more of technological problems identified herein by utilizing one or more elements of cellular networks (e.g. controlling element(s) (e.g. SCP/SCF) of an IN, billing element(s) of an IN (e.g. OCS)) that may be specifically programmed to transform and/or operate cellular signals in accordance with novel communications protocols and network architectures so as to avoid a lack of transparency and trackability on the part of the user that may be caused by an ability of a third party platform to unilaterally pull funds from an account associated with a cellular user that would be associated with one or more technological problems discussed herein.

As detailed herein, at least some embodiments of the present disclosure are directed to one or more technological solutions that are designed to address one or more of technological problems identified herein by utilizing one or more elements of cellular networks (e.g. controlling element(s) (e.g. SCP/SCF) of an IN, billing element(s) of an IN (e.g. OCS)) that may be specifically programmed to transform and/or operate cellular signals in accordance with novel communications protocols such as, without limitations, the Mobile (Cellular) Originated HOOK FLASH signaling protocol disclosed herein, to overcome such cellular certification disintermediation and the resulting security vulnerabilities, by utilizing the AAA (Authentication, Authorization and Accounting) protocol in Mobile Originated (MO) telephony, entering the billing systems of a mobile (cellular) network transparently through the carriers' "front door, so to speak."

As detailed herein, at least some embodiments of the present disclosure are directed to one or more technological solutions that are designed to address one or more of technological problems identified herein by utilizing one or more elements of cellular networks (e.g. controlling element(s) (e.g. SCP/SCF) of an IN, billing element(s) of an IN (e.g. OCS)) that may be specifically programmed to transform and/or operate cellular signals in accordance with novel communications protocols and network architectures so as to uniquely and securely capture the cost of the transaction in the address signals emitted by the cellular device, and, in accordance with one or more disclosed communications protocols, such as, without limitations, a HOOK FLASH transactional protocol, innately and authoritatively generate a native cellular billing certificate (CDR) to irrevocably capture and record the transactional data.

As detailed herein, at least some embodiments of the present disclosure are directed to one or more technological solutions that are designed to address one or more of technological problems identified herein by utilizing one or more elements of cellular networks (e.g. controlling element(s) (e.g. SCP/SCF) of an IN, billing element(s) of an IN (e.g. OCS)) that may be specifically programmed to and/or to instruct to transparently timestamp all transactions and record transactions consistent with, for example, without limitations, any other telephony call, displaying the dialed address together with the call duration and enumerated cost, substantially at the moment of the transaction, and which may be directly correlated with the cellular device call log (e.g. recent calls). For example, transactions administered in accordance with the present disclosure may result in the following itemized cellular phone bill entry as shown in Table 2:

TABLE 2

| Date Time | Dialed | Duration | Cost |
|---|---|---|---|
| 2021/10/01 10:30:15 | *010 | 00:01 | $0.10 |

In some embodiments, the present disclosure considers that the typical credit card processing is based on two transactional states
1) Card Present and
2) Card Not Present.
For example, typically, the Card Present state typically describes more than just the physical presence of a credit card, in that a transaction is only considered to be "card-present" if electronic data is captured at the time of the transaction. Data may be captured, for example, by swiping a magnetic strip card, dipping an EMV (Europay™, MasterCard™ and Visa™) chip card, or tapping an NFC (Near Field Communication) or contactless digital wallet with a stored card in a smartphone (e.g. Apple Pay™).

For example, DCB in being Internet Originated, and in failing to capture the cellular transactional data audit trail, may be classified as being in "card-not-present" transaction state of a typical credit card payment processing. Typically, even if the customer physically presents the card at the time of the transaction, all payment methods are deemed "card-not-present" transactions when there is a deficiency in capturing electronic data when a credit card is present. Given the system vulnerabilities inherent in a card-not-present transaction, they cost more to process, at the fundamental level, to mitigate fraud.

As detailed herein, at least some embodiments of the present disclosure are directed to one or more technological solutions that are designed to address one or more of technological problems (e.g. DCB-based shortcomings) identified herein by utilizing one or more elements of cellular networks (e.g. controlling element(s) (e.g. SCP/SCF) of an IN, billing element(s) of an IN (e.g. OCS)) that may be specifically programmed to transform and/or operate cellular signals in accordance with novel communications protocols and network architectures so as to utilize, for example, without limitations, the native and core billing pathway(s) applicable to cellular telephony calls that mature to answer, by employing, for example, without limitations, the disclosed HOOK FLASH (WINK) protocol that is securely underwritten and predicated on an active SIM card presence and internal data recording.

As detailed herein, at least some embodiments of the present disclosure are directed to one or more technological solutions that are designed to address one or more of current digital payment technological problems identified herein, by utilizing one or more elements of cellular networks (e.g. controlling element(s) (e.g. SCP/SCF) of an IN, billing element(s) of an IN (e.g. OCS)) that may be specifically programmed to transform and/or operate cellular signals in accordance with novel communications protocols and network architectures so as to avoid a requirement for users/consumers to create and administer a digital wallet in order to transact, and they do not require a carrier/operator to expose their internal elements of the carrier's IN (e.g. Core Billing System) to external third parties (e.g. DCB platform providers), and thus preserving the integrity and/or security of the cellular wallet by uniquely and synchronously transacting internally, along the cellular telephony billing path.

As detailed herein, at least some embodiments of the present disclosure are directed to one or more technological solutions that are designed to address one or more of technological problems (e.g. DCB-based shortcomings) identified herein by utilizing one or more elements of cellular networks (e.g. controlling element(s) (e.g. SCP/SCF) of an IN, billing element(s) of an IN (e.g. OCS)) that may be specifically programmed to transform and/or operate cellular signals in accordance with novel communications protocols and network architectures so as to provide fundamentally more secure and streamlined Mobile Originating (MO) authentication and transactional actions that may not require any manual data input by the user, and in containing payments to micro amounts (e.g. pennies rather than pounds) in order to automatically direct payments via cellular networks' elements (e.g. billing platforms). For example, in accordance with novel communications protocols and network architectures described herein, in some embodiments, a DCB access control platform of the present disclosure may be programmed, in accordance with one or more principles described herein, to address and meet mass market adoption and appeal, by for example, without limitations:

i) Restricting payments to a maximum micro threshold amount;

ii) Automatically selecting and presenting cellular billing as the single payment method;

iii) Forgoing highly contested recurring subscriptions for single service units, and iv) Removing additional verification and/or confirmation steps.

Further, in accordance with novel communications protocols and network architectures described herein, in some embodiments, the DCB access platform of the present disclosure (e.g. STARKEY Platform) may be programmed to perform in accordance with one or more principles described herein to go beyond gambling and gaming to facilitate payment for a broader market in mass content publishing and consumption. In some embodiments, restricting payment to micro amounts may also deftly sidestep regulatory spending restrictions and requirements, since now transactions may be limited to the realm of pocket change. And, further, in forgoing the vulnerabilities and the friction introduced by 2FA and multi-step PSMS confirmation, the re-programmed DCB platform in accordance with one or more principles of present disclosure may now offer a hitherto unattainable ubiquitous and exceptionally streamlined payment process. For example, without limitations, and as further detailed herein, in some embodiments, the re-programmed DCB platform in accordance with one or more principles of present disclosure may operate based on the following reduced instruction set and a simple sequence of events, transacted within a singular digital payment and interface channel (e.g. STAR BAND):

1. The user taps a cellular micro payment button displaying the purchase amount of an associated access-restricted content/service;
2. The cellular network (e.g. IN) determines the cellular device identity of the cellular device;
3. The DCB platform charges an account associated with the identified cellular device; and
4. The user instantly gets to access the product and/or service.

Further, in some embodiments, when the MPBN is not the active data bearer, resulting in the cellular network's inability to internally identify a cellular device, the IAPP may automatically engage, for example, without limitations, a Random Challenge system/engine to enable any network to seamlessly and securely identify the cellular device. For example, in at least some embodiments, a cellular device may have been previously identified and that the identity (e.g. MSISDN) or a unique derivative identity (e.g. a cryptographically hashed MSISDN) has been communicated to the IAPP.

In some embodiments, the exemplary inventive computer-based systems/platforms, the exemplary inventive computer-based devices, and/or the exemplary inventive computer-based components of the present disclosure may be configured to securely store and/or transmit data (e.g. identity, cellular identity, IMSI, MSISDN) by utilizing one or more of encryption techniques (e.g. private/public key pair, Triple Data Encryption Standard (3DES), block cipher algorithms (e.g. IDEA, RC2, RC5, CAST and Skipjack), cryptographic hash algorithms (e.g. MD5, RIPEMD-160, RTR0, SHA-1, SHA-2, Tiger (TTH), WHIRLPOOL, RNGs).

As detailed herein, at least some embodiments of the present disclosure are directed to one or more technological solutions that are designed to address one or more of technological problems identified herein by utilizing the trusted network (e.g., a cellular network, the IN) and by secure communicative coupling of access controlling components of The *O/S (e.g. the STARKEY Platform), programmed to recognize identities of cellular service-capable devices (e.g., cell phones) that users utilize to dial and/or send SMS with randomized address signals, corresponding to MOBILE ORIGINATING rather than MOBILE TERMINATING CODES. As detailed herein, at least some embodiments of the present disclosure, access controlling components of The *O/S (e.g. the STARKEY Platform) may be configured to hash the detected MSISDN (XMISDN), hash the detected MSISDN concatenated to a Secret Master Key (XYMSISDN), and augment the resultant hash with, for example, without limitation, the last N—Digits of the MSISDN in the clear which may deliver a human readable/recognizable hash without compromising security (e.g. XM4, XYM4). As detailed herein, at least some embodiments of the present disclosure, access controlling components of The *O/S (e.g. the STARKEY Platform) may be configured to purge (e.g. not store, not persist) the detected MSISDN after computing the MSISDN hash.

Figure 13A:
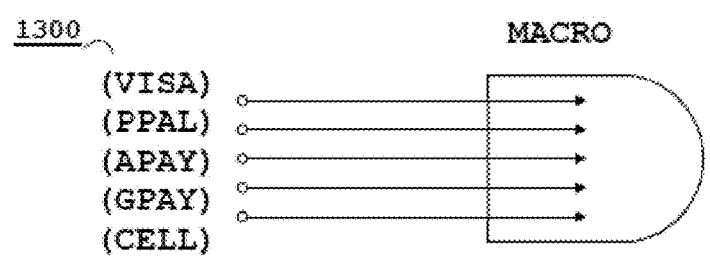
FIG. 13A is a Plurality of Action Methods (Prior Art).
Figure 13B:
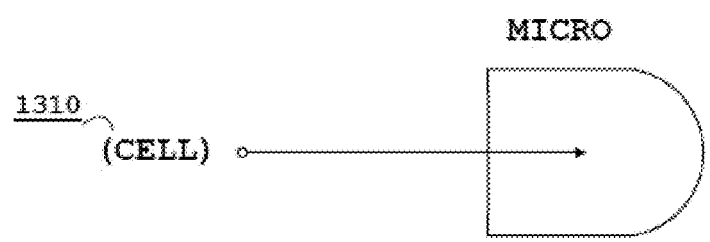
FIG. 13B is an illustrative non-restrictive example of a singularity nature of an Activity Channel in accordance with at least some embodiments of the present disclosure.

As detailed herein, at least some embodiments of the present disclosure are directed to one or more technological solutions that are designed to address one or more of technological problems identified herein (e.g. DCB-based shortcomings) by utilizing one or more elements of cellular networks (e.g. controlling element(s) (e.g. SCP/SCF) of an IN, billing element(s) of an IN (e.g. OCS)) that may be specifically programmed to transform and/or operate cellular signals in accordance with novel communications protocols and network architectures so as to allow the streamlined and secure access action sequence (including micro billing) that may be initiated, conducted and completed based on just a single step (e.g. 1-tap of a button) of the user/consumer, without requiring any additional steps, and without requiring any manual data entry by the user/consumer, by establishing of a singular activity channel (e.g. a singular transaction channel (STAR BAND)) connecting on-line environment with element(s) of cellular network (e.g. IN), as for example illustrated, without limitations, in FIG. 13B.

As detailed herein, at least some embodiments of the present disclosure are directed to one or more technological solutions that are designed to address one or more of technological problems identified herein by utilizing one or more elements of cellular networks (e.g. controlling element(s) (e.g. SCP/SCF) of an IN, billing element(s) of an IN (e.g. OCS)) that may be specifically programmed to transform and/or operate cellular signals in accordance with novel communications protocols and network architectures so as to utilize existing, digital cellular wallets (e.g. prepaid cellular accounts, prepaid SIM cards, non-prepaid cellular accounts with credit allowance, etc.) and currency in the hands of billions of people, accessible via telephony address signals (e.g. telephony numbers). While such cellular telephony-linked digital wallets and their associated currencies, billing and payment arrangements have been limited to control how much network time and/or data each user/consumer is permitted to consume, in accordance with novel communications protocols and network architectures, at least some embodiments of the present disclosure uniquely utilize, based at least in part on address signals, the cellular networks' linked currency/billing/payment arrangements to support a singular action access channel that links an Internet-based environment, and/or a virtual-based environment and/or a physical environment of the cellular networks to seamlessly utilize the cellular networks' linked currency/billing/payment arrangements for accessing and/or consuming various products and/or services, including, without limitations, virtual products (e.g. Internet hosted content), virtual services (e.g. Internet hosted services); physical products, physical services, or any combination thereof.

As detailed herein, at least some embodiments of the present disclosure are directed to one or more technological solutions that are designed to address one or more of technological problems identified herein (e.g. a need for Digital Wallet Creation (and administration) which is a typical impediment to the mass adoption of online micro commerce) by utilizing one or more elements of cellular networks (e.g. controlling element(s) (e.g. SCP/SCF) of an IN, billing element(s) of an IN (e.g. OCS)) that may be specifically programmed to transform and/or operate cellular signals in accordance with novel communications protocols and network architectures so as to seamlessly transact online using the existing digital cellular wallet.

As detailed herein, at least some embodiments of the present disclosure are directed to one or more technological solutions that are designed to address one or more of technological problems identified herein by utilizing one or more elements of cellular networks (e.g. controlling element(s) (e.g. SCP/SCF) of an IN, billing element(s) of an IN (e.g. OCS)) that may be specifically programmed to transform and/or operate cellular signals in accordance with novel communications protocols and network architectures so as to allow, without limitations, to:

1. Conduct a payment via a single phone call, lasting one (1) second or less, thus reshaping and repurposing the cellular networks;
2. Leverage scalable cellular networks with associated elements for instant/real-time micro billing;
3. Provide new ways to utilize existing cellular digital wallets, active for billions of cellular users;
4. Affect a movement of cellular currency over the ring, into the cloud and onto the internet, in milliseconds, at marginal signaling cost, for uniquely anticipated transactions only; and
5. Deliver a seamless, frictionless and gratifying user experiences based on the single action access channels.

As detailed herein, at least some embodiments of the present disclosure are directed to one or more technological solutions that are designed to address one or more of technological problems identified herein (e.g. DCB-based shortcomings) by utilizing one or more elements of cellular networks (e.g. controlling element(s) (e.g. SCP/SCF) of an IN, billing element(s) of an IN (e.g. OCS)) that may be specifically programmed to transform and/or operate cellular signals in accordance with novel communications protocols and network architectures so as to conduct, without limitations, various processes disclosed herein without any external billing exposure to a carrier/operator of the cellular network, without requiring any additional financial instrument disclosure by users, and without requiring the users to utilize and/or participate in administering security elements, such as, in the form of cryptographic keys, transactional PIN codes, user names, or passwords.

As detailed herein, at least some embodiments of the present disclosure are directed to one or more technological solutions that are designed to address one or more of technological problems identified herein (e.g. DCB-based shortcomings) by utilizing one or more elements of cellular networks (e.g. controlling element(s) (e.g. SCP/SCF) of an IN, billing element(s) of an IN (e.g. OCS)) that may be specifically programmed to transform and/or operate cellular signals in accordance with novel communications protocols and network architectures so as to utilize prepaid billing that may be, without limitations, in the form of Airtime vouchers of differing denominations that users/consumers may acquire either in retail stores or online, which are then loaded into their cellular wallet (account). In some embodiments, the prepaid cellular account may serve as a fiat backed digital currency. For example, users may be also permitted to send (gift) airtime directly from one wallet to another using cellular network services provided. For example, without limitations, as the user/consumer consumes cellular network's time and/or resources, the balance of a prepaid account associated with a corresponding cellular device depletes. In some embodiments, when the prepaid balance reaches zero, cellular network's services may be suspended until such time as the user/customer replenishes their account.

Typically, postpaid users would be credit worthy customers who typically settle their cellular network accounts at the end of their billing cycle (e.g. monthly). That is, whereas Prepaid customers pay before (PRE) consumption, postpaid customers pay after (POST) consuming cellular network resources and/or services. Typically, prepaid billing would be performed substantially in real-time for communications, whereas the postpaid billing would be typically billed in cycles. As detailed herein, in at least some embodiments, one or more technological solutions of the present disclosure are designed to utilize prepaid, postpaid, hybrid and blended cellular billing models.

As detailed herein, at least some embodiments of the present disclosure are directed to one or more technological solutions that are designed to address one or more of technological problems identified herein by utilizing one or more elements of cellular networks (e.g. controlling element(s) (e.g. SCP/SCF) of an IN, billing element(s) of an IN (e.g. OCS)) that may be specifically programmed to transform and/or operate cellular signals in accordance with novel communications protocols and network architectures so as to utilize, without limitations, marginal network signaling during call origination setup, resulting in costs for establishing the single action access channels with the cellular network's environment that may be minuscule and fixed, permitting the switching of very low denominations/minor units (e.g. pennies) such that the technological solutions of the present disclosure may be simple (e/g. a single click by the user) low cost (e.g. under 99 cents), secure (e.g. less vulnerable than PSMS over SS7 communications), fast (e.g. 1 second), and scalable (e.g. servicing billions of instant users/consumers).

As detailed herein, at least some embodiments of the present disclosure are directed to one or more technological solutions that are designed to address one or more of technological problems identified herein by utilizing one or more elements of cellular networks (e.g. controlling element(s) (e.g. SCP/SCF) of an IN, billing element(s) of an IN (e.g. OCS)) that may be specifically programmed to transform and/or operate cellular signals in accordance with novel communications protocols and network architectures so as to allow for, without limitations, a digital content billing model that is a more granular Pay Per View (PPV), Single Service Unit (SSU), where the user/consumer only pays for discrete access and/or consumption of at least one of product (e.g. digital content, physical product) or service (e.g. digital service, service at a physical establishment). For example, paying for a single article, photograph, song, video or other creative works of art and digital services that they desire in the moment, rather than having to commit to recurring subscription fees.

As detailed herein, at least some embodiments of the present disclosure are directed to one or more technological solutions that are designed to address one or more of technological problems identified herein by utilizing one or more elements of cellular networks (e.g. controlling element(s) (e.g. SCP/SCF) of an IN, billing element(s) of an IN (e.g. OCS)) that may be specifically programmed to transform and/or operate cellular signals in accordance with novel communications protocols and network architectures so as to enable any Mobile Network Operator (MNO) of a cellular network to pivot, for example, without limitation, their legacy and analog telephony network into a transactional platform, utilizing single access channels to online and/or physical environments, utilizing marginal network signaling.

As detailed herein, at least some embodiments of the present disclosure are directed to one or more technological solutions that are designed to address one or more of technological problems identified herein by utilizing one or more elements of cellular networks (e.g. controlling element(s) (e.g. SCP/SCF) of an IN, billing element(s) of an IN (e.g. OCS)) that may be specifically programmed to transform and/or operate cellular signals in accordance with novel communications protocols and network architectures so as to enable to reduce Call Hold Time (CHT) to a mere second based at least in part on various HOOK FLASH signaling protocols described herein and increase Busy Hour Call Attempts (BHCA), the density of calls a network can sustain during a peak hour.

As detailed herein, at least some embodiments of the present disclosure are directed to one or more technological solutions that are designed to address one or more of technological problems identified herein by utilizing one or more elements of cellular networks (e.g. controlling element(s) (e.g. SCP/SCF) of an IN, billing element(s) of an IN (e.g. OCS)) that may be specifically programmed to transform and/or operate cellular signals in accordance with novel communications protocols and network architectures so as to leverage (e.g. re-program) existing legacy cellular networks to address a typically perceived lack of a technologically successful micro access control platform, by utilizing the modern digital mobile phone and the Subscriber Identity Module (SIM) that uniquely identifies it, as without limitations, a wireless "credit/debit card."

As detailed herein, at least some embodiments of the present disclosure are directed to one or more technological solutions that are designed to address one or more of technological problems identified herein by utilizing one or more elements of cellular networks (e.g. controlling element(s) (e.g. SCP/SCF) of an IN, billing element(s) of an IN (e.g. OCS)) that may be specifically programmed to transform and/or operate cellular signals in accordance with novel communications protocols and network architectures so as to allow the user/consumer to utilize dialing the transaction amount from their mobile phone to digitally sign the transaction with a symbolic character (e.g. "*" key), thereby authorizing the payment.

Further, since at least some embodiments of the present disclosure operate via a singular access control channel that logically links and synchronizes the Cellular Signaling Channel with the Internet Data Channel (i.e., inline within the browser program or APP where the items for purchase are presented and consumed), and where the transactions may be described as occurring Out of Band or Above Band, and more pertinently, in the preferred signaling embodiment, in the STAR BAND.

Illustrative Terminologies as Utilized in at Least Some Embodiments Described Herein Table 3 provides full descriptions of abbreviations that may appear in the present disclosure.

TABLE 3

| | |
|---|---|
| A-SBC | Access Session Border Controller |
| 2FA | Two Factor Authentication |
| AAA | Authentication Authorization Accounting |
| ABMF | Account Balance Management Function |
| ACH | Apply Charging |
| ACK | Acknowledgment |
| ACM | Address Complete Message |
| ACR | Apply Charging Report |
| ANS | Answer |
| API | Application Programming Interface |
| APP | Application Program |
| AS | Application Server |
| B2BUA | Back To Back User Agent |
| BCD | Binary Coded Decimal |
| BGCF | Border Gateway Control Function |
| BHCA | Busy Hour Call Attempts |
| CAMEL | Customized Applications for Mobile network Enhanced Logic |
| CCA | Credit Control Answer |
| CCR | Credit Control Request |
| CDMA | Code Division Multiple Access |
| CDPA | CalleD Party Address |
| CDPN | CalleD Party Number |
| CDR | Call Data Record |
| CGPN | CallinG Party Number |
| CDRS | Call Data Records |
| CHF | Cryptographic Hash Function |
| CHT | Call Hold Time |
| CLI | Calling Line Identity |
| CLIP | Calling Line Identity Presentation |
| CLIR | Calling Line Identity Restriction |
| CPG | Call Progress |
| CSCF | Call Server Control Function |
| CSE | CAMEL Service Environment |
| CSI | CAMEL Subscription Information |
| CSS | Cascading Style Sheets |
| CTF | Charging Triggering Function |
| DCB | Direct Carrier Billing |
| DNS | Domain Name System |
| DOM | Document Object Model |
| DP | Detection Point |
| DP2 | Detection Point 2 |
| DRM | Digital Rights Management |
| EDP-R | Event Detection Point Request |
| ESD | Exceptional Service Delivery |
| ESME | External Short Message Entity |
| ETSI | European Telecommunications Standards Institute |
| FLASH | Momentary Connect and Disconnect |
| FQDN | Fully Qualified Domain Name |
| GMSC | Gateway MSC |
| GPRS | General Packet Radio Service |
| GSM | Global System for Mobile Communications |
| GSMSCF | GSM Service Control Function |
| GSMSRF | GSM Special Resource Function |
| GSMSSF | GSM Service Switching Function |
| GSMSSG | GSM Service Selection Gateway |
| GUID | Globally Unique Identifier |
| HLR | Home Location Register |
| HSS | Home Subscriber Server |
| HTML | Hyper Text Markup Language |
| HTTP | Hyper Text Transfer Protocol |
| I-CSCF | Interrogating Call Session Control Function |
| IAM | Initial Address Message |
| IAPP | Internet Application Program / Internet Enabled Application Program |
| ICCID | Integrated Circuit Card Identification Number |
| ICDR | Internet Content Data Record |
| ICSI | IMS Communication Service Identifier |
| IFC | Initial Filter Criteria |
| IMEI | International Mobile Equipment Identity |
| IMS | Internet Multimedia Subsystem |
| IMS-AGW | IMS Access Gateway |
| IMS-ALG | IMS Application Level Gateway |
| IMSI | International Mobile Subscriber Identity |

TABLE 3-continued

| | |
|---|---|
| IN | Intelligent Networking/Intelligent Network |
| INAP | Intelligent Network Application Protocol |
| INITDP | Initial Detection Point |
| IO | Internet Originated |
| IOT | Internet Of Things |
| IID | IOT Identity |
| IP | Internet Protocol |
| IPE | IP Endpoint |
| ISDN | Integrated Services Digital Network |
| ISUP | ISDN User Part |
| IVR | Interactive Voice Response |
| JSON | JavaScript Object Notation |
| LTE | Long Term Evolution |
| LTU | License To Use |
| MACRO | MACRO Band (Macro and MACRO may be used interchangeably herein) |
| MAP | Mobile Application Part |
| MCC | Mobile Country Code |
| MGCF | Media Gateway Control Function |
| MICRO | MICRO Band (Micro and MICRO may be used interchangeably herein) |
| MMS | Multimedia Messaging Service |
| MNC | Mobile Network Code |
| MNO | Mobile Network Operator |
| MO | Mobile Originating |
| MOD | Modulus |
| MPBN | Mobile Packet Backbone Network |
| MRF | Media Resource Function |
| MS | Mobile Station |
| MSC | Mobile Switching Center |
| MSISDN | Mobile Subscriber ISDN |
| MSRN | Mobile Station Roaming Number |
| MVNO | Mobile Virtual Network Operator |
| NIST | National Institute of Standards and Technology |
| O-CSI | Originating Camel Subscription Information |
| OBCSM | Originating Basic Call State Model |
| OCS | Online Charging System |
| OFFHOOK | Lifting Receiver/Answering a call (Connect) |
| ONHOOK | Replacing Receiver/Hanging up a call (Disconnect) |
| OSS | Operator Specific Service |
| P-CSCF | Proxy Call Session Control Function |
| P2P | Peer To Peer |
| PCC | Policy and Charging Control |
| PCEF | Policy and Charging Enforcement Function |
| PCO | Protocol Configuration Options |
| PCRF | Policy Charging and Rules Function |
| PDD | Post Dial Delay |
| PI | Personal Identification |
| PIC | Point in Call |
| PING | Signaling Caller Identity |
| PPV | Pay Per View |
| PSMS | Premium SMS |
| PSTN | Public Switched Telephony Network |
| PURL | Payment URL |
| QR | Quick Response (Code) |
| R-URI | Request URI |
| RAN | Radio Access Network |
| RBT | Ring-back-tone |
| RCS | Rich Communication Services |
| REL | Release |
| RF | Rating Function |
| RLC | Release Complete |
| ROI | Return On Investment |
| RRBE | Request Report BCSM Event |
| RRR | Restrictive Read Requirement |
| RTP | Realtime Transport Protocol |
| S-CSCF | Serving Call Session Control Function |
| SBC | Session Border Controller |
| SBCF | Session Balance Control Function |
| SBMF | Session Balance Management Function |
| SCP | Service Control Point |
| SFA | Star Factor Authentication/Symbolic Factor Authentication |
| SIM | Subscriber Identification Module |
| SIP | Session Initiation Protocol |
| SK | Service Key |
| SKU | Stock Keeping Unit |
| SKURL | SKU/URL |
| SLPI | Service Logic Program Instance |
| SMPP | Short Message Peer to Peer |

TABLE 3-continued

| | |
|---|---|
| SMS | Short Message Service |
| SMSC | Short Message Service Center |
| SRF | Specialized Resource Function |
| SS7 | Signaling System Seven |
| SSU | Single Service Unit |
| STP | Service Trigger Points |
| TAS | Telephony Application Server |
| TDMA | Time Division Multiple Access |
| TDP | Trigger Detection Point |
| TDP-N | Trigger Detection Point Notify |
| TDP-R | Trigger Detection Point Request |
| TMSI | Temporary IMSI |
| TTL | Time To Live |
| TURL | Target URL |
| UMTS | Universal Mobile Communications System |
| UNAP | User Name And Password |
| URI | Uniform Resource Identifier |
| URL | Uniform Resource Locator |
| USP | Unique Service Proposition |
| USSD | Unstructured Supplementary Services Data |
| UUID | Universally Unique Identifier |
| UX | User Experience (Interface) |
| VID | Vendor Identity |
| VLR | Visitor Location Register |
| VOCS | Virtual Coin Operating System |
| VOIP | Voice Over Internet Protocol |
| VOLTE | Voice Over LTE |
| VURL | Vending URL |
| WINK | Short Duration OFFHOOK Signal |
| WWW | World Wide Web |
| XM | Cryptographically Hashed MSISDN |
| XM4 | XM Ending With Last 4 MSISDN Digits Appended |
| XYM | Cryptographically Hashed Secretly Keyed MSISDN |
| XYM4 | XYM Ending With Last 4 MSISDN Digits Appended |

In at least some embodiments described herein, the terms "mobile", "cellular", "cell", "phone," are used interchangeably to describe a modern GSM/TDMA/CDMA/UMTS/IP digital wireless telephony and a communications network. While illustrations may depict a smartphone, any phone may be applicable, including without limitation, a basic feature phone, an IP phone, a VOIP phone. Statements such as "the mobile device" may be interchangeable with "the user of the mobile device". In at least some embodiments described herein, while networking elements may be referenced in the singular, they may incorporate elements in the plural. In at least some embodiments described herein, network subsystems (e.g. Billing Systems) may incorporate elements from other subsystems (e.g. IN Control Systems).

In at least some embodiments described herein, the terms "communications signal(s)", "communication signal(s)," "mobile communications signal(s)," "mobile communication signal(s)," "cellular communications signal(s)," "cellular communication signal(s)," "cellular signal(s)," and the like are used interchangeably and describe, without limitation, digital signals, data and/or digital data packet(s) that may be encoded, partially or in full, (e.g. without limitations, bit/byte/hexadecimal/binary coded decimal etc. format) for (1) cellular transmission utilizing radio wave frequencies and associated elements(s)/device(s) programmed to operate in accordance with one or more suitable cellular transmission protocols, (2) for transmission in accordance with one or more wireless Internet-related protocols and correspondingly programmed device(s)/element(s), or (3) any combination of any embodiment of (1) and any embodiment of (2).

In at least some embodiments described herein, the term "element(s)" and the like may describe programmed computing device(s) executing at least a portion of software program(s) resided, partially or in full, in one or more non-transient computer memory blocks (e.g. without limitations, Flash Memory, RAM, ROM, etc.), software program(s), or a combination thereof.

In at least some embodiments described herein, the terms "cellular network", "mobile networks," "cellular telephony network," "mobile telephony network," "cellular mobile network(s)", "cellular communications network" and the like are used interchangeably.

In at least some embodiments described herein, the terms "micro", "micro payment" "micro transaction," "micro action", "micro activity" and the like, may describe a digital transaction involving, for example without limitation, one or more minor units of one or more currencies that are defined by ISO 4217 standard published by International Organization for Standardization (e.g. one or more U.S. cents, etc.).

In at least some embodiments described herein, while, for example, the micro payment describes transactions of a small quantum in minor units of one or more currencies that are defined by ISO 4217 standard (e.g. typically less than one dollar), one or more principles/protocols/methods/systems/devices/platforms described herein may be programmed/utilized for activities/actions/transactions that exceed that amount. For example, transactions often dollars and greater are equally applicable. In some embodiments, one or more principles/protocols/methods/systems/devices/platforms described herein may be programmed/utilized for activities/actions/transactions that are typically settled using other banking instruments, such as debit and/or credit cards.

In at least some embodiments, the character "Y in conjunction with other Y characters represents a telephony decimal digit (0-9), or collectively an entire telephony number. The series +YYYYYYYY may represent a typical e164 formatted MSISDN (e.g. 11 digits, with + as the outbound international dialing symbol) except where otherwise indicated. The MSISDN may be transported and presented as the Calling Line Identity (CLI).

In at least some embodiments described herein, the character "X" herein may represent a decimal address signal (e.g. digits 0-9). In some embodiments the character "X" and/or "Y" may represent a randomly generated decimal digits.

In at least some embodiments, the term "caller" is interchangeable with "A" party. The party is interchangeable with the associated telephony device (telephone). Embodiments may show the caller as "A", "B", "C" etc., to distinguish between different callers.

In at least some embodiments, the characters "A" and "B" (etc.) represent cellular MSISDN A and B, or Cryptographically hashed cellular identities (XYM4-A, XYM4-B).

The enclosing square parentheses "[ ]" represent a digital monetary wallet (e.g. Star wallet).

The notation "[A]" and "[B]" represent CELL wallets A and B (e.g. pre-paid accounts associated with prepaid SIM cards, post-paid accounts at a cellular service carrier, etc.).

In at least some embodiments, the notation "[*A]" and "[*B]" represent STAR Internet wallets A and B. That is, wallets created and maintained by the systems and methods disclosed herein (e.g., wallets associated with a cellular identity and with an illustrative STAR Platform of the present disclosure).

In at least some embodiments, throughout this disclosure cellular identity, for example, MSISDN may be interchangeable with a Cryptographically derived and/or augmented identity, for example, C24XYM per the disclosed hashing methods herein.

In at least some embodiments, the NNN notation may signal a MICRO BAND data structure or a MACRO BAND data structure.

In at least some embodiments, the term MICRO herein may typically describe a data structure configured to represent a unit of payment between $0.01 and $1.00. In at least some embodiments, the term MICRO herein may be extended to the upper $9.99 limit supported by, for example, without limitation, a fixed three digit notation (NNN).

In at least some embodiments, the term MACRO herein may describe a data structure configured to be of a variable length and/or encode consequently variable range of unit and payment/amount, typically exceeding the MICRO, in one embodiment ranging from $1 to $1000 and beyond.

In at least some embodiments, all star dialed numbers may include more digits than the STAR P2P protocol specifies (for example, more than three digits in an NNN embodiment) and may be parsed by elements of a cellular network such as permission controlling schemas (e.g., cellular systems billing and/or OCS (Online Charging System) configured to operate as described herein) to extract the first NNN of the MICRO BAND signaling digits from the star address signals (e.g. *NNNXXX, *NNN*XXX) to determine, for example, without limitation, a cellular tariff/toll/fee/charge to apply for the switching the transaction.

In some embodiments, the present disclosure may describe a Prepaid cellular account, whose unit of currency is fiat backed network airtime, and an Accounting test that may determine whether the account has sufficient credit balance to sustain the charge. It is understood that various technological solutions of the present disclosure are equally applicable to a Postpaid account, where an Accounting test may determine whether the user has credit sufficiency (that is, credit worthiness) to sustain the debt incurred by the pending transaction.

Thus, while some embodiments may describe deducting the said amount from the cellular account, it may similarly debit (post) the amount to the account for later settlement. While debiting and deducting may technically describe different bookkeeping principles, they are applied in the broader context here, being that the account associated with the use has sufficient credit to sustain the charge, rather than in the narrower context that the account has sufficient (prepaid) credit balance. Thus, these two terms may be used interchangeably.

The payment quantum may be presented in a dollar, decimal, or unitary (¢) notation. While examples herein may illustrate dollar ($) amounts, any currency (e.g. currency defined by ISO 4217 standard) may be similarly mapped to the dialed digits as disclosed. In some embodiments, dollar amounts may be displayed as a uniform sticker price and then converted to local currency at transaction time. In some embodiments, the dialed digits and corresponding monetary suitable is localized to the home currency by referencing the MSISDN of the cellular device being utilized to effect payment. The digital store in a STAR wallet is herein termed STAR CURRENCY, a highly fungible fiat backed token.

In some embodiments, the term IP Endpoint (IPE) herein describes a uniquely addressed and referenced Internet connected component including without limitation, a discrete digital content or service, a Document Object Model (DOM) element (for example, without limitations, presented via XML or HTML) in a browser page, a user interface element on an internet connected device, application, terminal, webpage, etc. In some embodiments, An IPE may be addressable via a unique internet address including without limitation a socket address, port number etc., coupled to a digitally identifiable element.

In some embodiments, address signals of a cellular call may be symbolically prefixed. Without limitation, this prefix may be a Star (*), Double Star (**), Hash (#), Double Hash (##), Star Hash (*#), Hash Star (#*) or any other symbol or combination of symbols. In some embodiments, such a symbolic prefix shifts the address signals one position to the right, escaping the regular dialed address domain into a previously unutilized (e.g. star) number realm.

In some embodiments, without limitation, a Mobile Switching Center (MSC) is referenced as the transactional node responsible for generating the cellular micro billing tickets (records). Typically, the MSC is a switching element and function of legacy 2G/3G Circuit Switched telephony networks. In more modern 4G/5G Packet Switched telephony networks, for example those utilizing an Internet Multimedia Subsystems (IMS) architecture, and those utilizing Voice over Long Term Evolution (VoLTE), other network nodes and elements may be responsible for generating these transactional records, including without limitation, a Serving Call Session Control Function (S-CSCF), and/or a Telephony Application Server (TAS).

In some embodiments, whether a Circuit, Packet, or Hybrid Circuit and Packet Switched Network Architecture is utilized, an associated Online Charging System (OCS) typically manages user account balances and makes billing determinations. The OCS may comprise a Session Balance Control Function (SBCF), an Account Balance Management Function (ABMF) and a Rating Function (RF), to determine a tariff (i.e., a charge) for a communication.

In the nearly 150 years since the first telephony call, the ring has only transported Calling Line Identity (CLI). In some embodiments, the technological solutions of the present disclosure teach how to conduct currency over the telephony ring. In some embodiments, "RING COMMERCE", "RING TRANSACTION(S)" and the like, are terms coined herein to describe transacting over the ring, and to thereby literally ring up sales remotely online and/or in non-online environments.

The STAR ("*") is the universal key in the cellular matrix (the telephony dial pad). In some embodiments, elements of the cellular networks may be programmed to recognize the STAR ("*") as the symbolic network routing prefix and the name given to the cellular network signaling and switching element (node) that services and controls the micro payments as disclosed herein in accordance with at least some novel communications protocols and architectures. In some embodiments, while the disclosed STAR NODE is depicted as a SIP signaling server, other signaling systems, protocols (for example, without limitation, SS7 and ISUP) and/or entities, may be utilized to achieve the same transactional result (e.g. a micro transaction over the singular access channel (as interchangeably referenced herein as STAR BAND)).

In some embodiments, term "server" should be understood to reference a service point which provides processing, database, and communication facilities. By way of example, and not limitation, the term "server" can refer to a single, physical processor with associated communications and data storage and database facilities, or it can refer to a networked or clustered complex of processors and associated network and storage devices, as well as operating software and one or more database systems and application software that support the services provided by the server (e.g. Cloud servers).

In some embodiments, terms "cloud," "Internet cloud," "cloud computing," "cloud architecture," and similar terms correspond to at least one of the following: (1) a large number of computers connected through a real-time communications network (e.g. Internet); (2) providing the ability to run a program or application on many connected computers (e.g. physical machines, virtual machines (VMs)) at the same time; (3) network-based services, which appear to be provided by real server hardware, and are in fact served up by virtual hardware (e.g. virtual servers), simulated by software running on one or more real machines (e.g. allowing to be moved around and scaled up/down on the fly without affecting service to the end user). The aforementioned examples are, of course, illustrative and not restrictive.

In some embodiments, in accordance with the technological solutions of the present disclosure, users (and/or associated cellular devices) simply dial a star symbol (*) followed by the digits which match a monetary amount, as taught herein. In some embodiments, in accordance with the technological solutions of the present disclosure, access (event) activities (e.g. micro-payment transactions) may typically complete in just one second or less. In some embodiments, in accordance with the technological solutions of the present disclosure, access (event) activities (e.g. micro-payment transactions) may typically complete in just two seconds or less. In some embodiments, in accordance with the technological solutions of the present disclosure, access (event) activities (e.g. micro-payment transactions) may typically complete in just three seconds or less. In some embodiments, in accordance with the technological solutions of the present disclosure, access (event) activities (e.g. micro-payment transactions) may typically complete in just four seconds or less. In some embodiments, in accordance with the technological solutions of the present disclosure, access (event) activities (e.g. micro-payment transactions) may typically complete in just five seconds or less. In some embodiments, in accordance with the technological solutions of the present disclosure, users' cellular devices produce authenticated (signed) cellular signals (e.g. address signals), enumerating a monetary amount that may be processed by:

1) a presentation of a ring back tone; followed by
2) a call connect and disconnect (e.g. HOOK FLASH/ WINK protocol).

In some embodiments, by momentarily connecting and then disconnecting the call, the technological solutions of the present disclosure uniquely utilize a signaling technique such as, without limitations, "hook flashing" or "winking" as disclosed herein, to instantly switch and conduct the micro transaction by generating an event record (e.g. billing ticket at the originating switching element (MSC or suitable IMS billing nodes)) in an account that is associated with the corresponding cellular device (e.g. smartphone) and tracked in a database of an associated cellular operator/carrier. In some embodiments, one or more technological solutions of the present disclosure may be referenced as "FLASH COMMERCE." In some embodiments, in accordance with the technological solutions of the present disclosure, the resulting event record (e.g. the cellular billing ticket, also may be reference herein as the CDR (Call Data Record)), contains the star signaling event, which may be utilized to debit (or deduct) the monetary suitable of the dialed digits from the account associated with the calling device (caller account). In some embodiments, in accordance with the technological solutions of the present disclosure, the resulting event record (e.g. the cellular billing ticket (billable CDR)) may be generated when a call lasts one second. In some embodiments, in accordance with the technological solutions of the present disclosure, the resulting event record (e.g. the cellular billing ticket (billable CDR)) may be generated when a call lasts at least 500 milliseconds. In some embodiments, in accordance with the technological solutions of the present disclosure, the resulting event record (e.g. the cellular billing ticket (billable CDR)) may be generated when a call lasts at least 100 milliseconds. In some embodiments, in accordance with the technological solutions of the present disclosure, the resulting event record (e.g. the cellular billing ticket (billable CDR)) may be generated when a call lasts at least 50 milliseconds. In some embodiments, in accordance with the technological solutions of the present disclosure, the resulting event record (e.g. the cellular billing ticket (billable CDR)) may be generated when a call lasts at least 1 millisecond.

[FIG. 1]

FIG. 1 is a remote controlled access schema system and method in accordance with one or more embodiments of the present disclosure. An exemplary computing device (Internet connected device) 100, running Internet Application Program (IAPP) 101, requests an internet resource (e.g. a webpage) via an Application Programming Interface (API) 102 which connects to a remote server 111, in one embodiment hosted in the cloud 110. Remote server 111 returns at least one application program instruction (as represented by the generic scripting notation "</>"), to IAPP 101, that renders and displays an access controller interface element 103 with a displayed exemplary access code NNN, and in one embodiment, a linked URL 131 referencing an access-restricted digital resource (130) (e.g. internet hosted content) and/or or an access-restricted service 132.

In one embodiment, the API may transport a plurality of data, for example and without limitation, the access code NNN, a URL 131 referencing the internet content or service 132, a parameter identifying a cellular device (e.g. MSISDN) for a cellular device previously identified, and any other access control metadata. The cellular identity may be associated with the internet connected device 100, or any other previously identified cellular device. On receiving the request for the internet resource, remote server 111 responds to the IAPP 101, with at least one application program instruction 102 (again, as depicted by the generic scripting notation "</>") for rendering an access controller interface element 103.

At least one application program instruction 102 may, without limitation, contain code to stylize the access controller interface element 103 (e.g. HTML markup and/or CSS) and the displayed access code (NNN). In addition to providing script(s) for stylizing the interface element 103, the at least one application program instruction may include service logic (e.g. JavaScript) to execute when the interface element is activated. In one embodiment, the at least one application program instruction, without limitation, may thus encode a button rendering script (e.g. using HTML, CSS or any combination thereof) to stylize the interface element 103 and the presented display access code (NNN), and furthermore, provide service logic which communicatively couples the interface element 103, to a cellular network 120 controlling schema 121.

In one embodiment, the at least one application program instruction that communicatively couples the access controller interface element 103 to the cellular network controlling schema 121, may also instruct to activate and/or initiate a mobile originating cellular communications protocol to transmit/emit an access request including the access code NNN in symbolically prefixed address signals (e.g. *NNN as disclosed herein) on detecting of at least one activity associated with the access controller interface element 103. In some embodiments, at least one activity associated with the access controller interface element 103 may be an activation of the access controller interface element 103 when a user of the computing device 100 clicks on/selects the access controller interface element 103, and/or when a user of the computing device 100 while scrolling through online content advances to a part of online content that would display the access controller interface element 103 that would be operationally linked to an access-restricted digital resource (e.g., the access controller interface element 103 being in a focal presence (in focus) on a screen of the computing device 100). The mobile originating communications protocol may be without limitation, a Telephony call setup request, a Short Message Service (SMS) request or an Unstructured Supplementary Services Data (USSD) request. In some embodiments, on detecting the at least one activity with the access controller interface element 103 (e.g. the activation of the access controller interface element 103), access request data may thus be communicated along a cellular signaling path 105, to the cellular network hosted access controlling schema 121, which may then in turn communicate at least one access program instruction, via remote internet access control server 111 (e.g. addressed, in one embodiment, on the translated symbolic network routing prefix as described in FIG. 15 below), back to the access controller interface element 103 using the API 104.

In some embodiments, client-server interaction, as described between internet client device 100 (running IAPP 101) and remote internet access control server 111 may happen along the established internet communications path (e.g. API schema 104, represented by the generic HTTP "//" communications protocol). While this communication path may be utilized in this disclosed schema (e.g. in a modified DCB embodiment as newly disclosed herein), one technological solution in the disclosed remotely programmed access schema, is that in one embodiment, a remote internet access control server (111) may now inject new programming logic into an IAPP (101) executed on a client device (100), that redefines and pivots the client-server communications from one that is typically conducted over the internet, for example and without limitation, using an HTTP GET/PUT or JSON data interchange protocol along an internet communications path 104, to one that now is transported over a cellular network 120, using a Mobile Originating (MO) signaling protocol along a cellular communication path 105. By communicating thus, over a cellular rather than an internet channel, the data is transported securely out of internet band, or above band (e.g. in the STAR BAND) as disclosed and described in detail herein.

Thus, when the internet connected device 100 detects that the access control interface element 103 has been activated (e.g. a user taps/clicks the interface element), service logic programmed and supplied by the remote internet access control server 111 is executed. In one embodiment, this service logic may be configured to transport access controlling data over an internet communications channel 104 (e.g. "//" indicated, as in "HTTPS://"), including without limitation, transporting the access code (NNN) and cellular device identity (e.g. MSISDN), to the remote internet access control server 111, utilizing an internet API. In one embodiment, service logic may transport access controlling data over a cellular communications channel 105, using mobile originating signals directed to the network access controlling schema 121, which may then communicate access controlling instruction back to the remote internet access control server 111, as described above.

In one embodiment, on receiving the access controlling data via an internet communications channel 104, remote internet access control server 111 may then request a cellular network hosted access controlling schema 121 to approve access, based at least in part, on executing newly configured cellular service logic on the data communicated (e.g. access code NNN and the cellular device identity, e.g. MSISDN). In one embodiment, the access controlling data may be transmitted over a cellular communications path 105, as described above, to the cellular network access controlling element 121, bypassing the remote internet access control server 111.

In one embodiment, the newly configured cellular network hosted access controlling schema 121, recognizes and interprets the display access code NNN to enumerate a charge ($N.NN) that is to be applied to an account associated with the identified cellular device (e.g. MSISDN) in order to grant access to the referenced content or service 132 (e.g. on URL 131). In one non limiting embodiment, the access controller interface element 103 is rendered by the IAPP 101, as a graphical user interface element (e.g. a transaction submit button) displaying the access code NNN, in one embodiment formatted as the purchase price (e.g. $N.NN or NNN¢ as disclosed herein), to be paid for accessing the internet content or service 132.

The graphical user interface element 103, defined by the at least one application program instruction 102 received from the remote internet access control server 111 as described above, may thus be presented as a uniformly designed payment button (e.g. shape, size and color), suitably branded thus, so as to be instantly recognizable as a cellular billing payment method, displaying the transaction amount ($N.NN or NNN¢) as disclosed herein, for accessing a linked internet content or service (132). Presenting a consistently branded and stylized, and thus instantly recognizable payment instrument (e.g., interface element) is essential in order to engender trust in, and to capture a mass market for, cellular billing, as disclosed herein.

In one embodiment, the cellular network controlling schema, is thus a cellular billing and charging schema (e.g. OCS) which has been configured, as described herein with reference to FIGS. 15A and 15B below, to determine whether an account associated with the identified cellular device (e.g. MSISDN) has sufficient credit required to sustain the charge $N.NN enumerated by the access code NNN.

On determining that a cellular account associated with the cellular identity provided (e.g. MSISDN) has sufficient credit to sustain the $N.NN charge, as enumerated by the access code NNN, the cellular network hosted access controlling schema 121 may communicate a successful transaction to the remote server 111, which in turn may then instruct the access controller interface element 103, via the internet communications channel (API) 104, to grant access to the linked content 132, as referenced by the URL 131. On receiving instruction to grant access, the access controller interface element 103 displayed in the IAPP 101, directs the internet connected device 100 to access (retrieve) and present the linked content or service 132.

In at least some embodiments, the access-restricted digital resource (130) may be the IAPP 101 without a competed registration (a valid authenticated identity (e.g., MSISDN)).

[FIG. 2]

FIG. 2 depicts another illustration of a payment network architecture for implementing the process based at least in part on a mobile communication signals of FIG. 20 below in accordance with at least some embodiments of the present disclosure. FIG. 2 includes an illustration of a life cycle of a digital content payment and access via the payment network architecture.

In some embodiments, an access control platform 210 hosts an access-restricted digital service and/or content under a virtual lock 211. In some embodiments, the internet service may request an access control button 213 via a suitable communication, messaging and/or interfacing protocol. For example, in some embodiments, the internet service may utilize, e.g. an application programming interface (API) to send a request to the access control platform 210, which may respond by a same or different API to return an interface element. The interface element may include the access control button 213 and/or any other suitable interface elements.

In some embodiments, the term "application programming interface" or "API" refers to a computing interface that defines interactions between multiple software intermediaries. An API defines the kinds of calls or requests that can be made, how to make the calls, the data formats that should be used, the conventions to follow, among other requirements and constraints. An API can be entirely custom, specific to a component, or designed based on an industry-standard to ensure interoperability to enable modular programming through information hiding, allowing users to use the interface independently of the implementation.

In some embodiments, a user may navigate to the content of the internet service using an internet device 212. In some embodiments, the internet device 212 may include any suitable software and/or application for navigating to the content, such as, e.g. a web browser, an internet connected application, an internet messaging application, a media streaming service, a Real Simple Syndication (RSS) feed, or any other suitable internet accessible content access and/or delivery software or any combination thereof.

In some embodiments, upon navigating to the content, the internet service may deliver to the internet device 212 a content access interface presenting the content and the interface element including the access control button 213. In some embodiments, the content may be presented as a user selectable content interface element that identifies the content. For example, the content interface element may include, e.g. a thumbnail, a hyperlink, a list item, an icon, or other text and/or imagery representative of the content. In some embodiments, the access control button 213 may be presented in association with the content interface element to indicate that the access control button 213 is selectable for the content. For example, the access control button 213 may be rendered as, e.g. an overlay to the content interface element, adjoining the content interface element, on a list row alongside the content interface element, with a lead line pointing to the content interface element, or via any other design feature or any suitable combination thereof.

In some embodiments, the user may select, via the internet device 212, the access control button 213, the content interface element or both to generate an access request for accessing the content. In some embodiments, the access request may include a communication that stages a transaction event in an access control ledger. In some embodiments, the transaction event may be for a value associated with accessing the content and an expected telephony device 221. In some embodiments, the expected telephony device 221 may include a suitable telephony device 221 that has been registered with the access control ledger for a particular content and/or for a particular internet service associated with the value of the transaction event. In some embodiments, the telephony device 221 may be registered by, e.g. pairing, specifying, linking, or otherwise associating a unique identifier associated with the telephony device 221 to the transaction event. In some embodiments, the unique identifier may include without limitation, e.g. an MSISDN, a cryptographically hashed MSISDN, or an augmented hashed MSISDN of the telephony device 221.

In some embodiments, the access control button 213 may represent a request to the user viewing the content on internet device 212 to pay for access by activating (e.g. touching or otherwise selecting via a suitable input device) the access control button 213. Therefore, the access control button 213 may display a value (price) to access the content. In the example depicted in FIG. 2, the user is thus requested to pay 100 for accessing the service or the content as shown by the price presented on the access control button 213.

In some embodiments, to satisfy the request to pay for access to the content, the user may initiate a transaction using a telephony call from the telephony device 221 using address signals including the symbolic prefix and following digits formatted to enumerate the requested price. A specially configured IN 220 may utilize the address signals to route the telephony call and execute the transaction based on the symbolic prefix and following digits. In the example depicted in FIG. 2, the user may dial *10 as described below in greater detail, from telephony device 221, presented in portrait mode, utilizing IN 220.

In some embodiments, internet device 212 and telephony device 221 are one and the same device. Thus, on activating the access control button 213 by tapping the button, mobile device 212/221 may be controlled to open the native telephony dialer, preaddressed with the symbolic prefix followed by the digits enumerating the monetary suitable of the price as phone number. For example, the access control button 213 may include software instructions configured to instruct the mobile device 212/221 to open the native telephony dialer preaddressed with the price of the content, e.g. *10 for 10 cents.

In some embodiments, internet device 212 and telephony device 221 are separate devices. Thus, the user may read the prices and manually enter into a dialer the symbolic prefix followed by the digits enumerating the price. In some embodiments, communication between the internet device 212 and the telephony device 221 may enable the internet device 212 to automatically control the telephony device 221 to open the native telephony dialer, preaddressed with the symbolic prefix followed by the digits enumerating the monetary suitable of the price as phone number. For example, the access control button 213 may include software instructions configured to instruct the internet device 212 to broadcast a wireless signal to the telephony device 221. The wireless signal may include instructions to the telephony device 221 to open the native telephony dialer preaddressed with the price of the content. In some embodiments, wireless signal transmissions/communications may include, e.g. a radio frequency identification (RFID), near field communication (NFC), Bluetooth, NBIOT, 3G, 4G, 5G, GSM, GPRS, WiFi, WiMax, CDMA, satellite, ZigBee, and/or other suitable wireless signals.

In some embodiments, the NFC can represent a short-range wireless communications technology in which NFC-enabled devices are "swiped," "bumped," "tap" or otherwise moved in close proximity to communicate. In some embodiments, the NFC could include a set of short-range wireless technologies, typically requiring a distance of 10 cm or less. In some embodiments, the NFC may operate at 13.56 MHz on ISO/IEC 18000-3 air interface and at rates ranging from 106 kbit/s to 424 kbit/s. In some embodiments, the NFC can involve an initiator and a target; the initiator actively generates an RF field that can power a passive target. In some embodiment, this can enable NFC targets to take very simple form factors such as tags, stickers, key fobs, or cards that do not require batteries. In some embodiments, the NFC's peer-to-peer communication can be conducted when a plurality of NFC-enable devices (e.g. smartphones) are within close proximity of each other.

Accordingly, in some embodiments, the internet device 212 may be configured as a point-of-sale device for in-person micro payments for physical items and/or services, such as at a physical vending machine. The internet device 212 may be used to generate a price for a physical item along with an identifier (e.g. a SKU, SKURL), and then the internet device 212 and the telephony device 221 may be registered and/or paired for the prices for the physical item. Thus, upon use of the wireless signal (e.g. RFID, NFC, Bluetooth, etc.), the wireless signal may instruct the telephony device 221 to open the native telephony dialer preaddressed with the price of the physical item and/or service.

In some embodiments, on pressing connect (e.g. green phone) on the access control button 222, a call having the address signals enumerating the price to access the content are transported 223 over the wireless radio access network (RAN). The IN 220 performs the AAA (Authentication, Authorization and Accounting) procedure, where Accounting determines whether the account associated with the has sufficient credit ($0.10 per the above example) to complete the call. On successful credit verification, the call and associated address signals (*10), including the MSISDN transported as the Caller Identity, is routed to the access control element 224.

In some embodiments, on receiving the address signals the access control platform (e.g., STARKEY Platform) queries the access control ledger to determine if a transaction from the MSISDN for the amount signaled (e.g. 10¢ signaled by *10) is expected. In some embodiments, on determining that the transaction is expected, the access control platform may connect to and then disconnect from the call, e.g. by performing the disclosed hook flash (WINK) signaling, to conduct and complete the transaction, instructing the network to take the call OFFHOOK and thereby begin clocking the call at the signaled tariff (in this example, 10 cents).

In some embodiments, the access control platform instructs the network to replace the call ONHOOK, e.g. momentarily thereafter to complete the hook flash, thereby completing the transaction. Replacing the call ONHOOK which causes the IN to generate a billing CDR for the transaction amount (10c) debiting and/or deducting the transaction amount from an account associated with the caller.

In some embodiments, the access control platform awaits signaling acknowledgement that the call was network disconnected. If the network indicates that the user disconnected the call (e.g. pressed the red phone icon) prior to the call going OFF HOOK (for example, sending a SIP CANCEL message to the access control platform), then the IN 220 may cause the transaction to abort and fail to complete.

In some embodiments, on determining that the transaction is expected, the access control platform (e.g. STARKEY Platform) may register/receive and extract address signals, as detailed herein, without going OFF HOOK. For example, in cases, where address signaling of the present disclosure may not have an associated charge (e.g., no CDR), thus MNO element(s) may just route the call or SMS to the access control platform (e.g. STARKEY Platform) without any further processing. In at least some embodiments, novel SIP communication protocols of the present disclosure may use one of:

1)
>SIP INVITE
<100
<SIP BYE

2)
>SIP INVITE
<100
<SIP CANCEL.

In some embodiments, on receiving signaling confirmation that the hook flash event completed successfully, that is the CDR was successfully recorded and the amount was deducted from the caller account, the access control platform may update the access control ledger, marking the transaction from expectation "set" to "met" and/or "successful", communicating the same to the access control button 213. In some embodiments, upon receiving a micro payment confirmation indicating the transaction being "met" and/or "successful", the internet service may control the service or content to be UNLOCKED 225 for accessing via mobile device 212/221, by, for example, without limitation, downloading the internet service (being access-restricted) via the data network connection 226 to be shown on the display 230 of mobile device 212/221.

Thus, in order to effectuate the payment for the digital content and/or service, the user may dial the price indicated by the access control button 213 and unlock the content for consumption using a telephony call that is, e.g. one second or less.

[FIG. 3]

Figure 3:
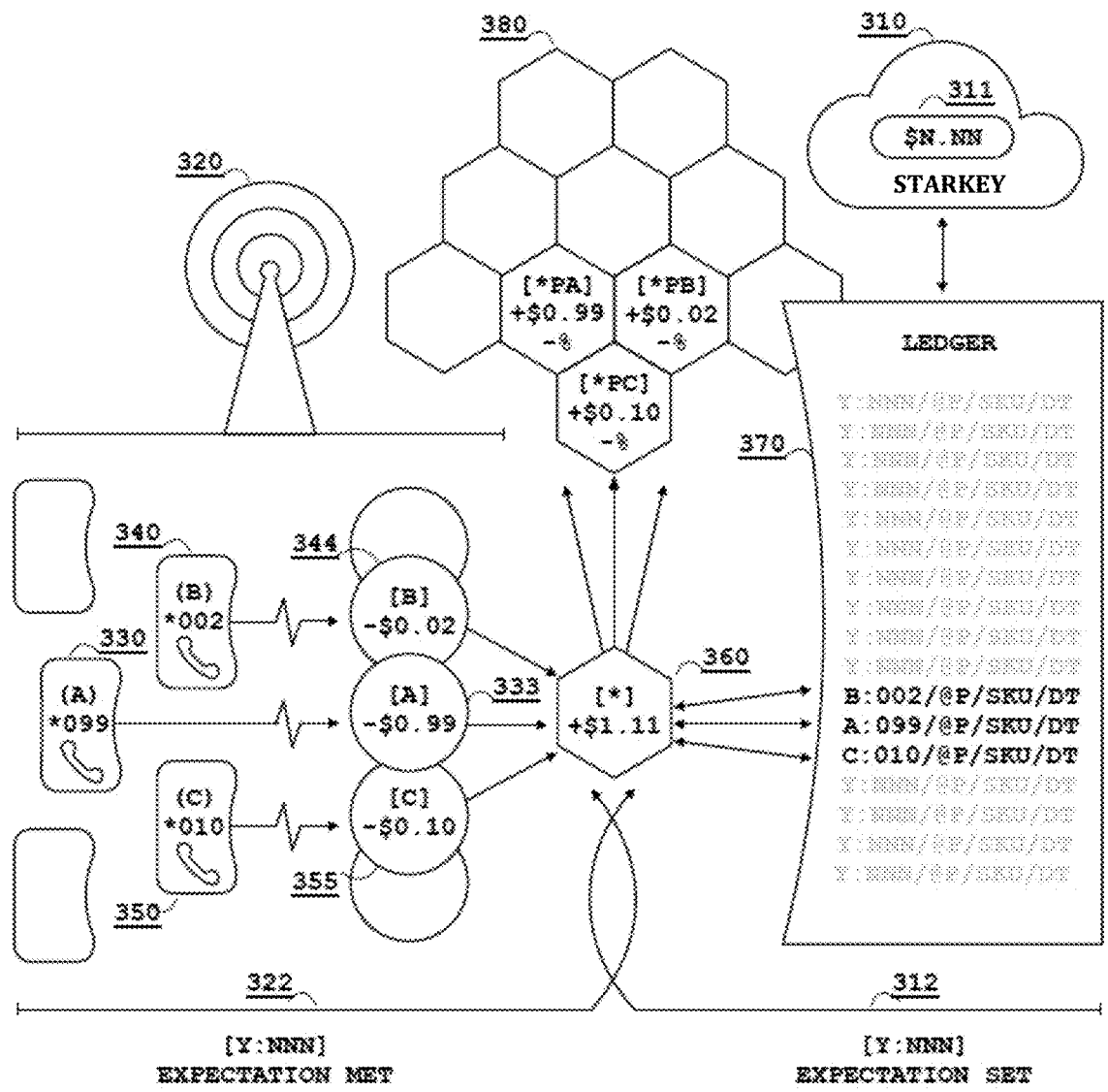
FIG. 3 is an illustrative non-restrictive example of an interworking arrangement in accordance with at least some embodiments of the present disclosure.

FIG. 3 depicts the payment network architecture in greater detail in accordance with one or more embodiments of the present disclosure. FIG. 3 graphically illustrates a massively parallel cellular transactional system and associated functional entity relationships that leverage the symbolic prefix and address signal protocol and the access control platform 310.

In some embodiments, an access control platform 310 hosts digital content requiring micro payment for access. An access control button 311 displays the requested amount to pay (e.g. $N.NN or NNN¢). In some embodiments, an IN 320 is used to signal and conduct the micro payment.

In some embodiments, a prior step may be performed for registering and pairing a cellular identity of the user with the access control platform 310. In some embodiments, the cellular identity may include, e.g. MSISDN-Y of the user. Registration of the cellular identity may be performed via, e.g. a challenge and response method, user input, or other suitable registration technique to pair the cellular identity to a particular expected transaction. This pairing, which couples the access control platform 310 amount presented in the access control button 311 as viewed in a browser or an APP, together with the registered cellular identity, uniquely binds and stages a pending transaction for the content with the user.

In some embodiments, since the payment requested ($N.NN) is uniquely bound (logically coupled) to the registered cellular identity (MSISDN-Y) of the user, the system and method disclosed herein records this pending transaction as an expectation, e.g. in an access control ledger 370 (for example, a record in a centralized database, or a contract in a decentralized blockchain) that lists the MSISDN from which the NNN series of address signals is expected.

In one or more embodiments, where the access control ledger 370 includes a blockchain, the pending transaction represented by the contract is then fulfilled (satisfied) on receiving the cellular signals matching the recorded expectation, thereby authorizing the transfer of funds to the content creator or publisher (@P).

In some embodiments, the exemplary inventive computer-based systems/platforms, the exemplary inventive computer-based devices, and/or the exemplary inventive computer-based components of the present disclosure may be configured interact and/or to store data in one or more private and/or private-permissioned cryptographically-protected, distributed databased such as, without limitation, a blockchain (distributed ledger technology), Ethereum (Ethereum Foundation, Zug, Switzerland), and/or other similar distributed data management technologies. For example, as utilized herein, the distributed database(s), such as distributed ledgers ensure the integrity of data by generating a chain of data blocks linked together by cryptographic hashes of the data records in the data blocks. For example, a cryptographic hash of at least a portion of data records within a first block, and, in some cases, combined with a portion of data records in previous blocks is used to generate the block address for a new digital identity block succeeding the first block. As an update to the data records stored in the one or more data blocks, a new data block is generated containing respective updated data records and linked to a preceding block with an address based upon a cryptographic hash of at least a portion of the data records in the preceding block. In other words, the linked blocks form a blockchain that inherently includes a traceable sequence of addresses that can be used to track the updates to the data records contained therein. The linked blocks (or blockchain) may be distributed among multiple network elements within a computer network such that each element may maintain a copy of the blockchain. Malicious network elements attempting to compromise the integrity of the database must recreate and redistribute the blockchain faster than the honest network elements, which, in most cases, is computationally infeasible. In other words, data integrity is guaranteed by the virtue of multiple network elements in a network having a copy of the same blockchain. In some embodiments, as utilized herein, a central trust authority for sensor data management may not be needed to vouch for the integrity of the distributed database hosted by multiple elements in the network.

In some embodiments, the exemplary distributed blockchain-type ledger implementations of the present disclosure with associated devices may be configured to affect transactions involving Bitcoins and other cryptocurrencies into one another and also into (or between) so-called FIAT money or FIAT currency and vice versa.

In some embodiments, the exemplary distributed blockchain-type ledger implementations of the present disclosure with associated devices are configured to utilize smart contracts that are computer processes that facilitate, verify and/or enforce negotiation and/or performance of one or more particular activities among users/parties. For example, an exemplary smart contract may be configured to be partially or fully self-executing and/or self-enforcing. In some embodiments, the exemplary inventive asset-tokenized distributed blockchain-type ledger implementations of the present disclosure may utilize smart contract architecture that can be implemented by replicated asset registries and contract execution using cryptographic hash chains and Byzantine fault tolerant replication. For example, each element in a peer-to-peer network or blockchain distributed network may act as a title registry and escrow, thereby executing changes of ownership and implementing sets of predetermined rules that govern transactions on the network. For example, each element may also check the work of other elements and in some cases, as noted above, function as miners or validators.

In some embodiments, the reverse association between an activated access control button 311 to purchase a uniquely identifiable digital product (e.g. via SKU or other identifier of content and/or services) online, and an expectation that awaits matching cellular signals from a known MSISDN, enables the user to dial the sticker price ($N.NN) without having to input any additional beneficiary addressing information to which the resulting micro payment is to be directed.

In some embodiments, this transactional simplicity and unified addressing protocol, which binds the signaled price and the provider of the content and/or service, is attained on the reverse association between payee and payer and the resultant expectation set on the selected content and/or service. Thus, the mappings between the cellular micro payment signals, the digital content being purchased, and the provider, are all seamlessly stitched on the backend, in the access control ledger 370 as disclosed, and are thus completely transparent to the consumer (caller).

For example, a digital product or service SKU, from provider @P, requiring NNN¢ ($N.NN) micro payment from MSISDN-Y, with an access control button 311 activated at Date Time Stamp DT, may result in the following expectation and associated metadata, as depicted in the access control ledger 370, where the "/" indicates a record field separator:

[Y:NNN/@P/SKU/DT].

Thus, in some embodiments, upon the address signals *NNN being received from MSISDN-Y, and where the cellular wallet (e.g. 333) associated with MSISDN-Y has sufficient credit balance to sustain the NNN¢ charge, provider P is credited for the SKU sold and a new transaction Date Timestamp (DT) is recorded. By recording an initial timestamp on at least one activity associated with Button (e.g. activation of Button (e.g. being clicked on/selected)), the access control platform can disengage on a timeout, on an interval during which no such cellular signals are received, to release any unutilized communication resources.

In some embodiments, a specific series of address signals may be expected from a known MSISDN according the expectation set in the access control ledger 370. Accordingly, in some embodiments, the access control platform 310 may use transaction precognition to ensure that only the correct address signals, and consequently the correct payment amount, are accepted for processing. Thus, if a user mistakenly dials, say *001 (1 cent U.S.) when the pending transaction expects *010 (10c), the access control platform 310 may benignly reject the transaction due to having no matching expectation. Thus, the access control platform 310 may avoid engaging the disclosed hook flash signaling protocol, which would erroneously execute a wayward transaction, debiting the cellular account with an incorrect amount.

In some embodiments, the cellular signaling of address signals mapped to an internet endpoint and product, permits highly parallel transaction processing, where many users (many thousands if not millions) may all simultaneously, or substantially simultaneously, view the same digital content, requesting the same micro payment, and all may then simultaneously or substantially simultaneously, emit the same signals to conduct the same micro payment transaction, all without any interference in signaling a unique transaction that could inadvertently authorize content access and delivery by one consumer to another.

In some embodiments, therefore, by setting a transaction expectation [Y:NNN] only the telephony device with MSISDN-Y that is transmitting address signals NNN, and with sufficient balance in an associated cellular wallet [Y] to sustain a $N.NN charge per the disclosed methods and systems, can unlock the content (SKU) associated with the activated $N.NN access control button 311 presented to the user. This highly orchestrated and staged, one-to-one, many-to-one and many-to-many, user-to-content relational construction as disclosed, enables more efficient and secure micro payment at scale.

FIG. 3 illustrates three such access control platform expectations and resulting transactions from three users, each recorded in the access control ledger 370 prior to the user emitting the associated address signals. These expectations (312) set in the access control ledger 370, may further records transactional metadata, including without limitation:

1. the unique identity of the digital publisher (@P) presenting the access control button 311, which, in some embodiments, is an MSISDN itself. Thus, the unique identity of the digital publisher (@P) describes a provider access control wallet 380 [*P] which may be registered as the content publisher's key, utilizing a similar registration and/or pairing technique to that described above for the user's telephony device, e.g. utilizing an access control platform API,
2. the SKU (Stock Keeping Unit) identifying the digital content or service being purchased, and
3. the button activated timestamp (e.g. a year to millisecond format YYYYMMDDHHMMSSMMM or any other suitable timestamp format).

Thus, in some embodiments, cellular user A with MSISDN-A (330), cellular user B with MSISDN-B (340), and cellular user C with MSISDN-C (350) and so on, who are viewing the same or different access control buttons 311, governing access to the same or different digital content, requesting the same or different payment amounts, may be securely signaled substantially simultaneously, in parallel.

In some embodiments, on each A, B, C telephony device emitting the respective NNN series of address signals, the IN 320 performs the AAA (Authentication, Authorization and Accounting) steps, where the latter step determines whether each of the cellular accounts [A], [B], [C], associated with the callers (A), (B), (C) have sufficient credit ($N.NN) per the direct mapping of the address signals to the monetary value, in order to complete the call setup and the pending micro transaction.

In some embodiments, if the accounts can sustain the associated charges, for example 20 for cell A, 990 for cell B and 100 for cell C respectively, the calls pass the Accounting Verification and are routed to the access control platform 310 (e.g. based on the symbolic prefix and/or equivalent internal routing short code). In some embodiments, the access control platform 310 may then query the access control ledger 370 as a pre-transaction verification step to determine whether the incoming signals from the respective telephony devices are expected.

In some embodiments, the pre-transaction verification step uniquely ensures that a cellular user cannot inadvertently misdial a payment amount, since the transaction is only executed on the condition that an active payment expectation (312) matches the address signals received (322) from the expected cell MSISDN-Y.

In some embodiments, upon the expectation being met for each cellular user, the access control platform 310 performs the hook flash signaling protocol to cause the IN 320 to generate the CDR and complete a corresponding transaction. In particular, the CDR may be generated on receiving acknowledgement that the call of the associated cellular user has been disconnected by the access control platform 310 and not by the cellular user.

In some embodiments, the conditional network disconnect that creates the CDR where the access control platform 310 disconnects, prevents the user from issuing a mid-call setup ABORT, by pressing a phone disconnect button momentarily after pressing a phone connect button for such a duration as to have sufficient time for the address signals to reach the access control platform 310 while subverting the transaction by avoiding generation of the CDR. In some embodiments, since the CDR is used to debit and/or deduct the price from account associated with the cellular user, voiding generation of the CDR causes the transaction to abort. In some embodiments, on receiving a successful transaction completion indication (e.g., affirmative access permission indication), the access control platform 310 may then update the access control ledger (370) to record a completed transaction and timestamp, debiting the provider access control wallet 380 [*P] to reflect the amount due.

The access control platform 310 then communicates to the Internet End Point (IPE) and provider (@P) that the transaction for the associated SKU item has been completed, permitting the digital content to be unlocked, thereby granting content access to the user via the IAPP. In some embodiments the provider receives a UUID that uniquely identifies the transaction.

This expected and verified signaling protocol ensures that the cellular user account has been debited with the payment amount transported in the cellular address signals before granting access to the digital content. Thus, in the illustrated examples, the three micro payment transactions, shown arriving substantially simultaneously from the three telephony devices, result in the following three time ordered cellular accounts ([wallets]) being debited:

[B]–$0.02 (344)
[A]–$0.99 (333)
[C]–$0.10 (355).

And accumulatively, resulting in an access control platform system register (wallet) credit:

$$[*]=[*]+\$1.11(360).$$

The access control platform 310 thus serves as a micro clearing house for content publishers. The accumulative access control platform register (360) is determined by the summation of all access control platform related CDRs over a defined transactional billing period (e.g. daily, weekly, monthly), as in the series:

$$[A,*NNN]+[B,*NNN]+[C,*NNN] \ldots$$

In some embodiments, the IN 320 may charge a percentage micro payment switching fee (% X) on the conducted transaction. Similarly, the access control platform 310 may charge a transaction processing fee (% Y). The content publisher may then accrue an accumulative balance in their associated access control platform wallet 380 [*P] with each $N.NN transaction completed as follows:

$$[*P]=[*P]+((100-X-Y)/100\times\$N.NN).$$

In some embodiments, for a 10% IN 320 fee and 5% access control platform 310 fee can result in rewarding the content publisher majority (85%) of the micro transaction. Accordingly, payment may include authentic and sustainable revenue apportioning.

On deducting any percentages for switching (% X) and transaction (% Y) fees the access control platform 310 may distribute the net payment revenue accrued to each provider (PA, PB, PC) for each transaction by debiting their respective access control platform wallets 380 per the above example:

$$[*PA]=[*PA]+(100-X-Y)/100 \times 0.99$$

$$[*PB]=[*PB]+(100-X-Y)/100 \times 0.02$$

$$[*PC]=[*PC]+(100-X-Y)/100 \times 0.10.$$

In some embodiments these funds may be marked "pending", until such time as the IN 320 finalizes payment to the access control platform 310.

In some embodiments, the internet application (IAPP) on a user's telephony device may request a micro pay transaction utilizing an API, which renders an access control button 311 user interface element displaying a sticker price. In some embodiments the access control button establishes a bidirectional communications channel (e.g. socket connection) between the access control element and the IAPP or IPE.

Such a bidirectional communications channel, permits IN 320 events to be pushed to the internet enabled access control button 311. In some embodiments, the access control button 311 thus delivers a live transactional payment channel, between telephony device, IN 320 and the Internet Application, in a single self-contained user interface element.

In some embodiments, the bidirectional communications channel, together with a micro payment expectation which, as disclosed, uniquely identifies and binds symbolically prefixed address signals from a known cellular device identity matched to a digital content or service at the signaled price, carries signaling per the disclosed methods and systems substantially in real-time between the Cellular Phone, the Cellular Switch, the Internet-based access control element and the access control button including, e.g. an Internet Button.

[FIG. 4A]

Figure 4A:
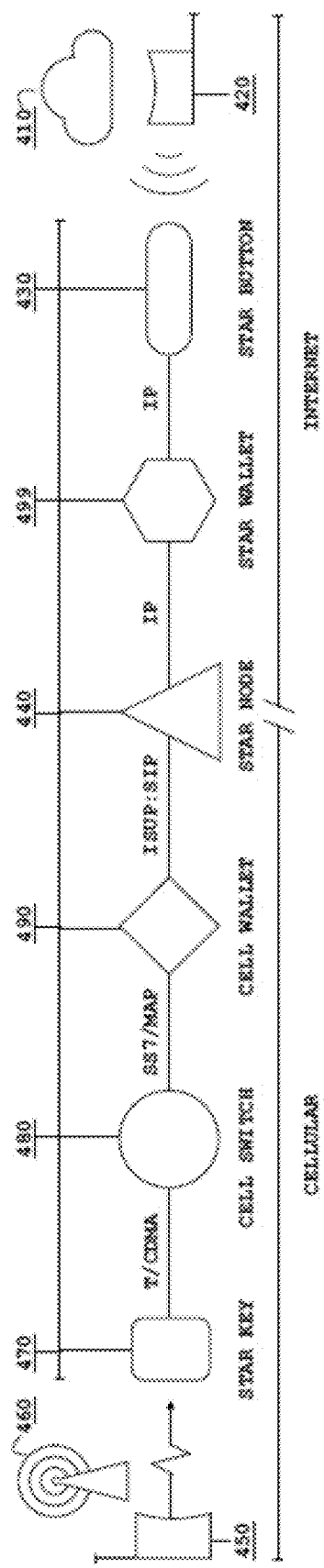
FIG. 4A is an illustrative non-restrictive example of a Circuit Switched Star Logical Channel in accordance with at least some embodiments of the present disclosure.

FIG. 4A depicts a logical representation for a circuit switched IN 460 (e.g. telephony network) and device A 450. In some embodiments, this architectural abstraction depicting the core elements in an access control platform transaction, may omit some elements for clarity. Some embodiments may have an allocation to physical elements different from that shown, however, the physical separation of the logic shown does not impact the modelling disclosed.

In some embodiments, an internet 410 connected device B 420 displays a screen that requests the user of an access control platform for access to digital content or services. The device B 420 may include an internet enabled cellular phone with an Internet browser linking to a webpage or an APP rendering internet content or services. Alternatively, device B 420 may be a personal computer with browser or software connected to the internet. As such, the device B 420 and cellular telephony A 450 may be one and the same physical device.

In some embodiments, on rendering a screen for the access control platform transaction, device B 420 connects to the access control element 440 via a published API, requesting an access control button (430). In some embodiments the API permits the IAPP to specify the access control platform transaction amount (e.g. NNN¢ and *NNN address signals as disclosed herein) together with the SKU being purchased. Each element rendered on the screen that requests access control platform functionality may be further identified by a unique digital ID, linked to the transaction.

In some embodiments, when device A (450) has previously conducted an access control platform transaction using the IAPP and has been registered and/or paired for a pending transaction, as described above, then the expectation may be set at an access control element (440). In some embodiments, the expectation may include a signal from device identified by MSISDN-A emitting the *NNN address signals. This expectation may be, for example, annotated [A:NNN] herein, however any other suitable annotation may be employed. In some embodiments the access control platform API establishes a bidirectional communication between the access control element (440) and the STAR Button (430), permitting transaction events to be communicated between them. One such bidirectional communications protocol utilizes an IP Socket.

In some embodiments, upon tapping the access control button (430) the transaction and the associated channel is activated, prompting the user to dial the *NNN address. While an access control button (430) may be automatically activated, since multiple buttons may be displayed on a single screen, each associated with different content/service, tapping or bringing focus to activate an access control button (430) may be a mechanism to select the desired item to purchase.

In some embodiments, user A may dial *NNN, representing payment in dollar notation ($N.NN), on device A (450). In another embodiment user A may dial *NN or *0NN (with leading zero) representing payment in cents (NN¢). The transactional signals may be transported over the IN 460 (e.g. Radio Access Network (RAN)) using, for example and without limitation, TDMA/CDMA signaling, or Session Initiation Protocol (SIP).

In some embodiments, a symbolic prefix, such as a star, hash, ampersand, etc., in the cellular address signals, is accessed on touching the symbol key (470). For example, a star may be used for the symbolic prefix, in which case, the symbol key 470 may be a star key located at coordinates R4C1 (Row 4 Column 1) in the cellular dial pad matrix. In some embodiments, the symbolic prefix may route the call along a star configured trunk or universal resource indicator (URI) to the access control element (440).

In some embodiments, upon dialing *NNN the mobile originating switching element (e.g. MSC 480) enters the Originating Basic Call State Model (OBCSM), encountering the Initial Detection Point (INITDP: DP2 Collected_Info). The INITDP establishes a call control dialog with a Service Control Point (SCP/gsmSCF) not shown. In some embodiments this MSC/SCP dialog is established utilizing the MAP/SS7 signaling protocol.

In some embodiments, the SCP performs a credit verification for A by querying cellular wallet (490), an account associated with device A 450, to determine whether user A has sufficient credit to complete the call. That is, in this example, determining whether user A has at least $N.NN credit, per the disclosed mapping, in the associated cellular account (490). In some embodiments, the cellular wallet 490 is managed by the IN billing system, or Online Charging System (OCS).

In some embodiments, upon determining that user A has sufficient credit, the SCP instructs the MSC (480) to CONTINUE the call and the MSC 480 then routes the call request to the access control element (440). In one switching embodiment the MSC routes the call along an associated symbol (e.g. star) trunk to a GMSC/SBC, which in turn translates ISUP into SIP signaling.

In some embodiments, while FIG. 4A depicts the MSC 480 connecting to the access control element (440) on a linear path and single hop over the cellular wallet (490), that is merely illustrative of the logical entity relationships in the channel being described. That is, the cellular wallet (490) may not in actuality be connected to the access control element (440) at all, nor involved in the call signaling path and in any protocol translation. The actual network routes, protocols and associated links for cellular wallet 490 access are not shown for clarity.

In some embodiments, on receiving the call request access control element (440) determines whether a call from MSISDN-A, transmitting address signals NNN is expected (i.e., record [A:NNN] exists), being set on the user activating the access control button 430. If such an expectation is met, access control element (440) may instruct MSC (480) to present a Ring Back Tone (RBT) to device A (450) and then, per the hook flash Signaling Protocol disclosed herein, momentarily instructs the MSC 480 to take the call OFF/HOOK and then momentarily thereafter, to replace the call back ON/HOOK in order to execute the transaction. Thus, In some embodiments the access control platform user experiences:

1. Instant Ring Back Tone followed by
2. Momentary Call Connect and Disconnect.

In some embodiments, telephony device (450) may then display a symbolically prefixed call with duration 00:01 seconds. In some embodiments, flash protocol thus presents both audible (Ring Back Tone) and visual (momentary connect) confirmation, where the call raises, connects and then drops in completion. hook flash signaling as disclosed herein generates a $N.NN Call Data Record (CDR) billing ticket on the MSC (480) for the star dialed digits NNN. In a prepaid cellular embodiment, this amount is debited to cellular wallet (490) substantially in real-time.

In some embodiments, on receiving confirmation from MSC (480) that the hook flash protocol completed successfully, confirming CDR generation, the access control element (440) may communicate with access control button (430) that the transaction was successful. On receiving successful indication (e.g. affirmative access permission indication), the access control button (430) may then change state, for example may present an affirmative icon such as a checkmark, to reflect payment completion before unlocking access to the digital service or the content purchased.

In some embodiments, upon a successful transaction completion, the access control element (440) may then record the access control platform transaction amount in the accumulative access control wallet 499 (STAR wallet) and record the amount due to the provider (less any switching and processing fees) in an access control wallet associated with the provider (not shown).

In some embodiments, upon receiving payment confirmation, the IAPP permits access to the requested content/service, completing the transaction. The access control element (440) may thus coordinate, transport and translate cellular signaling events into transaction events, synchronizing the events on the IN 460 with events on the internet. This signaling convergence thus seamlessly migrates cellular billing certificates into the cloud while maintaining an authoritative transaction record in the form of the CDR.

In some embodiments, since the device B (420) and the device A (450) may be the one and same smartphone device, the user may not have to manually enter the star address signals (*NNN) to dial. Rather, on touching the access control button (430), the access control button 430 may issue a command to the device AB 420/450 to present the native or selected dialer on the telephony device (420/450), with the address signals corresponding to the price on the access control button 430 automatically entered. To automatically activate the dialer in this preaddressed manner, the access control button (430) embedded in webpages may have an associated "tel:" reference, for example:

<a href="tel:*025">*025</a>.

In some embodiments, while such a telephony URL reference in some embodiments opens the telephony dialer with the address already entered, the user may then be required to CONNECT the call (e.g. pressing the Green Phone Button). A cellular APP with requisite telephony call control permissions and associated access control platform logic, may exercise greater call control through an API to the native dialer, permitting a one touch connection. Regardless, the typical time elapsed from tapping a access control button to completing the payment transaction, is mere seconds.

In some embodiments, since the symbol key (470) (e.g. star, hash, ampersand, etc.) on cellular phone A (450), is thus logically bound and synchronized to an expectant, activated, individual access control button (430) on the Internet, access control platform delivers a virtual fingerprinted payment system. The unique mapping between symbol key and the access control button 430, permits simultaneous access control platform transactions, uniquely signaled and switched, albeit that every transaction may be uniformly presented and practically simultaneously signaled. As described above in FIG. 3 above, this mass atomic binding between symbol key and the access control button 430, is a function of the uniquely staged and expectant signals, embodied in the access control platform transaction protocol.

In some embodiments, up to millions of users or more who may be viewing the same access control button governing access to the same internet content on the same internet page, each requesting users to emit the same cellular signals at substantially the same time, are all switched independently and securely, since every such button is uniquely and logically coupled, in a 1:1 relationship to the known and identified MSISDN from which the star signals are expected. This secure digital cellular circuitry ensures, that when multiple cellular users are simultaneously transacting using the disclosed protocol, A can never dial and inadvertently pay B, since their "cellular wires" can never cross, so to speak.

In some embodiments, the bidirectional star button communications channel permits the access control platform to signal and visually alert the user. For example, if the user dials an incorrect series of digits to that which the access control element is expecting, that is where the [A:NNN] expectation fails to be met, the button may "shake" NO (e.g. animate left right and left) to indicate an incorrect payment attempt was made, and thereby signal the user to try again without incurring cost.

[FIG. 4B]

Figure 4B:
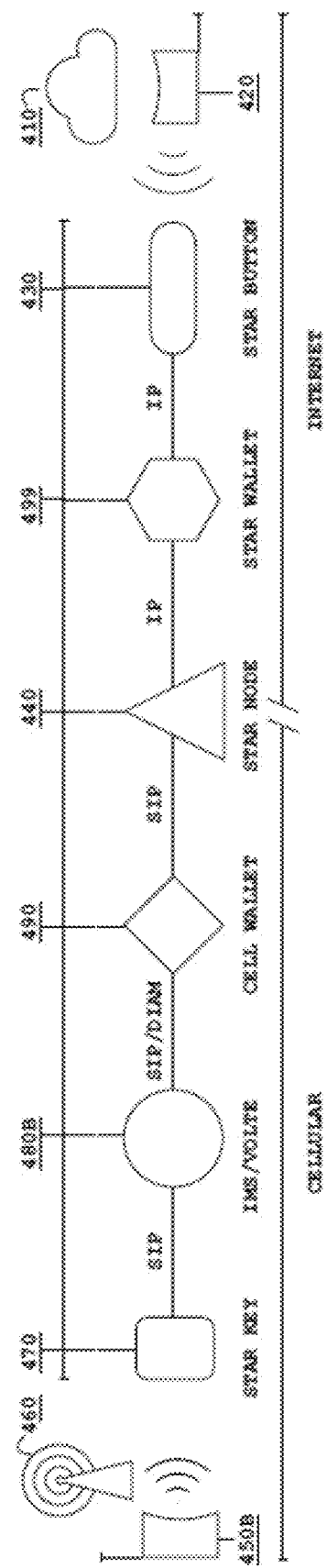
FIG. 4B is an illustrative non-restrictive example of a Packet Switched Star Logical Channel in accordance with at least some embodiments of the present disclosure.

FIG. 4B, which shares annotation with FIG. 4A, except where numeric labels are appended with the character "B", is a channel representation for an IMS/VoLTE Packet Switched Telephony Network (480B) and associated User Equipment (450B).

In this IMS/VoLTE embodiment the channel logically performs in the same sequence and series as described in FIG. 4A, the distinction being applied to the elements that are depicted to the left of the Cell WALLET (490), which may utilize SIP rather than ISUP signaling to setup the call, and which may utilize SIP and DIAMETER, rather than legacy SS7/MAP protocols for account management and credit verification.

[FIG. 5]

Figure 5:
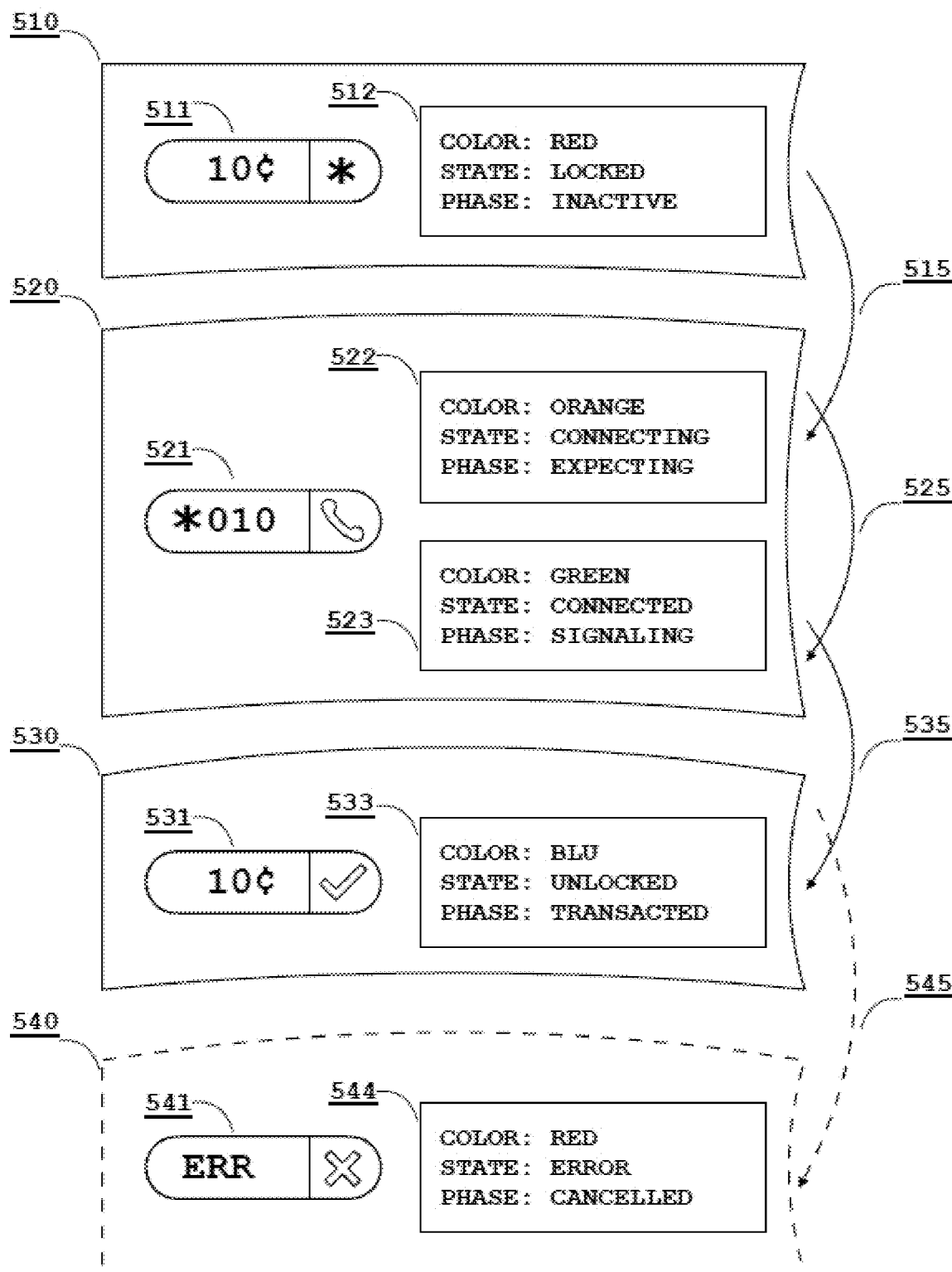
FIG. 5 is an illustrative non-restrictive example of an Action Button Event Transition Series in accordance with at least some embodiments of the present disclosure.

FIG. 5 illustrates a access control button transition series in accordance with one or more embodiments of the present disclosure. In the following series, it is assumed cellular MSISDN-A has been previously paired with the IAPP displaying the access control button 511.

In some embodiments, as described and disclosed in FIGS. 4A and 4B above, the access control buttons, being a self-contained user interface element communicatively coupled to the access control platform, overcomes a technical problem common to all transactional systems, which in some embodiments present separate screens or dialogs in order to communicate state. Separate user interfaces which switch the display context in order to communicate transaction progress, visually impair and operationally impact the user and the overall payment experience. The active, in channel, communication buttons disclosed herein, which contain all the payment communications and states in a single User Interface Element, uniquely overcome these current transactional design limitations.

In block u the access control button 511 is partitioned to display item price at left (100), and current icon (action/state) at right (*). On loading, the access control button 511 enters an initial state which In some embodiments displays as series 512:
  Color: RED, signaling the transaction is at a STOP
  State: Locked, barring access to the digital content/service
  Phase: Inactive.
Thus, 512 represents an inactive access control platform channel, coupled to a locked digital item for sale at a listed 100 sticker price.

In some embodiments, on activating the access control button 511, for example by tapping or clicking the access control button, the series transitions to block 520, wherein access control button 511 then establishes a communication with the access control platform to set up the payment expectation, which inter alia, records an association between cellular MSISDN-A and the payment amount, [A:010], as described above.

In some embodiments, the expectation further records and associates the provider and product identifiers for this button and the pending transaction as described in FIG. 3 (ledger 370).

During this communication establishment, In some embodiments the access control button 511, now labeled 521, transitions (swivels) to the series 522:
  Color: ORANGE signaling a state SHIFT
  State: Connecting
  Phase: Expecting.

In some embodiments, during this 520 transition, the button swivels from displaying the price at left, to displaying the address signals *010 representing the transaction monetary suitable ($0.10) and displays telephone icon at right. In one embodiment the telephone icon indicates that a dial action is required. The color indicates the button is at signal SHIFT.

In some embodiments, displaying the price and the star (10¢ and *) in access control button 511 swivels or otherwise transitions to reveal the button reverse side displaying the dial string (*010) and phone icon in access control button 521. In some embodiments, the transition visually synchronizes the transition from sticker price to dial string, showing the direct mapping between the dollar ($N.NN) digits and the star (*NNN) address signals previously displayed.

In some embodiments, on successful communications establishment, the access control button 523 transitions to series 523, which in this signaling embodiment displays:
  Color: GREEN signaling GO
  State: Connected
  Phase: Signaling.

In some embodiments, at this stage the access control button 521 may prompt the user to dial the displayed digits. In some embodiments, this dial action is manually engaged on tapping the now green button. In another embodiment the dial action is automatically engaged on successful communications establishment.

In either case, when the device supports telephony functionality, the dial action invokes and launches the native telephony dialer with the dial string (*010) automatically entered, as described in FIG. 4 above. If the paired cellular device is physically distinct from the device presenting and displaying the access control button, the user may enter the short dial string (*010) manually on the cellular telephony device (e.g., smartphone/mobile phone).

In some embodiments, on dialing and thus emitting the expectant access control platform address signals (*NNN), from the paired MSISDN-A, the access control platform, now communicatively coupled to the active and connected access control button, verifies the transaction as described above. On successfully completing the transaction, the access control button 521 transitions to block 530, which in some embodiments swivels the access control button 531 again to display the original price at left (100) and a tick icon at right. In some embodiments, an audible and/or visual indicator may be emitted to confirm success, such as a coin drop sound or other indicator. In some embodiments, this transaction is signaled and completed in just one second, as described and illustrated below in FIG. 6. Series 533, in this signaling embodiment, visually confirms the completed transaction with:
  Color: Blue, signaling communications and transaction has completed.
  State: Unlocked, granting access to the digital content/service
  Phase: Transacted.

In some embodiments, a final (blue) transacted state affirmatively "nods" YES to the user by animating the button in an up, down and up sequence, to indicate approval. In some embodiments, sound bytes may also be played at each transition for audible alerts (e.g. the sound made when a coin drops into a glass tip jar). On successful payment the screen unlocks to reveal the purchased item. In a URL driven content access embodiment, successful payment may redirect the APP/Browser to the completion URL, displaying the unlocked content.

In some embodiments, if any error condition is encountered during any phase, the series may transition to block 540 where, In some embodiments, the button reverts to a red error state displaying the error encountered at left (e.g. transaction time out, incorrect number dialed, user cancelled etc.), together with a cross icon at right. In some embodiments the button may negatively shake, by animating left and right, to signal NO. The error series 544 may thus present:
  Color: RED, as in the transaction has stopped
  State: Error, indicating cause
  Phase: Cancelled, wherein the button may reset.

In some embodiments, the access control button, and the described transition series, present a highly interactive, responsive and contained payment signaling and processing channel. In some embodiments, the access control button is rendered in an iframe, that overlays the content, so as to appear to float above the providers page.

Figure 6:
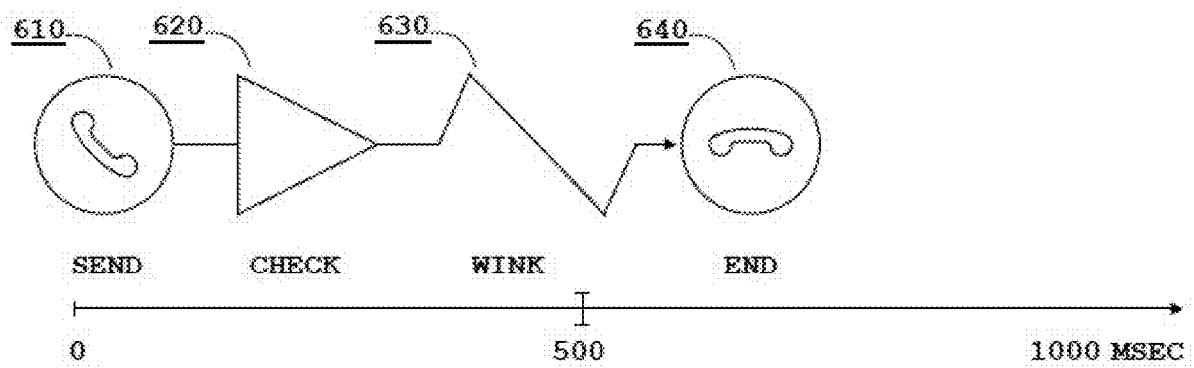
FIG. 6 is an illustrative non-restrictive example of an Action Millisecond Event Timeline in accordance with at least some embodiments of the present disclosure.

FIG. 6 depicts an example of an access control platform micro transaction switching timeline on a millisecond axis, highlighting the flash sub-second switching protocol in accordance with one or more embodiments of the present disclosure. In some embodiments, the time (T) elapsed between switching and billing elements are approximated for illustrative purposes and the timeline is not drawn to scale. Switching and verification is in some embodiments measured in single digit milliseconds.

T=0 msec:
At 610 the user presses SEND to emit access control platform address signals (*NNN) encapsulating the $N.NN transaction amount as disclosed.

T=10 msec:
At 620 the cellular network performs the AAA (Authentication Authorization and Accounting) procedure and on passing the Accounting CHECK, which verifies the account associated with the caller has sufficient credit to sustain the $N.NN charge, routes the call towards the access control platform.

T=20 msec:
At 630 the access control platform verifies that the *NNN address signals received from the cell are from the expected MSISDN-A and match the dollar amount on the access control button and on meeting that expectation, performs the WINK protocol, taking the call OFF/HOOK and then pauses for a suitable period of time, e.g. one second or less, such as 500 msec.

T=520 msec:
The access control platform returns the call ON/HOOK generating a one second cellular billing certificate on the cellular network for the $N.NN amount signaled, which the IN debits the cellular wallet.

T=521 msec:
In some embodiments, the access control platform credits an access control platform wallet associated with the access control platform and provider wallets associated with each provider. The access control platform transaction is complete and the call ENDS (640). Total time elapsed is less than one second.

In some embodiments, the access control platform micro payment protocol thus may conduct payment on a micro second switched phone call. Further, since the access control platform payment protocol operates using the native telephony signaling channel, along a call setup and billing control path, and since it operates seamlessly using the existing digital cellular wallet, on any and all phones, the access control platform is invisible to the user (i.e., zero footprint).

Figure 7:
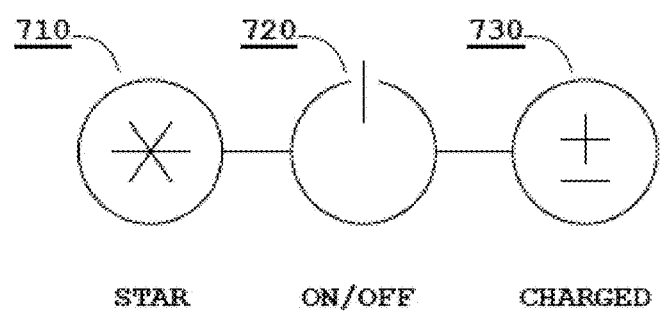
FIG. 7 is an illustrative non-restrictive example of an Action Event Representation Abstraction progression in accordance with at least some embodiments of the present disclosure.

[FIG. 7]
FIG. 7 depicts an abstract charging view of the disclosed access control platform micro payment protocol in accordance with one or more embodiments of the present disclosure.

Item 710 depicts the telephony device A emitting the star address signals (e.g. *NNN) signaling payment for transaction value $N.NN.

Item 720 depicts the OFF/ONHOOK switching function (power icon) engaged on passing the Accounting check, that CONNECTS the call (going OFF/HOOK) and momentarily thereafter DISCONNECTS the call (returning ON/HOOK).

Item 730 depicts the charging function (plus/minus polarity) wherein the callers cellular wallet is debited (-$N.NN) and the access control platform System and provider wallets are credited (+$N.NN less any switching and processing fees).

In some embodiments, the access control platform payment protocol may similarly be depicted by the following text schematic:

(*)–/\\/–(+/–), where:
(*) represents the star address signals (*NNN)
/\ represents the OFF HOOK state
\/ represents the ON HOOK state
(+/–) represents the wallet charging transactions (+/–$N.NN).

Figure 8:
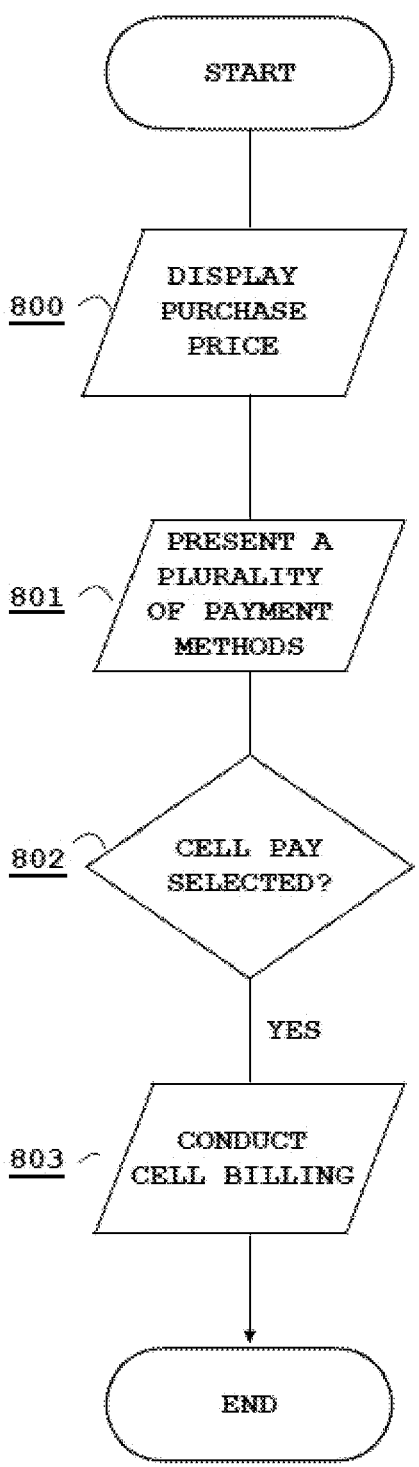
FIG. 8 is a Manual Selection (Prior Art).

[FIG. 8]
FIG. 8 is a flowchart depicting a prior art cellular billing. As shown in FIG. 8, users may be presented with a plurality of payment methods and are required to manually select their desired choice. In flow item 800, the IAPP presents a purchase price for the content or service. This purchase price is an information display rather than an active payment user interface element, to inform the user of the transaction amount. In flow item 801, the IAPP then presents a plurality of payment methods, by presenting a plurality of payment buttons that are logically coupled to the item and displayed purchase price. In flow item 802, the user selects the desired payment method by activating (e.g. tapping or clicking) the corresponding payment button. If the cellular payment button is selected, flow moves along the affirmative YES path to item 803. In flow item 803, the IAPP conducts the selected cellular billing method chosen by the user.

In some embodiments, the plurality of payment options introduces a manual decision making point and an impediment to the mass adoption and frictionless flow of micro payments, given that they are to be encountered with frequency, retarding the cellular billing method for low value (micro) transactions.

Figure 9:
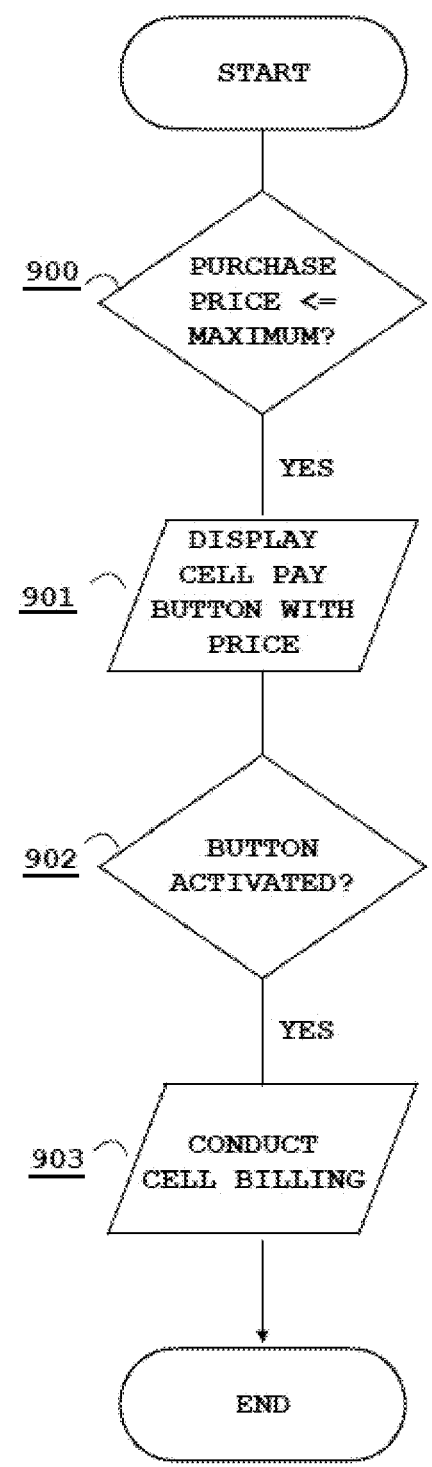
FIG. 9 is an illustrative non-restrictive example of an Automatic Selection in accordance with at least some embodiments of the present disclosure.

[FIG. 9]
FIG. 9 is a flow sequence that illustrates the cellular micro billing via the access control platform in accordance with one or more embodiments of the present disclosure. In some embodiments, as shown in the sequence of FIG. 9, embodiments of the present disclosure enable the removal of the manual payment selection by automatically selecting cellular billing for transactions that are below a maximum threshold amount. In some embodiments, a purchase price threshold of one dollar (USD) automatically selects and presents a cellular payment method button that displays the micro purchase price.

In flow item 900, if the content or service purchase price is below a predetermined threshold, flow moves along the affirmative YES path to item 901.

In flow item 901, the IAPP automatically switches the payment method to cellular and displays a cellular payment button that displays the micro purchase price. Thus, whereas, in the current state of the art as described in FIG. 8 above, the IAPP may present and display the purchase price separately from the access control button, given that there is a plurality of payment methods, the disclosed micro payment system and methods present a unified method and price in a single access control button determinant on the price being below a maximum threshold.

In flow item 902, if the user activates the access control button (e.g. access controller interface element), flow moves along the affirmative YES path to item 903, where the IAPP conducts the cellular payment method.

[FIG. 10]

Figure 10:
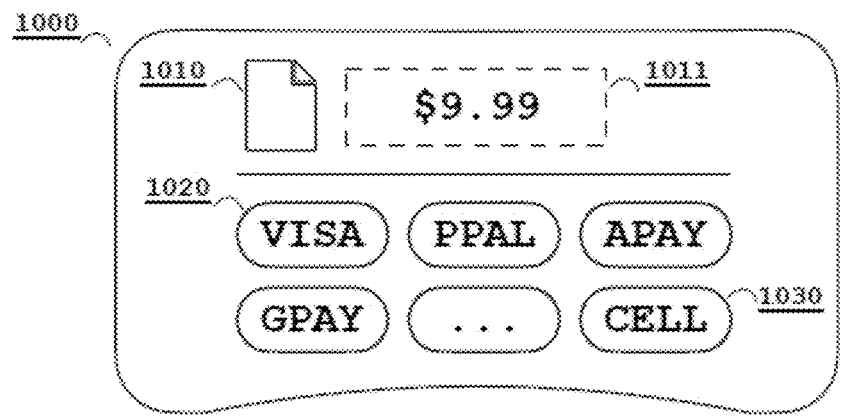
FIG. 10 is a Plurality of Action Methods (Prior Art).

FIG. 10 is a diagram depicting a prior art cellular billing interface.

IAPP screen 1000, displays content or service 1010 with a static (non-activating) purchase price element 1011 ($9.99), dotted, separate from a plurality of payment buttons and associated methods 1020~1030.

The plurality of payment methods may include options such as: Credit Cards (VISA), PayPal (PPAL), Apple Pay (APAY), Google Pay (GPAY) and Cellular Billing (CELL 1030).

The above display thus presents a user with a single item or service (1010) with a plurality of payment methods (1020), requiring the user to make a manual payment selection.

Figure 11A:
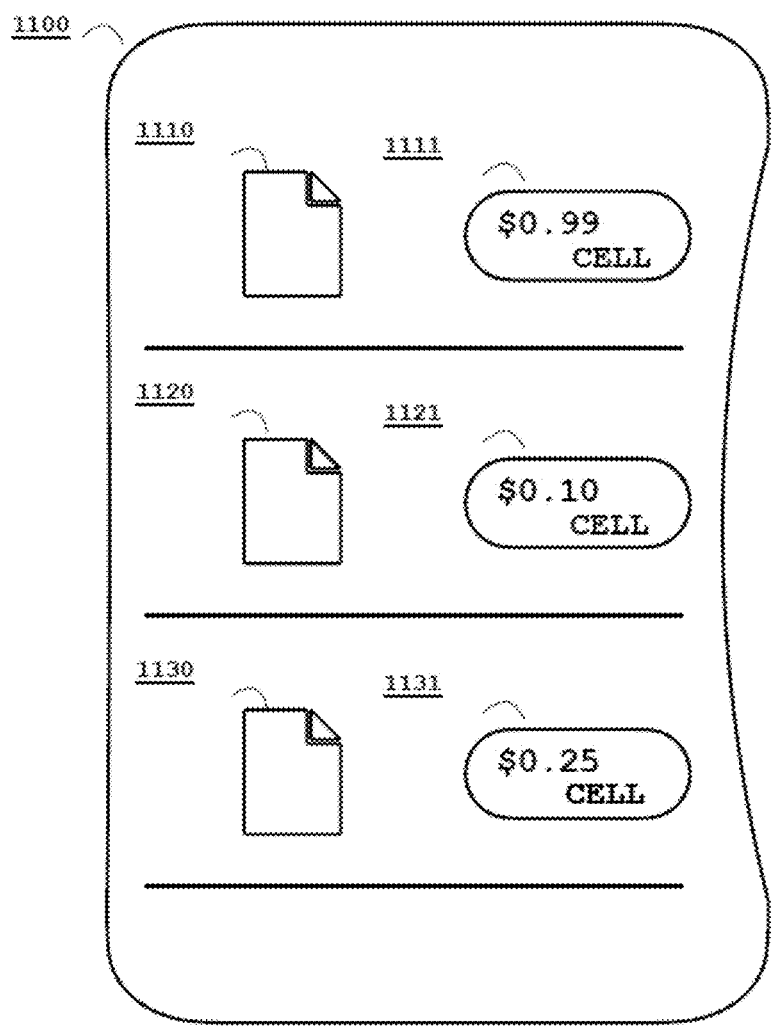
FIG. 11A is an illustrative non-restrictive example of a Singularity nature of an Activity Channel Method (a single activity channel) in accordance with at least some embodiments of the present disclosure.
Figure 11B:
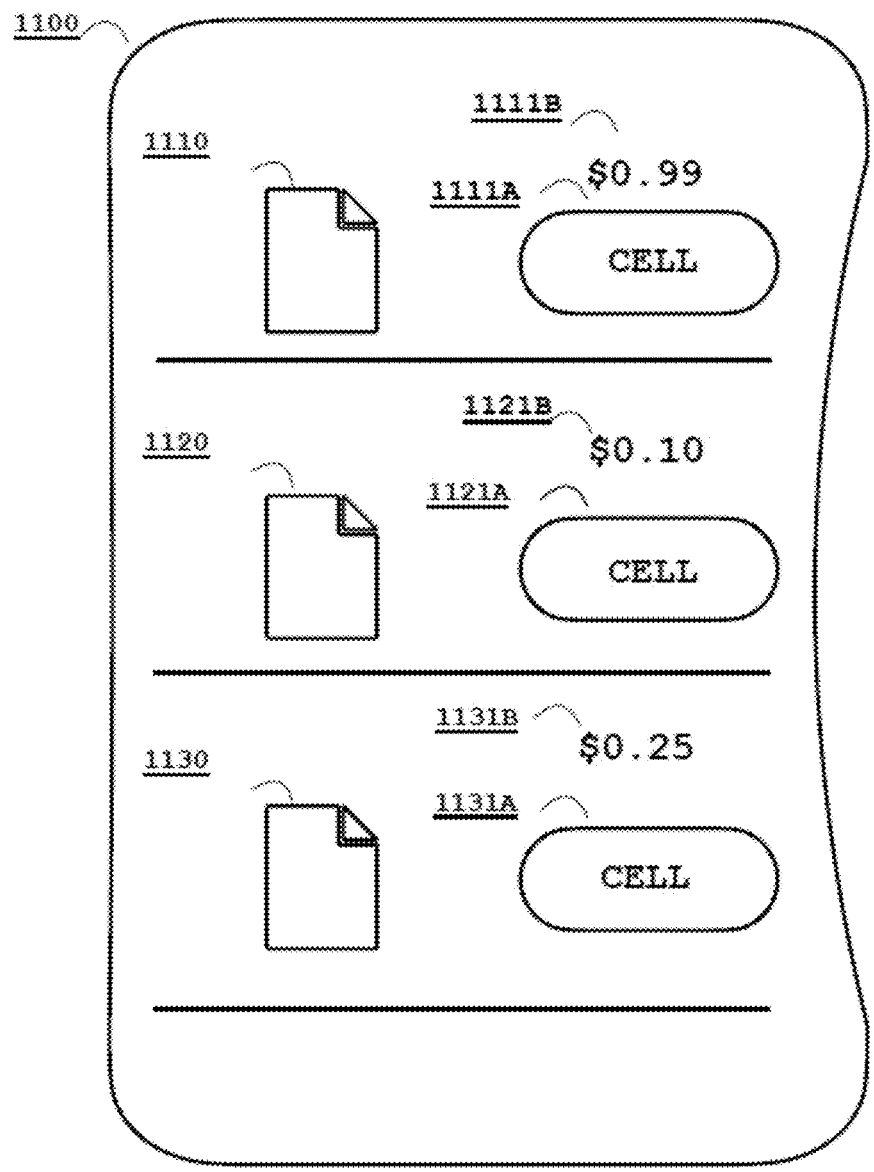
FIG. 11B is another illustrative non-restrictive example of a Singularity nature of an Activity Channel Method (a single activity channel) in accordance with at least some embodiments of the present disclosure.

[FIGS. 11A and 11B]

FIGS. 11A and 11B depict exemplary cellular micro access control application program interfaces enabled by the access control platform in accordance with one or more embodiments of the present disclosure. At least some embodiments of the present disclosure enable the removal of the manual payment selection requirement by automatically switching to cellular access control billing for transactions that are below a maximum threshold amount (e.g. $1.00). In providing the technologically improved access control application program interfaces configured for a particular access-restricted item down to a single selection, in at least some embodiments, the exemplary disclosed systems and methods of the present disclosure provide at least one technological solution that mesh with the website design which in some embodiments renders more than one access-restricted content item, article, link and/or service per webpage.

In some embodiments, as shown in FIG. 11A, display screen 1100 thus shows a plurality of access-restricted items for purchase each with a single directly associated cellular payment access control button (e.g. access controller interface element) displaying the micro purchase price that may utilized as access code. For example, item 1110 with a $0.99 access controller interface element 1111, item 1120 with a $0.10 access controller interface element 1121, item 1130 with a $0.25 access controller interface element 1131, and so on.

In some embodiments, as shown in FIG. 11B, display screen 1100 also shows a plurality of access-restricted items for purchase each with a single directly associated cellular payment access control button (e.g. access controller interface element) displaying the micro purchase price that may utilized as access code. For example, item 1110 with an access controller interface element 1111A and a $0.99 access code label 1111B, item 1120 with an access controller interface element 1121A and a $0.10 access code label 1121B, item 1130 with an access controller interface element 1131A and a $0.25 access code label 1131B, and so on. In some embodiments, access code label is displayed, for example, without limitation, in 1:1 ratio with access controller interface element, thereby providing another technological solution that ensure a singular logical and visual relationship between access code and access controller interface element. In some embodiments, access code label is displayed, for example, without limitation, in a visual vicinity (e.g. separating distance under 2 inches, separating distance under 1 inch, separating distance under 0.5 inch, separating distance under 0.2 inch, etc.) of access controller interface element, thereby providing another technological solution that ensure a singular logical and visual relationship between access code and access controller interface element.

[FIG. 12A]

Figure 12A:
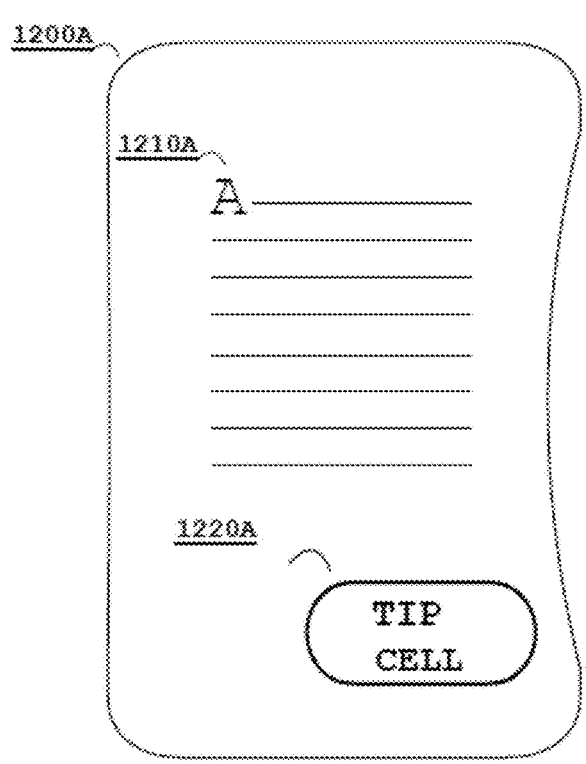
FIG. 12A is an illustrative non-restrictive example of an Action Schematic in accordance with at least some embodiments of the present disclosure.

FIG. 12A illustrates a Micro Gratuity Scheme using the access control platform, where the IAPP permits the user to access and consume the content before requesting any payment in lieu of a gratuity in accordance with one or more embodiments of the present disclosure. In some embodiments, an IAPP screen 1200A displays content 1210A (e.g. an article A), that is unlocked for consumption, together with a cellular tip access control button 1220A. A user may thus determine what value they derive from the freely accessible content and what reward they feel is due to the producer (if any).

[FIG. 12B]

Figure 12B:
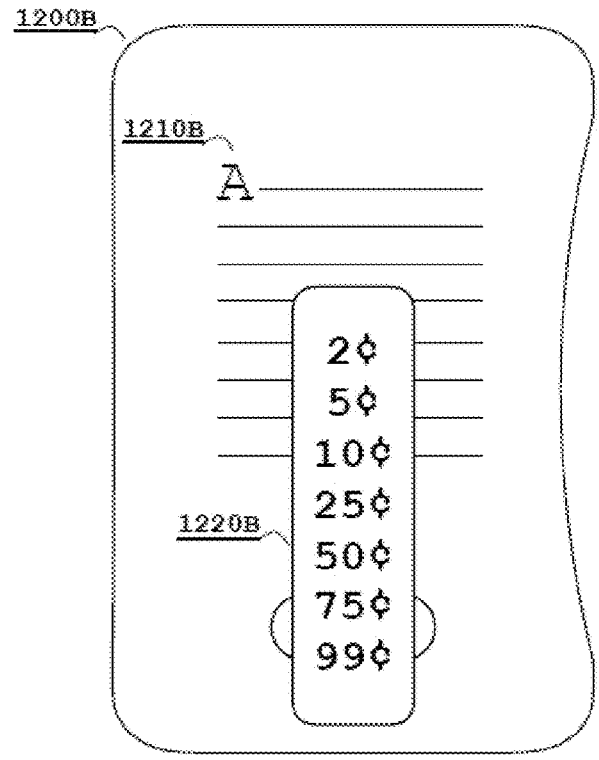
FIG. 12B is an illustrative non-restrictive example of yet another Action Schematic in accordance with at least some embodiments of the present disclosure.

FIG. 12B illustrates a gratuity menu 1220B in Micro Gratuity Scheme using the access control platform in accordance with one or more embodiments of the present disclosure. In some embodiments, the gratuity menu 1220B may present a plurality of micro amounts on activating (e.g. tapping/clicking) the tip access control button 1220A. The user may then select an amount to contribute towards the content production. In some embodiments the IAPP may display the average or the most common gratuity to guide user selection. On selecting the gratuity amount, the cellular payment is conducted as disclosed.

In some embodiments, the micro gratuity scheme inverts the content commercialization proposition, replacing it with an honor system where value may be freely determined by the consumer, the marketplace, rather than dictated by the producer.

[FIGS. 13A and 13B]

FIGS. 13A and 13B illustrate alternate views of FIGS. 10 and 11, again highlighting at least one technological distinction between a technical shortcoming and at least one technological solution in accordance with at least some embodiments of the present disclosure.

FIG. 13A shows a technological shortcoming of a circuitry that is a payment stack which presents a plurality of payment methods from which the user is required to manually select. In one embodiment, as shown in FIG. 13B, at least one technological solution of the present disclosure establishes an access control micro circuitry that may display an automatically assigned, single activity channel 1310, determinant, for example, without limitation, on the purchase price being below a threshold amount.

[FIG. 14]

Figure 14:
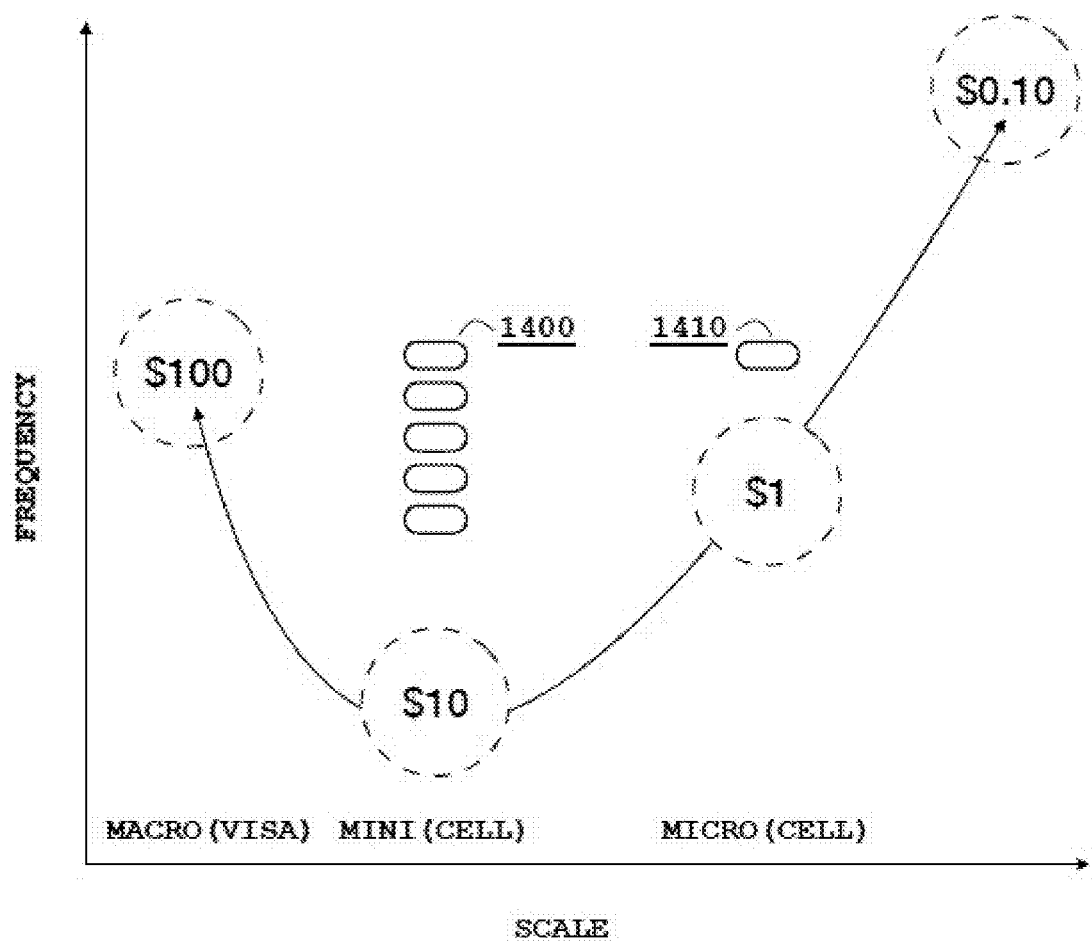
FIG. 14 is a comparative graph illustrating a result of at least one technological improvement projection in accordance with at least some embodiments of the present disclosure.

FIG. 14 graphically depicts a resultant transactional distribution curve, plotting frequency against scale, when a plurality of payment methods and options 1400 are presented for MACRO and MINI amounts versus a single cellular payment method 1410 presented for MICRO amounts.

The low frequency for MINI CELL transactions (e.g. $10) is principally due to the fact that these transactions have to compete with a plurality of more entrenched, renowned and habitually used payment methods as described above.

The high frequency MICRO payment projection is based on the frictionless singular cellular payment method and the positive psychological impact of ultra-low transactional values (e.g. 100).

The MICRO payment does not encumber the user with payment method choice. Rather, it seamlessly and swiftly directs all micro payments along an express cellular checkout lane, removing all purchase decision making impediments.

[FIG. 15A]

Figure 15A:
FIG. 15A is an illustrative non-restrictive example of a processing algorithm utilizing cellular communication signals in accordance with at least some embodiments of the present disclosure.

FIG. 15A depicts an example custom rating model of a IN billing element programmed to use the custom rating model to determine communication tariffs (charge) using the address signals of a call in accordance with one or more embodiments of the present disclosure. In some embodiments, the custom rating model may include a dynamic (continuous) computational billing matrix, mapping any star N address signals to its direct monetary suitable as follows:

Row 151A, two *NN digit address signals parsed into a min/max 0/$0.99 charge;

Row 152A, three *NNN digit address signals parsed into a min/max 0/$9.99 charge;

Row 153A, four *NNNN digit address signals parsed into a min/max 0/$99.99 charge;

Row 154A, five digit address signal parsed into a min/max 0/$999.99 charge;

Row 155A, any *N series digit address signal parsed into a min/max 0/N¢ charge; and Row 156A, any N series up to a 5 digit address signal parsed into a min/max 0/N¢ charge.

In some embodiments, there may be a 156A digit limitation, e.g. a limitation of up to 5 digits. Such a limitation, in some embodiments, is to ensure that non star dialed micro payment address signals do not intersect with the subscriber telephone number space.

In some embodiments, the access control platform thus presents users with a highly transparent billing protocol, since the dialed digits equate directly to the cost of the transaction, digit for decimal digit.

In some embodiments, a user may dial any payment amount using the above signaling method and notation. In some micro payment embodiments, two digits (NN), enumerating and encapsulating payments between zero and one dollar ($0.01 to $0.99), may enable the technical solutions to the technical problems described above, including an efficient and verifiable micro transaction with an authoritative record in the form of the CDR. In some embodiments, any other suitable number of digits may be used, such as a three digit embodiment (NNN) may best serve to clarify a dollar and cents notation, for example where 100 may then then presented as *010 rather than *10, to avoid any misinterpretation as to the actual transaction value (e.g. where *10 may be construed as signaling $10).

[FIG. 15B]

Figure 15B:
FIG. 15B is an illustrative non-restrictive example of a static state processing model matrix utilizing cellular communication signals in accordance with at least some embodiments of the present disclosure.

FIG. 15B depicts additional detail for the example custom rating model of a IN element programmed to use the custom rating model to determine call tariffs using the address signals of a call in accordance with one or more embodiments of the present disclosure. In some embodiments, the custom rating model may present a static (discrete) micro billing matrix, or rating table, matching two (NN) or three (NNN) digit address signals to their direct monetary suitables.

Row 151B: address signals *00 or *000 translate into a $0.00 charge;

Row 152B: address signals *01 or *001 translates into a $0.01 charge;

Row 153B: address signals *02 or *002 translates into a $0.02 charge;

Row 154B: address signals *05 or *005 translates into a $0.05 charge;

Row 155B: address signals *10 or *010 translates into a $0.10 charge;

Row 156B: address signals *25 or *025 translates into a $0.25 charge;

Row 157B: address signals *50 or *050 translates into a $0.50 charge;

Row 158B: address signals *75 or *075 translates into a $0.75 charge; and

Row 159B address signals *99 or *099 translates into a $0.99 charge;

Thus, a user may dial *01 (star zero one) to pay 1c from their cellular wallet. Similarly, the user may dial, e.g. *02, *05, *10, *25, *50, *75, *99 to respectively pay 2 cents, 5 cents, 10 cents, 25 cents, 50 cents, 75 cents or 99 cents. For larger amounts, users may dial a longer series of matching digits as previously shown. For more discrete amounts, users may dial the intervening representative digits (e.g. *03=30 (cents U.S.)).

Further, in some embodiments, users may dial a dollar normalized notation, such as *001, *002, *005, *010, *025, *050, *075, *099 for the matching denominations. In some embodiments users may dial a short digit sequence representing the monetary suitable, without requiring a symbolic (e.g. star) prefix, as in dialing 001, 002, 005, 010, 025, 050, 075, 099, wherein all such three digit telephone numbers may then be automatically translated into a star or suitably prefixed number by the network switching and controlling elements, in order to route them to such a micro payment processing platform.

In some embodiments, the above billing modification is achieved by manually programming elements of the IN to populate the IN rating tables, stored in non-transitory memory, with entries to support the permissible discrete micro payment amounts (signals). That is for each micro payment the IN offers (e.g. 1¢, 2¢, 5¢, 10¢ etc.) a new entry is inserted into the rating table that corresponds to the address signals for these discrete micro amounts (e.g. rows *001=>1¢, *002=>2¢ etc.). Thus, to support the micro payments in table FIG. 15B above, elements of the IN may be programmed to add nine new rows to the rating tables.

In some embodiments, a non-transitory memory may include any medium and/or mechanism for storing or transmitting information in a form readable by a machine (e.g. a computing device). For example, a machine-readable medium may include read only memory (ROM); random access memory (RAM); magnetic disk storage media; optical storage media; flash memory devices; electrical, optical, acoustical or other forms of propagated signals (e.g. carrier waves, infrared signals, digital signals, etc.), and others.

In one or more embodiments, the IN billing system programmatically determines the rating tariff to be applied by computing the integer suitable of the *NNN address signals. In one embodiment a computation may for example include:

1) extracting the NNN digits using a string operation on the *NNN address signals to remove the symbolic prefix; and 2) converting the resultant NNN string to integer format using a PARSEINT type operation, resulting in the number of cents (NNN) represented by the *NNN address signals.

In some embodiments, when the exemplary STAR micro payment protocol is defined by the fixed three digit notation (NNN) the above signal to tariff conversion in a packet switching network embodiment may be achieved by, for example, referencing the SIP URI/To String headers, and executing the string operations as in the following JavaScript code:

parseInt(SIP_To.sub string(1,4)).

In some embodiments, combining the string operations as set forth above may extract the leading portion of the address signals that enumerate the charge to be applied, without parsing any additional (meta) data that may be signaled, that are for transporting to and interpretation by the access control platform internally. In one embodiment, string functions may extract the digits signaled in part-2 of a multi-part signaling schema, that is extract the digits between a first and a second star (*) symbol as disclosed herein, to enumerate the charge to be applied.

In some embodiments, the charges may be collected in a suitable currency and/or cryptocurrency. In some embodiments, transfers of monetary value across the access control platform may be performed with the suitable currency and/or cryptocurrency (e.g. a suitable digital token and/or coin), while charges imposed by the IN may employ real/fiat/national currency.

In some embodiments, per the above notations, users may dial any amount, for example, between zero and one dollar (including dialing *000 for an audited transaction that bares no cost) however the common denominations as listed, may be sufficient. One benefit to providing a discrete set of values is to reduce the variance recorded and displayed in the telephone dialed history (e.g. a list of recent calls).

In some embodiments, the hook flash protocol may enable the transactions over a ring and switch funds:

From: A PLUS E.164 [+MSISDN] Cellular Sender Wallet ([+A] (or [A])

To: B STAR [*MSISDN] Internet Receiver Wallet [*B].

In some embodiments, the receiving access control platform wallet is addressed per the disclosed systems and methods, which, in some embodiments, utilizes the device registration and/or pairing techniques described above to identify and record the receiver MSISDN for the internet content provider.

In some embodiments, the use of the cellular and internet wallets enables a fungible tokenization, which transports and transforms cellular Network Access (Air time) into internet Content Access (View time). In some embodiments, the use of the cellular and internet wallets facilitated by the disclosed symbolically prefixed signaling and switching advances which succeed in migrating the authoritative and irrevocable cellular billing certificates (CDRS), the core cellular billing engine, to the cloud. In some embodiments, the CDR certificates that transfer across to the cloud (Internet CDR certificates (ICDRS)), retrofit the World Wide Web with Micro Billing Functionality.

[FIG. 15C].

FIG. 15C tabulates and illustrates different address signal encoding schemas in some embodiments. In one circuit switched network embodiment, address signals are Binary Coded Decimals (BCD) transported in pairs (Octets), wherein each signal is expressed as Hexadecimal. ISUP Address signals incorporate header information to define the overall address length, whether the address comprises an even or odd number of signals, and where odd length addresses use BCD zero (0000) as a filler.

Since such address signals are encoded in 4-bit Hexadecimal notation, which can represent 16 discrete signals, and given that decimal dialed digits require just ten (0-9) permutations, as depicted in rows 150C through 151C, Overdecadic Signals thus describe the six remaining characters over and above the ten decimal digits, as depicted in rows 152C through 157C.

In a Telephony BCD notation embodiment, these overdecadic signals may represent the characters "*#ABC" and a stop (ST) signal, by their BCD numerical equivalents (decimal digits 10-15). Thus, in a Telephony BCD encoding embodiment, the Star (*) symbol may be encoded as the character "A" as represented by hexadecimal (binary) 1010. In a Natural BCD notation embodiment, these overdecadic signals may similarly represent the characters "ABCDEF", where F indicates the terminating, address complete, signal Thus in a circuit switched network embodiment a controlling or billing element may convert the 4-bit Hexadecimal address signals into decimal integer notation, discarding any overdecadic signals, in order to extract and determine the charge to apply.

In some packet switched network embodiments, address signals are encoded in 8-bit ASCII notation, for example as represented by the SIP strings in the SIP URI and the SIP To headers. Thus in a packet switched network embodiment, a controlling or billing element may convert the 8-bit ASCII address signals into decimal (integer) format in order to extract the enumerated charge.

[FIG. 16]

Figure 16:
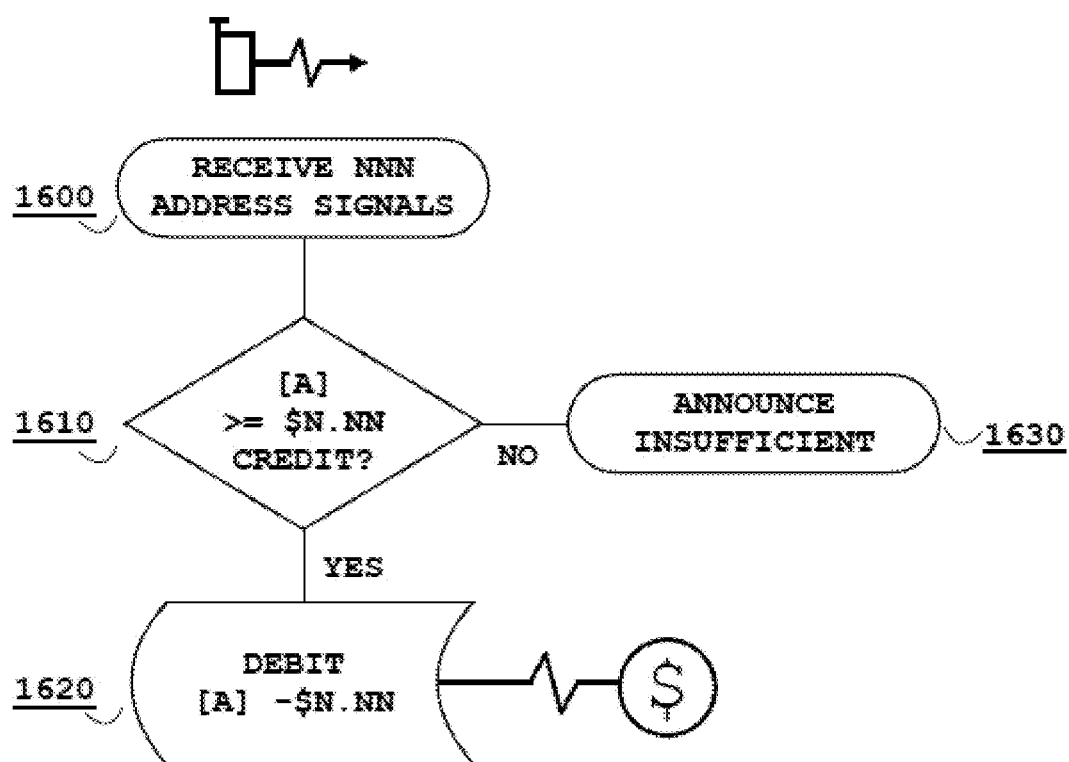
FIG. 16 is an illustrative non-restrictive event/action flow chart of a cellular communications protocol in accordance with at least some embodiments of the present disclosure.

FIG. 16 presents a flow sequence describing a step that debits the cellular wallet with the monetary suitable of the address signals, and which then enables the internet micropayment transaction to progress to completion in accordance with one or more embodiments of the present disclosure.

In flow item 1600, the network receives the NNN address signals per the notations described in FIGS. 15A and 15B above. The call setup request progresses through the OBCSM and AAA (Authentication, Authorization and Accounting) steps, the latter determining whether the sender (caller) has a credit balance sufficient to sustain the suitable $N.NN charge as disclosed.

In flow item 1610, if the caller has sufficient cellular credit to process the dialed transaction, flow progresses along the affirmative YES path to item 1620. If the caller has insufficient cellular credit to process the dialed transaction, flow progresses along the negative (NO) branch to item 1630.

In flow item 1620, on determining cellular credit sufficiency, the $N.NN amount is debited (or deducted) from an account associated with the caller, herein the CELL A Wallet [A]. This fundamental step completes the cellular micro payment component of the internet transaction and is achieved by HOOK FLASH (WINK) signaling as disclosed and described above.

In flow item 1630, on determining cellular credit insufficiency, In some embodiments the network may play an error announcement, for example, "You have insufficient credit to complete this call". The network may further direct the caller to replenish their account or may redirect the call to a service platform accepting payment to replenish the account.

Figure 17:
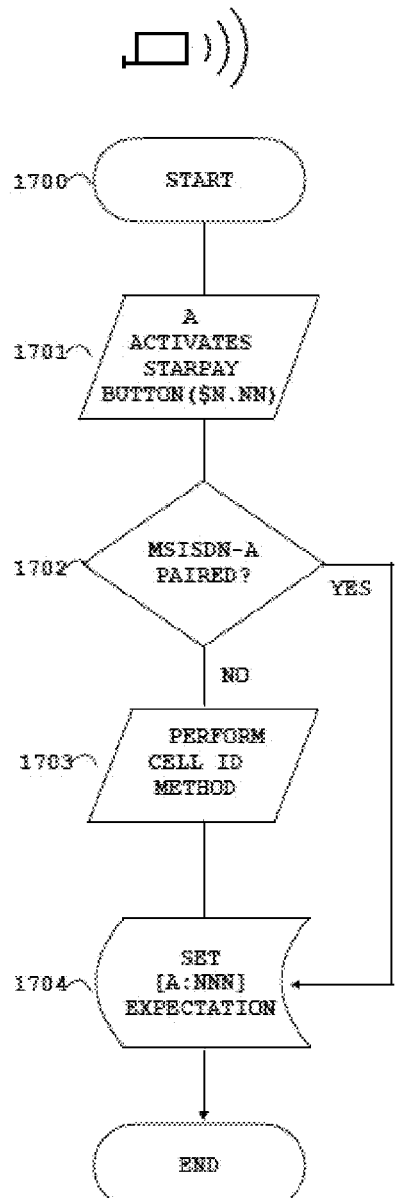
FIG. 17 is an illustrative non-restrictive event/action flow chart of an Expectation cellular communications protocol in accordance with at least some embodiments of the present disclosure.

FIG. 17 depicts a flow chart schema for setting up an access control platform expectation in accordance with one or more embodiments of the present disclosure.

In flow item 1700, IAPP requests an access control button using a published API that communicatively couples with the access control platform, to control access to digital content or service with sticker price $N.NN.

In some embodiments, if the IAPP has previously identified and paired an MSISDN, such identifying information is passed by parameter into the API.

In flow item 1701, user A activates the access control button, for example by tapping or clicking the access control button.

In flow item 1702, the access control platform checks whether the IAPP has passed cellular identifying information (e.g. the registration and/or pairing techniques described above). In some embodiments, if an X/MSISDN has not been communicated, flow progresses along the negative NO branch to step 1703. If an X/MSISDN has been communicated flow progresses along the affirmative YES path to step 1704.

In flow item 1703, the access control platform performs a registration and/or pairing technique to securely determine a cellular identity.

In flow item 1704, the access control platform sets a transaction expectation by recording (storing) the [A:NNN] entry in a datastore or ledger. This record thus sets an expectation to receive signals NNN from telephony device MSISDN-A, matching the activated access control button transaction from the registered and paired telephony device.

Figure 18:
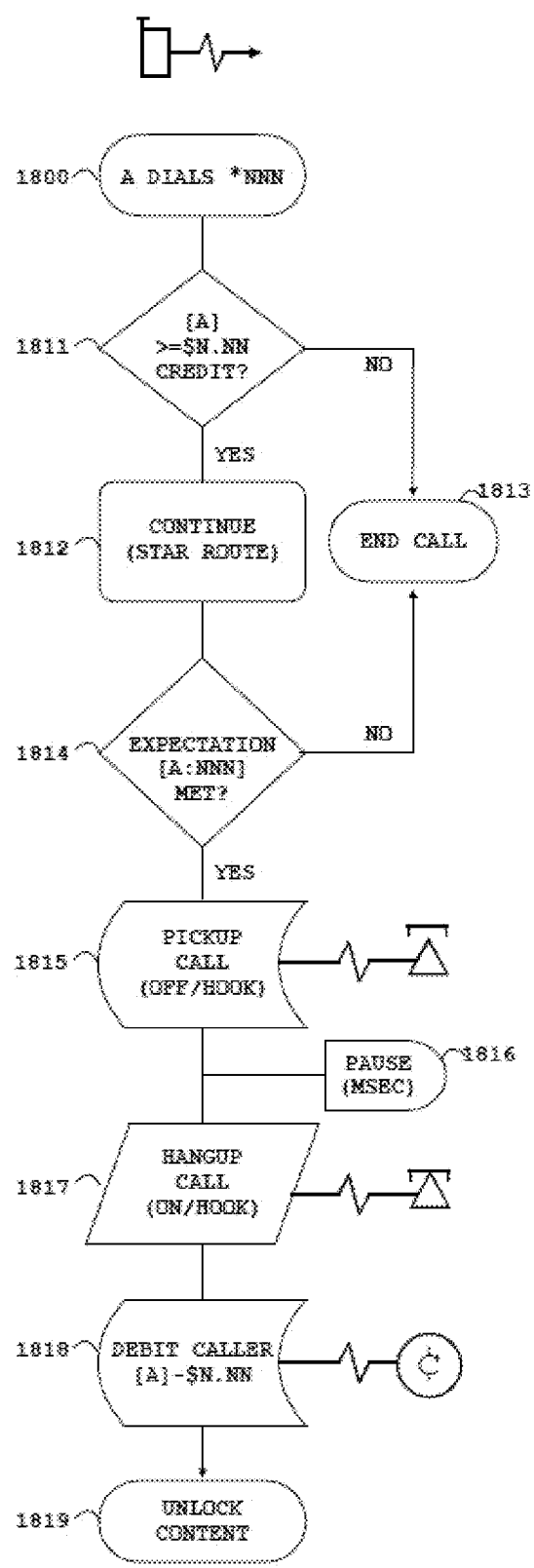
FIG. 18 is an illustrative non-restrictive event/action flow chart of a cellular communications protocol in accordance with at least some embodiments of the present disclosure.

FIG. 18 depicts an exemplary flow chart schema for processing an expected access control platform transaction, setup per FIG. 17 above, in accordance with one or more embodiments of the present disclosure.

In flow item 1800, on activating the access control button, the access control button may progress through a transition series as described in FIG. 5 above. In some embodiments, one transition may present the telephone number to dial in order to conduct the access control platform transaction.

In this example, where the access control platform transaction amount presented in the access control button is listed as $N.NN, per the disclosed systems and methods the button transitions to display a *NNN dial address.

In some embodiments, where the internet device A and the telephony device MSISDN-A are one and the same device (e.g. smartphone) the user may tap the button to activate the telephone dialer on the telephony device.

In some embodiments tapping the access control button thus causes the access control button to emit an instruction to the device to open the default, or the selected telephone dialer, with the *NNN address signals automatically entered. In some embodiments, where the telephony device MSISDN-A is distinct from the internet device A, the user may manually input the *NNN address signals to dial. Once the address signals are entered into the telephone dialer the user may press the CONNECT (e.g. the green phone button) to emit the signals.

In some embodiments, on receiving the call setup request containing the address signals, the cellular network performs the AAA (Authentication, Authorization and Accounting) steps.

In flow item 1811, the Accounting verification determines whether the cellular wallet or account [A] associated with caller A has sufficient credit ($N.NN per the disclosed signals to currency direct mapping), in order to permit the call setup to mature and route to its destination. That is, to CONTINUE routing the call towards the access control platform.

Thus, in some embodiments, access control platform calls may only be permitted to route and reach the access control platform if the caller has passed the requisite credit verification PIC (Point in Call). That is, the cellular account [A] associated with the caller is verified to contain sufficient funds required to cover the monetary suitable enumerated in the address signals as disclosed. Thus, all access control platform transactions are consequently preapproved and gated on established telephony accounting protocols which may verify credit sufficiency before maturing a call and routing to completion.

In some embodiments, if cellular account [A] has a balance less than $N.NN, per the NNN address signals, the flow branches along the negative NO path to flow step 1813, where In some embodiments the network announces the insufficient credit condition and terminates the call.

Figure 19A:
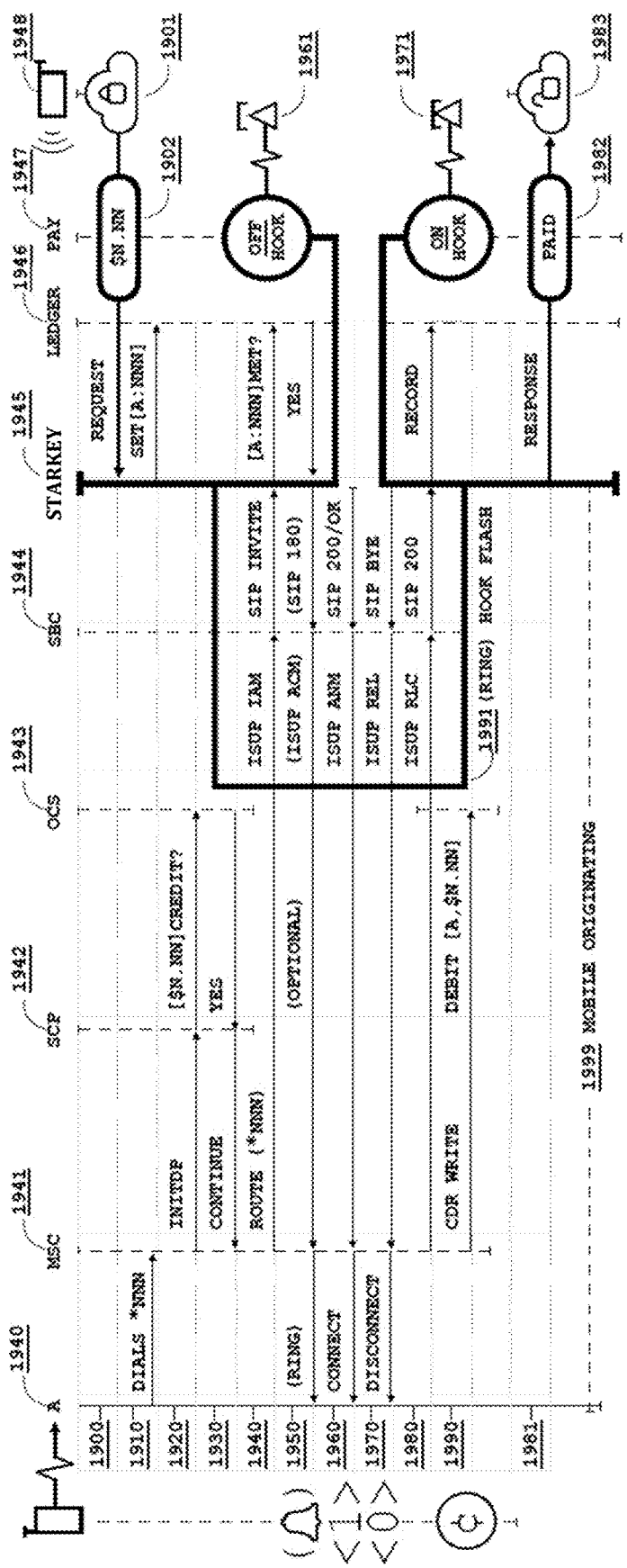
FIG. 19A is an illustrative non-restrictive example of a Circuit Switched Cellular Communication Flash Signaling protocol in accordance with at least some embodiments of the present disclosure.

In some embodiments, if account [A] has a balance greater than or equal to the $N.NN signals then flow progresses along the affirmative YES path to flow item 1812, where the network is commanded to CONTINUE routing and setting up the call along the star path towards the access control platform, as described in greater detail below (FIG. 19A).

In flow item 1814, on receiving the call setup request the access control platform checks whether an expectation for the requested transaction exists and is met. That is, whether a record exists that, inter alia, associates MSISDN-A with address signals NNN. If such an expectation exists and is thus met, flow progresses along the affirmative YES path to flow item 1815. If no such expectation exists, flow branches to the negative NO path to item 1813.

In some embodiments, in addition to binding the anticipated caller MSISDN-A to the series of expected address signals (NNN), the micro payment expectation further associates and records a provider access control platform wallet [MSISDN-B] and SKU identifying the content or service controlled by the actively selected access control button bearing the $N.NN price point. This reversed, BA addressed expectation, set prior to the user signaling the micro payment, enables the access control platform to bind the caller's internet device to the content, the content consumer to the content producer, and to process only matching, valid, active and expected transactions to completion.

In some embodiments, the expectation may ensure that if a user dials an incorrect price, by dialing a series of decimal digits that do not match the actively displayed SKU price as taught by the methods and systems disclosed herein, and even if the user has sufficient credit to cover the erroneously dialed transaction, the access control platform can reject rather than accept the call, thereby not generating a CDR and not executing an erroneous micro payment transaction.

In some embodiments, matching incoming access control platform calls to an expectation as described, enables technical improvements including both reverse binding the provider and the consumer, as well as preventing erroneous transactions being conducted against the callers account, since if the transaction is not expected (anticipated) it is not executed.

In some embodiments, on meeting the expectation, the access control platform commands the network to play RBT to the caller (not shown). Playing RBT gives audible confirmation that the transaction has been greenlighted.

In flow item 1815, the access control platform performs a telephony hook flash, a short duration OFF HOOK signaling event, taking the call OFF HOOK in order to begin the transaction recording.

In flow item 1816, the access control platform, In some embodiments, pauses for, e.g. between 500 msecs and 1 second, in order to generate at least a one second call duration.

In flow item 1817, the access control platform then returns the call back ON HOOK to complete the CDR recording.

In flow item 1818, on successfully completing the hook flash signaling protocol as described in FIG. 3 above, the network records a CDR for the transaction which debits cellular account [A] with the $N.NN signaled transacted amount, thereby completing the cellular component of the transaction.

In flow item 1819, on receiving confirmation that the network successfully disconnected the call, per the disclosed hook flash protocol, the access control platform updates an access control platform ledger to reflect the successful payment, crediting the internet access control platform system [*] and provider [MSISDN-B] wallets and communicating transaction completion to the access control button. On receiving a successful transaction communication, the access control button may transition to a completed state (ticked), and access to the purchased digital content or content and/or service may be unlocked, allowed the user to navigate to the content and/or service via the IAPP and/or web browser.

[FIG. 19A]

FIG. 19A is a control scheme corresponding to the flow methodology presented in FIG. 3 illustrating in greater detail a sequential signaling step ladder for the disclosed micro payment system and method in accordance with one or more embodiments of the present disclosure.

In flow item 1900, at access control element 1945, internet device 1948 requests access to digital content in the cloud (1901) that requires payment and is consequently lock protected as indicated. The content producer utilizes a suitable API to render an access control button (1902) on the display of internet enabled device 1948, requesting payment at the listed sticker price ($N.NN). In this example it is assumed that content provider has previously registered an associated MSISDN (B) as a provider identity, e.g. using the registration and/or pairing techniques described above.

On requesting the access control button 1902, the access control button API communicatively couples to access control element (1945), passing parameters that describe the characteristics of the access control button 1902, including without limitation In some embodiments, the dollar amount, provider identity, SKU, button style, redirect URL on payment completion, etc.

In this schematic, it is assumed the IAPP or the browser presenting the Internet hosted content/service has registered and paired with cellular identity MSISDN-A of user telephony device A (1940), as described above. In some embodiments, the pairing logically couples the access control platform amount presented in the access control button 1902, as displayed on internet device 1948, with the registered cellular identity MSISDN-A, uniquely binding and staging the pending transaction.

Thus, on receiving the access control button 1902 metadata via the API, in flow item 1910 at the access control element 1945, the access control element (1945) in turn sets (records) a pay expectation [A:NNN] as described in FIG. 3 above, by access control ledger 1946. While the schema depicts the access control button 1902 in direct communication with the access control element 1945, other access control platform elements may be associated and traversed in this communication. Thus, an access control button 1902 REQUEST, results in an access control platform EXPECTATION being SET.

While the access control button 1902 request itself may precipitate this expectation, in practice, the expectation may be deferred to button activation (selection) given that a plurality of access control buttons 1902 may be displayed. While a user may select multiple micro pay items to purchase, creating an accumulative payment total (the total sum over all the selected items), such a plural pay method may defer the expectation, so as to record the expected sum total of the pending transaction. The disclosed methods and systems governing button presentation and state management, are described in greater detail in FIG. 5 above, which illustrates a button transition series In some embodiments.

In flow item 1910 at the access control element 1945, mobile device A (1940) dials the access control platform signals *NNN, transmitting a Mobile Originating (MO) call to a servicing switching element (e.g. MSC) 1941. The setup message contains the *NNN address signals in addition to other call parameters. The MSC enters an OBCSM encountering an INITDP.

In flow item 1920, the INITDP establishes a call control dialog between the MSC 1941 and the Prepaid Service Control Point (SCP) 1942, the address of which, in some embodiments, is recorded in the SIM Originating Camel Subscription Information (O-CSI) in the MSC/VLR 1941.

In a Customized Applications for Mobile Networks Enhanced Logic (CAMEL) setting, the system may employ standards that work on a Global Systems for Mobile Communications (GSM) core network or the Universal Mobile Communications System (UMTS) network. In a CAMEL O-CSI embodiment, MSC 1941 has an associated gsmSSF (GSM Service Switching Function), and SCP 1942 is referred to as the gsmSCF (GSM Service Control Function).

SCP 1942 is configured to perform a credit verification for user A, for example, by querying an Online Charging System (OCS) 1943, or a Prepaid Billing System, to determine whether an account associated with device 1940 has sufficient credit to complete the call (i.e., a positive balance greater than or equal to $N.NN in this example). While SCP 1942 and OCS 1943 are depicted as separate elements, they may be the one and same logical or physical element, they may incorporate additional billing elements, and they may embody both call and billing control logic.

In flow item 1930, in response to the credit verification check, the OCS 1943 may respond to SCP 1942 that an account associated with device 1940 has SUFFICIENT credit to complete the call. In response to the credit sufficiency, the SCP instructs the MSC 1941 to CONTINUE the call.

It is important to note, that while figures in some embodiments may herein illustrate a controlling and/or billing element issuing a CONTINUE command, instructing a switching element to continue routing and progressing the call as originally signaled, in some networking embodiments a controlling or billing element may modify the symbolically prefixed address signals, and subsequently issue a CONTINUE with modified arguments instruction.

For example, in a Telephony BCD encoding schema as described in FIG. 15C above, star prefixed address signals (e.g. *010) may be encoded and received by a network switching element as "A010". In some embodiments, a controlling and/or switching element may then translate the symbolic overdecadic signal (i.e., the "*" address signaling prefix encoded as "A"), replacing it with an internal short routing prefix RRR (e.g. 555) that defines a routing path towards the access controlling element (e.g. the Star Access Control Platform). Typically, a short routing prefix comprises 3 or 4 characters, which themselves may include hexadecimal characters (e.g. 555A).

When a controlling or billing element translates and thus modifies the original address signals emitted by the cellular device, it may then issue a CONTINUE with modified arguments instruction (i.e., with the modified CgPN address, e.g. 555010), thereby instructing the switching element to perform a route lookup on the new internal routing prefix, in order to determine a network routing path towards the access controlling element.

In flow item 1940, in one symbol prefixed signaling embodiment, the MSC 1941 performs a routing lookup on a star prefix in the address signals to determine a trunk/route to the access control element 1945, which may be hosted in the Cloud, and transmits an ISUP IAM (Initial Address Message) to GMSC/SBC 1944, which establishes the Mobile Originating (MO) leg 1999.

The GMSC/SBC 1944 (or Media Gateway Controller) is configured to interwork between a Signaling System Seven (SS7) and an IP network, and In some embodiments, to perform signaling translation between ISUP and SIP (Session Initiation Protocol). In an ISUP/SIP translation, ISUP IAM is translated into SIP INVITE, which is transmitted to the access control element 1945.

ISUP includes a messaging protocol such as IAM and is a part of SS7 used to set up telephone calls in a Public Switched Telephone Network (PSTN). A Mobile Application Part (MAP) may be used as an SS7 protocol to setup and control calls via the PSTN through providing an application layer for GSM and UMTS mobile core networks and general packet radio service (GPRS) core networks for communication between and servicing of mobile users. Telephone exchanges (e.g. switches) may be connected via T1 or E1 trunks as shared communication line paths to transport speech from calls.

SIP is a signaling protocol to initiate, maintain, and terminate real-time multi-media (e.g. voice, video, and/or messaging) sessions for internet telephony applications and/or instant messaging over Internet Protocol (IP) networks and/or voice over IP (VOIP) networks.

In flow item 1940, on receiving the SIP INVITE, the access control element 1945, queries the access control ledger (1946) to determine if an access control platform transaction for device MSISDN-A (1940) emitting the NNN address signals is expected (was set) and now matches (is met).

In flow item 1950, on matching an expected transaction thus, In some embodiments access control element (1945) optionally, as depicted by the rounded brackets, responds with a SIP 180/RINGING message in the backward direction, commanding the GMSC/SBC 1944 to return an ISUP Address Complete Message/Call Progress (ACM/CPG) Alerting message, notifying MSC 1941 that the transaction has connected to the access control platform. In turn, MSC 1941 may then optionally present RBT to mobile device 1940 as graphically indicated (BELL). In responding with SIP/180 as a ringing message, the access control element 1945 matures the call into a placed and completed call, delivering a successful call setup.

The SIP/180 response is optional as it does not materially impact the access control platform protocol which is predicated on the disclosed WINK (hook flash) signaling which executes the transaction as described below and moreover, since the access control platform user experience is communicated visually via the access control button 1902 in the IAPP as disclosed.

In flow item 1960, the access control element 1945 then commands GMSC/SBC 1944 to ANSWER the call by issuing a SIP 200/OK message (CSEQ: INVITE), in the backward direction, which in turn is translated into an ISUP ANS (ANSWER) message at GMSC/SBC 1944, notifying the MSC 1941 that the call has been answered. At this point, the call has gone OFF HOOK (CONNECT BINARY <1>) as textually indicated in flow step 1960 and graphically in 1961, and a call duration timer begins for CDR generation associated with the answered call.

In flow item 1970, the access control element 1945 thereafter, in some embodiments, between 500 msec and 1 second later (or any other suitable time period), disconnects the call by issuing a SIP BYE command in the backward direction, which GMSC/SBC 1944 translates into ISUP REL (Release), instructing MSC 1941 to release the call, which returns the call to an ON HOOK state (DISCONNECT BINARY <0>) as textually indicated in flow step 1970 and graphically in 1971.

This Star mobile hook flash signaling is thus directed by the access control element 1945 lifting the receiver to be OFF HOOK (i.e., answer), and then, in some embodiments, between 500 msecs and 1 second thereafter (or any other suitable time period), replacing the receiver back to be ON HOOK (i.e., release).

In flow item 1980, on the network successfully disconnecting the call, the MSC 1941 responds with ISUP RLC (Release Complete) in the forward direction, which is translated at the GMSC/SBC 1944 into a SIP 200 message transmitted to access control element 1945 completing the STAR RING HOOK FLASH, or STAR HOOK FLASH (absent the RBT presentation) Payment Protocol (block 1991).

In flow item 1990, upon issuing ISUP RLC, MSC 1941 completes the CDR generation, thus recording a nominal call duration event (e.g. one second), thereby debiting the account associated with the caller NNN¢ (cents) per the disclosed micro payment method.

In some embodiments, such a mobile originating dialog, collectively referenced herein as a "Ring Hook flash" (or "hook flash") signaling protocol (block 1991), may present caller A with an instant ring, followed by a momentary call connect and disconnect (OFF/ON HOOK), thus raising and dropping the call to present a 00:00:01 second call duration on the display of device A 1940. This hook flash signaling protocol and clearing delivers an audiovisual confirmation that the transaction completed successfully.

On receiving the SIP 200 in flow item 1980 as response to the SIP BYE message issued by access control element 1945 in flow item 1970, the network acknowledges that the hook flash transaction has completed and the CDR has been recorded. This acknowledgment confirms that the account associated with device 1940 has been debited with the $N.NN micro payment and the cellular portion of the transaction has been successfully completed.

If device 1940 disconnects the call prior to the hook flash signaling completion, either in response to the user pressing disconnect (e.g. pressing the red phone button) or due to the network dropping the call (e.g. signal loss or network congestion) the transaction fails to complete. In such a scenario, in some embodiments, the access control element 1945 communicates the transaction failure to the access control platform button 1902/1982 which may then change state to reflect a "CANCEL" event occurred (not shown).

In flow item 1980, in response to the successful cellular transaction completion, access control element 1945 updates LEDGER 1946 to record the successful completion of the micro payment transaction, crediting a wallet of the access control platform itself (system wallet) [*] with the corresponding $N.NN amount and the provider access control platform wallet [*B] with the transaction amount ($N.NN) less any switching and processing fees that may apply (both not shown).

In flow item 1981 access control element 1945 then communicates the successful RESPONSE to the access control platform button 1902. In some embodiments, the successful RESPONSE may cause the access control button 1902 to change state reflecting PAID (1982), which in turns unlocks the digital content and/or service (1983) for access by device 1948.

While the RBT and hook flashing, may provide telephony audiovisual feedback the primary access control platform user experience presents within the access control platform button as it transitions under STAR 1945 signaling, state management and control, as described above in FIG. 5.

[FIG. 19B]

Figure 19B:
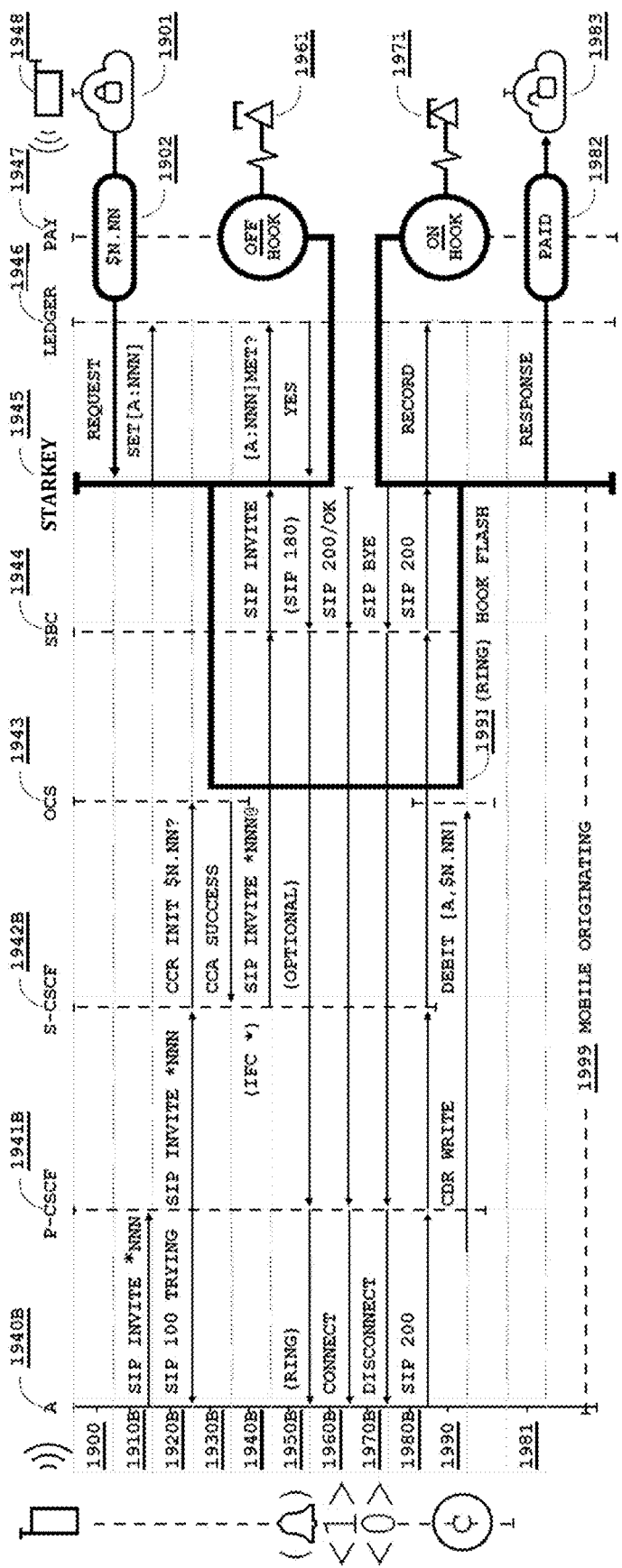
FIG. 19B is an illustrative non-restrictive example of a Packet Switched Cellular Communication Flash Signaling Protocol in accordance with at least some embodiments of the present disclosure.

FIG. 19B is a control scheme corresponding to the flow methodology presented in FIG. 3 illustrating in greater detail a sequential signaling step ladder for the disclosed micro payment system and method for an originating VoLTE call request in accordance with one or more embodiments of the present disclosure. FIG. 19B shares corresponding labels and steps with FIG. 19A as shown, with the exception of those flow items annotated with the letter B. Whereas FIG. 19A describes a Circuit Switched Framework and associated mobile telephony device 1940, FIG. 19B describes a VOLTE telephony device, User Equipment (UE) 1940B, accessing a packet switching network 1941B/1942B. In this control schema, the native SIP signaling capabilities between the UE 1940B, the IMS network elements 1941B and 1942B, and the access control platform 2 are described.

In some embodiments, the communication network may be a packet switched network supporting Session Initiation Protocol (SIP) User Equipment (UE). The packet switched network may be IMS, VoLTE, and combinations thereof, or other suitable packet switched networks that move data in separate data packets based on a destination address to transmit a message.

SIP is a signaling protocol to initiate, maintain, and terminate real-time multi-media (e.g. voice, video, and/or messaging) sessions for internet telephony applications and/or instant messaging over Internet Protocol (IP) networks and/or voice over IP (VOIP) networks. UE may include smart or otherwise network connected devices, such as the first user mobile device described herein. The embodiments described herein may be based on the packet switched network and/or may be integrated with a circuit switched network based on dedicated point to point connections for calls, as described in greater detail below.

Packet switched networks groups data such that it can be transmitted as packets (e.g. discrete blocks of data) over a digital network. As set forth above, one such packet switching network may be IMS VoLTE, utilizing an Internet Multimedia Subsystem (IMS) and a packet switched voice service as Voice over Long Term Evolution (VoLTE), which is a high-speed wireless communication for mobile telephony devices and data terminals such as other smart mobile devices that may be on an Internet of Things (IoT) network.

IMS VoLTE involves VoLTE as a high-speed wireless communications protocol utilizing IMS to implement standards and procedures for delivering voice communication as well as data over 4G LIE networks, Data from a circuit-switched cellular networks (i.e., Code Division Multiple Access (CDMA) and Global System for Mobile Communications (GSM may be transformed into network packets before being broadcast on a public switching network such as IM VoLTE. VoLTE uses IMS-based networks to offer these services. VoLTE supports amongst other services, rich multimedia communications including high definition audio and video services that may operate over 4G and LTE data capable networks.

IMS resides as a stand-alone system outside of a VoLTE network and may be connected to the VoLTE network through a communicative coupling through an interface to a gateway of the VoLTE network, such as a SGi interface connecting IMS with a Public Data Network (PDN) Gateway, described in greater detail below. One or more UEs may be communicatively coupled through an Evolved University Mobile Communications System Terrestrial Radio Access Network (E-UTRAN) and interfaces to an Evolved Packet Core (EPC) of the VoLTE network and further to IP services such as an IMS network and the Internet. E-UTRAN is a radio access network acting as an air interface of an 3rd Generation Partnership Project (3GPP) LTE IN upgrade path.

The EPC of the VoLTE network may include functional elements such as a Mobile Management Entity (MIME), a Serving Gateway (S-GW), and the PDN Gateway (P-GW). The MME is control point responsible for most control plane functions. The S-GW flows through IP packets in uplink and downlink transmissions and handles handovers. The PDN Gateway allocates IP addresses to UEs and acts as a point of communication between EUTRA and other non-3GPP services such as the Internet. Respective PDN Gateways may be associated with and provide interfaces to IMS and the Internet, such as the SGi interface that is a reference point between the PDN Gateway and the packet data network.

The EPC may further include a Policy and Charging Rule Function (PCRF) element as a functional element to determine permitted traffic types in real-time and traffic accounting for billing purposes. When a UE starts a VoLTE call, the PCRF may check if the UE has a subscription to start the call and, if so, setup a dedicated bearer for IMS services. An IMS powered UE may include a Universal Integrated Circuit Card (UICC) and a Session Initiated Protocol User Agent (SIP UA) to send and receive SIP messages and provide telephony functionality. The UICC may include identity modules such as a Subscriber Identity Module (SIM) and an IP Multimedia Services Identity Module (ISIM) for use by an IMS subsystem.

A multitude of elements may comprise an IMS/VoLTE Packet Switched network; however, for the sake of simplicity, IMS/VoLTE may be referenced herein as a generalized SIP network subsystem. Further, main functional elements of the VoLTE architecture as described herein may be defined in 3GPP while allowing non-3GPP technologies to interface with and be managed from the IMS VoLTE network. The IMS functional elements of the IMS Core governing call setup and control may include Proxy Call Session Control Function (P-CSCF) and Serving Call Session Control Function (S-CSCF).

The P-CSCF may be the initial point of contact for session signaling for the IMS-enabled VoLTE User Equipment (UE). The P-CSCF may behave as a SIP proxy by forwarding SIP messages between the UE and the IMS Core Network.

The S-CSCF includes data regarding user knowledge and application permissions associated with a user account. The S-CSCF of the IMS Core may provide session, routing and billing functions for all sessions under its control and invokes Application Servers based on Initial Filter Criteria (IFC) received from the Home Subscriber Server (HSS) during service registration. The S-CSCF may act as SIP registrar for the VoLTE User Equipment (UE) of a user account that the HSS and Interrogating Call Session Control Function (I-CSCF) assign to it. The S-CSCF may query the HSS for the subscriber profiles which are used to authorize and manage requested services.

The S-CSCF may thus be a central element on the IMS signaling plane. The S-CSCF may be a SIP server that also performs session control, and in some embodiments uses Diameter Cx and Dx interfaces to download and upload user profiles associated with user accounts to and from the HSS. The S-CSCF may also handle SIP registrations and be in the signaling path of all messages. In at least some embodiments, the S-CSCF may determine which Application Server (AS) the SIP message from the SIP UA of the UE has handled by the P-CSCF will be forwarded to for the provision of service and provide requisite routing.

The S-CSCF may thus enable the assignment of an AS to the session when required. In some embodiments, the role of the S-CSCF is to execute the session request by locating a destination endpoint and conducting the signaling toward it. The S-CSCE may also be able to coordinate with a Media Resource Function (MRF) for any media announcements/tones to be played to the originating party. Per the 3GPP technical specifications, the S-CSCF may also act as a Charging Triggering Function (CTF) managing charging of users of the IMS infrastructure and services. The S-CSCF may communicate with an IMS Gateway Function (IMS-GWF) that may operate as a SIP application server and may signal the S-CSCF to terminate a session when a user runs out of credits during a session. Although the S-CSCF may act as the CTF, a same functionality may be applied to any IMS network element.

In embodiments, as the CTF element in an IMS network, the S-CSCF may perform several tasks in order to identify the correct charging to apply, that corresponds to and is triggered by the user session activity. The S-CSCF, when performing its normal routing actions for the SIP signaling may determine whether the SIP information represents a chargeable activity, and which type of charging mechanism may be applied. The charging mechanisms for IMS sessions may be either Offline (Post-paid) charging, using accounting messages, or online (Pre-paid) charging, using substantially real time credit control messages and procedures. Information about IMS transactions may be sent from the S-CSCF to a charging element that collects this information and stores it in the form of Charging Data Records (CDRs).

In flow item 1910B, user A through VoLTE UE device 1940B, dials the address signals *NNN representing the micro transaction $N.NN, per the disclosed methods and systems. The dialing results in UE 1940B sending a SIP INVITE request to P-CSCF 1941B, whose address is discovered during UE registration procedure (not shown). The INVITE request may contain, within the Contact header and the P-Preferred-Service header, the IMS Communication Service Identifier (ICSI) for IMS Multimedia Telephony (e.g. urn:urn-7:3gpp-service.ims.icsi.mmtel).

In flow item 1920B, P-CSCF 1941B adds a P-Charging-Vector header and forwards the SIP INVITE to the S-CSCF 1942B identified during UE registration (not shown). S-CSCF 1942B receives the SIP INVITE from P-CSCF 1941B, S-CSCF 1942B invokes any VoLTE services as defined and triggered by the Initial Filter Criteria (IFC) within the subscriber profile, retrieved during the IMS Registration. S-CSCF 1942B checks the P-Preferred-Service header in the SIP INVITE request (e.g. MMTel ICSI) and verifies that the user is authorized for the service by validating against the subscribed services retrieved in the service profile during Registration.

For example, with online charging, network resource usage may be granted by the OCS based on the price or the tariff of the requested service and the balance in the subscriber's account. The OCS may support at least two types of online charging functions: session-based charging function (SBCF) and the event-based charging function (EBCF). The SBCF may be responsible for network bearer and session-based services such as voice calls, GPRS sessions, or IMS sessions. Moreover, it may be able to control the session by permitting or denying a session establishment request after checking the subscriber account. In the OCS, a rating function (RF) may determine the price/tariff of the requested network resource usage in real-time.

In flow item 1920B, the P-CSCF 1941B may respond with SIP 100 TRYING to the requesting UE 1940B in order to arrest an INVITE timeout. P-CSCF 1941B may then forward the INVITE to the S-CSCF 1942B, which in turns may send an Initial Credit Charge Request (for example, CCR CC-request-type "INITIAL_REQUEST") to OCS 1943. OCS 1943 may collectively comprise the Session Balance Control Function (SBCF) and the Account Balance Management Function (ABMF).

In flow item 1920B, on receiving the CCR message, the SBCF may retrieve the account information and the subscriber profile from the OCS ABMF. The SBCF may then send a Tariff Request message to the RF to determine the tariff of the IMS call. Based on the subscriber information, the RF may reply to the SBCF with the Tariff Response message, which may include the billing plan and the tariff information for the IMS service.

When the tariff information is received, the SBCF may perform credit unit reservation with the ABMF. It may then reply to S-CSCF 1942B with a Credit Control Answer (CCA) message containing any granted credit (e.g. specifying the number of seconds or minutes allowed for the call). When it has been determined that the account associated with user A has sufficient credit, in this embodiment credit greater than or equal to $N.NN, the CCA message returned in flow item 1930B may indicate credit authorization success.

In flow item 1930B, In some embodiments responsive to receiving the CCA Success, S-CSCF 1942B or attendant TAS may then reroute the INVITE request with a modified call signal (e.g. *NNN@), in some embodiments via SBC 1944 to the IP address of the access control platform 1945 as the transaction processing platform.

In flow item 1940B as shown, responsive to receiving the CCA Success, the S-CSCF 1942B or attendant TAS may thus create a new call leg on a modified INVITE request including a modified call signal with a modified address, a distinguishing service code prefix and a signaling switch destination address.

In embodiments, the modified address incorporates a distinguishing service code (e.g.: * or XXX) prefixed to the B address signals and specifies as a network identifier for the micropayment access control platform destination address, the star domain in the branched URI. As non-limiting examples, the modified address may be of the form:
INVITE sip:*NNN@starlogik.com SIP/2.0 or,
INVITE sip:555NNN@55.225.225.45 SIP/2.0,
where 555 is the applied service code prefix, and 55.225.225.45 is the Star Access Control Platform IP address (IPV4 notation).

S-CSCF 1942B may then add a Via Header with new branch tag, thereby branching (forwarding or sequentially forking) the call, in some embodiments via SBC 1944, to the access control platform 1945.

The symbol prefixed URL may further incorporate a Mobile Network Code (MNC) and Mobile Country Code (MCC) assigned to the Mobile Network Operator (MNO), such as, for example:
INVITE sip:*NNN@7.655.starlogik.com SIP/2.0.
The above INVITE example illustrates a DNS URL for a South African MNO Cell C (MCC=655 being the country designation for South Africa, and MNC=7 being the Network Identifier for the MNO. The MNC level 4 and MCC level 3 domains permit dynamic DNS resolution on a Fully Qualified Domain Name (FQDN) down to country and carrier for localized access control platform hosting.

In accordance with the Call Data Record generation reconciliation as disclosed herein, originating CDRS for the hook flash communication methods (Ring Commerce Uplink, block 1991) may generate CDRs that, in some embodiments, are recorded with MSISDN-A and address signals *NNN (A*NNN titled CDRs). Branching the INVITE request thus with the modified NNN address signals, as described above, preserves CDR reconciliation with the micro payment transactions conducted.

This NNN address signal modification may ensure that the originating S-CSCF CDRs, generated when the access control element 1945 performs the hook flash method as described in FIG. 19A above. In flow item 1960B, STAR 1945 going OFF HOOK (picking up the call) and then, e.g. between 500 msec and 1 second or other duration for a nominal call length, thereafter, in flow item 1970B, going back ON HOOK (hanging up the call), collectively service block 1991, are distinguishable as A*NNN (or XXXNNN) titled CDRS. Such A*NNN generated CDRs (e.g. the Star CDR dataset) may then be audited to calculate the accumulative access control platform transactions conducted over a set period of time.

Thus, flow items 1940B through 1980B communicating with the access control platform 1945 are functionally suitable to flow items 1940 through 1980 in FIG. 19A, however since the described IMS/VOLTE Packet Switched Network may utilize SIP signaling, no signaling protocol translation between the UE 1940B and the IMS network elements (P-SCSF 1941B and S-SCSF 1942B) and the access control platform 1945 may be required in this embodiment.

[FIG. 19C]

Figure 19C:
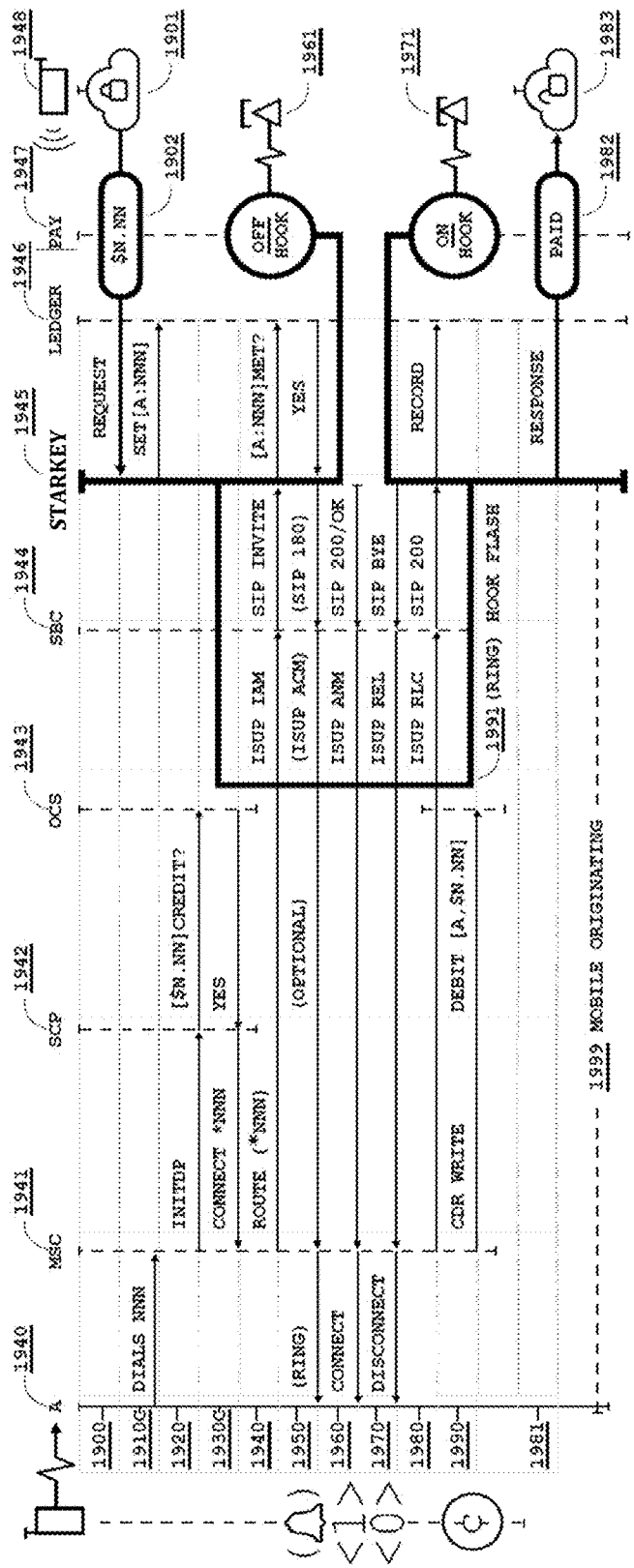
FIG. 19C is an illustrative non-restrictive example of a Circuit Switched Cellular Communication Signaling Protocol with Automatic Routing in accordance with at least some embodiments of the present disclosure.

FIG. 19B is a control scheme corresponding to the flow methodology presented in FIG. 3 illustrating in greater detail a sequential signaling step ladder for the disclosed micro payment system and method in accordance with one or more embodiments of the present disclosure. FIG. 19C is similar to FIG. 19A sharing corresponding labels and steps with FIG. 19A as shown, with the exception of those flow items annotated with the letter C. Whereas FIG. 19A depicts mobile telephone 1940 in flow item 1910 emitting signals *NNN, FIG. 19C illustrates an embodiment where in flow item 1910C the mobile telephone 1940 signals NNN, without a symbolic prefix.

In flow item 1930C, SCP 1942 In some embodiments with associated OCS 1943, automatically modifies the NNN address signals received, when those signals contain between a minimum and a maximum series of digits, for example, between a minimum of 3 and a maximum of 5 digits, to include a routing prefix identifying the access control platform 1945.

In flow item 1930C, on modifying the NNN address signals thus, SCP 1942 commands the MSC 1941 to CONNECT the call on the now modified address signals, for example, *NNN. This may command the MSC 1941 to REROUTE the call in flow item 1940, along a SIP trunk via a Gateway MSC (GMSC) or Media Gateway Controller (MGC) both not shown, and in some embodiments via the SBC 1944 to the access control platform 1945. The MGC/SBC may perform ISUP IAM to SIP INVITE signaling protocol translation as disclosed herein.

In flow item 1930C, MSC 1941 may look up a pre-configured routing table including a trunk indicator (e.g. trunk communication path) associated with the modified address signal prefix and translate/route the modified address based on the trunk indicator of the trunk associated with the modified address from the pre-configured routing table. The modified call signal may be automatically routed along the trunk from MSC 1941 to the GMSC/MGC or SBC 1944, and then be automatically routed along the SIP trunk to the access control platform 1945. The disclosed micro payment transaction then proceeds per FIG. 15A as described above.

[FIG. 20]

Figure 20:
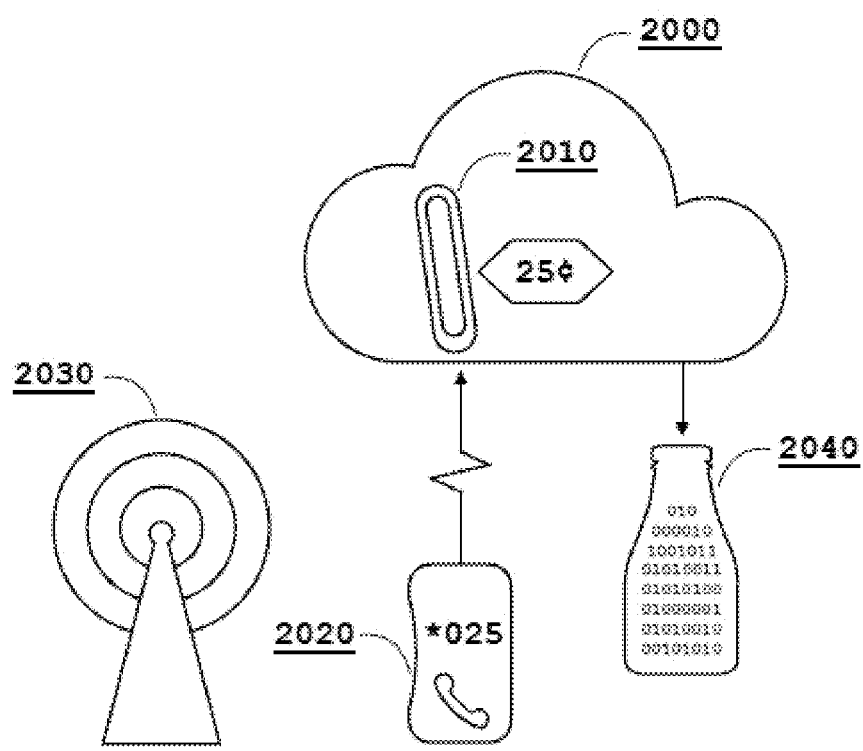
FIG. 20 is an illustrative non-restrictive example of a process based at least in part on cellular communication signals in accordance with at least some embodiments of the present disclosure.

FIG. 20 depicts an illustrative non-restrictive example of a process based at least in part on a mobile communication signals in accordance with at least some embodiments of the present disclosure. In some embodiments, the process includes an access control platform 2000, e.g. implemented as a cloud platform, that interfaces with a cellular network 2030 to conduct transactions using CDRs.

In some embodiments, a mobile phone 2020 may be associated with network account (wallet not shown) with the cellular network 2030. In some embodiments, the telephony device 120 may communicate with the cellular network 2030 to transfer value from the network account to the access control platform 2000 in order to access digital goods and/or services 2040 for delivery to the telephony device 2020. In some embodiments, the telephony device 2020 communicates a request for the transfer of value by formatting the address signals of a telephone call to carry the value to be transferred.

In some embodiments, the access control platform 2000 is configured to interface with the cellular network 2030. Accordingly, the cellular network 2030 may provide the value from the account of the telephony device 2020 to deposit a virtual token into an access control platform wallet 2010 associated with the provider of the digital goods and/or services 2040. In some embodiments, the virtual token may include an authentic transparent, and low cost, fiat backed micro currency. By providing the virtual token to the access control platform wallet 2010 of the provider, the access control platform 2000 can provide the value for the digital goods and/or services 2040, such that the digital goods and/or services 2040 may be dispensed to the telephony device 2020. As a result, the adaptations to the cellular network 2030 can democratize Internet commerce and access to digital content and/or services.

Artisans skilled in Switching and Billing will appreciate that alternate embodiments can include those incorporating metadata together with the dialed digits enumerating the monetary suitable, wherein such metadata can without limitation include data identifying a beneficiary and a Stock Keeping Unit (SKU).

While some embodiments may include using a hook flash protocol, where a phone call momentarily goes OFF and then back ON HOOK to execute the transaction, and wherein the address signals enumerate the transaction amount, other network protocols and bearers that deliver suitable transactional functionality may be employed, including without limitation, USSD and SMS bearers.

In an alternate USSD embodiment the following mobile originated dial string may achieve a similar result:

*NNN# or *XXX*NNN#.

The above USSD examples may similarly be interpreted as requesting a transaction with monetary suitable $N.NN matching the signals NNN, and where the XXX code may identify the USSD application servicing the transaction which is typical amongst USSD service provision. USSD command strings in some embodiments use the star as a delimiter to separate variables.

For example, the following USSD dial string may be constructed to encapsulate an alternate micro payment application XXX, monetary suitable amount NNN, provider identifier PPP and commodity SKU CCC being purchased:

*XXX*NNN*PPP*CCC#.

In the above USSD example, PPP and CCC may be as many or few digits necessary to uniquely identify the provider and the item being sold. Similarly, NNN may be as many digits required to enumerate the monetary suitable, with more digits representing higher cost items. In another USSD embodiment the USSD string may encapsulate (incorporate) multi-part address signals as disclosed herein. In yet another USSD embodiment, the micro payment application may be identified by a leading zero as in:

*0NN# which translates into $0.NN and
*0NNN# which translates into $N.NN.

In some embodiments, the zero based (prefixed) USSD command string embodiment, can condense the USSD application identifier, in some embodiments three digits, into a single identifying and leading digit (zero) in order to present a reduced USSD instruction set that enumerates the transaction amount, as per the telephony embodiments described herein.

USSD application hosting, routing and/or execution may be serviced internally by the network using protocols such as Mobile Application Part (MAP) signaling, and externally using an External Messaging Entity that connects to the carrier USSD and/or SMSC messaging platform, using standard Internet Protocols such as SMPP and HTTP.

In one SMS micro payment embodiment, the systems and methods disclosed herein may be similarly realized by permitting users, and by proxy their mobile devices, to send a payment instruction to an SMS short address code that itself enumerates the transaction amount.

The SMS signaling path and billing process in an Intelligent Network (IN) may be similar to that of the disclosed symbolically prefixed telephony protocol. By modifying the SMS routing (e.g. message interception and routing based on the CdPA), and by modifying the billing system per the above telephony systems and methods, all such symbolically addressed mobile originating messages may be utilized to conduct the cellular micro billing as disclosed, that is, debiting an account associated with the sending mobile device by the amount enumerated in the SMS address, and then be routed on the symbolic address prefix to an Access Control Platform (e.g. DCB Platform of the present disclosure) in order to complete the Internet transaction.

For example, permitting an SMS addressed to:
*NNN.

Since many mobile devices permit sending an SMS in the IAPP background, under programmatic control and without user intervention, such a symbol prefixed SMS signaling service would deliver an equally engaging and frictionless user experience. And since an SMS sent from a user who lacks sufficient credit may be instantly rejected (e.g. where the operator returns MO_FSM_Neg_Response) the device may be alerted to a failed submission, preventing content from being accessed and preserving the interactive real-time signaling characteristics displayed during the transaction, as disclosed using a telephony protocol.

As detailed above, up to now Premium Rate SMS services have not managed to transparently reflect the charge to be applied, since the PSMS short address code does not, in any way, encapsulate nor indicate the cost of service. Moreover, many PSMS service require distinct short codes for charging different amounts.

By permitting consumers to utilize a symbol prefixed SMS signaling service to transact as disclosed herein, a PSMS platform may be modified to overcome such billing and marketing limitations by accepting universal signaling encapsulating the cost of the service (the charge to be applied) in the symbolically addressed mobile originating SMS header. Whereas existing PSMS platforms utilize two way mobile terminating SMS, which consume vastly more network resources (i.e., paging and locating the destination device and then transporting a return reply confirmation), the newly disclosed mobile originating SMS transaction may be conducted in a single step, and without necessarily requiring any SMS confirmation content in the message body, since originating the message authoritatively instructs the operator to apply the signaled charge. A short message sent without a content payload, reduces signaling load on the network.

Moreover, such a cellular messaging signaling system would satisfy the data requirements constituting "Card Present" transactions, as described above, since a mobile originating SMS addressed thus, will generate an authoritative and irrevocable, billing record capturing the transaction data and cost at the time of the submission.

For example, sending a mobile originated STAR SMS may result in a CDR as follows in Table 4.

TABLE 4

| Date Time | SMS | Sent To | Cost |
| --- | --- | --- | --- |
| 2021/10/01 10:30:15 | Mobile Originated | *010 | $0.10 |

Conducting payments on the Internet in some embodiments require a user to login to an exemplary access control platform of the present disclosure, for example by entering a registered user name and password, and oftentimes a two factor code (2FA) in order to authorize a transaction. Thus, an improvement to online payment processing is enabled by the disclosed embodiments by utilizing the existing biometric and other safeguards used for locking mobile telephones, thereby preventing unauthorized access to the phone and consequently to the micro payment functionality without needing to rely on vulnerable network communications for authentication.

Since the disclosed methods and systems require access to the communication service(s) on the computing device (e.g. mobile phone, cellular service-enabled computer (e.g. laptop, tablet, etc.), etc.), these existing device safeguards obviate the need for additional payment security features, such as a secret PIN, since the device is already secured from unauthorized access. Reducing the number of steps required to affect a micro payment not only enhances the user experience but may lead to high frequency utilization. In some embodiments, exemplary inventive computer-based systems/platforms, exemplary inventive computer-based devices, and/or exemplary inventive computer-based components of the present disclosure may be configured to handle numerous concurrent users that may be, but is not limited to, at least 100 (e.g., but not limited to, 100-999), at least 1,000 (e.g., but not limited to, 1,000-9,999), at least 10,000 (e.g., but not limited to, 10,000-99,999), at least 100,000 (e.g., but not limited to, 100,000-999,999), at least 1,000,000 (e.g., but not limited to, 1,000,000-9,999,999), at least 10,000,000 (e.g., but not limited to, 10,000,000-99,999,999), at least 100,000,000 (e.g., but not limited to, 100,000,000-999,999,999), at least 1,000,000,000 (e.g., but not limited to, 1,000,000,000-10,000,000,000).

[FIG. 21]

Figure 21:
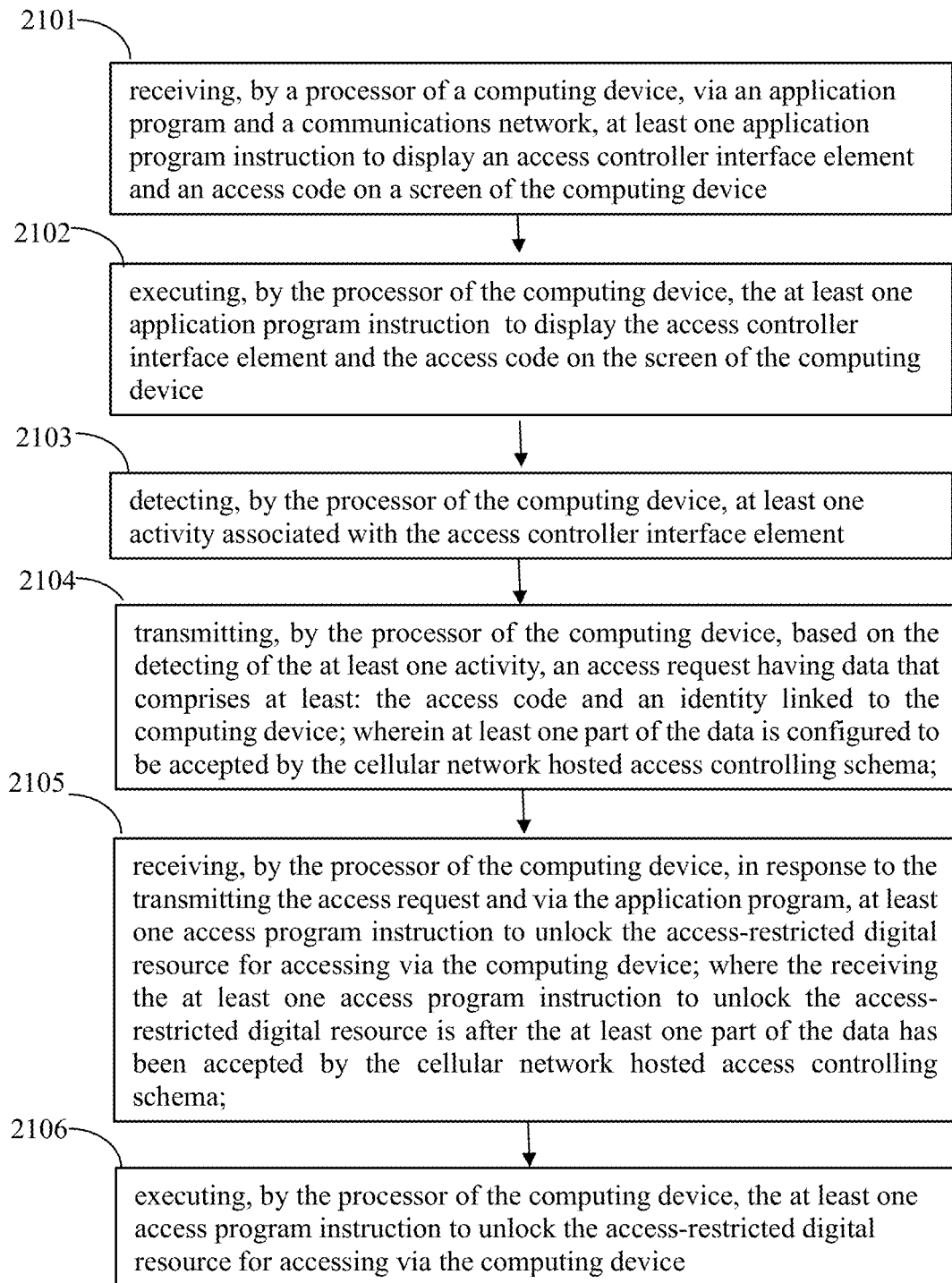
FIG. 21 is an illustrative non-restrictive example of a process based at least in part on cellular communication signals in accordance with at least some embodiments of the present disclosure.

FIG. 21 depicts an illustrative non-restrictive example of an exemplary process based at least in part on a mobile communication signals in accordance with at least some embodiments of the present disclosure. In some embodiments, the exemplary process of FIG. 21 may include at least the following steps of: at step 2101, receiving, by a processor of a computing device, via an application program and a communications network, at least one application program instruction to display an access controller interface element and an access code on a screen of the computing device; where the access controller interface element is: communicatively coupled to a cellular network hosted access controlling schema and operationally linked to an access-restricted digital resource; at step 2102, executing, by the processor of the computing device, the at least one application program instruction to display the access controller interface element and the access code on the screen of the computing device; at step 2103, detecting, by the processor of the computing device, at least one activity associated with the access controller interface element; at step 2104, transmitting, by the processor of the computing device, based on the detecting of the at least one activity, an access request having data that includes: the access code and an identity linked to the computing device; where at least one part of the data is configured to be accepted by the cellular network hosted access controlling schema; at step 2105, receiving, by the processor of the computing device, in response to the transmitting the access request and via the application program, at least one access program instruction to unlock the access-restricted digital resource for accessing via the computing device; where the receiving the at least one access program instruction to unlock the access-restricted digital resource is after the at least one part of the data has been accepted by the cellular network hosted access controlling schema; and, at step 2106, executing, by the processor of the computing device, the at least one access program instruction to unlock the access-restricted digital resource for accessing via the computing device.

[FIG. 22]

Figure 22:
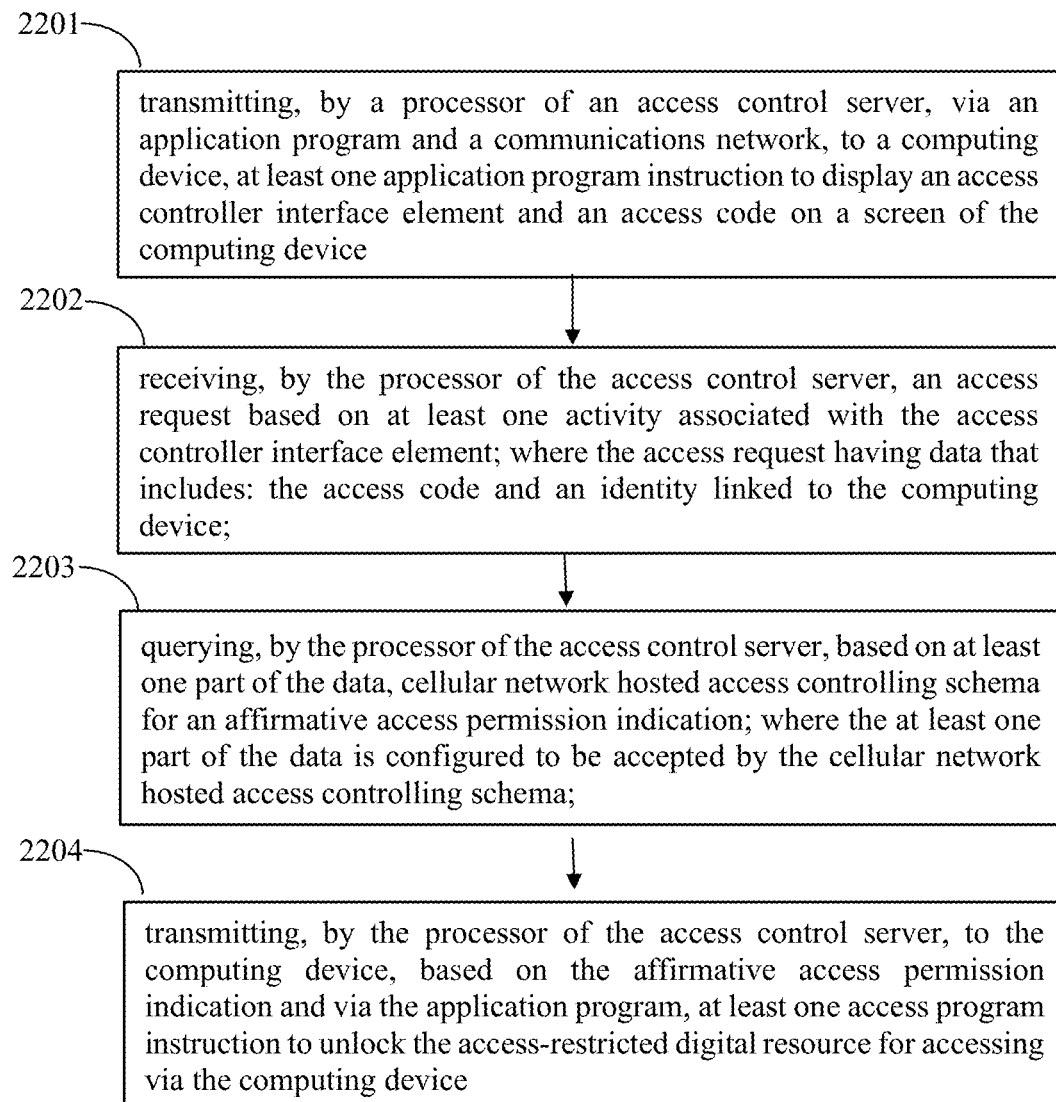
FIG. 22 is an illustrative non-restrictive example of a process based at least in part on cellular communication signals in accordance with at least some embodiments of the present disclosure.

FIG. 22 depicts an illustrative non-restrictive example of an exemplary process based at least in part on a mobile communication signals in accordance with at least some embodiments of the present disclosure. In some embodiments, the exemplary process of FIG. 22 may include at least the following steps of: at step 2201, transmitting, by a processor of an access control server, via an application program and a communications network, to a computing device, at least one application program instruction to display an access controller interface element and an access code on a screen of the computing device; where the access controller interface element is: communicatively coupled to a cellular network hosted access controlling schema and operationally linked to an access-restricted digital resource, restricted from being accessed via the computing device; at step 2202, receiving, by the processor of the access control server, an access request based on at least one activity associated with the access controller interface element; where the access request having data that includes: the access code and an identity linked to the computing device; at step 2203, querying, by the processor of the access control server, based on at least one part of the data, the cellular network hosted access controlling schema for an affirmative access permission indication; where the at least one part of the data is configured to be accepted by the cellular network hosted access controlling schema; and at step 2204, transmitting, by the processor of the access control server, to the computing device, based on the affirmative access permission indication and via the application program, at least one access program instruction to unlock the access-restricted digital resource for accessing via the computing device.

[FIG. 23]

Figure 23:
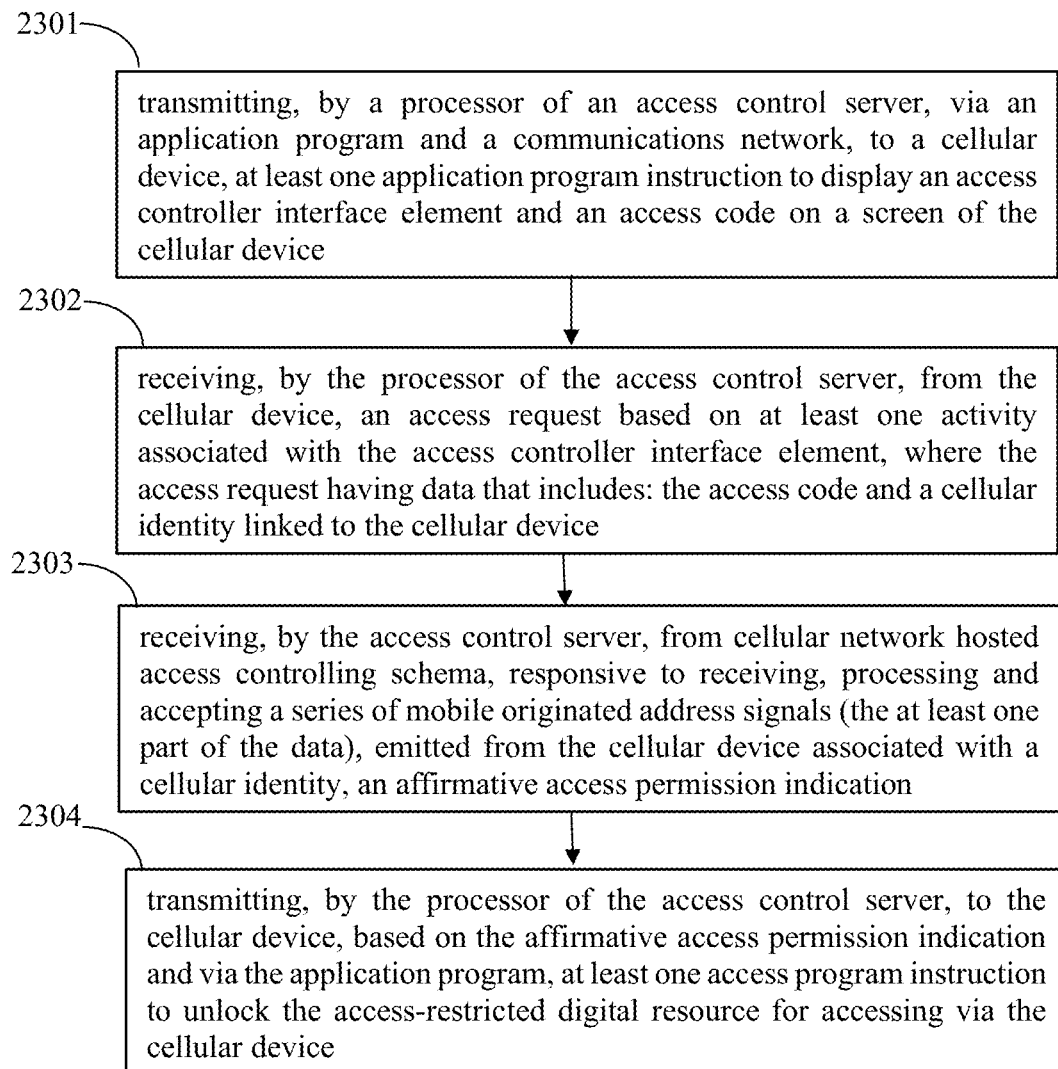
FIG. 23 is an illustrative non-restrictive example of a process based at least in part on cellular communication signals in accordance with at least some embodiments of the present disclosure.

FIG. 23 depicts an illustrative non-restrictive example of an exemplary process based at least in part on a mobile communication signals in accordance with at least some embodiments of the present disclosure. In some embodiments, the exemplary process of FIG. 23 may include at least the following steps of: at step 2301, transmitting, by a processor of an access control server, via an application program and a communications network, to a cellular device, at least one application program instruction to display an access controller interface element and an access code on a screen of the cellular device; where the access controller interface element is: communicatively coupled to a cellular network hosted access controlling schema and operationally linked to an access-restricted digital resource, restricted from being accessed via the cellular device; at step 2302, receiving, by the processor of the access control server, from the cellular device, an access request based on at least one activity associated with the access controller interface element; where the access request having data that includes: the access code and a cellular identity linked to the cellular device; at step 2303, receiving, by the access control server, from the cellular network hosted access controlling schema, responsive to receiving, processing and accepting a series of mobile originated address signals (the at least one part of the data) as disclosed herein, emitted from the cellular device associated with the cellular identity, an affirmative access permission indication; and at step 2304, transmitting, by the processor of the access control server, to the cellular device, based on the affirmative access permission indication and via the application program, at least one access program instruction to unlock the access-restricted digital resource for accessing via the cellular device.

[FIG. 24]

Figure 24:
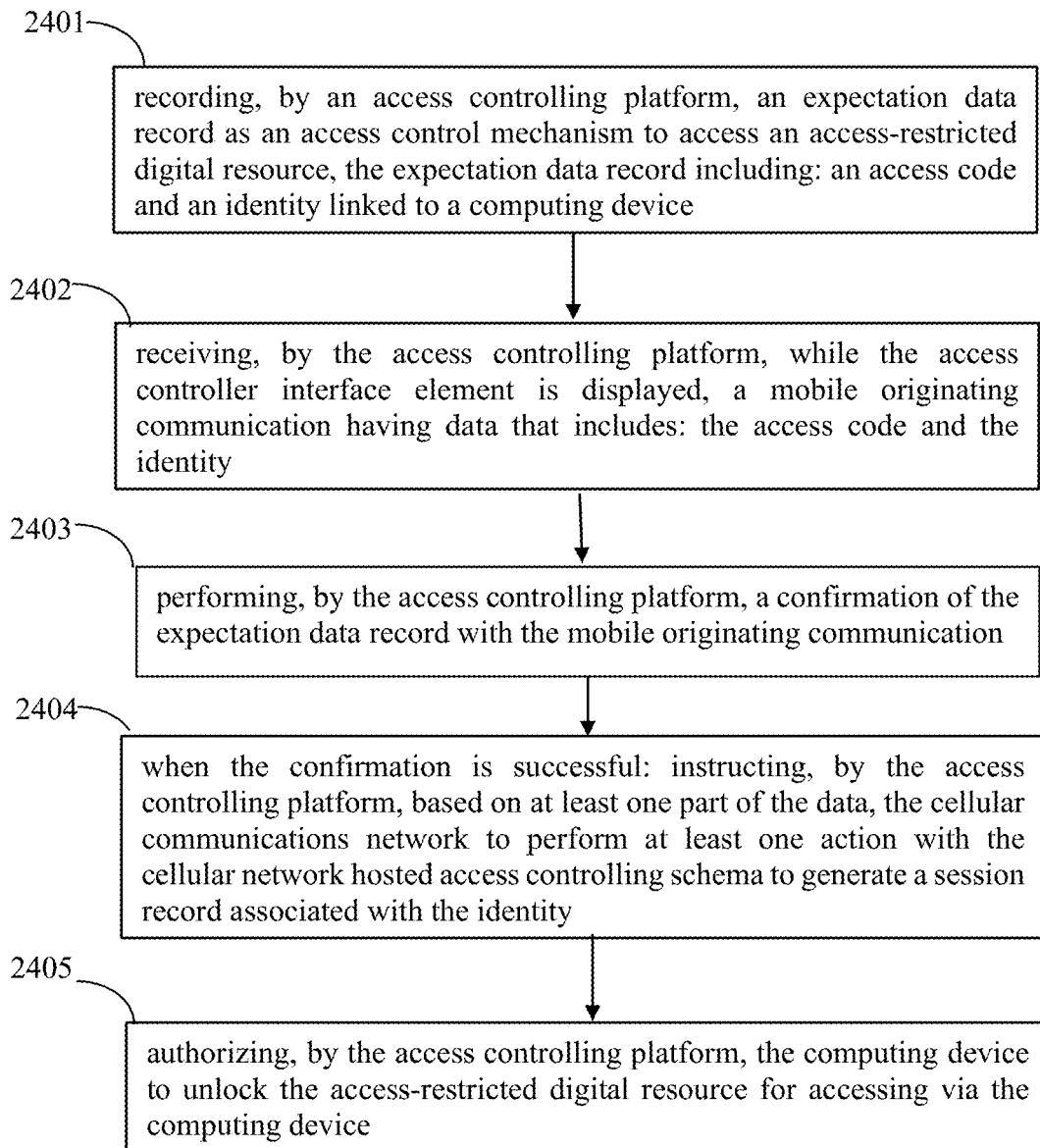
FIG. 24 is an illustrative non-restrictive example of a process based at least in part on cellular communication signals in accordance with at least some embodiments of the present disclosure.

FIG. 24 depicts an illustrative non-restrictive example of an exemplary process based at least in part on a mobile communication signals in accordance with at least some embodiments of the present disclosure. In some embodiments, the exemplary process of FIG. 24 may include at least the following steps of: at step 2401, recording, by an access controlling platform an expectation data record as an access control mechanism to access an access-restricted digital resource, the expectation data record including: an access code and an identity linked to a computing device; where the access code is associated with the access-restricted digital resource, restricted from being accessed via the computing device; where the expectation data record has been generated while an access controller interface element is displayed on a screen of the computing device; where the access controller interface element is operationally linked to the access-restricted digital resource; at step 2402, receiving, by the access controlling platform, while the access controller interface element is displayed, a mobile originating communication having data that includes: the access code and the identity; at step 2403, performing, by the access controlling platform, a confirmation of the expectation data record with the mobile originating communication; at step 2404, when the confirmation is successful: instructing, by the access controlling platform, based on at least one part of the data, the cellular communications network to perform at least one action with the cellular network hosted access controlling schema to generate a session record associated with the identity; and, at step 2405, authorizing, by the access controlling platform, the computing device to unlock the access-restricted digital resource for accessing via the computing device.

[FIG. 25]

Figure 25:
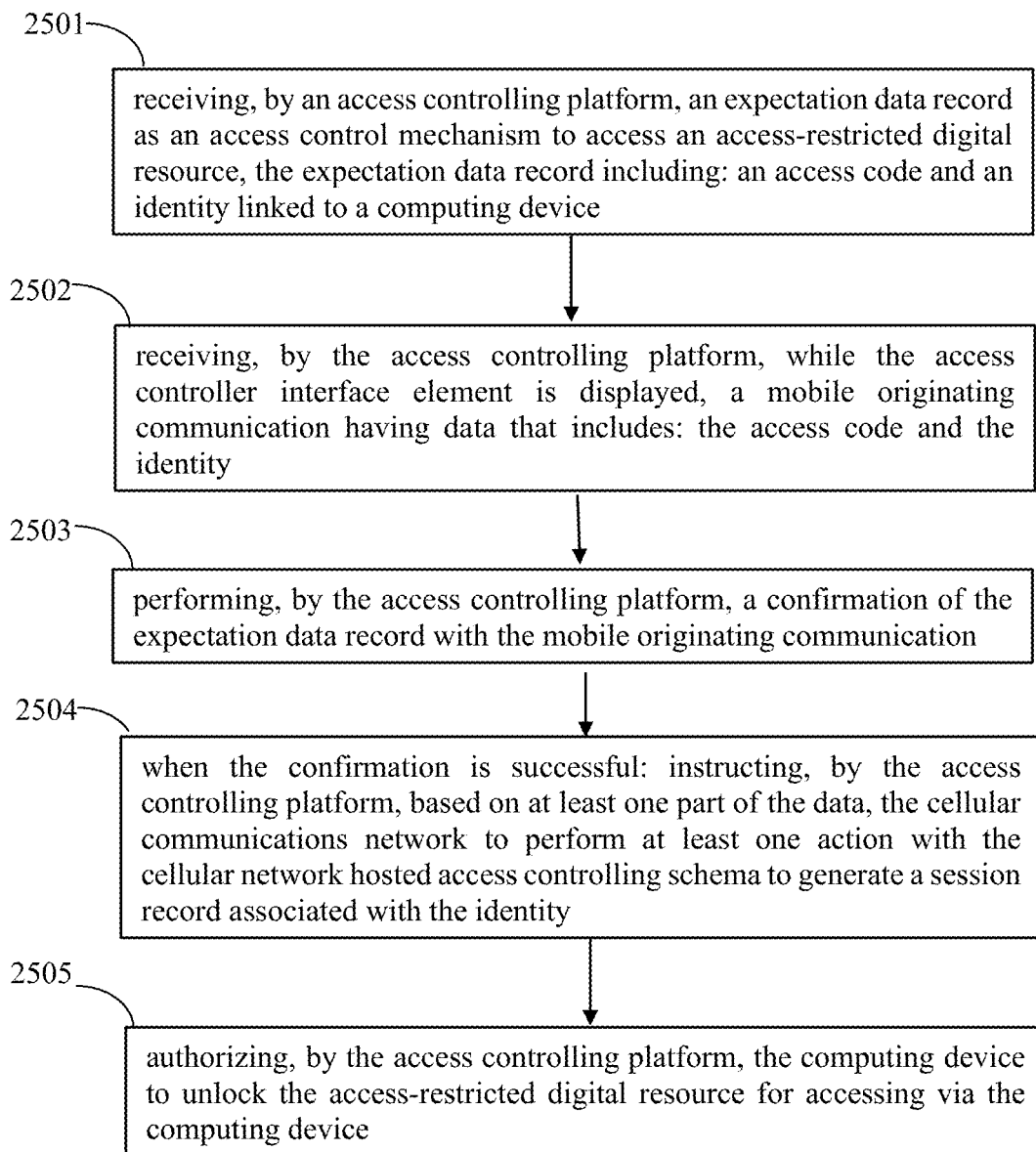
FIG. 25 is an illustrative non-restrictive example of a process based at least in part on cellular communication signals in accordance with at least some embodiments of the present disclosure.

FIG. 25 depicts an illustrative non-restrictive example of an exemplary process based at least in part on a mobile communication signals in accordance with at least some embodiments of the present disclosure. In some embodiments, the exemplary process of FIG. 25 may include at least the following steps of: at step 2501, receiving, by an access controlling platform, an expectation data record as an access control mechanism to access an access-restricted digital resource, the expectation data record including: an access code and an identity linked to a computing device; where the access code is associated with the access-restricted digital resource, restricted from being accessed via the computing device; where the expectation data record has been generated while an access controller interface element is displayed on a screen of the computing device; where the access controller interface element is operationally linked to the access-restricted digital resource; at step 2502, receiving, by the access controlling platform, while the access controller interface element is displayed, a mobile originating communication having data that includes: the access code and the identity; at step 2503, performing, by the access controlling platform, a confirmation of the expectation data record with the mobile originating communication; at step 2504, when the confirmation is successful: instructing, by the access controlling platform, based on at least one part of the data, the cellular communications network to perform at least one action with the cellular network hosted access controlling schema to generate a session record associated with the identity; and, at step 2505, authorizing, by the access controlling platform, the computing device to unlock the access-restricted digital resource for accessing via the computing device.

Illustrative Non-Limiting Embodiments of Access Controlling Network Architectures, Systems, Components and/or Elements Programmed Utilizing Novel Cellular Signaled Access Control Protocols with Expected Keys and Machine-Learning Techniques to Access Restricted Resources/Services and to Identify, Rank, Modify, and/or Control Automated Programmable Entities (Such as Robots/Bots) and their Visual Schemas, and Methods for Use Thereof Some Illustrative Non-Limiting Technological Problems being Addressed Herein One technological problem being addressed in the present disclosure is that Legacy and Analog User Name And Password (UNAP) based security may be severely compromised, given that many users opt for convenience over security, by choosing easier to remember passwords rather than stronger, more cryptic ones, and/or moreover reusing the same password across multiple services. For example, large scale data security breaches and privacy concerns has undermined online trust, with increased risk and exposure further eroding the UNAP method for gaining access to services. Typically, users may have also become increasingly reluctant to disclose personal data to online entities.

Another technological problem being addressed in the present disclosure is that users may enter their identities via a keypad or keyboard that may be a fundamental vulnerability because, for example, keystrokes are, typically, not encrypted at keypress (entry) time and may be intercepted, for example, by keyloggers and/or remote control software. Thus, regardless of how secure the internet communications protocol may be, data manually entered into the device using a keypad or keyboard could be captured by nefarious actors in plain and clear text or in an equivalent and associated text code (e.g. ASCII).

Yet another technological problem being addressed in the present disclosure is that usernames and passwords, moreover, may be often required to be stored by third party service providers who may often fail to take the necessary data protection precautions. A number of large scale data breaches and leaks have exposed and rendered the online identity of millions vulnerable.

Yet another technological problem being addressed in the present disclosure is that nefarious actors, such as scammers and phishers, may utilize computer-driven social engineering techniques to extract login credentials from unsuspecting users at alarming frequency.

Yet another technological problem being addressed in the present disclosure is that with the advent of smart cellular phones and app stores, countless application providers have gained access to computer data storages of deeply personal data, device controllers and features, such as, without limitation, access to contacts, telephone events, screen recordings, cameras and/or keypads. For example, users may grant habitually, without diligence, access permissions to third party applications and/or application features requested by software that may be outside the scope of services being rendered. Consequently, at least some consider the modern digital cellular telephone to be a security pandoras box.

Yet another technological problem being addressed in the present disclosure is the deficiency in securely verifying users via their cell numbers, given that many Internet Services use the MSISDN to deliver a two-factor authentication (2FA) communications. For example, in one typical 2FA procedure, a computing device of an Internet Service may send a One Time Passcode (OTP) via SMS and/or phone calls to a registered mobile device using the MSISDN, requesting users to reenter these codes into an expectant internet authentication session.

Yet another technological problem being addressed in the present disclosure is that there may be no known way to effectively detect BOTS (computer programs that are configured/programmed to perform automatic repetitive tasks) operating on a service platform at scale given that many services willfully provide an API to automate core components of their own service offering, for example, without limitation, to automatically respond to messages, to schedule responses to messages, to respond selectively to messages by topic and/or key words, to automatically follow other users, to create lists of users, to spot trends in the market place, to automatically react to trends, to conduct research, conduct online polls, disseminate news, etc.

Online social media platforms (e.g. Meta™/Facebook™/WhatsApp™ (Meta Platforms, Inc., CA), Twitter™ (Twitter, Inc., CA), etc.), may lack an automated method to, for example, without limitation, detect, highlight, and/or tag automated computer processes (e.g. "BOTS" or robots) that may register and masquerade themselves as humans. For example, while BOTS may provide valuable automated services, they can also not only artificially inflate the number of registered subscribers, and moreover may also disseminate false and/or misleading information to sway a public opinion and/or utilize computer technology for malicious purposes such as, without limitation, undermining the freedom of speech and democratic processes.

For example, there is a technological need for Authentic Beings (humans) and their input to be clearly distinguished and distinctly presented from input created by Artificial Entities (i.e. Automatons, BOTS) which may be malevolent in content and/or intent. At least one reason this segregation is so fundamental to restoring balance online, is the quintessential issue regarding the protection of free speech in digital ecosystem(s), between permitting free speech while ensuring truth based on data supporting facts prevail. This balance is literally a numbers game. For example, since typically BOTS are artificially spawned and programmatically injected into online systems, they may exist in vast quantities that far exceed the number of humans who are required to manually register to participate online. That statistic alone creates a non-level playing field of epic proportions, one that dramatically statistically and tangibly skews not only the source of data, but its reliability and its ability to sway online opinions at will, for example BOTS increasing or decreasing the prominence of a post (tweet), posing an existential threats to democratic free and fair processes (e.g. elections).

For example, this problem is accentuated by online forums that may permit people (and BOTS) to post, and thus it would not be typically accurately determined the percentage of the on-line base that may be BOTS which may have negative domino effects on, for example, without limitation, digital advertising to the base. In particular, advertising that is sold on the number of digital views (also referred to as "brand" or "mindshare" advertising) rather than necessarily on conversions (click throughs and product purchases), since if at least some portion of advertisements are unknowingly being served to BOTS, they cannot be deemed "viewed" (by a potential customer) yet currently they are being billed as such.

Yet another technological problem being addressed in the present disclosure is that some 2FA processes/systems may allow malicious actors to gain access to the phone-based messaging (e.g. SMS) and/or telephony functions to intercept the 2FA codes and control automatically users' cellular-service enabled computing devices to return the 2FA codes via the IAPP to complete the authentication loop, without users' intervention and/or users' appreciation of consequences of their action(s) in facilitating malicious actors.

Yet another technological problem being addressed in the present disclosure is that a legacy SS7 signaling network, being typically utilized to transport these 2FA codes and calls, may have a number of vulnerabilities that permit malicious actors with access to an SS7 peering point, to redirect and/or intercept such mobile terminating events, compromising these authorization codes and/or signals. For example, at least some vulnerabilities may be due to a case when, for example, without limitation, a source of SS7 messages may not be authenticated and critical network controlling messages may thus be injected into the SS7 network from one or more entities, masquerading as mobile phones and/or switching elements. Thus, for example, without limitation, a malicious actor could inject and thereby, for example, fake a mobile telephone location update (or similarly overwrite subscriber information in an HLR, etc.), hijacking the cellular routing to surreptitiously intercept phone calls and/or text.

Yet another technological problem being addressed in the present disclosure is that some Authenticator applications may be programmed to push notifications over data connections to registered cellular devices, prompting a user confirmation before granting access to online resources (e.g. services).

Yet another technological problem being addressed in the present disclosure is that while purporting to overcome at least one or more of identified 2FA issues, at least some Authenticator applications may cause attention deficit disorder (ADD), muscle memory and/or poor hand-eye coordination, which could result in users habitually and/or inadvertently granting access. For example, ADD may manifest as a bipolar disorder that may result in ADD-suffering users pressing/selecting, for example, the "Green"-color button or a button with the label of "YES" when they have intended to press the "Red"-color button or a button with the label of "NO".

Yet another technological problem being addressed in the present disclosure is that potentially significant number (e.g. potentially, billions) of cellular users may still use only so-called "basic feature" phones that typically lack so-called "advanced" data push notification services (e.g. web push notifications, rich push notifications carrying images, emojis, etc.) they cannot avail themselves of such "higher-end" authentication protocols such as.

Yet another technological problem being addressed in the present disclosure is that, while certain user interactions preclude automation through programmatic instruction, there is a phenomenon known as "click farming" which utilize, for example, hundreds or thousands of programmed cell phones, and/or low skilled and/or low wage human resources, mostly in developing countries, to perform automatic (cell phones are programmed to activate a user interface element) (BOT cell phones) and/or manual clicks (e.g. manually activating the user interface element) on behalf of actors with nefarious intent to bypass certain authentication processes. For example, human click farms or hybrid click farms, having BOT cell phones with some human input, may be used to effectively bypass Captcha-type systems that may present visual recognition tasks and/or puzzles to be solved that are designed to distinguish between human and machine input. Further, typically, the so-called "click farming" puts considerable strain on computing resources and/or network traffic, reducing the availability of both for other uses.

Some Illustrative Non-Limiting Technological Solutions Described Herein

As detailed herein, at least some embodiments of the present disclosure are directed to one or more technological solutions that are designed to address one or more of technological problems identified herein by, for example, without limitation, providing security enhancing methods, access controlling network architectures, and systems for identifying and authenticating users in various environments, such as, without limitation, online. For example, at least some embodiments of the present disclosure may leverage the secure Mobile Originating Signaling capability on digital networks to conduct cellular-based authentication that would deliver a trusted, seamless and frictionless user identity authentication for access to digital products and/or services at scale.

As detailed herein, at least some embodiments of the present disclosure are directed to one or more technological solutions that are designed to address one or more of technological problems identified herein by, for example, without limitation, shifting the reliance, and consequently the vulnerability, from users, identifying themselves, to arrangements where a trusted intelligent network (IN), such as, without limitation, a cellular network, securely provides the identification out of internet realm/band, without any user intervention, and thereby without any additional external point of compromise (e.g. from malicious actors from the outside of the IN/cellular network).

As detailed herein, at least some embodiments of the present disclosure are directed to one or more technological solutions that are designed to address one or more of technological problems identified herein by, for example, without limitation, programming an Internet Application (IAPP) to connect, for example, without limitation, via an application programming interface (API) to an exemplary disclosed so-called "STARKEY" Platform (which may be also be referenced herein interchangeably as an access controlling platform), requesting and then presenting a user with a challenge that may include, without limitation, a series (sequence) of randomly generated digits (e.g. a sequence of numbers, a sequence of randomly generated alphanumeric characters, etc., which may be also referenced herein as an expected access control digital key). In some embodiments, the series of randomly generated digits (the expected access control digital key) may be prefixed, without limitation, prior to be presented to a user, with one or more pre-determined or randomly selected symbols (e.g. star symbol (*), a symbolic routing prefix), collectively forming so-referenced herein interchangeably the "STAR Challenge," the "STAR Random Challenge," the "Star Randomized Phone Number", the "Star Random Challenge and Response", or the "Star Challenge". In at least some embodiments, the exemplary STARKEY Platform (the access controlling platform) may be programmed to generate/form the Star Challenge. In at least some embodiments, another computing device (e.g. a user computing device, a provider computing device, described herein) may be programmed to generate/form the Star Challenge, before being presented to a user, by prefixing/appending/adding one or more pre-determined symbols to the series of randomly generated digits (the expected access control digital key). In at least some embodiments, the Star Challenge and the expected access control digital key are configured to be recognized by a user as a series of telephone digits and symbol(s) that the user can select and/or input on a telephone keypad. For example, both, the Star Challenge and the expected access control digital key, may be structured to have a sufficiently suitable number of random digits so that a malicious actor would need to try millions, billions, trillions or even quadrillions of permutations, thus making brute force attacks potentially improbable and impossible, given their cellular origination and a sufficiently suitable short lived duration as disclosed herein.

As detailed herein, without limitation and as illustration only, billions of users/people have personal cellular phones and every cellular phone has, for example, a unique digital subscriber identity, known as the MSISDN (Mobile Subscriber Integrated Services Digital Network or also referenced as a Mobile Station International Subscriber Directory Number). Each MSISDN is the directory telephone number that users dial to establish contact with one another. As detailed herein, at least some embodiments of the present disclosure are directed to one or more technological solutions that are designed to address one or more of technological problems identified herein by, for example, without limitation, utilizing each cellular phone number as a Ubiquitous/Unique Personal Digital Identity (UPDI). For example, without limitation, registering users online using their cell phone number may deliver a Globally Unique Identity (GUID) that may seamlessly work with contact lists (e.g. personal phone address books), permitting IAPP linkage and viral propagation between social address books. In some embodiments, the GUID may permit Internet Services (e.g. internet publishers, internet business), to deliver Over The Top (OTT) telephony and/or messaging applications using the existing known telephone number as the service address and an identity (e.g. user identity, computing device identity, etc.). For example, without limitation, OTT telephony and/or messaging applications may include presence-based directories, video chat, multiparty conferencing, screen-sharing and/or PSTN calling. For example, without limitation, OTT telephony and/or messaging applications may be "thick" clients, browser-based "thin" clients, and/or WebRTC (Web Real-Time Communications)-based "thin" clients.

For example, when a cellular user A with a cellular-service enabled computing device (e.g. cellular phone/smartphone) having MSISDN-A that is registered with an Internet App (IAPP) using their MSISDN-A as an identity (an entry in the modified phone address book), the IAPP and/or other associated program(s)/application(s)/network(s) may determine, for a communication addressed to the user A (MSISDN-A) from another user of the IAPP, that the recipient cellular device MSISDN-A has been registered and connected to the IAPP, and may thus route the communication OTT using an internet connection (e.g. internet network), rather than routing communications via the cellular network.

As detailed herein, at least some embodiments of the present disclosure are directed to one or more technological solutions that are designed to address one or more of technological problems identified herein by, for example, without limitation, registering users by their identities described herein (e.g. MSISDN) to facilitate IAPP service propagation and adoption since any contact that is registered with the IAPP (e.g. social media app/website) may be indicated as such in a suitably modified phone address book program, and any contact that would not yet be registered may be invited to join the IAPP community on their MSDISN, via a network (e.g. the IN, cellular network)-mediated onboarding that would rely on the modified phone address book program.

As detailed herein, at least some embodiments of the present disclosure are directed to one or more technological solutions that are designed to address one or more of technological problems identified herein by, for example, without limitation, recording a series of randomly generated digits (e.g. the expected access control digital key), or series of randomly generated digits with symbol(s) (e.g., the STAR Challenge), or any other similarly suitable data, as an expectation record in a non-transitory memory; whereby the access controlling platform may be programmed to await a receipt of a series of network (e.g. IN or cellular network)-mediated signals from an as yet unknown cellular device that would exactly match the expectation record, digit for digit in sequence. In some embodiments, once this stored expectation would be met by a user, for example, by dialing the series of randomized digits displayed in the form of the STAR Challenge, as a phone number, on a cellular device and the cellular network routing such "STAR" call request to the servicing STARKEY Platform (access controlling platform), the cellular device that emitted the matching STAR address signals (the STAR Challenge as recorded in the expectation), also referenced herein as "the Star Challenge Response," may be securely identified by extracting the cellular network-provided Caller ID (e.g. MSISDN) determined from the user and/or device (e.g. SIM) associated cellular profile stored in the cellular network.

As detailed herein, at least some embodiments of the present disclosure are directed to one or more technological solutions that are designed to address one or more of technological problems identified herein by, for example, without limitation, programming the IAPP to present a series of randomly generated digits (e.g. the expected access control digital key, a part of the STAR Challenge) as a graphical user interface (GUI) element (which may be also referenced herein as, without limitation, the STAR Challenge Element (e.g. a button having a text label of the STAR Challenge, displaying the Star Challenge randomized series of digits as a click to call button/link)). In some embodiments, the illustrative STAR Challenge element may be programed to be displayed in form of a telephone button (e.g. green-color button with an icon/image of a telephone or a telephone receiver), displaying the STAR Challenge, including the series of randomly generated digits (e.g. the expected access control digital key) that a user would activate to dial (STAR Challenge phone number), and/or a telephony QR code, encoded with the STAR Challenge (STAR Challenge phone number), permitting users to scan rather than manually input the STAR Challenge or the series of random generated digits from it, when using the IAPP, for example, without limitation, on a desktop/laptop computer or in virtual reality (VR) headset that has no native cellular phone dialing functionality. In some embodiments, without limitation, on activating (e.g. without limitation "tapping") the STAR Challenge button or scanning the QR code encapsulating the STAR Challenge phone number, the cellular phone dialer may then be presented with the randomized phone number that has been automatically populated/entered as the dial address to complete the Star Challenge Response.

As detailed herein, at least some embodiments of the present disclosure are directed to one or more technological solutions that are designed to address one or more of technological problems identified herein by, for example, without limitation, providing that when the user dials a number containing the series of randomized digits (the expected access control digital key) or a number containing the series of randomized digits prefixed with a symbolic routing prefix (e.g. the STAR Challenge random telephone number), resulting in the Star Challenge Response, by pressing a GUI element (e.g. a button that is shaped as and/or displays, without limitations, a green phone icon), the user's associated cellular device or the user's associated cellular service-enabled computing device (e.g. a tablet) would emit telephony-type address signal (e.g. STAR Challenge address signals) for example, without limitation, over the air to the cellular network, which would then execute an Authentication, Authorization and Accounting (AAA) Protocol to securely verify and authenticate the user's associated cellular device or the user's associated cellular service-enabled computing device (e.g. a tablet) based on one or more secret internal network keys (e.g. Ki, stored locally on the SIM and internally in the HLR on the network) and/or one or more security algorithms, for example, without limitations, the A3/A8 and COMP128 challenge response algorithm.

In some embodiments, on passing the AAA verification procedure, the network would provide one or more internal network identifiers (e.g. MSISDN, ICCID, IMEI, etc.) associated with the cellular device (SIM/IMSI) and route the star prefixed call to the STARKEY Platform. The STARKEY Platform may be programmed to determine when the address signals received would be expected and, optionally, for example, being time-based active, by performing a confirmation (e.g. by matching) of the received address signals to the stored randomized series on, for example, a digit-for-digit basis in the sequence, and that the call would have been received within an unexpired timer interval, and on thus verifying the expected and active challenge, extract the MSISDN associated with the device that emitted the randomized address signals. Thus, on receiving the expected and matching response to the STAR Challenge, including highly randomized digits, as disclosed herein, the STARKEY Platform may be programmed to seamlessly, securely and uniquely identify the user's associated IAPP utilizing the network (e.g. the IN, the cellular network) provided cellular identity.

As detailed herein, at least some embodiments of the present disclosure are directed to one or more technological solutions that are designed to address one or more of technological problems identified herein by, for example, without limitation, by technologically confirming that only a user (human being) who would be presently viewing the STAR Challenge displayed on the internet-enabled computing device (e.g. a tablet, a desktop computer, a cellular phone, a VR headset, a ATM machine, a gaming terminal) can respond (e.g. dial, send an SMS) with the identical sequence and series of random digits within a predetermine time interval (e.g. 1-60 seconds, under 5 minutes, under 10 minutes, 15 minutes, etc.) (e.g. the Star Challenge Response). And further, given that the response received by the STARKEY Platform would be OUT of Band (OOB), over the cellular telephony network, rather than IN Band (INB), within the IAPP internet data communications channel, the response (e.g. the Star Challenge Response) to the random challenge (e.g. the Star Random Challenge), for example, cannot be intercepted on the internet and cannot be injected via the internet.

As detailed herein, at least some embodiments of the present disclosure are directed to one or more technological solutions that are designed to address one or more of technological problems identified herein by, for example, without limitation, by technologically enabling third party service providers with a so-called "STARKEY" API (e.g. an exemplary, non-limiting delivery mechanism/channel for the STAR Challenge) to, for example, without limitation, utilize a universal and secure digital registration and access protocol based on a unique digital identity (e.g. a cellular identity), provided by, for example, without limitation, the network (e.g. the IN, cellular network) rather than the user. For example, without limitations, once a user has been identified as disclosed herein, for example, without limitation, via a Star Random Challenge Response, utilizing the STAR Challenge described herein in accordance with at least some embodiments of the present disclosure, an exemplary internet service (e.g. a website with access restricted resource, ATM, physical vending machine with internet-based authentication vending, etc.) and/or an exemplary internet application (e.g. an internet browser, an app, etc.) may store access authentication expectation data/record that may include one or more components, including a component of identity data (e.g. the identity (e.g. the cellular identity) and/or derived identity based on the identity (e.g. the cellular identity)), returned by the STARKEY Platform so as to enable the STARKEY Platform to authenticate the user by receiving subsequent mobile origination communication(s) including static signals (e.g. a fixed digit(s) (e.g. phone number), fixed alphanumeric sequence, fixed symbol(s), etc.) as address signals rather than random signal(s) (random signal(s)/random symbol(s) are signal(s)/symbol(s) that would vary between a plurality of mobile origination communications), since these static signals may be only accepted from the device associated with a now-known identity (e.g. the cellular identity).

In at least some embodiments of the present disclosure, a unique identity (e.g. cellular identity) thus may be paired with an internet service and/or application, so that, for example, without limitation, any subsequent login, any subsequent signals requested from the same user for the internet service and/or application, may be uniquely matched to an expectant and previously-paired identity before granting access.

In at least some embodiments of the present disclosure, for example, an IAPP may receive a cellular identity of a cellular-service enabled computing device A (e.g. MSISDN-A), or a cryptographically-hashed identify, e.g. so-called "XMSISDN-A" (derived from MSISDN-A) as described in more detail below utilizing, for example, without limitation, the STAR Challenge and associated API. For example, on a subsequent access to an access-restricted IAPP, the now registered and identified user, associated with a now registered identity (e.g. the registered cellular identity) may be requested (e.g. via a graphical user interface) to utilize the device associated with the now-registered identity (e.g. the registered cellular identity) to emit a static/fixed cellular signal (e.g. via telephone call, SMS etc.) (STAR signals), for example, a single symbol (e.g. a star (*)), in order to gain access (e.g. login/sign-in, etc.) to an access-restricted resource (e.g. the access-restricted IAPP).

As detailed herein, at least some embodiments of the present disclosure are directed to one or more technological solutions that are designed to address one or more of technological problems identified herein by, for example, without limitation, by technologically enabling, for example, without limitation, the STARKEY Platform via a published API utilized, for example, within a browser and/or within a native APP, to ensure that an access would be only granted to a user who would utilize, for example, without limitation, the cellular device with MSISDN-A that would emit so-called "STAR" signal(s). For example, without limitations, on requesting the user login in accordance with at least some embodiments of the present disclosure, the STARKEY Platform may thus simply record an access authentication expectation record having an access authentication expectation data such as [MSISDN-A: *], per the notation in U.S. patent application Ser. No. 17/567,051, incorporated herein by reference for at least this specific purpose. That is, performing a confirmation to the access authentication expectation data/record would only be met (successful) when, for example, without limitation, a cellular device having the identity of MSISDN-A emits address signal(s) representing a static/fixed symbol (e.g. a single Star (*) address signal), within a preset time, before granting access.

As detailed herein, at least some embodiments of the present disclosure are directed to one or more technological solutions that are designed to address one or more of technological problems identified herein by, for example, without limitation, by technologically generating/utilizing a unique so-called "STARKEY" identity (also may be interchangeably referenced herein in some embodiments as the identity data) that may be derived from, for example, without limitation, a cellular identity (e.g. MSISDN), in order to prevent exposing the cellular identity (e.g. MSISDN) to third party service providers. In at least some embodiments of the present disclosure, this derived STARKEY identity may be computed by applying a suitable cryptographic hash function (CHF) such as, without limitation, a one-way hash function (e.g. SHA-256), to the cellular identity (e.g. MSISDN), resulting in a unique identifier that is illustratively referenced herein as "XMSISDN." Since the MSISDN is a network rather than a user provided identity, at least some embodiments of the present disclosure may be detailed by utilizing notations such as, without limitation, mapping/associating (:) and transporting (>) identities from a cellular device to a cellular network, to an internet service associated with access-restricted resource(s) as follows:

Cell Phone [SIM:IMSI/TMSI]>Cell Network AAA [TMSI/IMSI:MSISDN]> The STARKEY Platform [HASH(MSISDN):XMSISDN]>Internet Service [XMSISDN]=Unique Anonymous Online Identity.

As detailed herein, at least some embodiments of the present disclosure are directed to one or more technological solutions that are designed to address one or more of technological problems identified herein by, for example, without limitation, by technologically programming an exemplary access controlling platform (e.g. the STARKEY Platform) to transmit the hashed identity, e.g. XMSISDN, rather than the clear MSISDN to an internet service provider or APP that would be associated with at least one access-restricted resource. In at least some embodiments, this hashed identity may then be stored in a browser or APP for future reference without exposing the true identity (e.g. the cellular identity) associated with the user. For example, on receiving a request to authorize the previously identified user, the STARKEY Platform may then receive the hashed identity (e.g. XMSISDN-A) from the IAPP and may then setup an internal STARKEY expectation [XMA:*] (also may be interchangeably referenced herein for at least some embodiments as an access authentication expectation data/record) which would be utilized to perform the confirmation when the STARKEY Platform receives, for example, fixed symbol(s)-based address signal(s) (e.g. "*") from a MSISDN-A associated device whose cryptographic hash would equal XMSISDN-A (XMA). For example, without limitation, on receiving the signal from the MSISDN-A identified computing device (e.g. a cellular phone), the STARKEY Platform may then apply the cryptographic hash function to the MSISDN on the fly (in the moment of receipt) to determine if a corresponding expectation record (XMA: *) exists, and if the record does exist, the STARKEY Platform may then communicate to the internet service (e.g. via the STARKEY API), that a successful login for the user identified by the hashed XMSISDN-A has been recorded. The internet service may then securely unlock at least one access-restricted resource for accessing by the authenticated user (e.g. via an associated computing device).

As detailed herein, at least some embodiments of the present disclosure are directed to one or more technological solutions that are designed to address one or more of technological problems identified herein by, for example, without limitation, by technologically modifying an exemplary cryptographic hash function to further append (at the end) and/or prepending (at the beginning) at least the last one or more (N) digits of the MSISDN in the clear (e.g. one or more last digits) to the hashed identifier (e.g. XMSISDN) to allow users to more intuitively/readily identity cellular-service enabled computing devices (e.g. based on portion of a cellphone number) while still maintaining the integrity of the cryptographic hash (e.g. XMSISDN). In some embodiments, at least one technological solution may be to append the last three (3) digits as in MSISDNYYY (XM3, as shorthand notation herein). In some embodiments, at least one technological solution may be to append the last four (4) digits as in MSISDNYYYY (XM4, as shorthand notation herein). In some embodiments, at least one technological solution may be to append the last 5 (five) digits of the MSDSIDNYYYYY (XM5, as shorthand notation herein). In some embodiments, at least one technological solution may be to append the last N digits of the MSDSIDNN in the clear (XMN, as shorthand notation herein). For example, appending the last 4 digits in the clear thus, uniquely renders both a securely hashed and an easily recognizable short identity. In some embodiments, the so-called "STARKEY" IAPP (e.g. IAPP programmed to handle one or more unique identities of the present disclosure) may be programmed to extract and simply display those N appended digits (e.g. 4 digits) from the XMN (e.g. XM4) as the user identity (e.g. YYYY, as described, without limitation, in FIG. 26A at 108 below).

In one non-limiting embodiment, the cryptographically hashed identity is further seeded with a Secret Master Key (Y), known only to the access controlling platform, to further obfuscate the cellular digital identity, when the cellular digital identity is based solely on the MSISDN. While a hashed MSISDN is not reversable, it may be deterministic if one party knows the others cell phone number. By seeding the hash with a secret key, the resultant hash (e.g. XYM, XYM4 etc.) is not replicable. In one non-limiting example, applying a CGH (X) with secret master key (Y) concatenated ("+") to the MSISDN string as follows:

CGH("5t@R109iK#"+MSISDN) resulting in hash XYM.

For example, by simply displaying just the last 4 digits of the MSISDN, the user may readily recognize their cell identity at a glance. In some embodiments, at least one technological solution may be to prepend (prefix) the last N digits, as in N-MSISDN (NXM, as shorthand notation herein).

For example, in one non-limiting illustrative example, applying a SHA-256 cryptographic hash function to MSISDN (14154125111) would result in the XMSISDN hash:

2ea464c4a851e207dfe557f4567843eb52fe4df39923375b2e19d3e51bbe5b86.

For example, in one non-limiting illustrative example, applying a SHA-256 cryptographic hash function to Secret Master Key (5t@R109iK#) concatenated with MSISDN (14154125111) would result in the XMSISDN hash:

5ee32fa1faceeafd04aa80738c3297362534a1cd7ffa3692eeb39ad614041d10

And by then appending the last 4 MSISDN digits [5111], the XMSISDN or the XYMSISDN hash would be transformed into an easily recognizable cryptographic hash XM4 or XYM4 as in:

2ea464c4a851e207dfe557f4567843eb52fe4df39923375b2e19d3e51bbe5b865111 or

5ee32fa1faceeafd04aa80738c3297362534a1cd7ffa3692eeb39ad614041d105111 .

In some embodiments, by prepending the last 4 MSISDN digits [5111], the XMSISDN or XYMSISDN hash may be transformed into an easily recognizable cryptographic hash 4XM or 4XYM as in:

51112ea464c4a851e207dfe557f4567843eb52fe4df39923375b2e19d3e51bbe5b86 or

51115ee32fa1faceeafd04aa80738c3297362534a1cd7ffa3692eeb39ad614041d10.

In some embodiments, the 4XM or XM4 presentation may be reduced down to the prepended/appended MSISDN digits, while still retaining the unique full hash hidden by the IAPP (e.g. in a browser token), simply, for example, without limitation, displaying: 5111, or *5111, #5111, STAR5111, etc.

As detailed herein, at least some embodiments of the present disclosure are directed to one or more technological solutions that are designed to address one or more of technological problems identified herein by, for example, without limitation, utilizing XMN (e.g. XM4) to represent an extended human readable and identifiable 256 bit hash, from the standard 32 bytes to 32+N/2 (e.g. 34 bytes in an XM4 notation, utilizing an extra 2 bytes or 4 hexadecimals to store the appended 4 decimal digits). In some embodiments, the same MSISDN digit extension may be applied to any hash function to generate an anonymous yet easily recognizable identity.

In at least some embodiments the MNO may provide the access controlling platform (the exemplary STARKEY Platform) with additional identities associated with the cellular device emitting the randomized signals per this disclosure. In at least some embodiments, these additional identifiers may, without limitation, include the ICCID and the IMEI. In at least some embodiments these additional identities may be transported in SIP Private headers. In at least some embodiments, the ICCID may be hashed together with the MSISDN, that is hashing a concatenation of the ICCID and the MSISDN, to provide an additional layer of access security.

For example, in at least some embodiments, without limitation, such a multi-factor hashed identity, including both MSISDN and ICCID as input parameters, may prevent a so-called SIM Swap Fraud since the SIM identity may now be incorporated into the hashed identity. For example, while a SIM card may be fraudulently replaced (e.g. swapped) without the true owner's permission or awareness, while retaining the associated MSISDN, the SIM cannot be replaced without the ICCID changing, since every SIM card is manufactured with a globally unique ICCID. In at least some embodiments, when the hashed identity includes both ICCID and MSISDN (XIM/XIM4 etc., for short), then in the event that a SIM Swap occurs, the previously hashed and recorded identity associated with the cellular device and the IAPP will be invalidated, on performing a new hash. For example, in at least some embodiments, when a previously identified device identity has been hashed, recorded and associated with an IAPP, subsequent attempts to gain access on emitting a static signal from a device with the associated unchanged MSISDN, and a new ICCID (SIM swap), the access controlling platform on hashing the new ICCID+MSISDN tuple, will fail to locate a match to the expected previous ICCID+MSISDN hash, that had been recorded and associated with the cellular device. Such a hash mismatch may then permit the access controlling platform to alert a user that a possible SIM Swap fraud has been perpetrated.

In one embodiment the access controlling platform may record two separate hashes for a single device, in an expectation record (e.g. [XM, XIM: "*"]), one on the MSISDN (XM) and another on the combined ICCID+MSISDN (XIM) in order to locate an expectation record utilizing either the single identity hash on MSISDN (XIM) or the dual identity hash on both ICCID+MSISDN (XIM) and thereby conclusively ascertain that the MSISDN had been previously identified and associated and that it is the combination of ICCID+MSISDN that has failed (i.e. a SIM swap has occurred). In at least some embodiments, the Star Challenge Response methods, systems, components, and network architectures disclosed herein may utilize a plurality of network (e.g., the IN, cellular network, etc.) provided identities, associated with the same network or a plurality of networks.

As detailed herein, at least some embodiments of the present disclosure are directed to one or more technological solutions that are designed to address one or more of technological problems identified herein by, for example, without limitation, allowing users, who would have previously been identified using, for example, without limitation, the STAR Challenge, to simply without limitation initiate a Telephony, SMS or USSD transaction with particular signal(s) (e.g. STAR (*)) from their cellular device, and upon matching to, for example, the expected STAR (*) signal from their registered device, gain secure, instant and/or universal access to any access-restricted resource (e.g. internet service, website, file, etc.) without disclosing any additional personal data. As detailed herein, at least some embodiments of the present disclosure are directed to one or more technological solutions that are designed to address one or more of technological problems identified herein by, for example, without limitation, uniquely transforming (e.g. reprogramming) at least one button (e.g. the STAR (*) button) on any cellular phone into a Digital Master Key for securely unlocking access-restricted online resources (e.g. internet hosted services) as disclosed herein. In one non-limiting embodiment, for example, reprogramming the star (*) button of a telephone dialing pad to display a lock icon, and permitting the user, without limitation, to tap, or tap the star/lock icon button twice in rapid succession (e.g. a double tap), or tap and hold the star button (e.g. an extended tap) to automatically emit the static star (*) signal utilizing at least the disclosed methods. In one non-limiting embodiment, the cellular device may be programmed to enable at least one biometric trigger (e.g., voice, fingerprint, face recognition, etc.) to initiate the static star signaled methods, as disclosed, without exposing any biometric data to third parties.

As detailed herein, at least some embodiments of the present disclosure are directed to one or more technological solutions that are designed to address one or more of technological problems identified herein by, for example, without limitation, utilizing one or more additional security measures (e.g. without limitation, biometric signatures, including fingerprint sensors, facial recognition scanners, PIN codes, shape matching algorithms, and other suitable mechanism(s)) to allow users to further protect their cellular devices (e.g. telephony dialer application, SMS application, others APPs) from unauthorized use.

As detailed herein, at least some embodiments of the present disclosure are directed to one or more technological solutions that are designed to address one or more of technological problems identified herein by, for example, without limitation, utilizing Mobile Originating (MO), rather than Mobile Terminating (MT), signaling functionality to ensure at least one of signaling integrity, security and authenticity since all originating signals would be required, in at least some embodiments described herein, to pass the mandatory network AAA (Authentication Authorization and Accounting) procedures (e.g. utilizing Intelligent Network Nodes and functionality, as per International Telecommunications Union ITU-T Q.1200 series recommendations).

As detailed herein, at least some embodiments of the present disclosure are directed to one or more technological solutions that are designed to address one or more of technological problems identified herein by, for example, without limitation, allowing, online services and/or applications (e.g. Meta, Twitter, et.) to authenticate existing and/or newly registering users. In at least some embodiments, without limitation, the IAPP may present, for example, a Star Random Challenge (a process involving a Star Challenge as disclosed herein), requesting users to verify their existing accounts. In at least some embodiments, the exemplary STARKEY platform may be programmed to instruct the presentation of the Star Challenge during a service registration to correctly characterize the user account. In at least some embodiments, since the Star Challenge is predicated on a user (a person) manually activating the dial button to raise a call setup request to transport the encapsulated series of randomly generated address signals over the air toward the access controlling platform (e.g. the STARKEY Platform), and given that automated computer processes, such as BOTS and other nefarious actors and/or malicious code, cannot automatically activate such a dial request (e.g. pressing the connect call button under programmatic control), such automated computer processes are automatically excluded from completing the Star Challenge.

In at least some embodiments, since a telephone call is precluded from being conducted in the background, that is behind the currently visible application screen(s), and thus out of sight from unsuspecting users, the Star Challenge Response is programmed to necessitate that a particular user is actively engaged in the authentication process for it to complete and thereby succeed in determining that the account is an authentic, genuine user account.

Thus as described above and as detailed further below, disclosed ranked schemas are predicated on the negative outcome, or lack in response, to a Star Random Challenge as disclosed, segmenting the base by validating real (human) users when the said challenge response succeeds, and by inference, detecting non-human (BOTS) when the said Challenge response fails or is void any response. In some embodiments BOTS thus detected may be disabled (blocked) from operational activity until a secondary process is completed, for example, one that can ascertain and validate the BOTS intent and one that may more accurately identify its creator.

As detailed herein, at least some embodiments of the present disclosure are directed to one or more technological solutions that are designed to address one or more of technological problems identified herein by, for example, without limitation, utilizing the Digital Binary Star Challenge and Response BOT Detection systems, methods, components, elements, and associated architectures (collectively and interchangeably may be referenced herein as the Digital Binary Star Challenge and Response BOT Detection), as disclosed herein, that are modeled on characteristics displayed in an analog astrological system known as Binary (Twin) Stars, as they orbit around each other in a shared planet system, which in turn orbits around them. Typically, binary stars are two stars that are never simultaneously visible, rather the behavior of one (e.g. the light emitted) infers the existence of the other in a circumbinary planet system. A circumbinary planet, is a planet that orbits two stars instead of one, where the two stars orbit each other in a binary star system, while the planet typically orbits farther from the center of the system than either of the two stars.

In at least some embodiments, similarly the Digital Binary Star Challenge and Response BOT Detection is designed to infer the existence of one entity (BOTS) by the absence of a characteristically defining ability in another (a cellular ability to originate signals). In at least some embodiments, BOTS, entities that lack the cellular (i.e. phone) capability to signal and thus fail to respond to, for example, without limitation, the Star Random Challenge as disclosed herein, are thus inferred by HUMANS, beings that have cells (phones) and who can easily use cells (phones) that may emit cellular signals using the disclosed response to the challenge presented and thus are empirically detected.

As detailed herein, at least some embodiments of the present disclosure are directed to one or more technological solutions that are designed to address one or more of technological problems identified herein by, for example, without limitation, allowing for seamlessly and conclusively reverse detecting BOTS, as disclosed herein, economically at scale cannot be overstated. Once BOTS may be detected using this negative outcomes based on a "blind test" as disclosed herein, entire digital ecosystem(s) (e.g. the metaverse) and the information that is produced and consumed by their inhabitants, as data flows through it, may be reorganized and recalibrated, and may continue to operate as a largely self-regulated, autonomous ecosystem(s).

As detailed herein, at least some embodiments of the present disclosure are directed to one or more technological solutions that are designed so that, for example, without limitation, Authentic beings (humans) and their input may thus be clearly distinguished and distinctly presented from input created by artificial entities (i.e. automatons, BOTS) which may be malevolent in content and/or intent. For example, the Digital Binary Star Challenge and Response BOT Detection is predicated on getting the entire online user base to "call Twitter" (by proxy), to signal using their cellular phones up into the cloud, by challenging Twitter's base to dial highly randomized symbolic telephone numbers in order to reveal their true digital identity (e.g., their globally unique MSISDN). Thus, in at least some embodiments, the Digital Binary Star Challenge and Response BOT Detection is designed to identify and reveal the true nature and characteristics of online entities (e.g. "the user base"), and address the real practical, behavioral and technological challenges they present, serving to underscore the scope of the technological challenges being addressed by this present disclosure, such as, without limitation, amongst these being the ability to influence elections, followed closely by perpetrating fundamental economic inequities.

In at least some embodiments, for example, the Digital Binary Star Challenge and Response BOT Detection disclosed herein may now conclusively resolve various challenges presented by BOTS, click-farms and/or other malicious processes that seek to bypass human detection, since these BOTS and/or programs are typically executed remotely and/or virtually in the cloud, on the internet, using published APIs, etc., rather than executing locally on a physical computing device where the response requires access to cellular signaling functionality; consequently, BOTS and other various programs/processes lack the ability to mobile originate signals through an MNO and be authenticated as disclosed herein since they critically lack the presence of a registered SIM card with the requisite IMSI and security keys. Ironically, by analogy and in actuality, in the scope of this present disclosure and per the Digital Binary Star Challenge and Response BOT Detection, including various cellular challenge and response methods and systems disclosed herein, BOTS are thus literally and figuratively "entities who lack cells", that is "automatons who lack cellular signaling capability" and consequently, are incapable of recognizing and responding to the challenge presented as disclosed. Conversely, various technological solutions disclosed herein are predicated literally on "entities that do have cells", that is, human beings who have access to a cellular signaling device, and are capable of recognizing and responding to the challenge presented in accordance with various embodiments herein. Using TWITTER™ as an illustrative example, without limitation, the Star Challenge and Response methods, systems, components, and network architectures disclosed herein may now effectively segment/differentiate and/or partition/separate BOTS from the authentic human base.

For example, in at least some embodiments, presenting and on failing to pass a Star Random Challenge, by failing to respond from a cellular device in the disclosed signaling manner, an illustrative computer system of TWITTER™ may be programmed to then tag the account as unauthorized (non-human). In one non-limiting embodiment, the computer system of TWITTER™ may be programmed to then change a design schema for the unauthorized account, for example, from the current Blue style color theme to a Red (alert) theme (and/or make any other visual change(s) and segmentations as disclosed), and furthermore apply an appropriately colored (e.g. red) BOT visual "Badge" (i.e. visual schema) to the account profile and/or status. In some embodiments, all tweets posted from such unauthorized BOT account would then be instantly recognizable, for example, without limitation, both in color and/or in badge. In some embodiments, such exemplary market segmentation, the "separation of wheat from chaff", would further improve the technological operations of computer networks that may result in positive online social impact in crystalizing the metaverse, given that services would now have, for example, without limitation, a capability to authentically target and/or market products and/or services to their real authentic user base, excluding BOTS, since marketers may now have the option to elect to only target authentic (authenticated as detailed herein) users in their digital campaigns (e.g., digital automated computer recommendation engines). In at least some embodiments, for example, the Star Challenge Response methods, systems, components, and network architectures disclosed herein may, with the ability to segment the user base thus, be utilized to reshape and/or enhance the effectiveness of the digital advertising industry by permitting more granular/targeted campaigns directed to an authentic user base (e.g., online advertising, outdoor and/or indoor digital displays having social media capabilities, etc.). This enhanced advertising capability, to selectively target real human users while excluding BOTS, can both reduce Cost Per View (CPV) based advertising and increase the conversion and response rate, the ad-click through rate (CTR) since on such an accurately targeted and segmented campaign, overall less advertisements are being served to a more captive, real user facing audience.

In at least some embodiments, the IAPP may be programmed to periodically subject users to the Star Random Challenge as a security measure and/or resource management (e.g., freeing up computing resources by removing idle accounts). In at least some embodiments, the IAPP may be programmed to confirm that only a single account is associated with the identity (e.g., cellular identity (e.g. MSISDN), a globally unique hashed identity derived from the cellular identity (e.g. XM SI SDN), etc.).

In at least some embodiments, when the Star Random Challenge is not successfully completed, for example, the STARKEY Platform may return a failed/error indicator/identifier and/or nothing may be returned/received during a predetermined time period, identifying by the absence of a successful challenge/response, that an entity attempting to perform an action (e.g., access a restricted resource, login, post, retweet, etc.) may thus be deemed a BOT, and consequently, the IAPP may be programed to tag the account as a BOT and thereby change one or more visual characteristics of the IAPP and/or any content submitted and/or produced by the BOT to one of a plurality of schemas that may include without limitation, visual themes, sound-producing themes, vibration-inducing themes, or any combination thereof (e.g. color themes, content-related themes (e.g., domain themes (e.g., type of content), source themes), audience-related themes, etc.).

In at least some embodiments, when the Star Random Challenge is not successfully met, the IAPP, or the IAPP hosting platform, may be programmed to execute one or more machine-learning techniques, including machine-learning models based on classifying and/or algorithmic ranking schema(s), to, without limitation, classify the BOT by assigning/associating a particular service category to/with the BOT. In some embodiments, the IAPP may classify BOTs based on a plurality of categories and/or classifications for selected activity or activity category (e.g., tweeting), and/or source(s)/entity(ies) associated with BOTS (e.g. a source (e.g. IP address) from where a BOT communicates) that may be classified into source categories based on one or more parameters. For example, the classification may be further determined by a subject domain of the IAPP (e.g., health, news, marketing, education, research, etc.) and/or one or more metadata characteristics of content published by the IAPP. In some embodiments, in addition to classifying the users, the BOTs, or both, the IAPP may further rank such as, without limitation:

BOT(1): News/Orange/50%,

BOT(2): News/Orange/70%.

In at least some embodiments, the exemplary machine-learning techniques, including machine-learning models, utilized herein, may be chosen from, but not limited to, decision trees, boosting, support-vector machines, neural networks, nearest neighbor algorithms, Naive Bayes, bagging, random forests, and the like. In some embodiments and, optionally, in combination of any embodiments described above or below, an exemplary neutral network technique of the present disclosure, for example, to classify and/or rank BOTS, may be one of, without limitation, feedforward neural network, radial basis function network, recurrent neural network, convolutional network (e.g., U-net) or other suitable network. In some embodiments and, optionally, in combination of any embodiment described above or below, an exemplary implementation of Neural Network of the present disclosure may be executed as follows:

i) Define Neural Network architecture/model, ii) Transfer the input data to the exemplary neural network model, iii) Train the exemplary model incrementally, iv) Determine the accuracy for a specific number of timesteps, v) Apply the exemplary trained model to process the newly-received input data, vi) Optionally and in parallel, continue to train the exemplary trained model with a predetermined periodicity.

In some embodiments and, optionally, in combination of any embodiment described above or below, the exemplary trained neural network model may specify a neural network by at least a neural network topology, a series of activation functions, and connection weights. For example, the topology of a neural network utilized by the IAPP may include a configuration of nodes of the neural network and connections between such nodes. In some embodiments and, optionally, in combination of any embodiment described above or below, the exemplary trained neural network model may also be specified to include other parameters, including but not limited to, bias values/functions and/or aggregation functions. For example, an activation function of a node may be a step function, sine function, continuous or piecewise linear function, sigmoid function, hyperbolic tangent function, or other type of mathematical function that represents a threshold at which the node is activated. In some embodiments and, optionally, in combination of any embodiment described above or below, the exemplary aggregation function may be a mathematical function that combines (e.g., sum, product, etc.) input signals to the node. In some embodiments and, optionally, in combination of any embodiment described above or below, an output of the exemplary aggregation function may be used as input to the exemplary activation function. In some embodiments and, optionally, in combination of any embodiment described above or below, the bias may be a constant value or function that may be used by the aggregation function and/or the activation function to make the node more or less likely to be activated.

In some embodiments, the exemplary trained neural network model may be trained based training data set(s) derived from historical and/or present activity data related to one or more activities performed within the IAPP, including one or more of: user profile data, including, without limitation, activity preferences, contextual information associated with the user profile data, activity tracking data, geographical identifier(s), Internet Service Provider's geographic location, type of activities, social impact factors, etc. In some embodiments, historical and/or present activity data may be activity data related to one or more activities performed by BOTs only (BOT activity data). In some embodiments, historical and/or present activity data may be activity data related to one or more activities performed by both BOTs and physical users (e.g., users who successfully completed the Start Random Challenge). In some embodiments, historical and/or present activity data may be activity data related to one or more activities performed by physical users only (e.g., users who successfully completed the Start Random Challenge).

In some embodiments, since various communications protocols and network architectures of the present disclosure such as, without limitation, an exemplary so-referenced herein "STARKEY" protocol, would be conducting communications entirely along the MO signaling path, they would overcome the need for networks to incur the resources required to, for example, without limitation, page and locate cellular devices, as may be typically required for various 2FA protocols, since the cellular device itself would now transmit rather than receive the authorizing codes and/or signals.

As detailed herein, at least some embodiments of the present disclosure are directed to one or more technological solutions that are designed to address one or more of technological problems identified herein by, for example, without limitation, utilizing a cellular HOOK FLASH signaling protocol that powers the MO authentication protocol, that may operate, without limitation, synonymous to a fixed line telephone going OFF HOOK (e.g. user lifting a phone receiver), and thereby immediately disclosing its location to at least one network element (e.g. the Central Office). For example, at least some embodiments of the present disclosure would utilize an exemplary Instant Symbol Originating Signaling functionality that would be initiated/activated by the users activating (e.g. pressing) at least one particular symbol on a telephony dial pad, herein also referenced as "Symbol Factor Authentication" (SFA), the ability to transmit a digital cellular symbolic signal as the authenticating factor. For example, in some embodiments the SFA would be based on users, activating (e.g. pressing) the symbol "*" ("Star Factor Authentication").

As detailed herein, at least some embodiments of the present disclosure are directed to one or more virtual technological solutions that are designed to address one or more of technological problems identified herein by, for example, without limitation, utilizing any phone without change (so-called "zero footprint" technology).

As detailed herein, at least some embodiments of the present disclosure are directed to one or more technological solutions that are designed to address one or more of technological problems identified herein by, for example, without limitation, operating in the mass dial signaling stream.

As detailed herein, at least some embodiments of the present disclosure are directed to one or more technological solutions that are designed to address one or more of technological problems identified herein by, for example, without limitation, delivering instant (flash) high frequency secure authentication at scale.

As detailed herein, at least some embodiments of the present disclosure are directed to one or more technological solutions that are designed to address one or more of technological problems identified herein by, for example, without limitation, operating anonymously without exposing any personal identifying data of a user.

As detailed herein, at least some embodiments of the present disclosure are directed to one or more technological solutions that are designed to address one or more of technological problems identified herein by, for example, without limitation, providing/delivering a universal digital master key for unlocking internet resources (e.g. online services).

As detailed herein, at least some embodiments of the present disclosure are directed to one or more technological solutions that are designed to address one or more of technological problems identified herein by, for example, without limitation, allowing a Mobile Network Operator (MNO) to charge for delivering/providing access controlling mechanisms of the present disclosure (e.g. authentication service, login service, verification service, dispensing service, etc.). In some embodiments, the MNO may, for example, charge a predetermined or variable amount (e.g. a penny) per unlocking activity (e.g. releasing transaction, unlocking online resource, one-time login, etc.), thus allowing MNO's to increase its capacity utilization and/or operational efficiency at high frequency and mass scale without impacting the MNO's telephony operations. In some embodiments, the MNO may charge by creating a session data record that may be presented to a user as an entry in the user's itemized cellular bill.

In at least some embodiments, the character "X" in conjunction with other "X" characters, referenced herein, may represent a series of randomized decimal digits (0-9) to be utilized as detailed herein (e.g. the STAR challenge) except where otherwise indicated. For example, the series of "XXX XXX XXX" represents a randomized number describing 10^9 (billion) permutations (e.g. a billion challenges). For example, the series "XXX XXX XXX XXX" represents a randomized number describing 10^12 (trillion) permutations (e.g. a trillion challenges). For example, the series "XXX XXX XXX XXX XXX" represents a randomized number describing 10^15 (quadrillion) permutations (e.g. a quadrillion challenges).

In some embodiments, the illustrative STAR challenge may be symbolically prefixed. In some embodiments, without limitation, this prefix may be a Star (*), Double Star (**), Hash (#), Double Hash (##), Star Hash (*#), Hash Star (#*) or any other symbol or combination of symbols. In some embodiments, (e.g. a single Star (*)) such a symbolic prefix would shift the address signals one position to the right, escaping thus the regular dialed address domain into a previously unutilized symbol/number realm (e.g. star number realm, when utilizing the symbol "*").

In some embodiments, the character "Y" in conjunction with other "Y" characters, referenced herein, may represent a telephone number having a series of digits such as decimal digits (0-9) except where otherwise indicated. For example, the series of "+Y YYY YYY YYYY" may represent a typical e164 formatted MSISDN (e.g. 11 digits, with + as the outbound international dialing symbol). Note, while numbers may be presented with spaces for visual acuity, numbers are typically dialed without spaces. The MSISDN may be transported and presented as the Calling Line Identity (CLI).

At least in some embodiments, the term "caller(s)", and like, is interchangeable with the "A" party. The party is interchangeable with the associated telephony device (telephone). Embodiments may show the callers as "A", "B", "C" etc., to distinguish between different callers.

At least in some embodiments, the term "IP Application" (IAPP) and like, as referenced herein, may describe an internet connected application, including, without limitation, an internet browser and/or a native mobile application. At least in some embodiments, the terms "pairing", "coupling", and alike describes either transiently or persistently logically associating an identity (e.g. a cellular identity (e.g. MSISDN, hashed XMSISDN, etc.) with an IAPP. At least in some embodiments, pairing may be accomplished by storing, for example, an identity (e.g. a cellular identity (e.g. MSISDN), a globally unique identity (GUID) derived from the cellular identity (e.g. XMSISDN), etc.) in at least one of: application memory and/or variables, non-transient memory, database, cache, browser application context using storage components such as persistent cookies, cached URL parameters, etc. At least in some embodiments, the identity may be stored/kept local to a domain or may be global (e.g. cloud-based) in context, permitting cross domain reference.

At least in some embodiments, the identity may be written into a blockchain-type distributed storage. In some embodiments, the STARKEY Platform and/or the IAPP may be configured to interact and/or to store data in one or more, public, private and/or private-permissioned cryptographically-protected, distributed databased such as, without limitation, a blockchain (distributed ledger technology), Ethereum (Ethereum Foundation, Zug, Switzerland), and/or other similar distributed data management technologies. For example, as utilized herein, the distributed database(s), such as distributed ledgers ensure the integrity of data by generating a chain of data blocks linked together by cryptographic hashes of the data records in the data blocks. For example, a cryptographic hash of at least a portion of data records within a first block, and, in some cases, combined with a portion of data records in previous blocks is used to generate the block address for a new digital identity block succeeding the first block. As an update to the data records stored in the one or more data blocks, a new data block is generated containing respective updated data records and linked to a preceding block with an address based upon a cryptographic hash of at least a portion of the data records in the preceding block. In other words, the linked blocks form a blockchain that inherently includes a traceable sequence of addresses that can be used to track the updates to the data records contained therein. The linked blocks (or blockchain) may be distributed among multiple network nodes within a computer network such that each node may maintain a copy of the blockchain. Malicious network nodes attempting to compromise the integrity of the database must recreate and redistribute the blockchain faster than the honest network nodes, which, in most cases, is computationally infeasible. In other words, data integrity is guaranteed by the virtue of multiple network nodes in a network having a copy of the same blockchain. In some embodiments, as utilized herein, a central trust authority for sensor data management may not be needed to vouch for the integrity of the distributed database hosted by multiple nodes in the network.

At least in some embodiments, once paired thus, the illustrative IAPP may make reference to the associated identity (e.g. cellular identity) in future activities (e.g. processing transactions, accessing access-restricted resources, etc.) so that the exemplary STARKEY Platform would be programmed to expect (anticipate) signals from the paired device and thus, for example, without limitation, previously identified cellular device being associated to at least the expected access control digital key.

For example, at least in some embodiments, utilizing the disclosed expectation authentication mechanism may permit a MANY:ONE (Many-to-One) binding relationship, where many cellular devices may emit the one and same access control digital key (e.g. telephone calls having the same address signals) and yet still be uniquely identified and bound to, without limitation, an IAPP, an online accessed-restricted resource provider, etc., since the access controlling platform is set to monitor for incoming signals (e.g. phone calls, SMS messages, USSD messages) from the paired and thus uniquely associated and identified identity (e.g. MSISDN) matching an access authentication expectation record set for the paired identity, including thus identity data and common same access control digital key, which is logically associated to the access restricted resource for the paired identity.

In at least some embodiments, the IAPP and/or the internet service requesting Star Challenge login to a restricted resource, as detailed herein, would logically associate the currently active and pending login session with the anticipated authorization confirmation to be received from the access controlling platform (e.g., the STARKEY Platform), once the access controlling platform confirms receipt of the static signal(s) from the expected paired identity, specified by the IAPP as a parameter in an access controlling API. For example, without limitation, the illustrative IAPP may create a unique Star login session identifier "SL-X" and, utilizing the Star API, request Star Login access for the previously identified device ID MSISDN-A, XMSISDN-A or XMSISDN-A4.

In at least some embodiments, upon receiving a static star signal from a device identified as MSISDN-A, whose CGH equals XMSISDN-A, the access controlling platform may then communicate successful Star Login by device XMSISDN-A, which the IAPP has associated with login session SL-X, thereby uniquely and securely granting access to the restricted resource being requested and safeguarded by the Star login procedure. In at least some embodiments, an IAPP that has previously been paired with a known cellular identity (e.g. XYM4), as described herein (e.g. Star Random Challenge Response), may request the access controlling platform to notify the IAPP, for example utilizing a callback URL, when static signal(s) is/are received from a cellular device whose hashed MSISDN together with the Secret Master Key, matches the recorded hashed identity (e.g. XYM4). Thus receiving an authentication confirmation that the cellular device whose identity matches the identity paired with the IAPP, is analogous to the device unlocking the restricted device with its unique digital signature ("Star Key").

As detailed herein, at least some embodiments of the present disclosure are directed to one or more technological solutions that are designed to address one or more of technological problems identified herein by, for example, without limitation, presenting thus, a randomized, and optionally extended, telephone number to call that would uniquely bind the challenge (e.g. the STAR challenge) and the responding cellular device to an IAPP, an online accessed-restricted resource provider, or similar others, based on utilizing a trusted network (e.g. a cellular network) to provide an identity (e.g. MSISDN) associated with the device that emits the matching response. In at least some embodiments, for example, without limitation, the cellular identity (e.g. MSISDN) would be an end user network presentation that would be provided by the cellular network based on a more intrinsic identity called the International Mobile Subscriber Identity (IMSI), which may be stored on the Subscriber Identification Module (SIM) embedded/included in every cellular phone. For example, the Home Location Register (HLR) or Home Subscriber System (HSS) may store a mapping between IMSI and MSISDN. In some embodiments, a Temporary Mobile Subscriber Identities (TMSI) may be allocated to mobile subscriber equipment (i.e. cellular phone) in order to support subscriber identity confidentiality. The TMSI is mapped to the IMSI internally within the MNO, so only the mobile equipment and the MNO knows the mapping. By utilizing a TMSI, the network minimizes IMSI exposure over the air interface. As detailed herein, at least some embodiments of the present disclosure are directed to one or more technological solutions that are designed to address one or more of technological problems identified herein by, for example, without limitation, relying on the trusted cellular network that, rather than the user or the device, would control and present a Calling Line Identity (CLI), as in:

Source Phone [IMSI/TMSI]>Network [TMSI/IMSI: MSISDN]>Destination Platform [CLI].

As detailed herein, by signaling (e.g. address signaling) in accordance with various embodiments of the present disclosure, each user would be individually and digitally signing a cellular certificate (CDR), authenticating access to an access-restricted resource (e.g. internet service, electronic game console-based offering (e.g. skin, avatar, game pass, etc.), an item from a physical vending machine, ATM-based transaction, etc.). Accordingly, in at least some embodiments, utilizing various disclosed methods, systems, network architectures, and communications protocols would deliver the digital equivalent of a virtual master key (e.g. a virtual cellular master key), also interchangeably referenced herein, without limitation, as a "STARKEY" that would be utilized to unlock various resources (e.g. digital services, digital products, physical services, physical products, etc.).

In some embodiments, by shifting the dialed subscriber domain on a symbolic prefix (e.g. STAR (*) symbol), various disclosed methods, systems, network architectures, and communications protocols would shift the entire known dial address space one digit to the right, encapsulating a hitherto unutilized dial domain for signaling and/or switching advanced user services. For example, without limitation, the STAR (*) symbol may be utilized as the universal key on the telephone dial, and, as interchangeably referenced herein, be a symbolic network routing prefix and the name given to a network signaling and switching node that may service and control one of more elements of various systems and/or network architectures disclosed herein, and also may be interchangeably referenced herein, without limitation, as illustrative STARKEY systems, network architectures, and/ or elements. In some embodiments, while, for example, without limitation, the illustrative STARKEY Platform is depicted as a SIP signaling system/server/network architecture, the illustrative STARKEY Platform and variations and extensions thereof that would be reasonably foreseen based on one or more principles detailed in the present disclosure (even if not specially detailed herein). In at least some embodiments, various access controlling network architectures, interchangeably may be referenced herein also as STAR architectures, are detailed herein for illustrative purposes only and other signaling systems, network architectures, elements, and/or communications protocols (e.g. without limitation, SS7, ISUP) may be similarly designed, adopted, and/or modified in accordance with one or more principles described herein to achieve one or more same or suitably similar practical, technological improvements.

In some embodiments, for example, without limitation, the illustrative IAPP programmed in accordance with one or more principles of the present disclosure would operate/function as a so-called "virtual/digital Automated Teller Machine" ("V-ATM"), by permitting users to wirelessly, without contact, authenticate and pair their computing device (e.g. cellphones) with an interactive cardless (e.g. Virtual VISA) session for cash withdrawals from an MSISDN/XYMSISDN-linked bank account. For example, without limitation, to authenticate such cash withdrawal, in accordance with one or more principals disclosed herein, various disclosed methods, systems, elements, network architectures, and/or communications protocols would be programmed to utilize the described identity (e.g. the cellular identity) as an internal banking identity and/or a proxy to the internal banking identity to deliver seamless interworking between various involved systems, where:
The Cell Phone Number [MSISDN/XYM4/XIM4]=The Bank Account Number [MSISDN/XYM4/XIM4].

In some embodiments, without limitation, the MSISDN/XYM4/XIM4 may be set as a primary bank account number. In some embodiments, the MSISDN may be utilized as a proxy, aliased to the primary (internal) account number of, for example, a financial institution/service provider (e.g. bank, brokerage, credit card issuer, etc.), a utility company (e.g. cable, gas utility, electrical utility, etc.). In some embodiments, for example, without limitation, a computer system of a financial service provider may be programmed to automatically create the MSISDN-numbered and/or linked/associated bank account (e.g. electronic/digital wallet) upon receiving funds designated to the said MSISDN, even when such MSISDN numbered and/or linked/associated bank account would not yet exist. In some embodiments, without limitation, since the recordation of money may be performed via entry(ies) recorded in a database (e.g., session data record), the MSISDN based identities (e.g. MSISDN based financial identity, MSISDN based utility identity, MSISDN based government agency identity, etc.) and their management (e.g. financial account management, etc.) would be readily realized based on one or more principles disclosed herein.

In some embodiments, based on one or more principles disclosed herein, the exemplary Mobile Network Operator (MNO) may be utilized/modified to become/perform as, for example, without limitation, as a Virtual Bank, permitting users to receive and sends funds directly into and from their Cellular Wallets (e.g. cellular accounts with the MNO). In some embodiments, based on one or more principles disclosed herein, the exemplary MNO may maintain a MNO-based ledger (e.g. MNO Billing System) and/or, utilizing one or more distributed ledger/blockchain technologies (e.g. Ethereum-based technology, Hyperledger Fabric™ (IBM), etc.) that may be configured to interoperate with computer systems of financial institutions (e.g. banks) to permit cash redemption at ATMs of participating ATM networks as disclosed herein.

In some embodiments, based on one or more principles disclosed herein, such as, without limitation, various disclosed cellular signaling methods and systems together with the unified cellular account number management, financial institutions (e.g. banks) can onboard the unbanked masses virtually, without having to issue physical debit/credit cards. For example, users may then bank and transact on their cellular identities (e.g. MSISDN numbers) to wirelessly receive funds into their cellular identified bank accounts (e.g. cellular account e-Wallets) from others (e.g. the economically empowered), and then wirelessly withdraw cash by pairing their cellular devices with ATM sessions, using, for example, without limitation, the Star Challenge (e.g. displaying the series of randomized digits or QR code encapsulating the series of random digits or the series of random digits prefixed with symbol(s)), as disclosed herein.

In some embodiments, based on one or more principles disclosed herein, on a first time STAR Challenge, an exemplary ATM may be programmed, without limitation, to request the user to enter a banking PIN using the ATM terminal to secure access, once the Star Random Challenge has been met. Thus, in at least some embodiments, while an exemplary cellular network would be utilized to identity a user facing the ATM by presenting the STAR Challenge, an associated financial (e.g. banking) network would secure access to funds by requiring the user to enter and record a secret PIN for future withdrawals at the ATM terminal on first time access. In some embodiments, based on one or more principles disclosed herein, neither the cellular nor the ATM network would be in total control of access, thus neither may individually gain full and compromised access. In some embodiment, the ATM-associated STAR Challenge may be presented as a telephone number to dial, and/or as a telephony QR code to scan, permitting the user to scan and automatically address the connection (e.g. the QR code would encapsulate the random series of digits that on scanning would be automatically entered into the user's phone as the number to dial), rather than requiring the user to manually input and dial the random series of digits.

In some embodiments, based on one or more principles disclosed herein, without limitation, users may activate an IAPP's STAR Challenge button and/or a link encapsulating a "tel:" reference, which may similarly link to and present a native device dialer preaddressed with the randomized STAR Challenge digits. For example, without limitation, a user interface element associated with the STAR Challenge may encapsulate the following or similar HTML reference:
　　<a href="tel:*XXX XXX XXX">:*XXX XXX XXX</a>.

In some embodiments, based on one or more principles disclosed herein, the illustrative STARKEY platform/system/architecture may be programmed to operate in accordance, without limitation, to the following illustrative non-limiting end user signaling protocol of the present disclosure upon dialing the STAR Challenge:
　　(1) Instantly Play a Ring Back Tone (RBT); and
　　(2) Momentarily Connect and Disconnect the Call.

For example, without limitation, by instantly presenting RBT, the above illustrated protocol of the present disclosure would ensure a short responsive, Post Dial Delay (PDD) experience. In at least some embodiments, by momentarily connecting and then disconnecting the call, a technique herein referenced as so-called "HOOK FLASHING," the illustrative STARKEY platform/system/architecture would be programmed to, for example, without limitation, uniquely generate, and/or caused to generate by the MNO, an early Call Data Record (CDR), may also be interchangeably referenced herein as a session data record, on the originating network (e.g. mobile originating network), instantly recording the authentication transaction and seamlessly transporting the recorded cellular certificate into, for example, the cloud for internet reference as described herein. For example, in accordance with the above illustrative non-limiting end user signaling protocol of the present disclosure, the entire STARKEY transaction would be typically completed in just one second or less to deliver a FLASH user engagement. For example, in some embodiments, one or more technological solutions of the present disclosure may be referenced as "FLASH Authentication." In some embodiments, in accordance with the technological solutions of the present disclosure, the resulting event record (e.g. the cellular billing ticket, also may be reference herein as the CDR (Call Data Record) or session data record), contains the Star signaling event (e.g. generated upon the user's cellular device emitting the address signal(s) upon activation of a "*" button). In some embodiments, in accordance with the technological solutions of the present disclosure, the PDD experience may last 1 second or less (e.g. from 1 millisecond to 1 second). In some embodiments, in accordance with the technological solutions of the present disclosure, the PDD experience may last 500 milliseconds or less (e.g. from 1 millisecond to 500 milliseconds). In some embodiments, in accordance with the technological solutions of the present disclosure, the PDD experience may last 100 milliseconds or less (e.g. from 1 millisecond to 100 milliseconds). In some embodiments, in accordance with the technological solutions of the present disclosure, the PDD experience may last 50 milliseconds or less (e.g. from 1 millisecond to 50 milliseconds). In some embodiments, in accordance with the technological solutions of the present disclosure, the PDD experience may last 1 millisecond or more. In some embodiments, the PDD may be eliminated entirely by forgoing to present a RBT.

In some embodiments, all star (*)-prefixed STAR Challenges may present as having a fixed length number (e.g. comprising 9, 12, 15 digits, etc.), that may be uniformly rated, for example, at 1 penny per transaction that may be referenced as "STAR AUTHENTICATION TOLL." For example, without limitation, the STAR AUTHENTICATION TOLL model, and associated access controlling network architectures may be operated by matching all fixed length symbol-prefixed (e.g. star (*)-prefixed) dialed numbers in an Online Charging System rating engine, which may uniformly apply the associated charge for switching the disclosed STARKEY-based transaction. In one embodiment the OCS sets a tariff switching interval to a minute rather than a second refresh interval, for example, by setting the tariffSwitchingInterval parameter in the AChBillingChargingCharacteristics function (per the ETSI TS 129 078 V12.0.0 (2014-10) specification) equal to an integer value 60, in one non limiting example, thereby ensuring that STAR Authentication Toll applied to transactions are debited discretely, rather than repeatedly during a single transaction. For example, in one embodiment, a STAR Challenge response may result in a Call Hold Time (CHT) exceeding one second, however on utilizing a minute-based tariff switching interval, the account associated with the cellular device may only be charged once, to ensure a fixed service toll/fee would be levied.

In at least some embodiments, the disclosed Star Random Challenge and Response methods, systems, components, and network architectures disclosed herein may be applied to existing online services and applications to authenticate existing and newly registering users. In one non limiting example, the IAPP may present a Star Random Challenge requesting users to verify their account. In at least some embodiments, since the Star Challenge may be predicated on a user (a person) manually activating the dial button to raise a call setup request to transport the encapsulated the series of randomly generated address signals over the air toward the access controlling platform, and given that automated processes, such as BOTS and/or other nefarious actors and/or malicious code, cannot automatically activate such a dial request (e.g. pressing the connect call button under programmatic control), such automated processes may be automatically excluded from completing, for example, the Star Random Challenge. In at least some embodiments, since a telephone call may be precluded from being conducted in the background, that is behind the currently visible application screen(s), and thus out of sight from unsuspecting users, the Star Challenge Response necessitates that a user is actively engaged in the authentication process for the Star Challenge Response to be completed and thereby the Star Challenge Response succeeds in determining that the account is an authentic, genuine user account.

[FIG. 26A]

FIG. 26A is an illustrative non-restrictive example of utilizing a cellular-signaled access control methodology with expected random-generated cryptographic key(s)/challenge(s) in accordance with novel communications protocols and access controlling network architectures of at least some embodiments of the present disclosure. In some embodiments, based on one or more principles disclosed herein, an exemplary IAPP on an Internet-enabled computing device 2601 is instructed to display a "STARKEY" locked screen requiring user identification for accessing at least one access-restricted digital resource. In some embodiments, the IAPP may be instructed/programmed to present an access controller interface element (e.g. lock icon) 2602 to indicate that access is currently restricted. In at least some embodiments, the IAPP may be instructed/programmed via an API, to also present a randomized series of telephone digits (e.g. an access control component of the STAR Challenge, the expected access control digital key) in a user interface element 2603, that would have been provided, for example, without limitation, by the illustrative STARKEY Platform (not shown).

In at least some embodiments, the API requests a user interface element (2603) that is rendered by the IAPP to display the Star Challenge, for example in a button. In one embodiment the user interface element is described by, for example, without limitation, an HTML and or CSS script that is received and rendered by the IAPP. As described above, the user interface element may further incorporate, for example, programming instructions setting an "href=tel:" reference link (also known as a "click to call" button/link), that on activation launches and presents a native dialer APP (e.g. the telephone application) on a cellular enabled device, that has the series of random digits returned by the access controlling platform, automatically pre-addressed for dialing. In one non-limiting embodiment, programming instruction may render the user interface element (e.g. link or button) to display a prompt for the user to activate the user interface element to authenticate the device or request access to a restricted online resource (e.g. without limitation, a button or a link labelled "Star Login", or "Star Sign in", or "Star Auth", etc.).

On activating a user interface element that prompts the user thus, rather than displaying the actual Star Random Challenge itself, the interface element may, as described above, utilize a reference link (e.g. a click-to-call link) to launch the native dialer on a cellular device, which has the Star Challenge, the series of random digits, automatically pre-addressed and ready to dial.

In some non-limiting embodiments, the Star Challenge request may return, via the API, the random series of digits or programming instruction to render an interface element (e.g. HTML/CSS button, link, etc.) that may either encapsulate or may display the series of randomized digits or an interface element, wherein the former rendition only displays the random series of digits upon activation, and whereupon activation the series of digits would be automatically entered (i.e. pre-addressed) in the native dialer application as described. By returning programming instruction to render a user interface element, the Star Challenge API may thus present stylized instruction to render a consistently branded Star Challenge user interface (e.g. button shape, size, color, display text font and size, button animation effects etc.) instantly recognizable across a plurality of IAPPS.

Further, in at least some embodiments, the user would be requested to dial the entire STAR Challenge 2603 from a cellular phone, which may for example, without limitation, be indicated by a phone icon (as displayed, at right).

In some embodiments, based on one or more principles disclosed herein, the STARKEY Platform may be programmed to utilize a random engine generator (e.g., a random number generator application and/or any other suitable technique to generate a series of randomly generated digits (e.g. an access control component of the STAR Challenge, the expected access control digital key) 2603 and then return it to the IAPP utilizing a STARKEY API, in response to a request for authentication. Additionally, the STARKEY Platform may be programmed to store an expected access data record in an exemplary form of [?: RAN] which would indicate that the random number RAN has been generated and would be expected as the response from an as yet unknown cellular device ("?"). While the expected access data record shows a single datapoint for clarity, additional data may be recorded in the expectation record, including without limitation, the internet address (IPE) of the IAPP, permitting the access controlling platform to communicate with and identify the IAPP during the Challenge Response life-cycle, and absent a verified cellular identity having been determined by the MNO and communicated to the access controlling platform, per the disclosed system and methods, furthermore data such as unique IAPP signatures (e.g. GUID, NONCE etc.) that permit the access controlling platform to uniquely identify the IAPP. In some embodiments, this communication is synchronous and bi-directional, utilizing IP Sockets (e.g. Web Sockets). In some embodiments this communication may be asynchronous and/or unidirectional (e.g. Callbacks). In some embodiments, there may be a timing condition event programmed to confirm that the response would be received by the STARKEY Platform within a predetermined time interval (e.g. 1-30 seconds, 1-60 seconds, 1 120 seconds, 1-180 seconds, etc.).

As shown in FIG. 26A, the illustrative randomized telephone number (the STAR Challenge) 2603 may include 12 random decimal digits (XXX XXX XXX XXX) prefixed by the star symbol (*). This 12 digit random number series may be utilized to provide one trillion (10^12) possible permutations/keys/STAR Challenges. In some embodiments, based on one or more principles disclosed herein, the Star (*) prefix would set a call route that would direct the cellular signals (e.g. cellular call, SMS message) toward the exemplary STARKEY Platform as, for example, without limitation, described in U.S. patent application Ser. Nos. 17/567, 044 and 17/567,051.

In some embodiments, based on one or more principles disclosed herein, the random STAR Challenge 2603 may be presented as a software button (the access controller interface element) that the user may tap/click, or otherwise activate (e.g. under voice control and/or other biometric trigger). In addition to the STAR Challenge 2603, presented as a telephone number, the IAPP may be instructed/programmed to present a barcode (e.g. a telephone number QR code) 2604 which would be generated as a result of encapsulation and encoding of the STAR Challenge sequence 2603, permitting a user to scan rather than manually dial the STAR Challenge on a cellular phone that may be physically distinct from the IAPP-running device (e.g. desktop/laptop computer, ATM terminal, etc.).

In some embodiments, based on one or more principles disclosed herein, when the IAPP-running device 2601 and the cellular phone 2605 are one and the same physical device (e.g. a smart phone, an internet enabled cellular device, etc.), the IAPP (e.g. button 2603) may be programmed so that by tapping or similarly activating the telephone-displayed button with randomized digits 2603, the IAPP would causes to launch, for example, without limitation, a native telephone dialer function of the cellular device 2605, with the STAR Challenge, the expected access control digital key, automatically entered as the dial address (telephone number).

In some embodiments, based on one or more principles disclosed herein, once the cellular phone dialer screen (dial pad screen) 2605 displays the STAR Challenge telephone number, the user may initiate the call, for example, by pressing a connect call (e.g. typically green in color) button, shown on the bottom of the cellular phone dialer screen 2605. In some embodiments, based on one or more principles disclosed herein, on pressing the connect call button, the cellular phone's display may change from the dial pad screen 2605 to an active call screen 2606, graphical user interface, showing that calling is in progress. In some embodiments, based on one or more principles disclosed herein, during this call setup procedure, the cellular-service enabled device would emit address signals, encoding, for example, without limitation, the STAR Challenge (or the expected access control digital key) 2603, to a cellular network (not shown).

In some embodiments, based on one or more principles disclosed herein, on receiving the "*XXX XXX XXX XXX" address signals in the call setup request, a mobile originating switching element (e.g. MSC/gsmSSF) would enter the Originating Basic Call State Model (OBCSM), encountering the Initial Detection Point (e.g. INITDP: DP2 Collected_Info). In some embodiments, the INITDP would establish a call control dialog between the network switching element and a network controlling element (e.g. SCP/gsmSCF). In some embodiments, this switching-controlling dialog may be established utilizing a MAP/SS7 signaling protocol.

In some embodiments, a Mobile Network Operator (MNO) may configure the network switching element, by setting a wildcard (i.e. a default "catch all", routing entry) in the switching element routing table(s), that would route all undefined Star (*)-prefixed numbers to the STARKEY Platform. In some embodiments, such a wildcard routing entry may translate the Star (*) symbolic address into a short internal routing address that may typically, without limitation, include three or four digits that would, in turn, identify a route towards the STARKEY Platform as the destination. In some embodiments, based on one or more principles disclosed herein, similar routing protocol may be followed for any symbolically prefixed STAR Challenges based on one or more symbols (e.g. without limitation "*", "**", "#", "##", etc.).

In some embodiments, based on one or more principles disclosed herein, the MNO may permit all such wildcarded and undefined star calls to proceed without charge, by zero rating all such star numbers. In some embodiments, the MNO may rate all undefined symbol prefixed numbers (e.g., Star number) at a fixed toll/cost that is less than a large monetary unit (e.g., 1 penny to 99 pennies), requiring the network's respective charging elements to ensure that the account associated with the caller has at least the amount of the toll (e.g. a penny) in credit available before continuing the call and routing the call to the STARKEY Platform. In some embodiments, based on one or more principles disclosed herein, call charging and/or rating by various Online Charging Systems (OCS) may be performed as detailed, without limitation, in U.S. patent application Ser. Nos. 17/567,044 and 17/567,051, whose relevant disclosure is incorporated herein for at least such purpose.

In some embodiments, based on one or more principles disclosed herein, on passing, for example, without limitation, a zero rated or one penny credit verification, the network controlling element may be programmed to instruct the network switching element to CONTINUE the call, routing the call request to the STARKEY Platform. In some embodiments, the network billing and/or controlling elements may translate a star (symbolic) address prefix into an internal routing prefix addressing the STARKEY Platform as final switching destination, and then instruct the network switching element to CONNECT the call on the now modified (translated) address. In some embodiments, the network switching element may be programed to route the call along an associated so-called "STAR" trunk to a network gateway or border controller element (e.g. GMSC/SBC), which in turn would translate ISUP IAM call setup signaling into SIP signaling (e.g. SIP INVITE). In some embodiments, based on one or more principles disclosed herein, on receiving a SIP INVITE, the STARKEY Platform would perform a confirmation whether an active [?:RAN] expected access data record exists.

In some embodiments, based on one or more principles disclosed herein, when the active expectation data/record exists, that is the address signals received in the INVITE message matches the sequence and series of the STAR challenge (or the series of random digits of the STAR Challenge, or the expected access control digital key) 2603, the STARKEY Platform may be programmed to extract the source phone number (e.g. the calling line identity (CLI)) from the call setup header information (in one non-limiting example, from the SIP P-Asserted-Identity Header). In some embodiments, the CLI may be presented to the STARKEY Platform in the international e.164 notation so as to present a fully qualified MSISDN. In some embodiments, the STARKEY Platform may be programmed to normalize the CLI into the e.164 format.

In some embodiments, Network Originating Identification (OI) services may be used to provide the information about the source of the call. Usage of the OI is similar to usage of CLI, however OI is extended to cover networks other than the PSTN/ISDN/PLMN. In one embodiment the SIP protocol (e.g. the SIP P-Asserted-Identity Header) is used to carry the OI information, whereas for CLI Signaling System #7 (SS7) is used. Furthermore, the OI may consist of different kinds of identifiers, not only E.164 numbers as is the case with CLI.

In at least some embodiments, for example, the Star Challenge/the expected access control digital key may be routed by network switching and routing elements based on a fixed maximum address signal length for a sequence of address signals, specifying, for example, without limitation, the length of the series of digits being greater than or equal to a specified number (e.g. greater than N digits (e.g., 15 digits per e.164 notation). In some embodiments, such address signal length-based routing may permit, for example, without limitation, a network switching element to distinguish and/or switch (route) Star Random telephone number challenges to an access controlling platform (e.g., the StarKey Platform) by default, even without receiving a routing prefix to the RAN address signals, without the address signals being erroneously interpreted as regular PLMN or PSTN subscriber telephone numbers, thus permitting the MNO to switch purely on address signals exceeding a pre-configured digit count threshold. In one non-limiting example, when the RAN (e.g., the expected access control digital key, the total multi-part signals, etc.) is greater than N, where N is the maximum regular dial plan number length (e.g. 15 digits per the ETSI e.164 recommendation) then a routing entry (rule) may be set as follows: IF >N digits THEN route to the access controlling platform (e.g. the STARKEY Platform).

In some embodiments, such OI/CLI identification would, by association and proxy, identify the device and its user. Since many cellular devices may support biometric scanners (e.g., fingerprint, facial recognition input) to secure device access, to ensure that only the true device owner can unlock access to native telephone functions (e.g. the telephony and messaging applications for placing calls and sending messages), the disclosed systems, components, network architectures, and methods for signaling and determining the device identity necessarily, in some embodiments, follows biometric verification of the actual user, required to unlock the device in order to signal. In some embodiments, signaling and in, for example, signaling using the Star (*) per the disclosed systems, components, network architectures, and methods, the Star Key may now extend the reach of the biometric recognition and verification functionality, resident on and applied locally at the device interface, to being logically and functionally applied remotely at an access controlling platform interface, thereby remotely and biometrically (e.g. fingerprinting) controlling access to restricted online content and services.

In some embodiments, for example, to perform an anonymous authorization, the STARKEY Platform may be programmed to apply at least one cryptographic hash function to encrypt the extracted identity (e.g. MSISDN), resulting in a hashed identity (e.g. XMSISDN, XYMSISDN). In some embodiments, based on one or more principles disclosed herein, on successfully confirming/matching the expected RAN response (e.g. the expected access control digital key), the STARKEY Platform may be programmed to communicate/transmit at least an indicator of a successful identification (access authentication indicator) to the IAPP 2607 via, for example, without limitation, the STARKEY API. In some embodiments, the indicator of a successful identification (access authentication indicator) may be a binary indicator (e.g., "1"—successful identification and "0"—failed identification).

In some embodiments, the STARKEY Platform may be programmed to return to the IAPP an access authentication expectation data, including, without limitation, the MSISDN or an XMSISDN, to prevent exposing the MSISDN (cellular phone number) to third parties.

In some embodiments the STARKEY API may be programmed to prepend/append the last N digits (e.g. 4 digits) of the MSISDN to the XMSISDN/XYMSISDN to generate NXM/NXYM, XMN/XYMN, or NXMN/NXYMN (e.g. 4XM/4XYM, XM4/XYM4, or 4XM4/4XYM4) as described above, permitting the user to easily identify their own cell. In some embodiments, based on one or more principles disclosed herein, on receiving the successful identification authorization, the IAPP may be instructed/programmed to update the display/interface 2601 to present an exemplary display/interface 2607, showing, without limitation, an UNLOCKED icon 2609, and, per this non-limiting illustration, updating the button 2603 to display the identified MSISDN (+YYYYYYYYYYY) 2608, as shown, or updating the button 2603 to display the last 4 digits of the hashed 4XM, XM4 etc., (YYYY), not shown.

In some embodiments, based on one or more principles disclosed herein, on successfully authenticating the user, the IAPP may be programed/instructed to unlock the at least one access-restricted digital resource (e.g. restricted content, restricted service, etc.) for accessing by the user-associated computing device. In some embodiments, based on one or more principles disclosed herein, an internet service, associated with the at least one access-restricted digital resource, and/or the IAPP may then store the received identity (e.g. XMSISDN, XM4, XYMSISDN, XYM4, XIM4 etc.), for reference in future STARKEY login requests as described herein.

In at least some embodiments, whereas the random STAR Random Challenge and Response methods, systems, components, and network architectures disclosed herein seek to uniquely identify the user via, for example, without limitation, their associated cellular phone number (MSISDN) using a randomized dial challenge, once identified, in at least some embodiments, based on one or more principles disclosed herein, for example, the IAPP may be programmed/instructed to restrict access to the predetermined cellular identity only, by requesting any static STAR signal response (for example, a single fixed "*") from the previously identified device. In some embodiments, without limitation, when a user is detected as roaming on a foreign visited network outside their home country, a USSD signal response may be requested (e.g. "*#", or "*111#", etc.). In some embodiments, in cases of roaming, the STARKEY Platform may detect that the user is roaming on a foreign visited network (e.g. non-primary domestic network for the associated cellular service-enabled device) by inspecting the IP source address of the IAPP requesting authorization, and then may adjust the requested signaling to engage a USSD or an SMS rather than a Telephony transaction protocol and bearer.

[FIG. 26B]

FIG. 26B is an illustrative non-restrictive example of a binary bot detection process by inference based at least in part on cellular communication signals in accordance with at least some embodiments of the present disclosure.

At step 2600, in at least some embodiments, the illustrative access controlling platform presents a Star Random Challenge to an IAPP that is required to be authenticated. The random challenge is displayed to the user by the IAPP, and the access controlling platform records an expectation data record ([?:RAN]) per the steps enumerated in FIG. 4.

At step 2610, the access controlling platform sets and initiates a countdown timer (T), set to an interval of time sufficient to enable a user to respond to the challenge presented. In some embodiments, the timer may be set to less than one minute. In some embodiments, the timer may be set to greater than one minute. Various network factors, including without limitation, IAPP home country, current traffic density, number of pending authentication challenges, busy hours, latency etc., may determine the optimum timer interval to be set. In some embodiments, the access controlling platform may be programmed/configured to actively monitor incoming network traffic (e.g. SIP INVITES) transporting cellular signals from MNOs.

At step 2620, on receiving a SIP INVITE, the access controlling platform extracts the address signals from the SIP INVITE Headers (e.g. SIP URI, SIP From: headers etc.) and queries the expectation data records to determine whether an valid and active RAN challenge exists that matches the signals detected and extracted from the incoming call. A valid RAN is a challenge that is expected. When an active RAN is a challenge whose timer T has not been exhausted (e.g. T=0 sec). When a RAN match is successful, then logic flows to step 2630. When no RAN signals (SIP INVITES transporting the expected cellular signals) has been received and timer T has expired (T=0) then logic flows through step 140 to step 150.

While the flow sequence depicts the Timer being explicitly checked (polled), in some embodiments, timers may automatically trigger events on expiring, that is they can push notifications rather requiring them to be pulled/polled (e.g. event driven timers). In some embodiments, database may store actively monitor records with TTL (Time To Live) attribute(s) and execute predefined call-back(s) to appropriate functions for processing. In some embodiments, the timer T value may be communicated to the IAPP as a parameter set on activating the Challenge Request user interface element, and the countdown may then execute locally on the IAPP device. In some embodiments, on exhausting the Timer (i.e. T=0 sec) the IAPP is self-aware that a response to the challenge failed.

At step 2630, on the affirmative YES branch the access controlling platform has empirically detected a human presence operating the IAPP, since per the disclosed Challenge Response Signaling, a human is required to interact with the IAPP in order to transmit the expected and anticipated cellular signals, by confirming the initiation of a call to the randomized telephone number. Thus the access controlling platform may set a verification attribute of the IAPP, by centrally recording an association between the IAPP, and in one embodiment, an identity associated with the cellular device (e.g. MSISDN and/or ICCID etc.) provided by the trusted MNO, and/or in an alternate embodiment the access controlling platform may record a cryptographically hashed associated cellular identity to safeguard user privacy. On successfully detecting a human operator thus, the access controlling platform may communicate to the IAPP that a successful authorization/verification response has been received, permitting the IAPP to gain authentic verified status. In some embodiments, the data transported to the IAPP in successfully responding to the random challenge is described in more detail herein. In one embodiment, the access controlling platform may transmit the hashed identity for local storage in the IAPP itself or on the cellular device to be utilized in subsequent star challenges as disclosed herein (e.g. requesting static cellular signals from a previously authenticated device).

At step 2640, the access controlling platform may check whether the timer T has expired.

At step 2650, on detecting that a RAN timer associated with a pending (unfulfilled) challenge has expired (step 2640), the access controlling platform may thus by inference make the determination that the IAPP is being operated by a BOT, since the response requires the initiation of a cellular communication transporting the random address signals, and such a cellular response requires manual user intervention and activation. On making the inferred determination on the negative outcome of the Challenge Response, the access controlling platform may then record and/or categorize the IAPP as being a BOT.

[FIG. 26C]

Figure 26C:
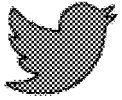
FIG. 26C is an illustrative non-restrictive example of an aspect of a binary bot detection process by inference based at least in part on cellular communication signals in accordance with at least some embodiments of the present disclosure.
Figure 26C:
Figure 26C:
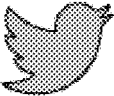
Figure 26C:
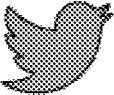
Figure 26C:
Figure 26C:

In at least some embodiments, different BOT classes/categories or BOTS applied to certain subject matter/content domains (e.g. without limitation, BOTS applied to news feeds, marketing, health care, academia/research, non-profit organization; governmental agencies, etc.) may be further distinguished by applying, without limitation, distinct interface profiles or themes from a plurality of color schemas, as shown for example in the table of FIG. 26C (A Twitter™ Taxonomy).

The Table of FIG. 26C depicts a non-limiting Twitter Taxonomy (Classification), segmented using the disclosed systems and methods, and modeled on a broadcasting network covering a variety of channels.

In one non limiting embodiment, in reference to Twitter™, the aforementioned color schemas may be applied to the corporate logo as depicted in the Table of FIG. 26C, for example presenting a suitably colored bird, and/or by applying similar coloring accents to messages and windows associated with a BOT detected and categorized account. In one non-limiting embodiment, such BOT schemas may be distinguished further by applying at least one ranking algorithm which may be programmed/configured to score each BOT based on one or more metrics, such as, without limitation, the number of links and/or citations (e.g. retweets) referencing a particular post or discussion thread, the number of hash (#) tag references, the number of "likes" and/or followers of real users authenticated using, for example, without limitation, the Star Random Challenge methods and systems disclosed herein etc.

For example, in one non limiting illustrative BOT ranked schema, a particular BOT's activity, collectively overall and/or discretely (e.g., an individual posting, a group of postings, etc.)

may be ranked and rated, in one non-limiting embodiment, using a percentage confidence-based weighted average score, by measuring the inputs (e.g. "likes", retweets, hash-tags etc.) from users that have been authenticated as humans by the random challenge and response method and system disclosed, either numerically, as a percentage of the total postings in that category as a measuring scale, or graphically, where in some embodiments, the ranking is portrayed as an arc of a circle where a fully closed circle represents 100% and where a half moon circle represents 50%, a quarter moon represents 25%, etc. For example:

News/Orange/50%, indicating a 50% level of trust in a new channel reported by a BOT, rated by an algorithm that computes the percentage of authenticated users who have tagged, followed, retweeted, hash-tagged etc. the news channel, collectively on all news items, and discretely on individually reported events, and the algorithm excluding or distinctly indicating separately, any ratings/recommendations by BOTS, detected and tagged as such on failing to respond to the authentication challenge as disclosed herein;

Marketing/Green/90%, indicating a 90% level of confidence in recommending a service or product promoted by BOTS or actual humans, as ranked and rated by authenticated actual humans (users) per above, and, by excluding or distinctly indicating separately, any recommendations by BOTS, detected and tagged as such, on failing to respond to the authentication challenge as disclosed herein.

In some embodiments, such illustrative ranking-tagging schemas, where a higher score equals a greater confidence ranking, may permit viewers to instantly, at a glance, through color and percentages, gain insight into the reliability of source(s) and/or accuracy of the information posted (e.g. electronic submissions). In some embodiments, such illustrative ranking-tagged schema, where a higher score equals a greater confidence ranking, may permit viewers to instantly, at a glance, through color and percentages, gain insight into the reliability of link(s), citation(s), tweet(s) and/or retweet(s). In some embodiments, such illustrative ranking-tagged schema, where a higher score equals a greater confidence ranking, may permit viewers to instantly, at a glance, through color and percentages, gain insight into the credibility of real users following them. For example, users may be less inclined to follow a "Gray BOT" with low ranking, indicating a generic contributor over a wide subject domain with relatively few real user endorsements (i.e. retweets, up votes etc.), and more inclined to follow a "Colored BOT" with higher ranking, indicating a specialist with a dominant domain of expertise, that has been determined either through artificial intelligence conducted on posted subject matter, or whose domain has programmatically selected a domain from a plurality of domains, that has a relatively high number of real user endorsements (i.e. retweets, up votes etc.).

In some embodiments, various online participation-related ranking schemas for identifying, differentiating, classifying, and/or ranking users, BOTs, and their associated activities, as disclosed herein, may allow more complex evaluation assessments that may not be binary (true or false) but instead may now be based on a fuzzy-logic that may be designed to facilitate the IAPP to display and/or represent degrees of truth based at least in part on, for example, the collective opinions of authenticated users (per the disclosed system and method) and from BOTs that are ranked by authenticated users, according to the metrics disclosed, or any combination thereof. In some embodiments the default status of all IAPPS registered or registering with the online service provider is set to BOT, and only upgraded to HUMAN on recording a successful challenge and response event. In one non-limiting embodiment, with reference to Twitter, applying a default BOT categorization to all accounts (save those that have been previously verified with a Blue Ticked Badged), may then automatically change the Twitter APP's visual appearance, for example, switching from the standard blue to red or gray, per the disclosed visual schemas. In some embodiments, the APP may further emphasize the BOT status by, without limitation, changing color accents to messages posted, changing message font style, size, color, etc. In one embodiment all BOT posted messages may be presented in a computerized "bitmap" (rasterized, pixelated) styled font to indicate an automated (BOT) submission.

[FIG. 27]

Figure 27:
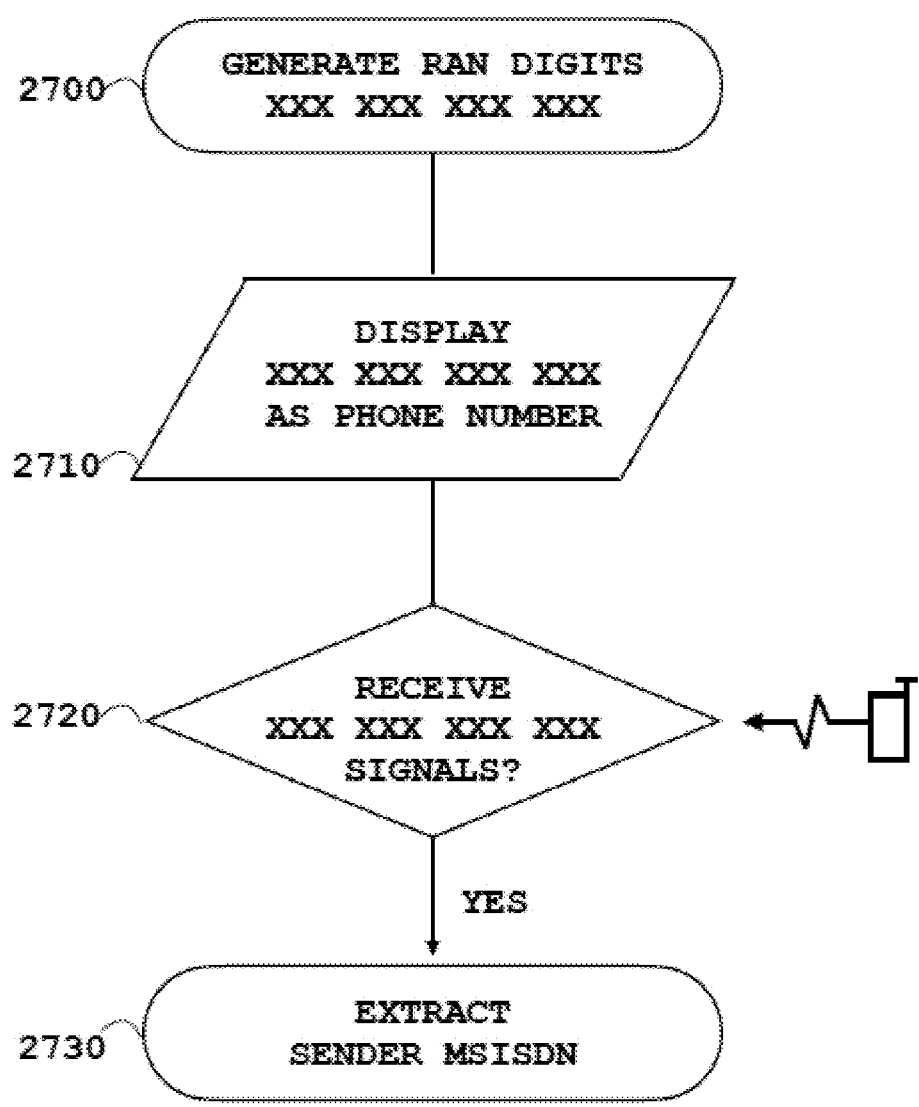
FIG. 27 is an illustrative non-restrictive example of utilizing a cellular-signaled identity management methodology in accordance with novel communications protocol(s) and access controlling network architecture(s) of at least some embodiments of the present disclosure.

FIG. 27 is an illustrative non-restrictive example of utilizing a cellular-signaled identity management methodology in accordance with novel communication protocols and access controlling network architectures of at least some embodiments of the present disclosure. At step 2700, in at least some embodiments, based on one or more principles disclosed herein, an exemplary, non-limiting Internet Application (IAPP) may be programmed/instructed to request a device authorization from the STARKEY Platform, for example, without limitation, via an exemplary STARKEY API. In some embodiments, based on one or more principles disclosed herein, the STARKEY platform may be programmed to generate a random series of digits (the STAR Challenge), for example without limitation, 12 random decimal digits, as illustrated, utilizing a random number generator. In some embodiments, based on one or more principles disclosed herein, the STARKEY platform may be programmed to store an access authentication expectation data/record ([?:RAN]) for receiving the digits of the access controlled component of the STAR Challenge in address signals from a cellular network.

At step 2710, in at least some embodiments, based on one or more principles disclosed herein, the IAPP may be programmed/instructed to present the digits of the access controlled component of the STAR Challenge ("random STAR Challenge digits") as a telephone number. In at least some embodiments, based on one or more principles disclosed herein, the displayed random STAR Challenge digits may be prefixed, without limitation, with a STAR (*) symbol identifying a call route within the cellular network to the STARKEY Platform. In at least some embodiments, based on one or more principles disclosed herein, the IAPP may be programmed/instructed to append/add the STAR (*) symbol prefix. In at least some embodiments, based on one or more principles disclosed herein, the STARKEY Platform may be programmed to append/add the STAR (*) symbol prefix to the random STAR Challenge digits to form the STAR Challenge. In at least some embodiments, based on one or more principles disclosed herein, the exemplary STARKEY API may be programmed/instructed to append/add the STAR (*) symbol prefix and output it to the IAPP display. In at least some embodiments, based on one or more principles disclosed herein, on dialing the displayed random telephone number (e.g. the expected access control digital key), the call would progress through the O-BCSM and AAA procedures as described in FIG. 26A above.

At item 2720, in at least some embodiments, based on one or more principles disclosed herein, on successfully completing the AAA procedure and the STAR call routing, the STARKEY Platform may be programmed to perform a confirmation whether the address signals received match the expected random series (the access authentication expectation data), digit for digit in sequence.

At item 2730, in at least some embodiments, based on one or more principles disclosed herein, when the expected random series of digits would be received, the STARKEY Platform may be programmed to identify a cellular device that emitted the expected random series of digits, by extracting the MSISDN of the cellular device, presented by a network in the signaling headers (e.g. without limitation, inspecting the SIP P-Asserted-Identity header). Accordingly, in at least some embodiments, based on one or more principles disclosed herein, this exemplary, non-limiting random challenge/response system and method are configured to ensure that it is the network and, by direct communicative coupling, the STARKEY Platform that identifies the user by a respective associated identity (e.g. the identity of the cellular device that would have emitted, for example, address signals, enumerating the series and sequence of expected random digits (e.g., random numbers, random alphabetic characters, random alphanumeric characters, etc.).

[FIG. 28]

Figure 28:
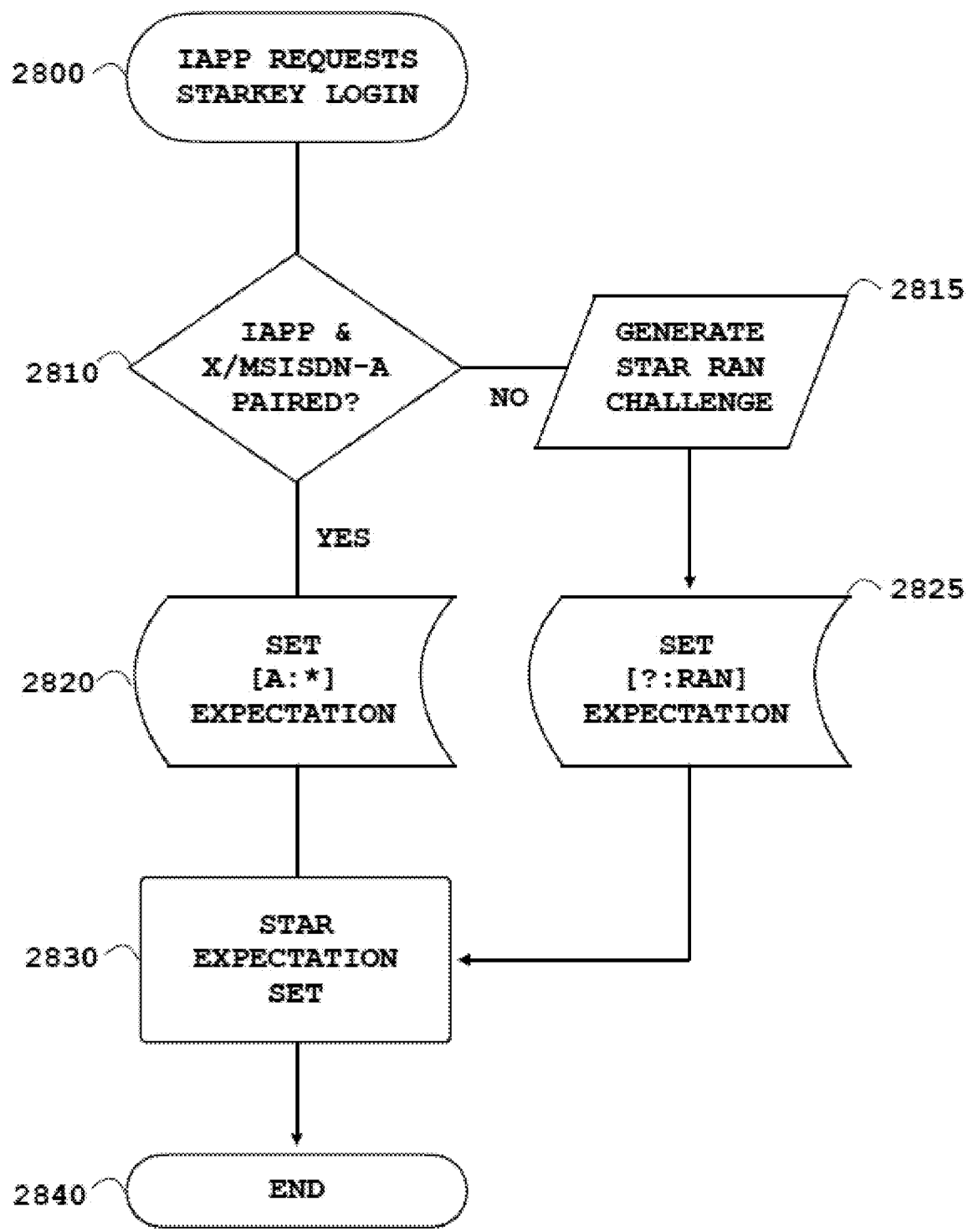
FIG. 28 is an illustrative non-restrictive example of utilizing an expected cellular-signaling management methodology in accordance with novel communications protocol(s) and access controlling network architecture(s) of at least some embodiments of the present disclosure.

FIG. 28 is an illustrative non-restrictive example of utilizing an expected cellular-signaling management methodology in accordance with novel communications protocol(s) and access controlling network architecture(s) of at least some embodiments of the present disclosure.

At step 2800, in at least some embodiments, based on one or more principles disclosed herein, an exemplary, non-limiting Internet Application (IAPP) may be programmed/instructed to request a Star Login utilizing an exemplary, non-limiting STARKEY API. In at least some embodiments, based on one or more principles disclosed herein, one or more parameters passed to the STARKEY API may include an MSISDN or a hashed XMSISDN/XYMSISDN (XY/MSISDN in short) XIM4 etc., stored from a previous STARKEY authentication (the access authentication expectation data/record).

At step 2810, in at least some embodiments, based on one or more principles disclosed herein, the STARKEY Platform may be programmed to determine whether any XY/MSISDN has been referenced in the Login Request. When an XY/MSISDN has been referenced (the affirmative "YES"), control proceeds to step 2820, otherwise absent any previously identified identity (e.g. cellular telephone number), the STARKEY Platform would proceed to step 2815.

At step 2820, in at least some embodiments, based on one or more principles disclosed herein, the STARKEY Platform may be programmed to perform a confirmation that parameter(s) specified in the STARKEY API include the access authentication expectation data, indicating that this IAPP would have previously identified the user as XY/MSISDN-A. Consequently, for example, without limitation, as the cellular identity of the cellular device from which the user would be required to dial/signal is KNOWN, the STARKEY Platform may be programmed to set an access authentication expectation record to the XY/MSISDN-A and the expected address signal(s) as ([A:*] or [XYM4-A:*]), herein further referenced as Symbol Factor Authentication/Star Factor Authentication (SFA). In this example, based on this access authentication expectation data/record, also interchangeably referenced herein as STAR expectation authentication data/record, to confirm a successful authentication of the user, the STARKEY Platform would thus expect to receive a static single STAR (*) signaled from the cellular device identified as MSISDN-A.

At step 2830, in at least some embodiments, based on one or more principles disclosed herein, this STAR expectation authentication data would have thus been set (recorded) and the exemplary access authentication expectation methodology of the present disclosure would proceed to and end at step 2840.

At step 2815, in at least some embodiments, based on one or more principles disclosed herein, the STARKEY Platform, absent receiving any device identification (e.g. XY/MSISDN4) reference data via the STARKEY API's Login Request, may be programmed to determine that this is a first time login request by the IAPP, from an as yet UNKNOWN device (e.g. Internet-enable cellular device), and thus may generate a random challenge (RAN), a series of randomized digits, also interchangeably referenced herein, without limitation, as the expected access control digital key, or an access control component of the STAR Challenge, which may be returned via the STARKEY API to the IAPP. The IAPP may then be programmed/instructed to present and display the STAR Challenge to the user, for example, without limitation, as described in FIG. 26A.

At step 2825, in at least some embodiments, based on one or more principles disclosed herein, the STARKEY Platform may be programmed to then set an access authentication expectation data/record, storing the expected random series of digits [?,RAN], which seeks to identify the unknown cellular device ("?") that would emit the RAN address signals, and this illustrative, non-limiting process would proceed to step 2830. In at least some embodiments, based on one or more principles disclosed herein, the above schematic designation of "?" may be recorded as an empty value, or a null value, for a corresponding parameter in the access authentication expectation data/record or any other similarly suitable placeholder. The "?,RAN" notation grammar is thus used herein, without limitation, to depict an unknown source identity for the RAN signaled digits. In some embodiments, the access authentication expectation record may simply store the expected RAN, or the expected multi-part signals.

[FIG. 29]

Figure 29:
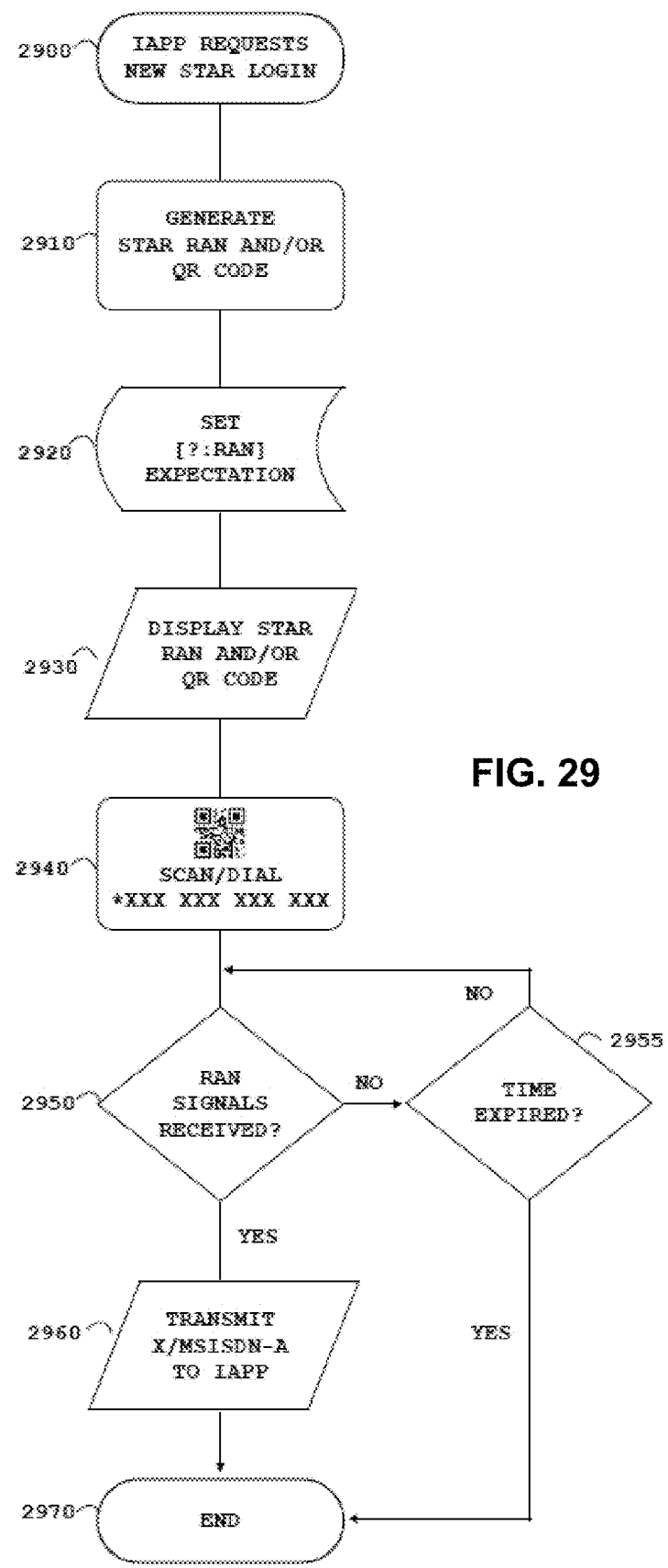
FIG. 29 is an illustrative non-restrictive example of utilizing a cellular-signaled authentication management methodology in accordance with novel communications protocol(s) and access controlling network architecture(s) of at least some embodiments of the present disclosure.

FIG. 29 is an illustrative non-restrictive example of utilizing a cellular-signaled authentication management methodology (the STARKEY authorization) in accordance with novel communications protocol(s) and access controlling network architecture(s) of at least some embodiments of the present disclosure.

At step 2900, in at least some embodiments, based on one or more principles disclosed herein, an exemplary, non-limiting internet application (IAPP) may be programmed/instructed to request a new, first time, STAR login utilizing an exemplary, non-limiting STARKEY API.

At step 2910, in at least some embodiments, based on one or more principles disclosed herein, absent any unique device identifying parameter (e.g. XY/MSISDN4) communicated via the STARKEY API, the STARKEY Platform may be programmed to generate a random series of digits (RAN), also interchangeably referenced herein, without limitation, as the expected access control digital key, or an access control component of the STAR Challenge, which the IAPP may be programmed/instructed to present to the user, as described, for example, without limitation, in FIG. 26A. In at least some embodiments, in addition to generating the STAR Challenge, the STARKEY Platform may be configured to generate a STARKEY barcode (also referenced herein as the telephone barcode), encapsulating/encoding the STAR Challenge as a telephone number (e.g. FIG. 26A). In at least some embodiments, based on one or more principles disclosed herein, the STARKEY barcode may be in a form of Quick Response (QR) code (also referenced herein as the telephone QR code) or a n-dimension code.

At step 2920, the STARKEY Platform may be programmed to store an access authentication expectation data/record as [?,RAN] to determine which cellular-service enabled computing device (?) would emit address signals matching the series and sequence of random digits (RAN). In some embodiments, the STARKEY Platform may be programmed to set a validity timer to ensure the STAR Challenge would be received within an acceptable/predetermined period of time, for example, without limitation, within X seconds (e.g., 10 seconds, 20 seconds, 30 seconds, etc.) or X minutes (e.g., 1 minute, 5 minutes, 10 minutes, 15 minutes, etc.), during which the access authentication expectation data record would remain active/valid.

At step 2930, in at least some embodiments, based on one or more principles disclosed herein, the IAPP may be instructed/programmed to display a Star (*) prefixed RAN telephone number (e.g. the STAR Challenge) as a button (an access controlling interface element), prompting the user to, for example, without limitation, tap/click and dial the displayed number. In some embodiments, the IAPP may also be programmed/instructed to display the STARKEY barcode (e.g. the telephony QR code) for scanning by a cellular-enabled computing device.

At step 2940, in at least some embodiments, based on one or more principles disclosed herein, the user may be required to tap/click or otherwise activate the button with the STAR Challenge (RAN) telephone number and/or scan the STARKEY barcode (e.g. the telephony QR code) to automatically pre-address the telephony connection. For example, on tapping the button with the STAR Challenge the IAPP may be programed to launch a native dialer on a cellular device with the STAR Challenge (RAN) address already entered (e.g. the series of RAN digits, the expected access control digital key) being displayed as the phone number to be dialed, prefixed with one or more symbols (e.g. Star "*" symbol) in order to route the call toward the STARKEY Access Controlling Platform. The user may then simply press a CONNECT/dial/send button (e.g. a green phone icon, a forward arrow for a SMS message, not shown) to transmit the displayed address signals by the associated cellular device.

At step 2950, in at least some embodiments, based on one or more principles disclosed herein, the STARKEY Platform may be programmed to await any cellular signals received from an MNO that would match the series and sequence of random digits (RAN) (e.g. the access control component of the Star Challenge, the expected access control digital key). When the RAN-matching signals are not received within an expected period of time, this exemplary process would proceed to the so-called negative "NO" branch to step 455. When the RAN signals are received, the process would proceed along the affirmative "YES" branch to step 2960.

At step 2955, in at least some embodiments, based on one or more principles disclosed herein, the STARKEY Platform may be programed to determine whether a timer (a computer program configured to track/count time (e.g., countdown time)) set at step 2920 has expired. When the timer has expired, the RAN expectation would be deemed invalid (or being invalidated) and flow moves along the affirmative "YES" path to the "END" step 2970. When the timer has not expired, the process loops back along the negative "NO" branch to step 2950.

At step 2960, on receiving the expected and matching RAN sequence and series of signals, the STARKEY Platform may be programmed to extract the sender cellular device's MSISDN from the signaling headers (e.g. the SIP P-Asserted-Identity header). When the access authentication expectation data/record is set to PRIVATE, in at least some embodiments, based on one or more principles disclosed herein, the STARKEY Platform may be programmed to apply a cryptographic hash function to the MSISDN, as described herein, and transmit the identity data of the access authentication expectation data in the form of a hashed XY/MSISDN (or, for example, XYM4 that would include the last 4 digits of the MSISDN in clear text, or XIM4) to the IAPP via the STARKEY API. In some embodiments, when the authorization is set to PUBLIC, the STARKEY Platform may be programmed to transmit the MSISDN in the clear to the IAPP as part of the access authentication expectation data. On successfully transmitting the cellular identity to the IAPP, the process of FIG. 29 proceeds to the "END" step 2970.

In some embodiments, when RAN signals (the expected access control digital key, the access control component of the Star Challenge) are received after the time has expired, the STARKEY Platform may be programmed to instruct the IAPP to inform the user that the session has expired and the authentication process needs to be repeated (e.g. for example, by generating a new RAN). In some embodiments, the STARKEY Platform may be programmed to instruct the IAPP (or IAPP may be programmed) to remove displaying the RAN after the timer has expired so to indicate that the user would have to generate another Login Request to access the access-restricted resource.

[FIG. 30]

Figure 30:
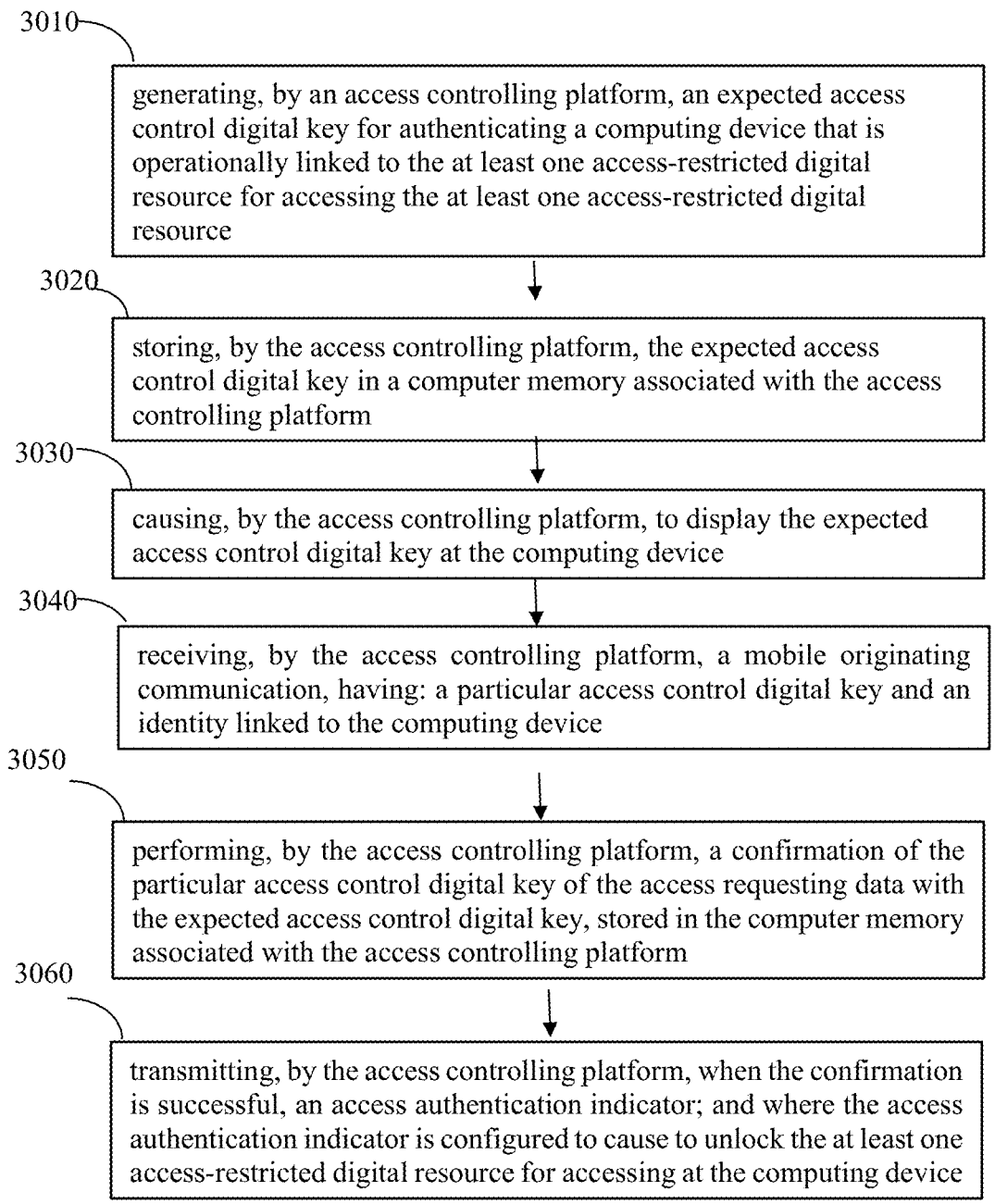
FIG. 30 is an illustrative non-restrictive example of access controlling network architecture(s) utilizing a cellular-signaled access control methodology with expected digital key(s) in accordance with novel communications protocol(s) of at least some embodiments of the present disclosure.

FIG. 30 is an illustrative non-restrictive example of a process based at least in part on cellular communication signals in accordance with at least some embodiments of the present disclosure. In some embodiments, the exemplary process of FIG. 30 may include at least the following steps of: at step 3010, generating, by an access controlling platform, an expected access control digital key for authenticating a computing device that is operationally linked to the at least one access-restricted digital resource for accessing the at least one access-restricted digital resource; at step 3020, storing, by the access controlling platform, the expected access control digital key in a computer memory associated with the access controlling platform; at step 3030, causing, by the access controlling platform, to display the expected access control digital key at the computing device; at step 3040, receiving, by the access controlling platform, a mobile originating communication, having at least a particular access control digital key and an identity linked to the computing device; at step 3050, performing, by the access controlling platform, a confirmation of the particular access control digital key of the access requesting data with the expected access control digital key, stored in the computer memory associated with the access controlling platform; and, at step 30160, transmitting, by the access controlling platform, when the confirmation is successful, an access authentication indicator; and where the access authentication indicator is configured to cause to unlock the at least one access-restricted digital resource for accessing at the computing device.

[FIG. 31]

Figure 31:
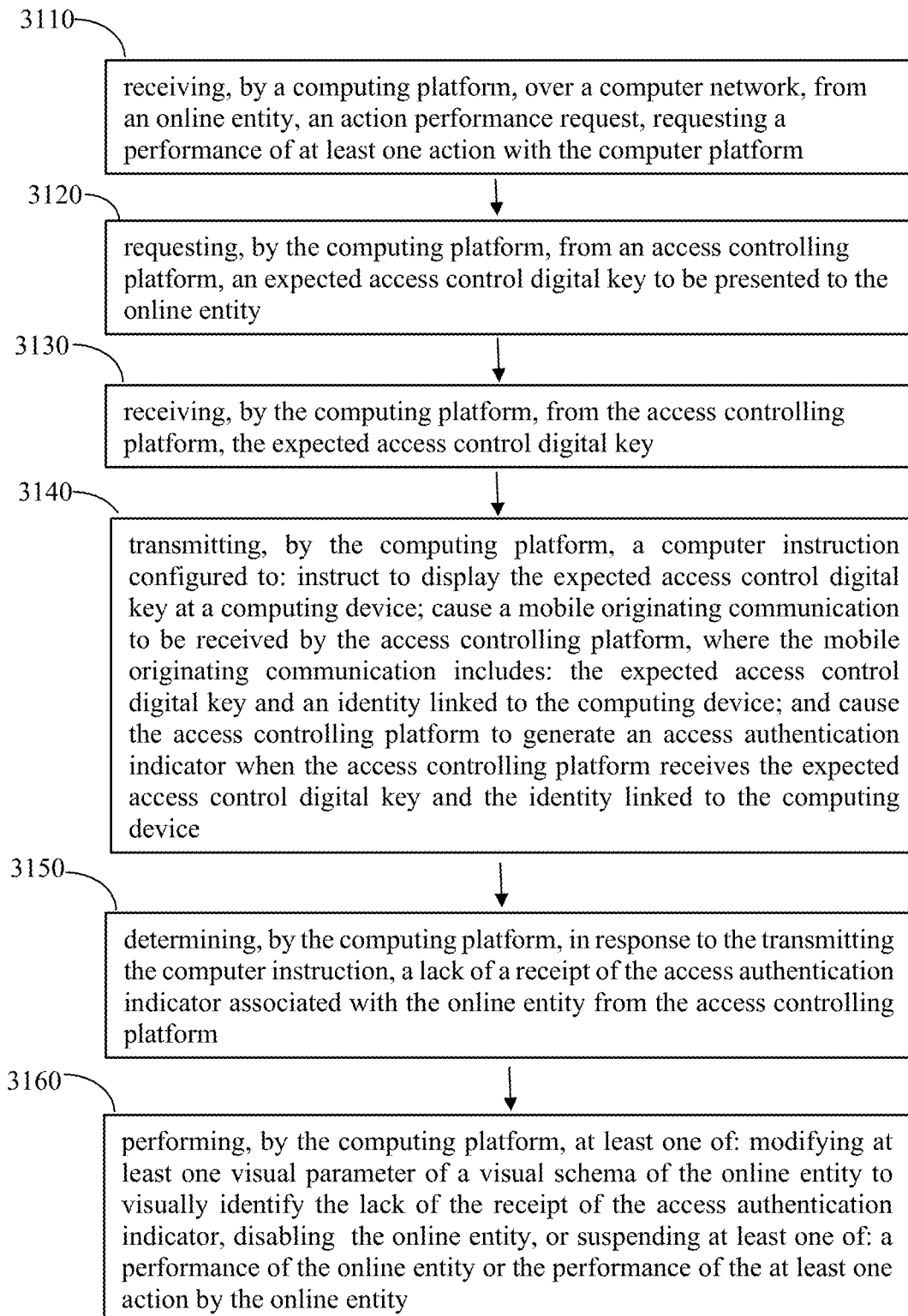
FIG. 31 is an illustrative non-restrictive example of a process based at least in part on cellular communication signals in accordance with at least some embodiments of the present disclosure.

FIG. 31 is an illustrative non-restrictive example of a process based at least in part on cellular communication signals in accordance with at least some embodiments of the present disclosure. In some embodiments, the exemplary process of FIG. 31 may include at least the following steps of: at step 3110, receiving, by a computing platform, over a computer network, from an online entity, an action performance request, requesting a performance of at least one action with the computer platform; at step 3120, requesting, by the computing platform, from an access controlling platform, an expected access control digital key to be presented to the online entity; at step 3130, receiving, by the computing platform, from the access controlling platform, the expected access control digital key; at step 3140, transmitting, by the computing platform, a computer instruction configured to: instruct to display the expected access control digital key at a computing device; cause a mobile originating communication to be received by the access controlling platform, where the mobile originating communication includes: the expected access control digital key and an identity linked to the computing device; and cause the access controlling platform to generate an access authentication indicator when the access controlling platform receives the expected access control digital key and the identity linked to the computing device; at step 3250, determining, by the computing platform, in response to the transmitting the computer instruction, a lack of a receipt of the access authentication indicator associated with the online entity from the access controlling platform; and, at step 3160, performing, by the computing platform, at least one of: modifying at least one visual parameter of a visual schema of the online entity to visually identify the lack of the receipt of the access authentication indicator, disabling the online entity, or suspending at least one of: a performance of the online entity or the performance of the at least one action by the online entity.

[FIG. 32]

Figure 32:
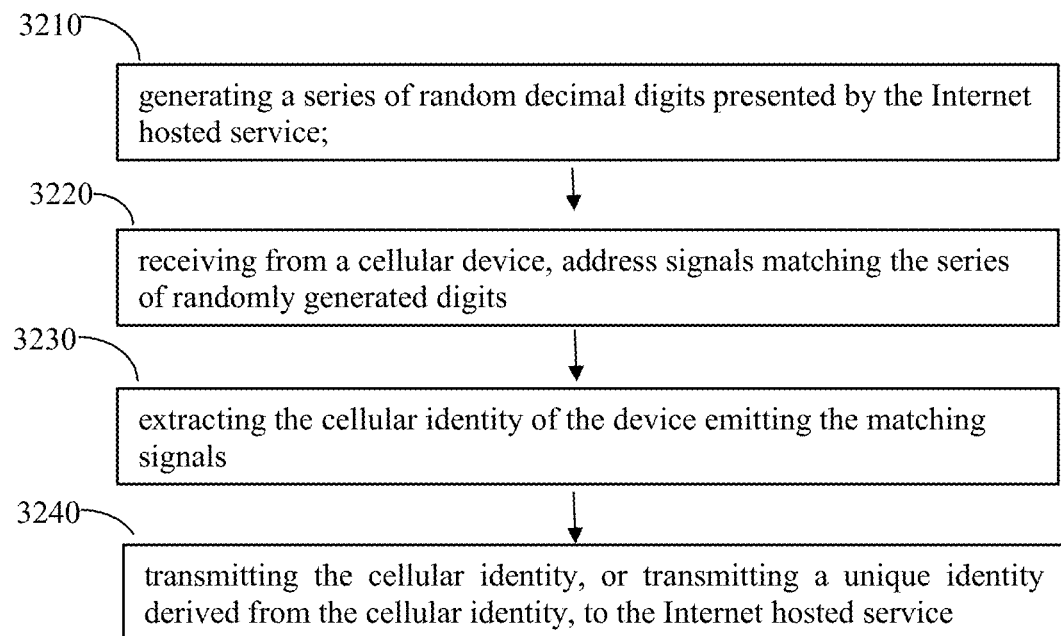
FIG. 32 is an illustrative non-restrictive example of a process based at least in part on cellular communication signals in accordance with at least some embodiments of the present disclosure.

FIG. 32 is an illustrative non-restrictive example of a process based at least in part on cellular communication signals in accordance with at least some embodiments of the present disclosure. In some embodiments, the exemplary process of FIG. 32 may include at least the following steps of: at step 3210, generating a series of random decimal digits presented by the Internet hosted service; at step 3220, receiving from a cellular device, address signals matching the series of randomly generated digits; at step 3230, extracting the cellular identity of the device emitting the matching signals; and, at step 3240, transmitting the cellular identity, or transmitting a unique identity derived from the cellular identity, to the Internet hosted service.

In at least some embodiments, the signals received from the cellular device are address signals in a telephony call setup request.

In at least some embodiments, the extracted cellular identity is the MSISDN of the cellular device.

In at least some embodiments, the extracted cellular identity is the CLI of the cellular device.

In at least some embodiments, the Internet hosted service presents on a display terminal or in a web page or component thereof.

In at least some embodiments, the Internet service is a component in an internet enabled application.

In at least some embodiments, the address signals are symbolically prefixed with a star (*), a pound (#), an at (@) or other symbol, or any combinations of symbols or combination of symbols and routing digits identifying an access controlling platform.

In at least some embodiments, extracting the cellular identity comprises storing an association between the cellular identity and internet hosted service or IAPP.

In at least some embodiments, the internet hosted service is unlocked for access when the expected cellular signals originate from a cellular identity matching the stored and associated cellular identity or an identity derived from a cellular identity.

[FIG. 33]

Figure 33:
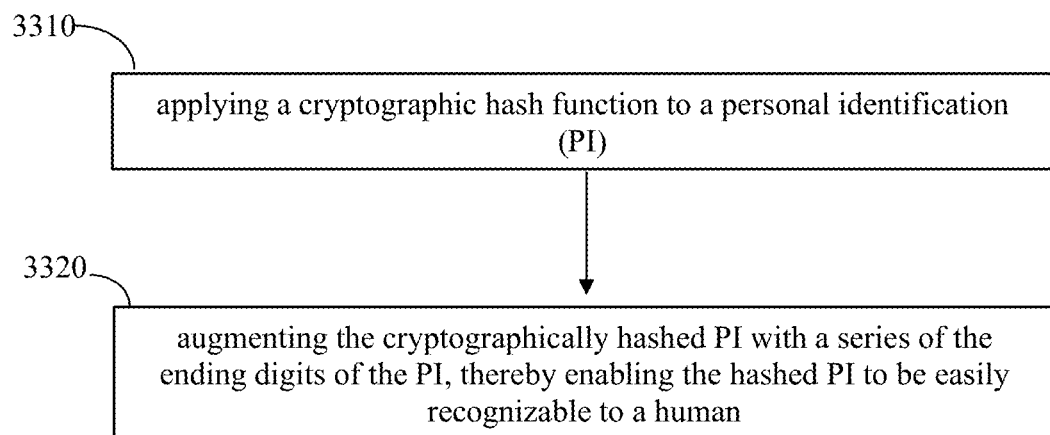
FIG. 33 is an illustrative non-restrictive example of a process based at least in part on cellular communication signals in accordance with at least some embodiments of the present disclosure.

FIG. 33 is an illustrative non-restrictive example of a process based at least in part on cellular communication signals in accordance with at least some embodiments of the present disclosure. In some embodiments, the exemplary process of FIG. 33 may include at least the following steps of: at step 3310, applying a cryptographic hash function to a personal identification (PI); and at step 3320, augmenting the cryptographically hashed PI with a series of the ending digits of the PI, thereby enabling the hashed PI to be easily recognizable to a human.

In some embodiments, based on one or more principles disclosed herein, the cryptographically hashed PI may be held in volatile computer memory for ad hoc actions.

In at least some embodiments, the PI is one of an MSISDN, ICCID, a passport number, a social security number, a national identity number or any globally unique number or any combination of globally unique identities.

In at least some embodiments, augmenting is by pre-fixing or post-fixing to the cryptographically hashed PI.

In at least some embodiments, the PI is a public or private cryptographic key and the augmented digits are taken from the end (e.g. from the right hand side) of an MSISDN.

In at least some embodiments, the PI is presented or referenced by the augmented digits.

Illustrative Non-Limiting Embodiments of Star Paywall Methodology for Real-Time/Dynamic Adjustments of Access Codes, Starkey Challenges, Tolls, Actions of Interface Control Elements (e.g. Active Links, Action Buttons, Etc.) and Other Components Detailed Herein Based at Least in Part on Detection of a Geolocation of Cellular-Service Enabled Computing Devices (e.g. Cell Phones)

As already detailed herein, one technological problem that the present disclosure may address is a technological problem caused by the phenomenon known as "click farming" which utilize, for example, hundreds or thousands of programmed cell phones, and/or low skilled and/or low wage human resources, mostly in developing countries, to perform automatic clicks (computer and/or cell phones that are programmed to activate a user interface element, i.e. BOT cell phones/computers) and/or manual clicks (e.g. manually activating the user interface element) on behalf of actors with nefarious intent such as, without limitation, to bypass certain authentication processes, to raise a popularity ranking, to show a heightened interest to an online posting (e.g., news), automatic submission of product and/or service reviews without actually being an authentic consumer of such product/service, etc. For example, human click farms or hybrid click farms, having BOT cell phones with some human input, may be used to effectively bypass Captcha-type systems that may present visual recognition tasks and/or puzzles to be solved that are designed to distinguish between human and machine input, or to click "like buttons" or click to increase views (videos, articles etc.), or to create a fictitious group of followers, thereby increasing apparent popularity and falsely supporting influenced (influential) based marketing endorsements and commercial contracts.

In at least some embodiments, in addition to methodologies and various components/elements/systems/platforms detailed above, additional approach(es) to mitigate and counter click-farms may involve, for example, without limitation, programming one or more elements requested by online interfaces (e.g., active links, buttons, entry boxes, etc.) to execute a computer script/instruction that would request the geolocation of the requesting computing device (e.g. by inspecting the source IP address of the requesting application) that is being utilized to perform an online activity and, then, prompt a user of such computing device to pay a toll of a predetermined or a varied amount to discourage the nefarious activities, such as "click farming", which would then no longer be commercially viable to operators of such "click farms".

For example, before allowing such a device to input an activity, such as, without limitation, clicking on a referral link, submitting a fake customer review, vote, tweet, post, etc., the associated program interface element may be programmed, based on determining a geographic location, to require a user to pay a particular amount (toll) if the geographic location of the user is associated with high frequency of "click farming" actors. In at least some embodiments, various methods of the present disclosure may train a machine-learning model that would predict when a user is more likely to be member of the "click farm" based at least in part on training data, including network traffic patterns associated with a particular geographic location, activity data (e.g., frequency, type, etc.), user's online behavioral patterns (e.g., actions taken on webpage(s)/website(s), actions perform within an APP session, etc.), proximity to other cellular-enabled computing devices, relative concentration of cellular-enabled computing devices in particular geographic locations, etc.

In at least some embodiments, as used herein, the term geolocation is the identification of a real-world geographic location (e.g., by latitude and longitude) of an object (e.g., a person, device, etc.) and may refer to assessing a location or referencing the actual assessed location. While geolocation is closely related to the use of positioning systems (e.g., the global positioning system (GPS)), geolocation can also be distinguished by a greater emphasis on determining a meaningful location (e.g. street address) rather than a set of geographic coordinates. In some embodiments, geolocation can also determine the way in which the information necessary for the geolocation is acquired (e.g., through identification of an internet protocol (IP) address of a device connected to the Internet, the network provider/operator or mobile device GSM network, through the GPS system, etc.).

As used herein, terms "proximity detection," "locating," "location data," "location information," and "location tracking" refer to any form of location tracking technology or locating method that can be used to provide a location of, for example, a particular computing device/system/platform of the present disclosure and/or any associated computing devices, based at least in part on one or more of the following techniques/devices, without limitation: accelerometer(s), gyroscope(s), Global Positioning Systems (GPS); GPS accessed using Bluetooth™; GPS accessed using any reasonable form of wireless and/or non-wireless communication; WiFi™ server location data; Bluetooth™ based location data; triangulation such as, but not limited to, network based triangulation, WiFi™ server information based triangulation, Bluetooth™ server information based triangulation; Cell Identification based triangulation, Enhanced Cell Identification based triangulation, Uplink-Time difference of arrival (U-TDOA) based triangulation, Time of arrival (TOA) based triangulation, Angle of arrival (AOA) based triangulation; techniques and systems using a geographic coordinate system such as, but not limited to, longitudinal and latitudinal based, geodesic height based, Cartesian coordinates based; Radio Frequency Identification such as, but not limited to, Long range RFID, Short range RFID; using any form of RFID tag such as, but not limited to active RFID tags, passive RFID tags, battery assisted passive RFID tags; or any other reasonable way to determine location. For ease, at times the above variations are not listed or are only partially listed; this is in no way meant to be a limitation.

In one non-limiting embodiment, in reference to FIG. 1, application program instruction(s) 102 may, without limitation, additionally contain code to geolocate the internet connected device 100. For example, in one non-limiting example, code (e.g. JavaScript) can be programmed to request a Geolocation API (e.g. World Wide Web Consortium (W3C), IP Geolocation API, etc.) to return a geographic location (e.g. country, city etc.) of the internet connected device 100 and then dynamically adjust the digital presentation of the displayed access code to a location-specific value in order to inhibit click-farming or reduce its commercial viability. For example, without limitation, when the geolocate request returns a first location that is in a first country, the interface element 103 of FIG. 1 may display "*0.99", corresponding to the access code of "*099" that would be dialed as address signals matching the format of (*NNN) and which would then result in a $0.99 click/dial-charge debited directly to the MNO account associated with the cellular device, per the disclosed systems and methods. In another example, without limitation, when the geolocate request returns a second location that is in a second country, the interface element 103 of FIG. 1 may display "*9.99", corresponding to the access code of "*999" that would be dialed as address signals matching the format of (*NNN) and result in a $9.99 access charge, debited directly to the MNO account associated with the cellular device, per the disclosed systems and methods.

As detailed herein, based on the dialed address signaling, for example, the controlling schema 121 of the cellular network 120 would recognize and create a location specific session record, resulting in a charge of either 99 cents or 9 dollars and 99 cents, etc.

In some embodiments, based on the geolocation of the user, the IAPP interface element may be programmed to require the user to submit a payment-linked verification before allowing the IAPP to conduct one or more actions within the IAPP, such as, without limitation, being redirected based on the activation of an interface element, button, hypertext link etc., to submit a posting/review/tweet/like etc. For example, in one non-limiting example, the payment-linked verification may be in a form of a supplemental request, to provide and/or link to a valid credit/debit card, a valid bank account, a PayPal™, Alipay, WeChat Pay, Venmo™ etc. account/handle, or any other another acceptable payment instrument. For example, in one non-limiting example, the payment-linked verification may be in a form of a charged request to authorize a particular amount (e.g. 1 cent, 10 cents, 1 dollar, etc.) to be debited to the user account and credited to the IAPP provider's account.

[FIG. 34]

Figure 34:
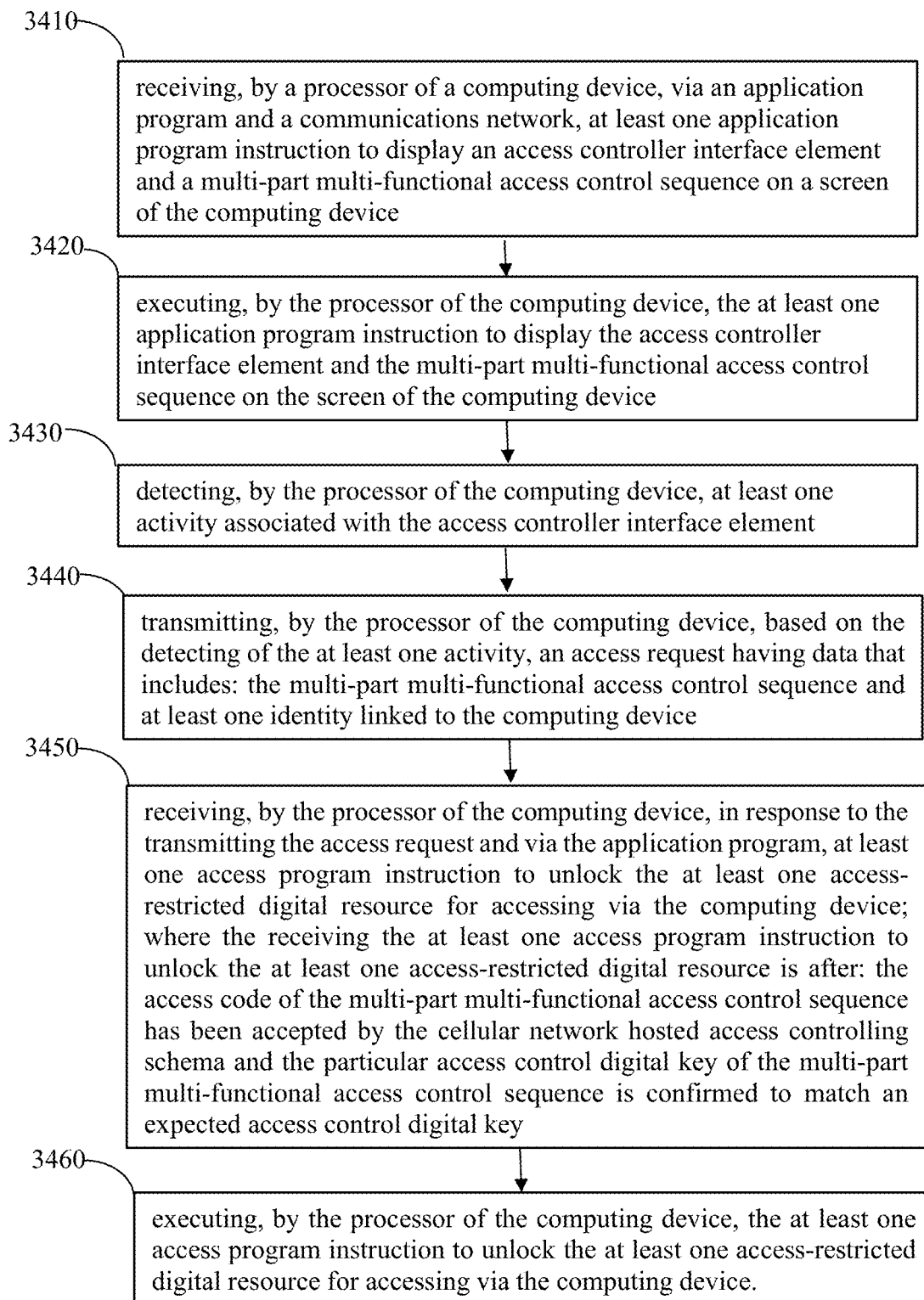
FIG. 34 is an illustrative non-restrictive example of a process based at least in part on cellular communication signals in accordance with at least some embodiments of the present disclosure.

FIG. 34 is an illustrative non-restrictive example of a process based at least in part on cellular communication signals in accordance with at least some embodiments of the present disclosure. In some embodiments, the exemplary process of FIG. 34 may include at least the following steps of: at step 3410, receiving, by a processor of a computing device, via an application program and a communications network, at least one application program instruction to display an access controller interface element and a multi-part multi-functional access control sequence on a screen of the computing device; where the access controller interface element is: communicatively coupled to a cellular network hosted access controlling schema; and operationally linked to at least one access-restricted digital resource; where the multi-part multi-functional access control sequence includes: at least one symbol, an access code and a particular access control digital key; where the access code is configured to be accepted by the cellular network hosted access controlling schema; at step 3420, executing, by the processor of the computing device, the at least one application program instruction to display the access controller interface element and the multi-part multi-functional access control sequence on the screen of the computing device; at step 3430, detecting, by the processor of the computing device, at least one activity associated with the access controller interface element; at step 3440, transmitting, by the processor of the computing device, based on the detecting of the at least one activity, an access request having data that includes: the multi-part multi-functional access control sequence and at least one identity linked to the computing device; at step 3450, receiving, by the processor of the computing device, in response to the transmitting the access request and via the application program, at least one access program instruction to unlock the at least one access-restricted digital resource for accessing via the computing device; where the receiving the at least one access program instruction to unlock the at least one access-restricted digital resource is after: the access code of the multi-part multi-functional access control sequence has been accepted by the cellular network hosted access controlling schema and the particular access control digital key of the multi-part multi-functional access control sequence is confirmed to match an expected access control digital key; and at step 3460, executing, by the processor of the computing device, the at least one access program instruction to unlock the at least one access-restricted digital resource for accessing via the computing device.

[FIG. 35]

Figure 35:
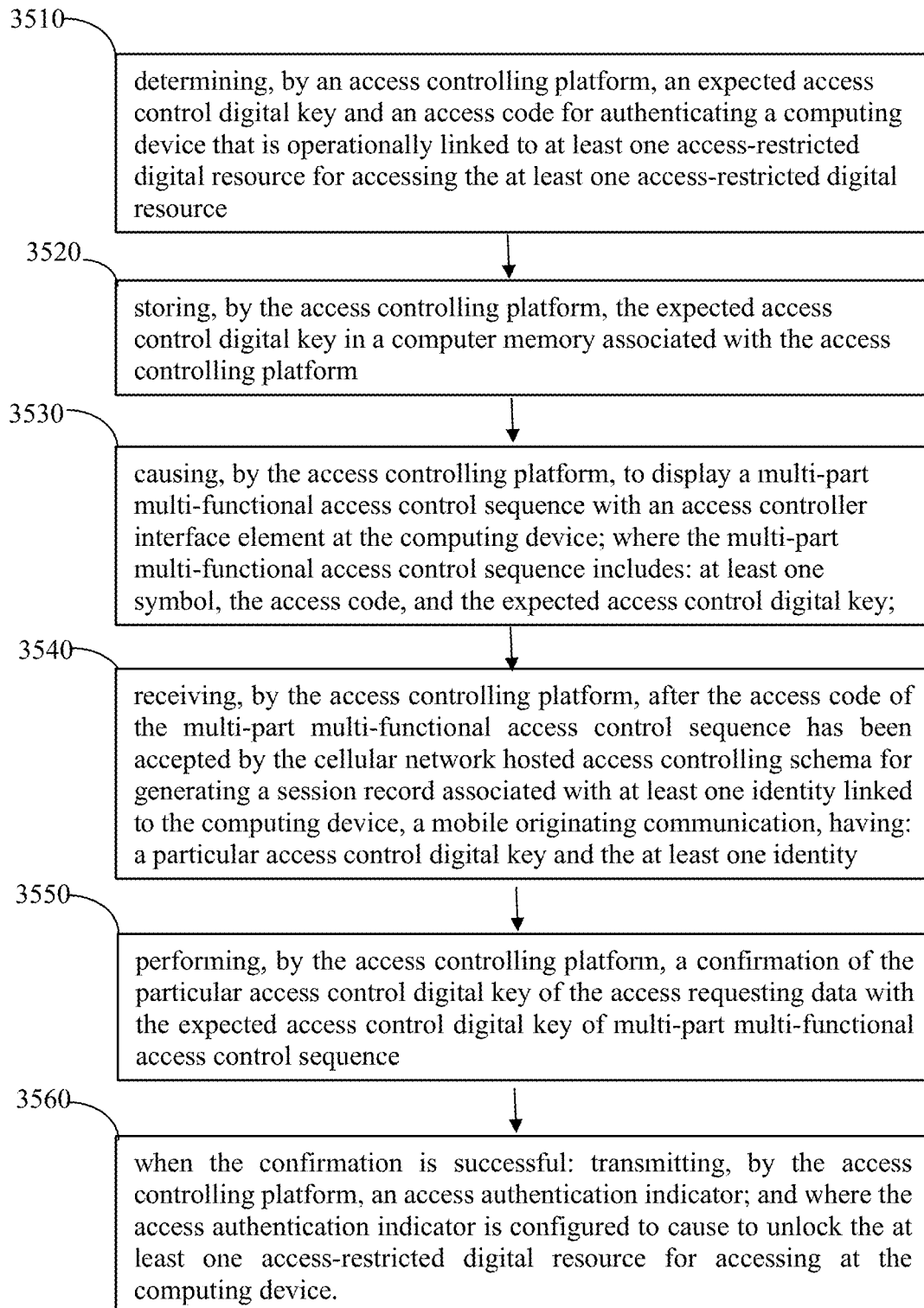
FIG. 35 is an illustrative non-restrictive example of a process based at least in part on cellular communication signals in accordance with at least some embodiments of the present disclosure.

FIG. 35 is an illustrative non-restrictive example of a process based at least in part on cellular communication signals in accordance with at least some embodiments of the present disclosure. In some embodiments, the exemplary process of FIG. 35 may include at least the following steps of: at step 3510, determining, by an access controlling platform, an expected access control digital key and an access code for authenticating a computing device that is operationally linked to at least one access-restricted digital resource for accessing the at least one access-restricted digital resource; at step 3520, storing, by the access controlling platform, the expected access control digital key in a computer memory associated with the access controlling platform; at step 3530, causing, by the access controlling platform, to display a multi-part multi-functional access control sequence with an access controller interface element at the computing device; where the multi-part multi-functional access control sequence includes: at least one symbol, the access code, and the expected access control digital key; where the access controller interface element is: communicatively coupled to a cellular network hosted access controlling schema and operationally linked to the at least one access-restricted digital resource; at step 3540, receiving, by the access controlling platform, after the access code of the multi-part multi-functional access control sequence has been accepted by the cellular network hosted access controlling schema for generating a session record associated with at least one identity linked to the computing device, a mobile originating communication, having: a particular access control digital key and the at least one identity; at step 3550, performing, by the access controlling platform, a confirmation of the particular access control digital key of the access requesting data with the expected access control digital key of multi-part multi-functional access control sequence, stored in the computer memory associated with the access controlling platform; at step 3560, when the confirmation is successful: transmitting, by the access controlling platform, an access authentication indicator; and where the access authentication indicator is configured to cause to unlock the at least one access-restricted digital resource for accessing at the computing device.

[FIG. 36]

Figure 36:
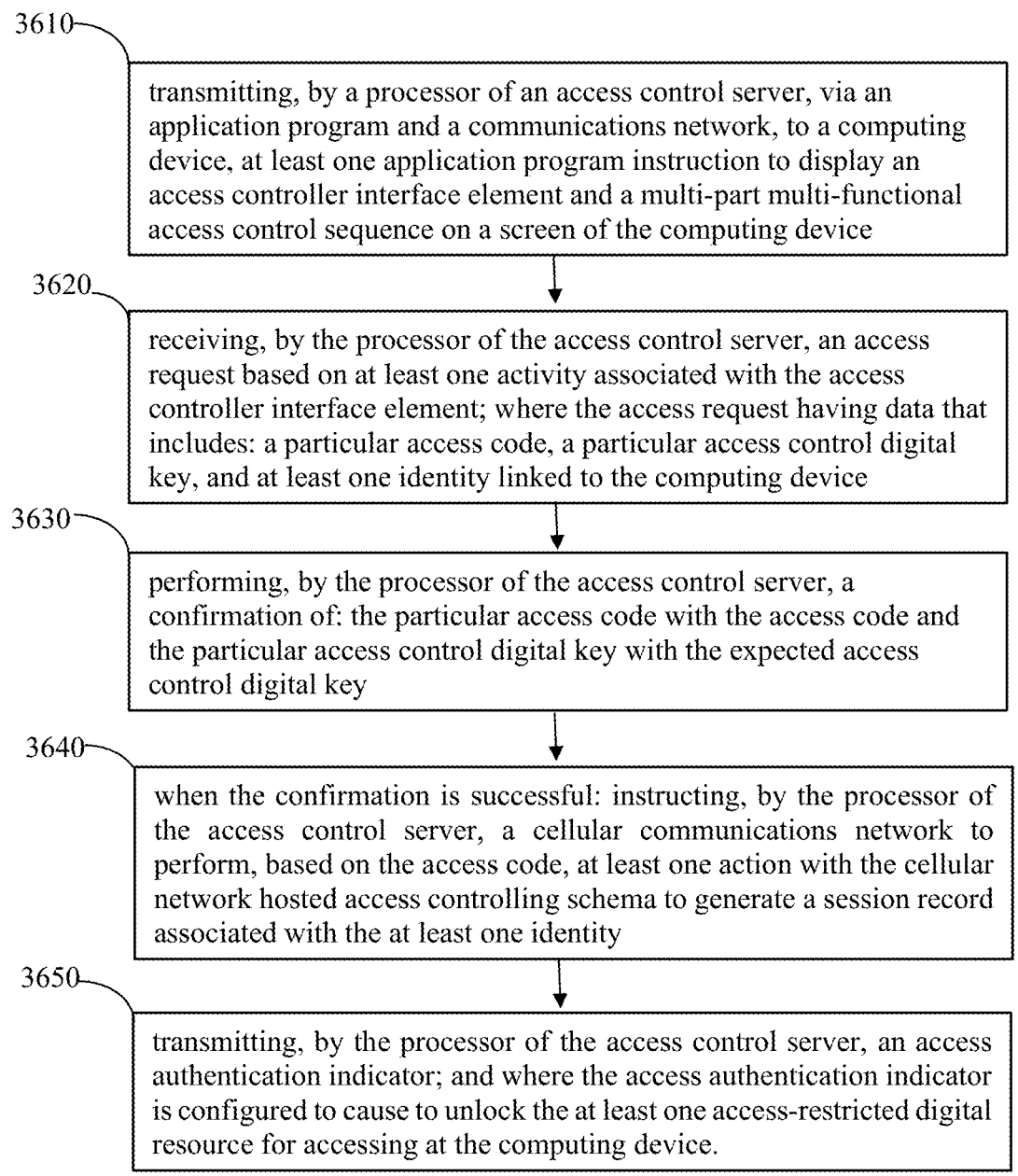
FIG. 36 is an illustrative non-restrictive example of a process based at least in part on cellular communication signals in accordance with at least some embodiments of the present disclosure.

FIG. 36 is an illustrative non-restrictive example of a process based at least in part on cellular communication signals in accordance with at least some embodiments of the present disclosure. In some embodiments, the exemplary process of FIG. 35 may include at least the following steps of: at step 3610, transmitting, by a processor of an access control server, via an application program and a communications network, to a computing device, at least one application program instruction to display an access controller interface element and a multi-part multi-functional access control sequence on a screen of the computing device; where the access controller interface element is: communicatively coupled to a cellular network hosted access controlling schema and operationally linked to at least one access-restricted digital resource, restricted from being accessed via the computing device; where the multi-part multi-functional access control sequence includes: an access code and an expected access control digital key; at step 3620, receiving, by the processor of the access control server, an access request based on at least one activity associated with the access controller interface element; where the access request having data that includes: a particular access code, a particular access control digital key, and at least one identity linked to the computing device; at step 3630, performing, by the processor of the access control server, a confirmation of: the particular access code with the access code and the particular access control digital key with the expected access control digital key; at step 3640, when the confirmation is successful: instructing, by the processor of the access control server, a cellular communications network to perform, based on the access code, at least one action with the cellular network hosted access controlling schema to generate a session record associated with the at least one identity; where the access code is configured to be accepted by the cellular network hosted access controlling schema; at step 3650, transmitting, by the processor of the access control server, an access authentication indicator; and where the access authentication indicator is configured to cause to unlock the at least one access-restricted digital resource for accessing at the computing device.

Illustrative Non-Limiting Embodiments of Access Controlling Network Architectures, Systems, Components and/or Elements Programmed to Administer Novel Authoritative Internet Resources Certification, Management and Associated Communications Protocols (Also Interchangeably Referenced Herein as the Star Domain Protocols) and Methods for Use Thereof.

In some embodiments, for example, without limitation, in reference to FIGS. 26A and 26B, but can be utilized in other arrangement and/or communication schema detailed herein, in addition to communicating/transmitting the indicator of successful identification, the access controlling platform (e.g. STARKEY Platform) may record and communicate to the IAPP, an authoritative certificate (The STAR Certificate) on a communicatively coupled secure datastore, which may be centralized (e.g. a high performance low latency cache), or decentralized (e.g. DNS, blockchain etc.), registering a certificate, in one non-limiting embodiment at or in one of:

I: A Star Sub-Domain, Level-3 (also known as a Wildcard Domain) certificate recorded in a sub-domain (i.e. to the left) of a registered Level-2, Second Level Domain, owned and accessible only by the access controlling platform, and once propagated, is then DNS accessible (e.g. performing a DNS lookup on "<certificate>.starlogik.com") to the IAPP or the IAPP provider (Platform); or II: A Star Sub-Directory, to deliver an HTTPS accessible certificate hierarchy (e.g. "HTTPS://CERT.STARLOGIK.COM/XYM4/<certificate>.crt") for the IAPP to query against, in order to validate one or more activities of a user, or transactions conducted by the IAPP, such as, without limitation, the successful Star Random Challenge Response, or the successful access granted to a restricted resource by the cellular network access controlling schema as disclosed.

In at least some embodiments, STAR Certificates of the present disclosure may serve a remote function of protecting (e.g., time-locking) digital resources. For example, in one non-limiting example, all internet resources may be access-restricted by the non-existence/lack of a valid STAR Certificate, thereby redirecting access to the disclosed access controlling schemas.

In at least some embodiments, performing a function of administering (e.g. issuing/setting, validating, returning, etc.) STAR Certificates, the access controlling platform (e.g.) The STARKEY Platform) may be functioning as a nano-certification authority (interchangeably referenced herein as The STAR Certification Authority (STAR CA)).

Thus, whereas SSL Certificates may govern and protect web domains, by certifying the HTTPS secure sockets layer (i.e. The protocol for web browsers and servers that allows for the authentication, encryption and decryption of data sent over the Internet), for example, by displaying a locked-icon in a browser address bar when a website serves a valid SSL certificate, the disclosed Star Certificates may govern access to internet hosted resources, that is govern access to objects on a much more granular level (e.g. access to content, services etc.), thereby delivering a novel DRM (Digital Rights Management) System at scale.

For example, without limitation, one exemplary STAR Certificate may record an association between the computing cellular device identity (e.g. XY/M4) and the restricted access resource reference (e.g. Stock Keeping Unit/Universal Resource Locator ("SKURL")). Further, the certificates may be indexed on the XY/M4 (i.e. XY/MN-indexed certificates), herein without limitation the "STAR XYMN Certificates" resident on a remote centralized (high-speed ultra-low latency dictionaries or caches), or on distributed (DNS, blockchain) datastores, to deliver a novel and scalable alternative to locally cached data (e.g. Cookies).

In such embodiments, for example, without limitation, the described transaction/activity validation URL may thus deliver a remote and virtual cross-domain cookie (The Star Cookie) and/or session timer (The Star Session Timer). In such embodiments, for example, without limitation, the exemplary architecture utilizing the STAR CA with STAR certificates may provide a technological solution in the scenario when a user opts-out from being tracked online, and where an internet software company may thus program its IAPP or website to store generic and ephemeral STAR certificates (that automatically purge themselves on their TTL expiry) rather than storing explicit and persistent tracking data (cookies, etc.), locally on users' devices (e.g. in the IAPP/browser). In one embodiment, when a request is then made to access a restricted resource, the IAPP and/or the application servers providing the IAPP functionality (e.g. web servers) may utilize the associated Star Certificate to first query the above STAR Domains (e.g. via DNS lookup) or Directories (e.g. via HTTPS GET) to determine whether the previously identified device, with hashed ID XY/M4, has an active and valid STAR certificate authorizing access to the requested resource. In one embodiment the URL queried may return a binary "1" to indicate certificate validity, and a binary "0" to indicate certificated invalidity. In some embodiments, the STAR URL query request may, in addition to returning a binary "1" successful response, may return the time remaining for the STAR certificate (based on the TTL). In some embodiments, absent a valid response to the STAR certificate query, the IAPP may then be directed to request a new Star Challenge and present the same to the user in order to reauthorize access using one or more embodiments disclosed herein.

In some embodiments, the disclosed high speed DNS propagated star domain certificates and/or hierarchically stored sub-directory certificates (e.g. microsecond access latency) may thus deliver a semaphore that either raises or lowers access to a restricted resource, which third parties may instantly query (e.g. DNS Lookup, HTTPS GET) to validate any activity (e.g. the StarKey platform-linked transaction), and/or unlocking access restricted resource(s) (e.g., access a restricted content and/or service). For illustrative non-limiting purposes, in some embodiments, the access controlling platform (e.g. The STARKEY Platform), may be programmed to manage an exemplary Internet domain (e.g. the "starkeys.com" domain), for querying a STAR URL thus:

HTTPS://CERT.STARKEYS.COM/XYM4/EVAL.HTML?cert=<certificate>.

For illustrative non-limiting purposes, in some embodiments, the access controlling platform (e.g. The STARKEY Platform), may be programmed to manage an exemplary DNS domain (e.g. the "starkeys.com" domain), for querying a STAR DNS thus:

DNS Lookup: <certificate>.STARKEYS.COM

In some non-limiting embodiments, the Star Certificates may record metadata referencing the cellular device ID (e.g. XY/M4) and the access restricted resource (e.g. SKURL), returning this metadata in response to the certificate being queried. In some non-limiting embodiment, this meta data may be recorded in DNS TXT records, or DNS NAPTR-styled records. Thus, in some embodiments, the response to a Star Certificate query may, in non-limiting examples, return binary "I/O", to indicate valid/invalid certificates, and/or in addition to a binary "1" valid indication, the response may return without limitation, associated metadata including: the IAPP identity (e.g. XY/MN4), the access-restricted reference (SKURL), and the remaining certificate TTL (time validity).

Thus, in one non-limiting embodiment, in addition to communicating/transmitting the indicator of success as disclosed in the access controlling schema embodiments, the access controlling platform (e.g. STARKEY Platform or STAR CA) may be programmed to communicate/transmit the recorded Star Certificate, which the IAPP may store and associate with the restricted access resource, for future reference and validation. In one non-limiting embodiment, the IAPP in communication with the access controlling platform and/or the STAR CA, may control the STAR certificate's TTL (Time To Live) to, for example, without limitation, create an ephemeral certificate that may automatically time-lapse (purge), thereby establishing a remote session-based "cookie" and timer (e.g. activating a software timing tracking routine) to gatekeep the restricted access resource (i.e. a semaphore). The ephemeral nature of these star certificates are a highly distinguishing feature that may further support and safeguard the privacy of users online. For example, the more secured a resource requirement is, the more trusted the star certificate is required to be (e.g. extremely high trust when authorizing a financial transaction versus low trust when authorizing access to a news article), trust which may be attained on reducing the TTL to a minimum (e.g. down to seconds) in order to trigger a renewed authentication on a new Star Random Challenge, which given the frictionless and instant (msec) signaling systems and methods as disclosed, inherently supports authentication at high frequency.

For example, without limitation, on requesting a Star Challenge, the IAPP may specify a period of time that a successful Response may remain alive (i.e. the certificate TTL). In one non-limiting example, on a user successfully responding to a STAR Challenge for authentication of a Twitter™ account as disclosed herein, and after the access controlling platform has instructed the cellular network hosted access controlling schema to process a micro payment charge (e.g. 1 cent U.S., per the "001" MICRO band signals of the multi-part signal, as disclosed herein), the STARKEY Platform may generate and record a globally unique STAR Certificate associated with the transaction, that may have an associated TTL set to, for example, one month (as specified by the IAPP requesting the Star Random Challenge), and after which the certificate would lapse and become invalidated, requiring a new Star Challenge in order to re-authenticate the account.

In another non-limiting example, on a user successfully responding to a STAR Challenge for authentication of a Twitter™ account access to a restricted resource (e.g. a news article) as disclosed herein, and after the access controlling platform has instructed the cellular network hosted access controlling schema to process a micro payment charge (e.g. 2 cents U.S., per the "002" MICRO band digits of the multi-part signal, as disclosed herein) the STARKEY Platform may generate and record a globally unique STAR Certificate associated with the transaction, that may have an associated TTL set to 10 minutes, after which the certificate would lapse and purge, and thus become unavailable/invalidated, requiring a new Star Challenge to regain access to the restricted resource.

In at least some embodiments, STAR time-lapsed digital certificates may be utilized similarly to a token issued to perform at least one activity (e.g., online activity, VR-activity, ATM-related activity, physical vending machine-related activity, etc.), or to gain access (e.g. board a public transit/transport system), that may remain valid for a pre-determine time period (e.g., month, week, day, hour, second, etc.). In at least some embodiments, on TTL expiry, for example, the STAR CA may then automatically purge the STAR certificate(s), via, for example, without limitation, modifying the datastore, which may record these ephemeral STAR Certificates, and thereby invalidate any subsequent requests to check for its existence (i.e. by analogy, invalidating access to the public transport at the turnstile, where the token may be inserted). In some embodiments, the star certificate is automatically purged by the datastore on the TTL expiring (e.g. reaching zero seconds) using native timer-event driven functionality.

In at least some embodiments, the exemplary STARKEY Platform and STAR CA may be operated by a single entity or multiple different entities. In at least some embodiments, in reference to the methodologies of FIGS. 1, 26A, and 26B, when the access authorization succeeds (e.g., STAR Challenge authentication is successful, a payment goes through creating CDR, etc.), a publisher/provider/merchant/host of the restrictive resource may receive an authoritative STAR Certificate from the access controlling platform (e.g. STARKEY Platform, STAR CA), validating and confirming a transaction's source.

Illustrative Non-Limiting Embodiments of Generating and Managing an Irrevocable Authoritative WHOIS Service (Star WHOIS Records) and/or Domain Name Service (DNS) Registration and Management (Star DNS Registrar)

Yet another technological shortcoming being addressed herein is that certain distributed data systems may utilize, for example, resource intense algorithms to allow entities to record data. For example, without limitation, Proof of Work algorithms (e.g., blockchain technologies) utilized for writing in blockchain technologies typically require considerable computational power consuming considerable amount of electrical energy, in some cases matching or exceeding the energy consumption of a state and/or a country.

Yet another technological shortcoming being addressed herein is that WHOIS lacks many of the modern protocol design attributes, for example internationalization and strong security. It is considered that WHOIS is a TCP-based (Transmission Control Protocol) transaction-oriented query/response protocol that is used to provide information services to Internet users, and the WHOIS protocol has no mechanism for indicating the character set in use. Originally, the predominant text encoding in use was US-ASCII. In practice, it is considered that some WHOIS servers, particularly those outside the USA, might be using some other character set either for requests, replies, or both. This inability to predict or express text encoding has adversely impacted the interoperability (and, therefore, usefulness) of the WHOIS protocol. Yet another technological shortcoming is that, it is considered, the WHOIS protocol has no provisions for strong security. WHOIS lacks mechanisms for access control, integrity, and confidentiality. Accordingly, WHOIS-based services are used for information which is non-sensitive and intended to be accessible to everyone. Typically, a WHOIS server listens on TCP port 43 for requests from WHOIS clients. The WHOIS client makes a text request to the WHOIS server, then the WHOIS server replies with text content. All requests are terminated with ASCII CR and then ASCII LF. The response might contain more than one line of text, so the presence of ASCII CR or ASCII LF characters does not indicate the end of the response. The WHOIS server closes its connection as soon as the output is finished. Typically, the closed TCP connection is the indication to the client that the response has been received.

Yet another technological shortcoming being addressed herein is that the domain name system (DNS), which is a distributed computing system that enables access to any resource in the Internet by translating user-friendly domain names to IP Addresses, lacks information that goes beyond information needed for resolution of domain name through domain servers. Such additional authoritative DNS information may include, without limitation, authoritative transactional information, authoritative reputational information, authoritative user/customer/subscriber profile information, etc. (collectively references herein as Authoritative Meta DNS Records). In some embodiments, Authoritative Meta DNS Records may be DNS Resource Records (RRs) that include additional authoritative DNS information.

In at least some embodiments, various access controlling network architectures, systems, components and/or elements of the present disclosure may be configured to provide technological solutions that generate Authoritative WHOIS information (also called herein STAR WHOIS Records) and Authoritative Meta DNS Records (also herein called STAR DNS Records) and then, for example, without limitation, record/store STAR WHOIS Records at WHOIS server(s) utilizing the WHOIS protocol, transforming WHOIS server(s) into STAR WHOIS server(s), and/or record/store STAR DNS Records at DNS server(s), transforming DNS server(s) into STAR DNS server(s)/registrar(s).

In at least some embodiments, without limitation, a STARKEY Platform may be programmed to generate limited-TTL Level 3 (L3, Wildcard) domain certificates in an illustrative exemplary format that a producer, publisher, merchant etc., may simply check against to validate a time-lapsing transaction (e.g. purchase, login access, etc.), for example on a DNS Lookup:

<certificate>.STARKEYS.COM (STAR Transaction Certificate Validation).

While in the above illustrative example, the Level 1 (TLD, L1) parameter is ".com", any other TLD (e.g. ".co", ".gov", ".org", ".net", etc.) may be utilized. Additionally, while in the above illustrative example, the Level 2 (SLD, L2) parameter is "STARKEYS", an existing trusted L2 brand name, may host star certificates under license (e.g. THAWTE, VISA, etc.). Additionally, in the above illustrative example, the Level 3 (Star/Wildcard L3) parameter is a string "<certificate>" that corresponds to authoritative information, forming a record/register (STAR DNS RR). In at least some embodiments, the exemplary STAR DNS registration and management of the present disclosure may utilize unlimited register space (sublevels below (to the left of) L2) to form the STAR DNS AUTHORITATIVE REGISTRAR:

L1=COM (.)
L2=STARKEYS
L3=STAR REGISTERS (STAR DNS RRs).

In at least some embodiments, the TTL of STAR Transaction Certificates may be 1-1,000 nanoseconds. In at least some embodiments, the TTL of STAR Transaction Certificates may be 1-1,000 microseconds. In at least some embodiments, the TTL of STAR Transaction Certificates may be 1-1,000 milliseconds. In at least some embodiments, the TTL of STAR Transaction Certificates may be 1-60 seconds. In at least some embodiments, the TTL of STAR Transaction Certificates may be 1-60 minutes. In at least some embodiments, the TTL of STAR Transaction Certificates may be 1-24 hours. In at least some embodiments, the TTL of STAR Transaction Certificates may be X days.

In at least some embodiments, upon expiration of TTL, STAR WHOIS Records/STAR DNS RRs (e.g., STAR Transaction Certificates) may be automatically purged by, for example, without limitation, WHOIS Server(s), DNS Server(s), Controlling Entity 3430 of FIG. 34, etc.

In at least some embodiments, to maintain the authoritative nature of the STAR DNS record/register, the STAR DNS server(s)/registrar(s) (e.g., DNS server(s) with STAR DNS RRs) are configured that the STAR DNS record/register is locked for writing—i.e., STAR DNS RR may only be read. In at least some embodiments, to maintain the authoritative nature of the STAR DNS record/register, for example, without limitation, only the STARKEY Platform/STAR CA is permitted to write/record and/or modify STAR DNS RRs to the STAR DNS server(s)/registrar(s). In at least some embodiments, to maintain the authoritative nature of the STAR DNS RRs, for example, without limitation, only the STARKEY Platform/STAR CA is prevented from modifying the STAR DNS RRs after they have been created/written into the STAR DNS server(s)/registrar(s) (i.e. a write-once restriction).

In at least some embodiments, without limitation, a producer/publisher computer system would be programmed to perform a DNS check on a STAR DNS RR. In some embodiments, for example, without limitation, a domain ownership may be validated by requesting a DNS TXT record (STAR DNS RR) that would have an expectation string (e.g., the STAR Access Controller Platform generated RAN, XY/MN4, transaction ID/reference, etc.) to be recorded in the L3 subdomain (L3 parameter) DNS record of a domain owner. For example, for an online transaction, an STAR DNS RR may be generated based on transactional data to serve as an atomic sales receipt ("atomic" as in uniquely individual and "atomic" with respect to time-lapsed validity) with DNS stamp (i.e., record on a DNS server). For example, when a DNS query on the openly shared certificate (STAR DNS RR) fails, then it is not a STAR authorized transaction since a STAR transaction that would be based, at least in part, on, for example, without limitation, a cellular mobile originated signaled identity associated with the internet connected device, that either has a cellular-enabled capability or is associated with another device having the cellular-enable capability, as disclosed herein.

[FIG. 37]

Figure 37:
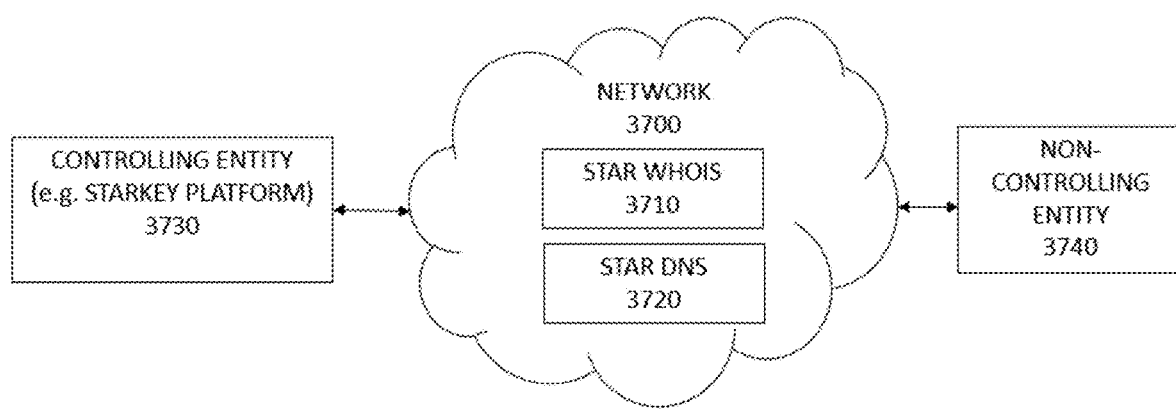
FIG. 37 is an illustrative non-restrictive example of an aspect in accordance with at least some embodiments of the present disclosure.

In at least some embodiments, referring to FIG. 37, various access controlling network architectures, systems, components and/or elements of the present disclosure may have an exemplary arrangement of FIG. 37, having a Controlling Entity 3730 (e.g. STARKEY Platform) that has read-and-write access to the STAR WHOIS records 3710 for reading and entering STAR WHOIS Information, and a Non-Controlling Entity 3740 that has a read-only access to the STAR WHOIS records 3710 for reading STAR WHOIS Information (e.g. STAR Transaction Certificates). In some embodiments, STAR WHOIS records 3710 may be part of a legacy WHOIS database or be a separate STAR WHOIS database.

Still referring to FIG. 37, Non-Controlling Entity 3740 may be producer, publisher, merchant, internet provider, online gaming platform, social media platform, etc. In at least some embodiments, the STAR WHOIS records 3710 may be maintained by the Controlling Entity or another Registering Entity (not shown), such as a Registry, a Registrar, or a Reseller of a Registry or a Registrar. In at least some embodiments, the STAR DNS RRs 3720 may be maintained by a Hosting Entity (not shown), such as a Registry, a Registrar, a Hosting Company, or a Reseller of a Registry, a Registrar, or a Hosting Company. In at least some embodiments, the Hosting Entity may host a web site, a webpage, an email address, a DNS record, or another network related service, resource, or document (or plurality thereof) associated with the domain name. Referring to FIG. 74, access to the STAR WHOIS 3710 and the STAR DNS 3720 by the Controlling Party 3730 and the Non-Controlling Party 3740 is performed via a Network 3700, such as the Internet.

In at least some embodiments, the STAR CA, the STAR DNS Registrar, and/or STAR WHOIS Records, and methods discussed herein, may be adapted into an arrangement and a process to establish, track and/or manage digital rights management (STAR DRM).

In at least some embodiments, various access controlling network architectures, systems, components and/or elements of the present disclosure (e.g. the STAR CA, the STAR DNS Registrar, STAR WHOIS Records) provide technological solutions that consume less (e.g., by several orders) electricity/computer power (e.g., environment friendly) than other distributed data systems (e.g., blockchain technologies) and utilize existing, ubiquitous infrastructure(s).

Illustrative Non-Limiting Embodiments of Permission-Based Controlling Network Architectures and Systems, Having Cellular Network Components and Elements Modified to Host Permission Controlling Schemas Designed to Facilitates Electronic Peer-to-Peer Communication Sessions Between Member Computing Devices Based on Cellular Communication Signals in Accordance with Novel Cellular Communications Protocols, and Methods for Use Thereof.

[FIG. 38]

Figure 38:
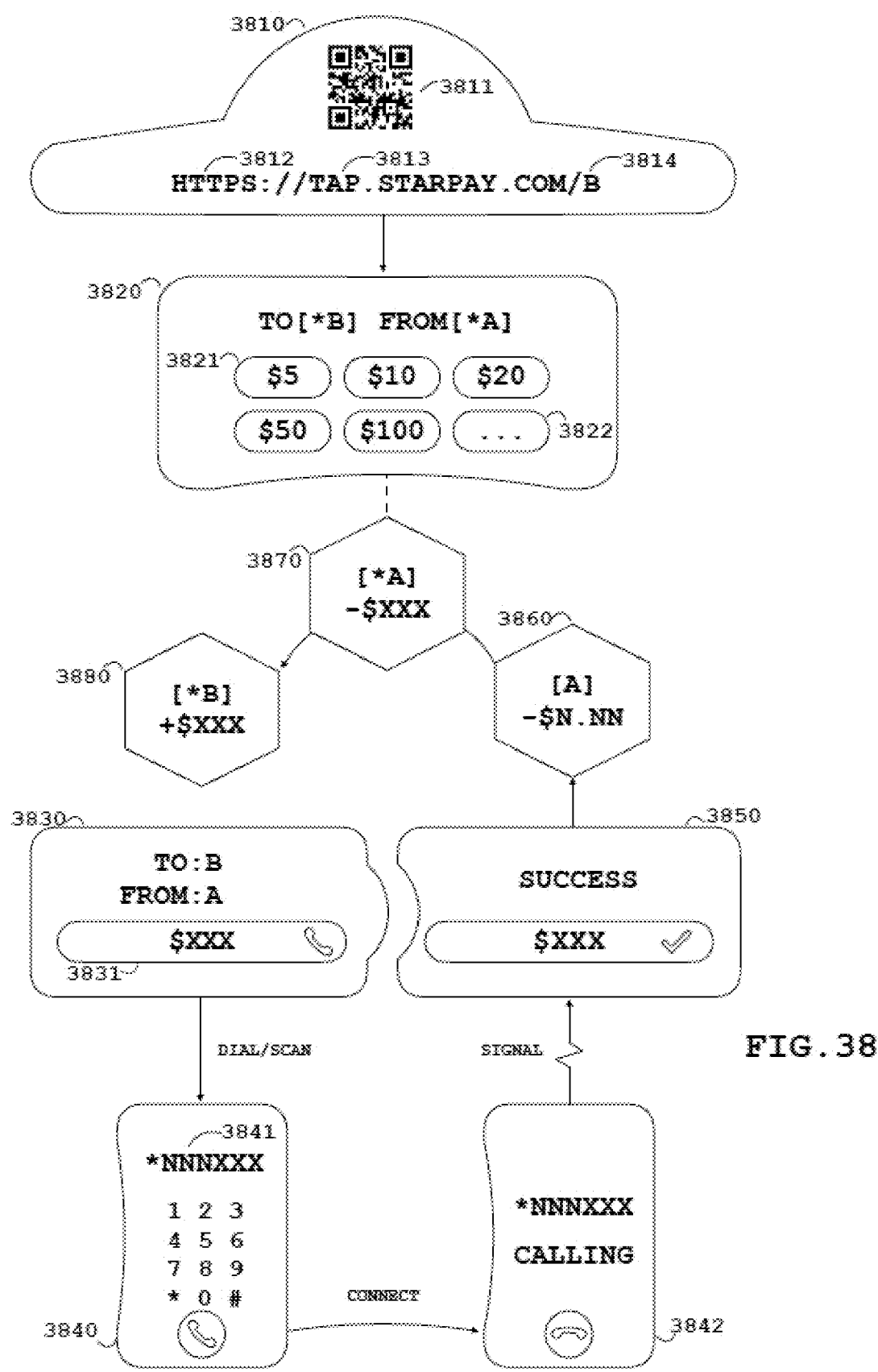
FIG. 38 is an illustrative non-restrictive example of a Star P2P Digital Communication Schema for token redemption (TAP).

In at least some embodiments, with reference to FIG. 38, which illustrates an exemplary TAP virtual Automated Teller Machine (also referenced herein as STAR ATM) interface (e.g. an encoded URL link having a subdomain "TAP", a graphical user interface (GUI) with the encoded link having the TAP subdomain), for example, without limitation, redeeming STAR CURRENCY (e.g., STAR tokens) as FIAT currency (cash). Any cellular user may present their STAR ATM with illustrative data as displayed in bubble 3810. For example, the STAR ATM may include the domain STAR PURL 3812, including a cellular identity of an associated cellular service enabled device, MSISDN B or the Cryptographically hashed MSISDN (e.g. XYM4-B) 3814, or an STAR QR code 3811 that is a QR code, encoding and encapsulating the PURL 3812 link and parameters.

This illustrative example of FIG. 38 assumes that an application (e.g. an exemplary IAPP of the present disclosure) is launched and prepared to conduct a P2P communication session in accordance with the present disclosure (e.g. transaction) on activating the PURL 3812 or scanning and accepting the QR code 3811 activation, when the application has been previously unlocked and paired with a cellular device A (e.g., based on MSISDN-A) as for example described herein in relation to the STAR Random Challenge and Response illustrative example.

In at least some embodiments, on scanning the QR code 3811 or on receiving and activating a STAR TAP communication session request (e.g., request to pay) in the form of the PURL 3812, the star token sending party IAPP on mobile device A is configured to render and display the associated ATM styled screen 3820, communicatively coupled to the STARKEY Platform, which displays a plurality of buttons, interchangeably referenced herein as STAR buttons, with common denominations 3821, for example $5, $10, $20, $50, $100 and so on. In one embodiment, a button 3822 may be programmed to permit the star token sender to specify an alternate cash receipt amount.

In at least some embodiments, on receiving aa activation input from the user (for example, without limitation, by tapping or clicking) based on the user activating one of the buttons displayed in 3820, the STARKEY Platform sets an expectation ([A:NNNXXX]) for the MICRO and MACRO signals anticipated from the cellular device with MSISDN-A, pre-addressed to a STAR Internet Wallet MSISDN-B ([*B]), per the URL link parameter 3814. Thus, in one non-limiting embodiment, the illustrative STARKEY Platform may be programmed/configured to set and control the MICRO signals (e.g. NNN) enumerating/corresponding to the amount to be charged (by configured element(s), hosting permission controlling schemas) for switching a communication session that may include cash redemption based on the user selected button.

In at least some embodiments, on activation, the screen of a cellular device, or any other associated computing device utilized by the user, may present an illustrative transaction summary 3830, displaying the star token recipient (MSISDN-B) and the star token sender (MSISDN-A), and the button 3831 may change to display the STAR address signals to dial in order to complete the transaction which, in the illustrated example, omits/hides the NNN MICRO address signals for clarity. In at least some embodiments, since the MICRO data signals correspond to a toll/fee that would typically be nominal in comparison to an amount enumerated in the MACRO data signals, the summary screen 3830 may simply footnote the signaling cost (NNN¢) to inform the user.

In at least some embodiments, on tapping or clicking the STAR button 3831 by the user, the IAPP launches a native cellular dialer 3840 with the expected Star address signals automatically entered 3841. This Star address displays the combined NNN (MICRO) and XXX (MACRO) address signals of a communication message/session as a unified symbolic (e.g. "*") prefixed phone number (*NNNXXX, *NNN*XXX etc.), per 3841. For example, the MICRO data may correspond to a fee levied in a $10 transfer/remittance (e.g. 10¢), resulting in address signals:

NNN=010 (¢ notation),
XXX=10 ($ notation), and
UNIFIED ADDRESS SIGNALS=*01010 (combined).

In one non-limiting embodiment, the MICRO and MACRO parts of the address signals may be distinctly colored in order to highlight and differentiate them and their respective wallets (cellular wallet (e.g. user's account at a cellular operator) versus internet wallet (e.g. STAR online wallet associated with the STARKEY Platform)). In one non-limiting embodiment the STARKEY Platform may be programmed to delimit/demarcate MICRO and MACRO signaling bands with Star (*) for simplified computational efficiency, and an enhanced user presentation, displaying the telephone number as:

*010*10.

In one non-limiting embodiment, the TAP cash redemption service of the STARKEY Platform is set on a distinctly defined STAR TAP subdomain 3813 of a parent domain (e.g., "starpay.com"), permitting the STARKEY Platform to uniquely and selectively interpret the XXX signals based a pre-set classification of subdomains. That is by including "TAP" as the subdomain 3813, the STARKEY Platform is configured to intelligently interpret NNN=10 to reflect $10 (ten dollars) rather than 100 (cents), since the TAP subdomain may be programmed, without limitation, to be associated with major rather than major/minor monetary units (e.g. in whole dollars, without cents).

In at least some embodiments, when the user presses CONNECT (e.g., Green Phone Button), the cellular device may be programmed to switch from the dialer addressing screen 3840 to the calling (signaling) screen 3842, where the cellular device MSISDN-A emits the address signals 3841. In some embodiments, the dial addressing screen 3840 and/or the calling screen 3842 may popup as a floating window/panel, overlaying only part of the IAPP screen.

In at least some embodiments, on receiving the address signals, the MNO cellular network performs the AAA procedure as described, without limitation, herein. In conducting the Accounting procedure, the OCS may be configured, via a permission controlling schema, to extract the fixed leading NNN digits, or to extract (e.g. utilizing for example, without limitation, PLSQL/Oracle SUBSTR functions/operations) the digits between the leading star (*) prefix and the second star (*) delimiter, enumerating the MICRO charge from the star (*) prefixed address signals, in order to determine whether a cellular account [A], associated with the caller has sufficient MICRO credit (NNN¢) to complete the P2P communication session signaling towards the STARKEY Platform for processing the transaction.

In at least some embodiments, when the associated cellular account has sufficient credit, the mobile network may be programmed to CONTINUE call routing toward the STARKEY Platform on the symbolic prefix as described, without limitation, herein. On receiving the call request, the STARKEY Platform may be programmed to determine whether the address signals match the expectation set ([A: NNNXXX], [A: NNN*XXX] etc.). That is whether the MICRO and MACRO (NNN and XXX) signals expected were emitted by the cellular device with MSISDN-A. When a valid matching expectation exists, the STARKEY Platform may be configured to determine when the STAR Internet wallet [*A] has sufficient MACRO credit (Star tokens) to complete the P2P communication session (e.g. transferring $XXX from STAR A Internet Wallet [*A] to STAR B Internet wallet [*B]).

In at least some embodiments, when sufficient funds exist in [*A], the STARKEY Platform may be configured/programmed to perform the WINK protocol as, for example, without limitation, disclosed herein, by taking the call OFFHOOK and momentarily thereafter replacing the call back ONHOOK to cause a CDR on the cellular network being generated for an amount enumerated by the MICRO address signals (i.e. NNN=NNN¢). Since the MACRO signals may be simply internal parameters to the STARKEY Platform, they may be ignored and not processed by the Cellular OCS.

In at least some embodiments, still referring to FIG. 38, the HOOK FLASH signaling method allows for modifying the respective data structure of the CELL wallet to record debit, a fee/toll, ([A]–$N.NN) for the signaling transaction 3860. The STARKEY Platform is then configured to continue the P2P communication session by conducting the MACRO transaction, debiting the sender device's associated STAR Internet wallet ([*A]=[*A]–$XXX) 3870, and crediting the recipient device's associated STAR Internet wallet ([*B]=[*B]+$XXX) 3880, with the corresponding amount. On MICRO and MACRO BAND communication session completion, the STARKEY Platform may be configured to communicate at least a transaction success indicator to the IAPP which may be programmed to then present a success screen 3850 which the Star token sender may present to the Star token receiver as transaction confirmation for the P2P communication session. In at least some embodiments, the star token recipient may then hand over the equivalent $XXX in cash (FIAT) to the star token sender.

In one non-limiting embodiment, the illustrative STAR TAP redemption protocol exchanges like for like, without the redeemer levying a payment surcharge or penalty. In one non-limiting embodiment, a portion of the MICRO switching fee that is debited to the CELL wallet [A] by the cellular operator, and automatically shared/transferred to an account associated with the STARKEY Platform according to a predetermined commercial rule (e.g., the agreed percentage) as described without limitation herein, may be credited to the redeemer STAR wallet [*B] in return for converting Star tokens into cash for the sender A (e.g. providing the cash redemption service, preforming personal ATM service).

In at least some embodiments, the TAP PURL 3812, thus incorporates the Star token recipient MSISDN-B address parameter directing the P2P communication session to process and conduct a transfer that would utilize the exemplary STARKEY Platform for recording a credit in the STAR B Internet wallet data structure [*B] and recording a debit in the previously IAPP paired STAR A Internet wallet [*A] with the selected transaction amount, and upon successful transfer (e.g., showing a receipt GUI 3850) token recipient B may then physically hand over the cash to sender A. In at least some embodiments, the token recipient B may also access their own PURL, that is access their PURL from their cellular device whose MSISDN-B matches the B link parameter 3814, to access payment history (e.g., that may be stored as part of recipient B's profile data structure), amongst other STAR related data, in order to verify the token transaction was completed (visually confirming that the most recent transaction just conducted, was successfully recorded).

In one non-limiting embodiment, when MSISDN-B has not previously received STAR CURRENCY (Token) deposits, the exemplary STARKEY Platform may be configured to automatically create a STAR B Internet wallet [*B] structure in an associated non-volatile datastore/computer memory so that digital transfers/funds may be processed and received, thus forward propagating the service without requiring an explicit/manual registration. In at least some embodiments, activating the B PURL (STAR Payment URL) may cause a rendering/display of a webpage that may be customized for and/by the MSISDN-B owner and, optionally, for display characteristic(s) of the device having the entity of MSISDN-B, which may then be presented to the display screen of the Star Token Sender A (who is initiating the token transfer).

In at least some embodiments, when the B PURL is accessed by cellular device with MSISDN-B, by utilizing any embodiment detailed herein, the STARKEY Platform may be configured to present one or more personalization service options. In at least some embodiments, personalization options may include, without limitation, accessing payment history, setting personal identifying information (for example, a photo or logo) and custom STAR ATM options which may change the default denominations and settings. In at least some embodiments, the STARKEY Platform may be configured to present HTML constructor tools (e.g., HTML editor/design tool) to control the design and/or layout of the customized page(s).

In at least some embodiments, the illustrative STAR TAP protocol may be extended to support additional parameters that can automatically set the MICRO NNN address signals and the MACRO BAND parameter for a single tap service (that is, the user would not have to explicitly select the denomination, as described above in screen 3810. In the following non-limiting examples, STAR personalized URLS (PURLS), B denotes the recipient's device MSISDN (by example, 14154125111), NNN enumerates the MICRO switching and a corresponding toll/fee (e.g., surcharge fee, processing fee, credit fee, etc.), and XXX enumerates the MACRO parameter that may correspond to a cash denomination to transfer during the P2P communication session:

(1) HTTPS://TAP.STARPAY.COM/14154125111?N=050&X=10.00&T=$10CASH,
(2) HTTPS://TAP.STARPAY.COM/14154125111?N=250&X=50.00&T=$50CASH,
(3) HTTPS://TAP.STARPAY.COM/14154125111?N=500&X=100.00&T=$100CASH

In the PURL (1) above, the domain "starpay.com" may be associated with the exemplary STARKEY Platform, and a participating STAR entity (e.g. a merchant (e.g. kiosk operator)) with a cellular-service enabled computing device (e.g., a payment terminal), having identity of MSISDN 14154125111, may present a QR code, encapsulating and encoding the above PURL (1) that offers to redeem $10.00 (X=10) in cash, levying a 5% surcharge (N=050=$0.50) with a text title string (T="$10 CASH") that may be displayed in the summary screen 3820. In this illustrative fully formed ATM PURL example, the user/consumer may then be presented with a *05010 (or *050*10) address string to dial or send SMS to, where the first three digits (NNN) thus set the transaction switching fee/surcharge (in cent notation), and where the remaining XXX digits represent the cash redemption value (in dollar notation).

In another non-limiting embodiment of PURL (2) above, an offer to redeem $50.00 in cash levying a $2.50 surcharge; and in non-limiting embodiment of PURL (3) above, $100.00 in cash levying a $5 surcharge. In at least some embodiments the above PURLS may display a Cryptographically Hashed MSISDN-B (e.g., SSHA-296, per the methods disclosed herein) in order to safeguard the privacy of Star Token Recipients. For example, where MSISDN-B is 14154125111, a PURL may present as:
HTTPS://TAP.STARPAY.COM/
*us51115ee32fa1faceeafd04aa80738c3297362534a1cd7ffa3692eeb28ad614041d10? . . .

In at least some embodiments, for example, without limitation, element(s) of a cellular network may administer surcharges/transaction fees that may themselves be subject to a transactional program and/or which may perform a permission controlling schema(s) to permit, recognize and parse out a switching fee/toll, levied by the MNO and/or by the exemplary STARKEY Platform, for example deducting a percentage of the $N.NN amount, represented by MICRO address signals, and the balance of which is then credited to the STARKEY Platform wallet ([*], the ledger which records, summates and reconciles all MICRO transactions) and then further, may credit to, or credit a portion to, the Star Internet B wallet ([*B]).

In at least some embodiments, the STARKEY Platform may be configured to communicatively operate with a social media network platform/website/IAPP that may be programmed/configured to enable their users to share a STAR PURL to raise funds (e.g., online fundraising campaigns, etc.) by requesting donations from other users who may or may not be previously pre-registered with the STARKEY Platform. In one non-limiting embodiment may be distinguished based on a PURL that may be configured, by the exemplary STARKEY Platform, such as:
HTTPS://UA.STARPAY.COM/B The internet address having UA(*) subdomain of the domain (STARPAY.COM) may be an indicator for the exemplary STARKEY Platform to process the received Star Tokens, then render and host an illustrative enterprise system that may be programmed to administer STAR B Internet wallet funds to one or more electronic transfers and/or via one or more other communicating devices associated, for example, without limitation, with one or more other entities.

At least some embodiments of the present disclosure, by themselves or in combination with one or more embodiments detailed herein, may provide any user, operating a cellular-service enabled device (e.g. every person associated with a cellphone), having an identity (e.g. cellular identity (e.g. MSISDN, or Cryptographically hashed MSISDN, e.g., C24XYM per the disclosed hashing methods herein)) to become an individual digital bank of one, delivering personal financial services (e.g., microlending) on a cellular scale. For example, without limitation, the STARKEY Platform can be configured, utilizing a predetermine subdomain permission controlling schema, and MICRO and MACRO signaling schema, to provide users ability to pay to distinct entities (e.g. users, ridesharing service, delivery service, etc.) by dialing a single multi-part address sequence or sending to an SMS, directed to the same single multi-part address sequence.

[FIG. 39]

Figure 39:
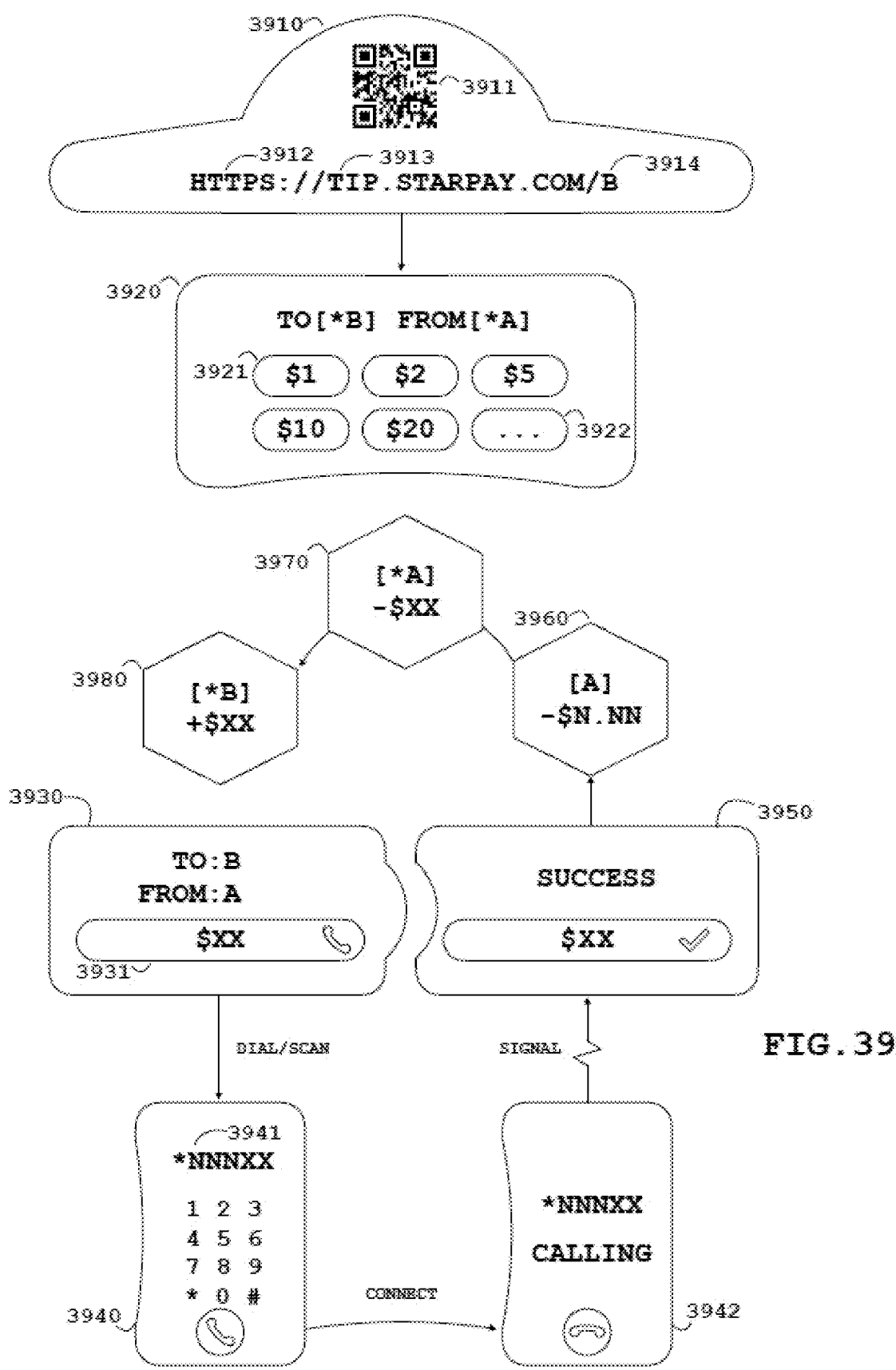
FIG. 39 is an illustrative non-restrictive example of a Star P2P Communication Schema for Gratuities, Real-world services and/or products (TIP).

In at least some embodiments, with reference to FIG. 39, the exemplary STARKEY Platform may be configured, utilizing a predetermined subdomain permission controlling schema, and a MICRO and MACRO multi-part signaling schema, to provide a TIP (gratuity) based schema and permission-based controlling architecture for paying (e.g., tipping) service providers.

In at least some embodiments, any cellular user may present their virtual STAR TIP Jar with data as displayed in bubble 3910. For example, a STAR personalized PURL 3912 including their identity (e.g. cellular MSISDN B, hashed C24XYM cellular identity etc.) (3914), or an Internet QR code 3911 encoding and encapsulating the PURL 3912 link and parameters.

In at least some embodiments, assuming that the IAPP conducting this transaction has been previously unlocked (access granted) and paired with cellular device A (MSISDN-A) utilizing one or more embodiments detailed herein (e.g., via STAR Challenge and Response), on scanning the QR code (3911) or receiving and activating the STAR TIP payment request URL (3912), the sending party IAPP on mobile device A renders and displays the associated service screen (e.g. a webpage) including a GUI 3920, which may consist of a plurality of STAR programmed buttons with different common tip amounts 3921, for example $1, $2, $5, $10, $20 and so on. In one non-limiting embodiment, a button 3922 permits the user to specify an alternate TIP amount.

In at least some embodiments, on activating (for example, by tapping or clicking) one of the buttons in 3920, the exemplary STARKEY Platform sets (e.g., in a computer memory (e.g., cache, database)) an expectation ([A:NNNX]) for multi-part MICRO and MACRO signals anticipated from MSISDN-A, preaddressed to cellular device with MSISDN-B, per the URL link parameter 3914. Thus, in one embodiment, the STARKEY Platform sets and controls the NNN (MICRO) signals and the equivalent amount for tipping.

In at least some embodiments, on activation, the screen may present the transaction summary 3930 on the device A, displaying the recipient's identity (e.g. MSISDN-B, hashed C24XYM, XYM4, [YYYY], etc.) and the sender's identity (e.g. MSISDN-A, hashed C24XYM, XM4, [YYYY], as disclosed herein), and the button may change to display the STAR telephone number to dial 3931 to complete the transaction in a P2P communication session which, in the illustrated example, may omit the NNN (MICRO) address signals for clarity since they may be nominal. In one non-limiting embodiment, the summary screen 3930 may include a message (e.g. footnote) about the signaling cost ($N.NN) to inform the user. In one non-limiting embodiment, both the Micro NNN and Macro X amounts are displayed, for example, $N.NN and $X and the total $(X+N.NN) cost of the pending transaction.

In at least some embodiments, on activating (e.g. tapping, clicking) the STAR button 3931 the IAPP may be configured to present a native cellular dialer 3940 with the expected multi-part star address signals automatically entered 3941 (or present a native SMS message interface with a recipient field being pre-populated with the multi-part star address signals 3941). These address signals include the combined NNN (MICRO) and X (MACRO) payment signals in a unified star prefixed address (i.e. *NNNX or *NNN*X) B41. For example, in one non-limiting embodiment, the MICRO fee levied for a $1 tip may be 1¢, resulting in address signals:

NNN=001 (¢ notation),
X=1 ($ notation),
STAR ADDRESS SIGNALS=*001*1 (combined).

Similarly, a $10 tip with a 10¢ switching fee may present address signals as follows:

NNN=010 (0 notation),
XX=10 ($ notation),
STAR ADDRESS SIGNALS=*010*10 (combined).

In one non-limiting embodiment, the MICRO and MACRO address signals may be distinctly colored to highlight and differentiate them as cent and dollar notations. In one non-limiting embodiment, a symbol (e.g. star (*)) may separate and delimit them for computational efficiency and enhanced user presentation, displaying the virtual phone number for the latter example above as:

*010*10.

In one non-limiting embodiment, the TIP service may be set on a distinct STARPAY TIP subdomain 3913 permitting the exemplary STARKEY Platform to uniquely and selectively interpret the X signals. For example, the STARKEY Platform is configured to identify the presence of the subdomain name TIP and thus interpret MACRO signal X=1 to reflect $1 (one dollar) and MACRO signals XX=10 to reflect $10 (ten dollars), since digital tips may typically be in those orders of magnitude. In at least some embodiments, MICRO signaling parameters may enumerate transferring an amount in, for example, without limitation, dollars normalized as cents, and MACRO parameters may be represented as discrete dollar digits.

Figure 40:
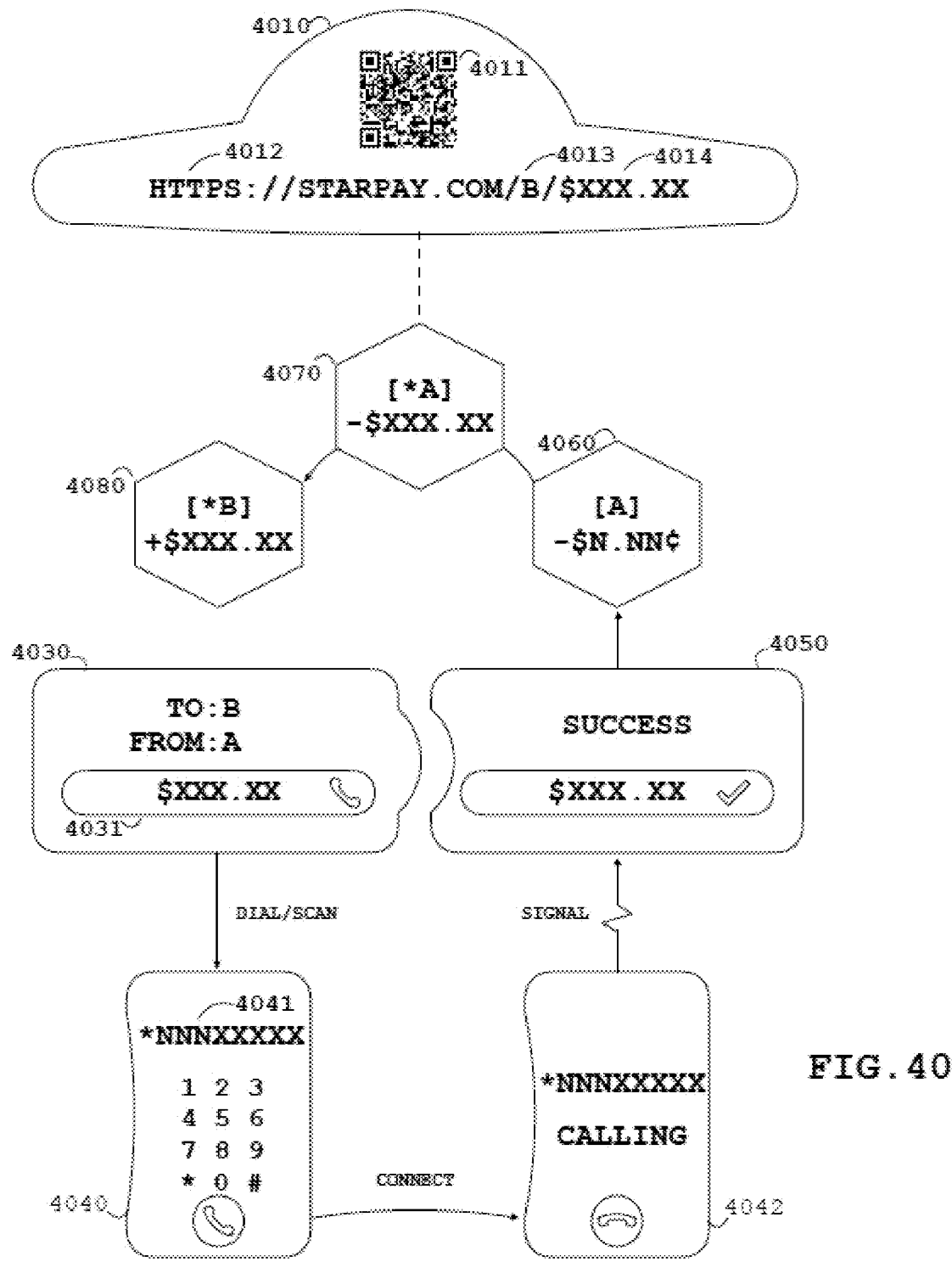
FIG. 40 is an illustrative non-restrictive example of a Star P2P Invoicing URL and Schema.

In at least some embodiments, illustrative non-limiting Star Invoicing embodiments, as herein described in reference to FIG. 40, may be configured to execute communication sessions related to precise payments, including both, for example, without limitation, dollars and cents (e.g., XXXXX=12399 representing $123.99).

In at least some embodiments, when the user presses a CONNECT button (e.g., Green Phone Button), the user's cellular device switches from the dialer addressing screen 3940 to the calling screen 3942, where the cellular device MSISDN-A emits the address signals 3941. In some embodiments, the dial addressing screen 3940 and/or the calling screen 3942 may popup as a floating window/panel, overlaying only part of the IAPP screen In at least some embodiments, on receiving the STAR address signals, corresponding to 3941, the mobile network performs the AAA procedure as described without limitation herein. In at least some embodiments, conducting the Accounting procedure, element of the mobile/cellular network are configured to act as permission controlling schema(s) (e.g. the OCS) may be configured to extract the fixed leading NNN digits enumerating the MICRO parameter from the star (*) prefixed address signals, to determine whether an account associated with the caller has sufficient credit ($N.NN) to complete the transaction signaling portion of the TIP communication session.

When the associated account has sufficient MICRO credit, elements of the mobile network are configured to continue to route the call toward the STARKEY Platform as, for example, without limitation, detailed herein. In at least some embodiments, on receiving the call signals associated with the routed call the STARKEY Platform determines whether the address signals match the expectation set (e.g., [A,NNNXX]) from MSISDN-A. When a valid matching expectation exists, the STARKEY Platform determines whether the STAR A Internet wallet [*A] has sufficient MACRO credit to complete the $XX transfer into the Star B Internet wallet [*B].

In at least some embodiments, when the sufficient funds are present in wallet [*A], the STARKEY Platform may be configured to perform the WINK protocol, as disclosed without limitation herein, by taking the call OFF HOOK and momentarily thereafter replacing the call ON HOOK to cause the cellular network to record the MICRO parameter (e.g. switching fee) in a CDR.

In at least some embodiments, the HOOK FLASH signaling methodology may cause the CELL A wallet of the sending device to be debited ([A]−$N.NN) for the signaling transaction 3960. In at least some embodiments, the STARKEY Platform may be configured to then parse the MACRO parameter of the addressing sequence during the P2P communication session in order to process and complete the transaction, by debiting the STAR A Internet wallet ([*A]=[*A]−$XX) 3970, and crediting the STAR B Internet wallet ([*B]=[*B]+$XX) 3980, with the corresponding amount. On MICRO and MACRO transfer completion, the STARKEY Platform may be configured to communicate at least a transaction success indicator to the IAPP which may then present success screen 3950 completing the TIP process. In some embodiments the STARKEY Platform may be furthermore programmed/configured to record an authoritative (e.g. in a Star Subdirectory, a Star Subdomain, etc.) transaction certificate (The Star Certificate) which the IAPP and/or the IAPP Platform my then query to validate the transaction per the methods and systems disclosed herein.

[FIG. 40]

In at least some embodiments, in reference to FIG. 40, an illustrative STAR INVOICING permission controlling schema and permission controlling networking architecture for settlement using STAR CURRENCY (e.g. digital tokens, representation of FIAT, Crypto, or any other currency) accumulated in STAR Internet Wallets, enables users to pay for goods and/or services, offered online and/or in physical stores. In at least some embodiments, any cellular user may present their STAR Invoice with data as displayed, for example, in bubble 4010. For example, a STAR PURL 4012 including their cellular identity (e.g. MSISDN B, C24XYM-B, etc.) 4013 and invoice amount 4014, and/or an Internet QR code 4011 encoding and encapsulating the PURL 4012 link and parameters. In at least some embodiments, invoice parameters and information may be included in the PURL 4012, including without limitation, one or more of the invoice amount, description of and/or identifier (e.g. SKU) of goods/service rendered, a payment/transaction reference/identifier and so on. In one non-limiting embodiment, the STAR PURL may incorporate a link reference rendering a personalized invoice for the service provider. For example:

HTTPS://INV.STARPAY.COM/14154125111?X=364.10&CO=ACME.COM&INV=4012.

In the above PURL example, a service provider company ACME.COM requests a payment for services rendered in the amount $364.10 per INVOICE#4012. In this example, the internet invoice link is absent a MICRO parameter (e.g. transaction fee) ($N.NN). The exemplary STARKEY Platform managing the PURL may thus insert the generated MICRO switching signals that enumerate into the dollar amount debited to the cellular account [A] of the customer utilizing the exemplary STAR INV Platform. Thus, in this example, assuming a micro switching fee equal to $0.50, the user activating the above PURL would dial address signals, *05036410 or *050*36410, from the cell with MSISDN A, resulting in the following wallet transactions (debits and credit), where B is the recipient and service provider, with MSISDN 14154125111:

CELL Wallet [A] is Debited (−$0.50),
STAR Wallet [*A] is Debited (−$364.10),
STAR Wallet [*B] is Credited (+$364.10).

And, for example as detailed without limitation herein, the $0.50 switching fee may be debited by the cellular operator (e.g. utilizing permission controlling schema(s) and/or associated services/network systems/devices) to the CELL [A] wallet that then itself may be further shared with the STARKEY Platform at an agreed percentage and/or amount. In one non-limiting embodiment, a PURL reference parameter for example "&CO=ACME.COM", may be rendered together with STARPAY.COM for example utilizing an HTML IFRAME (e.g., <iframe src="https://www.acme.com</iframe>) to brand the invoice.

In at least some embodiments, utilizing STAR MACRO payments staged using a PURL (and administered by the exemplary STARKEY Platform) may thus direct the user to a pre-addressed data structure of STAR Wallet [*B] whose data schema may be configured to record data corresponding to an amount of payment being deposited.

In at least some embodiments, the exemplary STARKEY Platform may be configured/programmed to record an expectation [A:NNNXXXXX] for the expected address signals, as detailed herein, to be received from a cellular phone with MSISDN-A, which may result in an internal MNO cellular network executed MICRO access signaling processing charge, deducting $N.NN from the user's CELL wallet [A], and an external (Internet) MACRO transaction transferring $XXX.XX from STAR wallet [*A] to STAR wallet [*B], as recorded in the requesting PURL. In at least some embodiments, the external transaction may be signaled and transported transparently over the cellular network, which may authorize the signaling transaction on analyzing only the leading MICRO address signals (NNN), in order to determine when credit sufficiency ($N.NN) exists in the CELL wallet [A] associated with MSISDN-A, whereas the MACRO address signals, enumerating the invoiced $XXX.XX amount per the requesting PURL parameter 4014, may not be analyzed by element(s) of the cellular network, programmed to operate in accordance with the disclosed permission controlling schemas (e.g. a modified MNO/OCS). Rather, the STARKEY Platform may be programmed/configured to process MACRO parameters on determining that the STAR wallet [*A] has sufficient token credits to support the transfer identified by the MACRO parameter into the recipient STAR wallet [*B] per PURL parameter 4013.

In at least some embodiments, where a three (NNN) decimal MICRO address digit signaling may permit cellular payments between $0.01 and $9.99, the present description may permit an unrestricted and variable X digit length series to facilitate internet transfers of any amount (e.g., $1 to $1000 and beyond) as disclosed in the multi-part P2P communication signaling protocol and session.

In at least some embodiments, still referencing FIG. 40 and assuming that the IAPP rendering the PURL has been previously unlocked and paired with cellular device A (e.g. MSISDN-A, XYM4-A, etc.), utilizing, for example, without limitation the STAR Challenge and Response embodiment detailed herein, on the sender scanning the QR code 4011 or on receiving and activating the STAR PURL 4012, the sending party IAPP on a mobile internet device A, in one embodiment, may be instructed (e.g. per one or more embodiments detailed herein) to render and display, for example, without limitation, an associated page and a screen 4030, which presents a STAR INVOICE BUTTON displaying the invoiced amount $XXX.XX (4031).

In at least some embodiments, on activating the button, the STARKEY Platform may be programmed/configured to set an expectation ([A:NNNXXXXX]) for multi-part MICRO and MACRO address signals anticipated to be received from MSISDN-A, preaddressed to cellular device with MSISDN-B on PURL link parameter 4013. Thus, in one embodiment, the STARKEY Platform may be programmed/configured to set and insert the MICRO payment signals (NNN) enumerating the amount for processing the transaction as part of communication session.

In at least some embodiments, on STAR button 4031 activation, the button may progress through a communication transition series as described without limitation herein, prompting the user to dial the address signals (and/or send an SMS, dial USSD etc.) and for an associated mobile device to emit the expectant address signals. In at least some embodiments, IAPP thus is configured/instructed to present, for example, without limitation, the native cellular dialer 4040 with the expected STAR sequence of digits being automatically inputted/prepopulated as a to-be dialed (i.e. Click-to-Call) number 4041. In at least some embodiments, the expected STAR sequence of digits for address signals include the combined NNN (MICRO) and XXX (MACRO) parameters in a unified symbol (e.g. star) prefixed (*NNNXXXXX, *NNN*XXXXX) address 4041. For example, in the above PURL, a $1.00 MICRO fee may be levied for processing the $364.10 invoice payment resulting in address signals:

NNN=100 (¢ notation),
XXX=36410 ($ and ¢ notation),
SIGNALS=*100*36410.

In at least some embodiments, the MICRO and MACRO addressing digits of the STAR sequences, corresponding to addressing signals, may be distinctly colored to highlight and/or differentiate them (e.g., the first color denoting the micro cent, and the second color denoting the macro dollar amounts). In one non-limiting embodiment, a star (*) may delimit them for computational efficiency and enhanced user presentation, displaying the telephone number as:

*100*36410.

In at least some embodiments, on pressing CONNECT (e.g., Green Phone Button) by a user, the cellular device switches from the dialer addressing screen 4040 to the calling screen 4042, where the cellular device MSISDN-A emits the address signals 4041. In some embodiments, the dial addressing screen 4040 and/or the calling screen 4042 may popup as a floating window/panel, overlaying only part of the IAPP screen.

In at least some embodiments, on receiving the address signals, the mobile network may perform the AAA procedure as described, without limitation, herein. In at least some embodiments, in conducting the Accounting procedure, the OCS may be configured to extract the fixed leading NNN digits enumerating the MICRO transaction from the star (*) prefixed multi-part address signals and determine whether a cellular account [A] associated with the caller MSISDN-A has sufficient credit ($N.NN) to complete the transaction signaling (e.g. cellular switching) portion of a P2P communication session.

In at least some embodiments, when the associated account has sufficient MICRO credit, the illustrative cellular network may be configured to continue routing the call request toward the STARKEY Platform as described without limitation herein. On receiving the call request the STARKEY Platform determines whether the address signals match the expectation set (e.g. [A:NNNXXXXX]) and were transmitted from cellular device MSISDN-A. When a valid matching expectation exists, the STARKEY Platform determines whether the STAR Internet wallet [*A] has sufficient MACRO token credits to complete the $XXX.XX transfer into recipient STAR Internet wallet [*B], as designated by PURL parameter 4013. When sufficient funds exist in [*A], the STARKEY Platform may be configured to perform, without limitation, an exemplary WINK protocol as disclosed without limitation herein, taking the call OFF HOOK and momentarily thereafter replacing the call back ON HOOK to cause the recordation of a MICRO transaction CDR on the cellular network.

In at least some embodiments, the illustrative HOOK FLASH signaling debits the CELL wallet ([A]–$N.NN) for the signaling transaction 4060. The STARPAY Platform then conducts the MACRO transaction by debiting the STAR A wallet ([*A]=[*A]–$XXX.XX) 4070, and crediting the STAR B wallet ([*B]=[*B]+$XXX.XX) 4080, with the corresponding amount. On MICRO and MACRO payment completion, the STARKEY Platform communicates at least a transaction success indicator to the IAPP which may then present success screen 4050 completing the STAR Invoice signaling session/process.

While the above examples describe settling an invoice, it will be clear that any merchant (e.g., kiosk selling goods (e.g. perishables) may similarly request a STARKEY Platform mediated communication payment session by, for example, without limitation, generating a QR code encapsulating their MSISDN-B and the total amount expected at a checkout register. In at least some embodiments, merchants may display preprinted, statically generated QR codes (a paper receipt with QR code), requesting fixed and rounded up MACRO amounts for bundles of goods (e.g., a grocery checkout receipt for a bundled bag of goods, e.g., charging $10 for "a loaf of bread, carton of milk and portions of fresh fruit").

[FIG. 41A]

Figure 41A:
FIG. 41A is an illustrative non-restrictive example of a Star Micro/Macro Band Signaling Notation.

In at least some embodiments, with reference to FIG. 41A which depicts an exemplary permission controlling schema, including multi-part signaling comprising, symbolic prefix, fixed MACRO and variable MICRO address signals per table row 4101, that modified cellular network element(s) and the exemplary STARKEY Platform may utilize in accordance with the present disclosure. In one non-limiting embodiment, the address routing refix may be a single symbol (e.g. star (*)), the fixed MICRO signals are enumerated on three decimal digits (NNN) and the variable MACRO signals are enumerated on one to many (X) decimal digits, for example as many as may be required to enumerate the total dollar and cents amount in the illustrative STAR Invoicing schemas as disclosed herein.

[FIG. 41B]

In at least some embodiments, which depicts an extended multi-part MICRO and MACRO permission controlling schema (conversion routing schema) that can be utilized as detailed without limitation herein:

Column 1 presents the combined MICRO and MACRO address signals;

Column 2 presents the fixed length MICRO address signals (N);

Column 3 presents the variable length MACRO address signals (X);

Column 4 presents the MICRO switching fee debited to CELL wallet [A]; and

Column 5 presents the MACRO amount transferred between STAR wallets [*A] and [*B].

Figure 41B:
FIG. 41B is an illustrative non-restrictive example of a Star Micro/Macro Band Controlling/Session record-keeping Matrix.

For example, without limitation, the NNN address signals may enumerate the NNN¢ MICRO switching fee, as disclosed herein, supporting switching fees between $0.00 and $9.99. With further reference to FIG. 41B:

Row 4102 shows 1X MACRO address signals parsed into a min/max $1/$9 transfer;

Row 4103 shows 2X MACRO address signals parsed into a min/max $10/$99 transfer;

Row 4104 shows 3X MACRO address signals parsed into a min/max $100/$999 transfer; and Row 4105 shows 4X and more MACRO address signal series supporting $1000 and up transfers.

In the schema of FIG. 41B, row 4105 signals may thus enumerate into dollar and cents, for example, XXXXX=36410=$364.10 per the STAR invoicing example described in FIG. 40, whereas signals per Rows 4102-4104 may thus enumerate into dollar only amounts, for example X=1=$1, XX=10=$10 and so on, per the examples in FIGS. 38 and 39 herein.

[FIG. 41C]

Figure 41C:
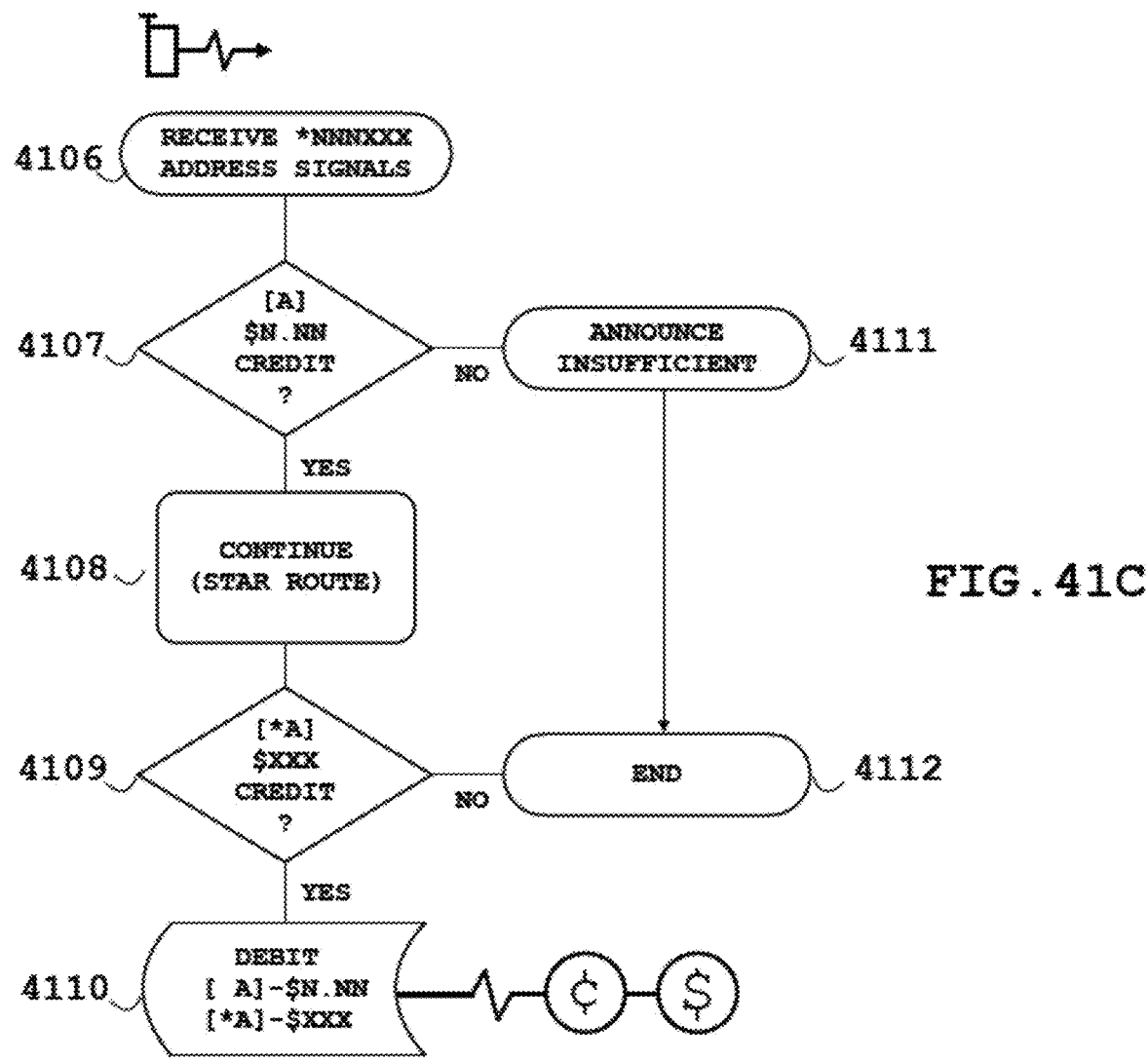
FIG. 41C is an illustrative non-restrictive example of a Star Micro/Macro Band Permissions Verification Flow Chart.

In at least some embodiments, the present disclosures provide a multi-part signaling communication session for a MICRO and MACRO transaction credit verification flow with reference to FIG. 41C.

At step 4106, an exemplary MNO may receive the *NNNXXX address signals from a cellular device with MSISDN-A.

At step 4107, an exemplary OCS is configured to perform a credit verification to determine whether an account associated with a caller A (CELL Wallet [A]), has sufficient MICRO credit (NNN¢) to complete the signaling/switching portion of the transaction. In one non-limiting embodiment, the OCS extracts the first three digits which enumerate the MICRO switching tariff. When the CELL Wallet [A] has sufficient credit, then the flow progresses along the affirmative "YES" path to step 4108, otherwise the flow branches along the negative "NO" path to step 4111.

In the flow of FIG. 41C, at step 4108, on determining an insufficient credit condition that disqualifies the MICRO parameter, the MNO may be programmed/configured to play an announcement (e.g. "You have insufficient credit to complete this call") and/or terminate the call.

In the flow, at step 4108, the MNO is programmed to CONTINUE the call along the star route defined by the star (*) prefix, to the STARKEY Platform, as described without limitation herein.

In one non-limiting embodiment, the MNO may define a Wildcard (*) routing entry in the switching element table, that routes all undefined star prefixed numbers to the STARKEY Platform for processing. For example, a routing entry described as:

*N (min=0,max=28)→STARKEY Platform, may permit all star (*) N digit address signals, corresponding to a minimum of zero and a maximum of twenty eight digits (per ANSI/ITU CdPN Information Element (0x02) Specification), to be routed toward the STARKEY Platform, by default. For example, when switching precedence prioritizes more specific routing patterns over less specific routing patterns, any existing star numbers offering specialized services, for example *PAY (*729), which may route cellular subscribers to an IVR for fast processing (e.g. account payment) would take a routing priority and precedence over a more generic *NNN (any undefined three digit) routing definition. Similarly such anecdotal and extraneously defined star dialed numbers may be excluded from the computational modifications in the network billing elements (OCS) so as not to apply the disclosed cellular network hosted access controlling schemas (i.e. not applying a $7.29 charge per the above predefined service signals).

In the flow of FIG. 41C, at step 4109, on receiving the star NNNXXX address signals the STARKEY Platform determines whether STAR Internet wallet [*A] has sufficient funds to complete the MACRO $XXX enumerated portion of the transaction. When the [*A] wallets has a sufficient token balance to cover the MACRO amount (and/or associated with a sufficient MACRO credit), the flow of FIG. 41C progresses along the affirmative YES path to step 4110, otherwise flow branches along the negative NO path to step 4112.

In the flow, at step 4109, on verifying the STAR wallet token/credit sufficiency the STARKEY Platform may perform the WINK protocol, as described without limitation herein, causing to debit the CELLULAR wallet ([A]=[A]−$N.NN), and then debiting the STAR A wallet ([*A]=[*A]−$XXX) to complete the A party transaction of the multi-part signaled communication session. In at least some embodiments, the STARKEY Platform may then credit the STAR B wallet ([*B]=[*B]+$XXX) with the corresponding amount to complete the P2P transfer (not shown).

In the flow of FIG. 41C, at stage 4112, on determining the STAR wallet has insufficient credit, the STARKEY Platform may terminate (disconnect) the call, and in one non limiting embodiment, the STARKEY Platform may communicate transaction declined to the IAPP, which may then be programmatically instructed to visually indicate transaction failure by changing the Star Pay Button text (e.g. to display "Declined", "No Credit/Tokens" etc.) and may further animate the Star Button left, then right, and left again (i.e. "shaking the button from side to side" to signal "no").

[FIG. 42]

With reference to FIG. 2, which describes an expectation flow in accordance with one non-limiting embodiment. In the flow, at step 4200, the IAPP opens a B addressed Personalized URL (PURL), requesting a MACRO $XXX payment as described in FIG. 38, FIG. 39 and/or FIG. 40 herein.

At step 4201, user A activates the PURL by, for example, tapping or clicking the link or scanning and accepting the QR code.

Figure 42:
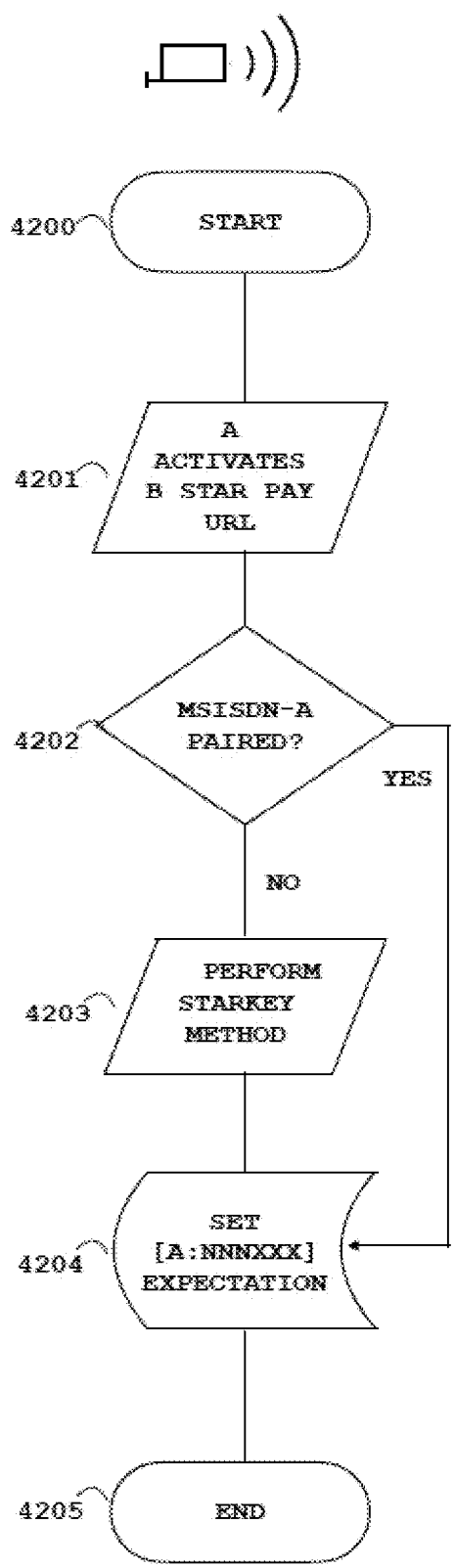
FIG. 42 is an illustrative non-restrictive example of a Star Micro/Macro Band Expectation Flow Chart.

At step 4202, the STARKEY Platform servicing the PURL determines whether user A has been previously identified as an operator of a cellular device with MSISDN-A and paired with the IAPP per one or more embodiments disclosed herein (e.g., the user has passed a STAR Challenge and Response). For example, absence of a paired MSISDN or hashed XMSISDN, as disclosed herein, the flow of FIG. 42 continues along the negative "NO" path to step 4203. When an MSISDN/XYM is detected and paired with the IAPP requesting the PURL, the flow progresses along the affirmative YES path to step 4204.

At step 4203, the STARKEY Platform may be configured to perform, for example, without limitation, a multi-part signaled MICRO/MACRO/RAN STAR Challenge and Response method (as disclosed herein) to both identify an identity of a cellular device associated with the user (e.g. MSISDN), and too conduct the MICRO and MACRO transaction in a single user step/engagement. In one embodiment the STARKEY Platform sets an [A:NNNXXXYYYYYYYYY] expectation record anticipating and enumerating a MICRO $N.NN parameter, a MACRO $XXX parameter, and a RANDOM YYYYYYYYY challenge that must be met with matching cellular signals emitted by a cellular device over the MNO and received at the STARKEY Platform, At step 4204, the STARKEY Platform sets an [A:NNNXXX] expectation enumerating a MICRO $N.NN parameter and a MACRO $XXX parameter, which anticipates address signals NNNXXX from cellular device with MSISDN-A completing the expectation setup flow at step 4205.

[FIG. 43]

Figure 43:
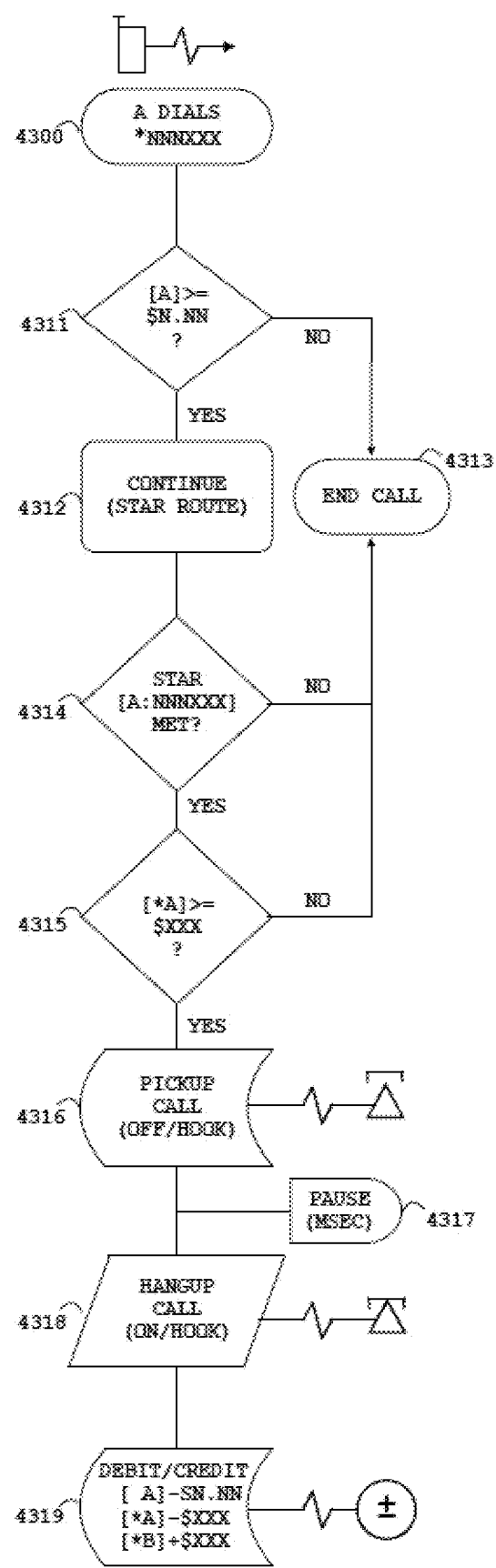
FIG. 43 is an illustrative non-restrictive example of a Star Micro/Macro Band Communication session (e.g. transaction) Flow Chart.

With reference to FIG. 43, at step 4300, user A dials (or sends an SMS, a USSD, etc.) the expected address sequence of *NNNXXX (corresponding to emitted address signals) to conduct a P2P signaling communication session having MICRO component (e.g. payment ($N.NN)) and MACRO component (e.g., transfer ($XXX)) as described herein.

At step 4311, upon the MNO receiving the *NNNXXX address signals, the OCS performs a credit verification to determine whether an account associated with caller A (CELL wallet [A]) has sufficient MICRO credit ($N.NN) as enumerated in the leading NNN address signals, to complete the signaling portion of the transaction.

In one non-limiting embodiment, the OCS extracts the first three digits (NNN) in the star address signals received, which enumerate the MICRO switching tariff ($N.NN), as disclosed herein. When the cellular account has sufficient credit then flow progress along the affirmative YES path to step 4312 otherwise flow moves along the negative NO credit branch to step 4313.

At step 4313, on determining cellular micro credit insufficiency, the MNO may play an error announcement (e.g. "You have insufficient credit to complete this call.") and terminate the call.

At step 4312, the MNO switching element is instructed by the network controlling/billing elements to CONTINUE routing the call along the star prefixed route to the STARKEY Platform, as described, for example, without limitation, in one or more embodiments disclosed herein.

At step 4314, on receiving the NNNXXX address signals the STARKEY Platform determines whether the address signals from MSISDN-A are expected (anticipated) and whether they match the recorded and expected signals [A:NNNXXX]. When the signaling source and expectation is met, flow moves along the affirmative YES path to step 4315. Otherwise, flow branches along the negative NO expectation path to step 4313.

At step 4315, the STARKEY Platform determines whether STAR Internet wallet [*A] has sufficient tokens/credits to complete the MACRO signaled and $XXX enumerated portion of the transaction as described herein. When the STAR wallet [*A] has sufficient MACRO tokens/credit, flow progresses along the affirmative YES path to step 4316, otherwise flow branches along the negative NO credit path to step 4313.

At step 4313, on determining the STAR wallet has insufficient tokens/credit, the STARKEY Platform terminates (disconnects) the call.

At step 4316, on verifying the STAR A wallet token/credit sufficiency the STARKEY Platform may perform the WINK protocol as described herein, which results in a short duration OFF HOOK signal (e.g., signaling SIP 200/OK ANSWER).

At step 4317, the STARKEY Platform pauses, in one embodiment for 500 msec or for another sufficiently suitable duration per one or more embodiments disclosed herein.

At step 4318, the STARKEY Platform returns the call ON HOOK (e.g. signaling SIP BYE) completing the FLASH HOOK signaling and causing to generate a billing ticket (CDR) on the MNO, debiting the CELL wallet ([A]=[A]− $N.NN), as enumerated by the leading MICRO address signals (NNN).

At step 4319, on receiving confirmation that the FLASH HOOK signaling was successful (e.g., receiving a SIP 200/OK in response to the SIP BYE transmitted when going back ON HOOK), the STARKEY Platform completes the MACRO transfer of the P2P signaling communication session by:

Debiting (−) $XXX from the STAR wallet [*A] and
Crediting (+) $XXX to the STAR wallet [*B], as described in the PURL examples above, thus completing the P2P transfer.

In at least some embodiments, utilizing a multi-part multi-function single signaled (NNNXXX) P2P transaction switching and processing, the STARKEY Platform may audit the P2P signaling communication session (e.g. payment parameters) to, for example, prevent or reduce excessive MICRO surcharges (NNN) being applied by unscrupulous cash vendors, prior to completing the transfer.

In at least some embodiments, unless both the CELL wallet [A] and the STAR wallet [*A] have sufficient credit and tokens to satisfy both the MICRO signaling fee ($N.NN) and the MACRO signaled transaction amount ($XXX), the STARKEY Platform may be configured to decline the transaction and terminate the call (the P2P communication session) without incurring either charges, simply by not signaling the FLASH HOOK Protocol and avoiding a CDR Billing Ticket being generated.

In at least some embodiments, the present disclosure provides various exemplary technically improved methods, one method may include, without limitation, at least steps of: presenting, at a computing device, a multi-part series (sequence) of characters (e.g. digits) having at least one symbolic routing prefix, a first subset of characters (e.g. digits) corresponding to (e.g. enumerating) a first (MICRO) monetary equivalent and a second subset of characters (e.g. digits) corresponding to (e.g. enumerating) a second (MACRO) monetary equivalent; receiving from a cellular-service enabled device with MSISDN-A, address signals matching the first (MICRO) and the second (MACRO) monetary equivalents; deducting (e.g., generating a record), based on at least one hosted access/permission controlling schema, the first (MICRO) monetary equivalent based on the first subset (MICRO) of address signals, from a cellular account associated with device MSISDN-A; debiting (e.g., generating a record) an internet MSISDN-A account with the second (MACRO) monetary equivalent based on the second subset (MACRO) of address signals; and crediting (e.g., generating a record) an internet MSISDN-B account with the second (MACRO) monetary equivalent based on the second subset (MACRO) of address signals.

In at least some embodiments, the present disclosure provides various exemplary technically improved methods, one method may include, without limitation, at least steps of: presenting, at a computing device, a multi-part multi-functional series (sequence) of characters (e.g. digits) having: a symbolic routing prefix, a first subset of characters (e.g. digits) corresponding to (e.g. enumerating) a first (MICRO) monetary equivalent, a second subset of characters (e.g. digits) corresponding to (e.g. enumerating) a second (MACRO) monetary equivalent, a third subset of characters (e.g. digits) corresponding to (e.g. enumerating) an expected access control digital key; receiving from a cellular-service enabled device with MSISDN-A, address signals matching the first (MICRO) monetary equivalent, the second (MACRO) monetary equivalent, and the third subset of characters (e.g. digits) corresponding to a particular access control digital key; deducting (e.g., generating a record), based on at least one hosted access/permission controlling schema and when the particular access control digital key of the third subset of digits is confirmed to match the expected access control digital key, the first (MICRO) monetary equivalent based on the first subset (MICRO) of address signals, from a cellular account associated with device MSISDN-A; debiting (e.g., generating a record) an internet MSISDN-A account with the second (MACRO) monetary equivalent based on the second subset (MACRO) of address signals; and crediting (e.g., generating a record)

an internet MSISDN-B account with the second (MACRO) monetary equivalent based on the second subset (MACRO) of address signals.

Additional Non-Limiting Illustrative Examples Utilizing Star Certificates

In one non-limiting embodiment, STAR Certificates, as disclosed herein, may include at least one Restrictive Read Requirement (RRR) attribute that may be set to permit a persistent validation yet restrictive authorization certificates. For example, without limitation, in at least some embodiments, the STARKEY Platform may set an IOT or Transaction ID Certificate to record a Single Restrictive Read Requirement instruction parameter (e.g. RRR=1), thereby only permitting a single read access before reducing (decrementing) the CERT to a consumed (expired) status (e.g. RRR=0). In one non-limiting "restrictive read" embodiment, any external process accessing such illustrative STAR Certificate with the RRR parameter (e. g. activating a STAR URL as disclosed herein), and thus reading the STAR certificate, logically consumes the Star Certificate, where upon reading the certificate the RRR would be decremented thereby restricting any future authorizations, since authorizations may be predicated on positive non-zero RRR counts. In at least some embodiments, in consuming the STAR Certificate thus, for example, decrementing and setting RRR=0, the semaphore (flag) is considered permanently lowered, and the STARKEY Platform may then no longer authorize the referenced and associated transaction. That is, while the Platform may still communicate that the certificate is valid, though consumed, it may thus not sanction additional authorization requests. In at least some embodiments, such STAR certificate may physically persist for the TTL duration as an audit record.

In at least some embodiments, utilizing the Restrictive Read Requirement may address an illustrative technological problem, where one digital certificate may be redeemed (consumed) multiple times substantially simultaneously (e.g. an access race condition) and thereby succeed in defrauding, for example, a Service Provider/Vendor.

Additional Non-Limiting Illustrative Examples Utilizing Star Bands Implementations In at least some embodiments, present disclosure may utilize the ANSI/ITU CdPN Information Element (0x02) Specification that permits at least up to 28 address signals. Such "extended" Star address realm embodiments, as disclosed herein, may permit dynamic and/or extensible multi-part address signaling, where each band may be logically separated (delimited) for example, in at least one non limiting embodiment, by embedding a star (*) between each band.

Additional Non-Limiting Illustrative Examples Utilizing Star IOT Cellular Implementations In at least some embodiments, the multi-part multi-functional signaling of the present disclosure may describe an alternate part-2 signaling band in order to permit MACRO cellular transactions/activities, whereby the MACRO charge enumerated in the part-2 address signals is debited to the cellular account per Table 6 below.

While Table 6 above depicts fixed length signaling (signaling bands), bands may be variable length, permitting greater/lessor amounts to be enumerated by the address signals.

In one non-limiting embodiment, the MNO OCS may thus be configured to interpret any part-2 signals as enumerating major and/or minor currency units, that is, a MICRO or a MACRO transactional amount (e.g. $0.XX, $XXXX.XX etc.), and whereby the currency is localized to the MSISDN-A (caller) thereby, in one non-limiting embodiment permitting cellular users to redeem prepaid airtime for utility tokens (e.g. electricity, water etc.), and in one cellular postpaid (contract) embodiment, to purchase utility tokens without disclosing financial instruments to third parties, by debiting their cellular account.

In at least some non-limiting embodiments, the present disclosure thus provides a Star Internet Of Things (IIOT) Vending System that may be configured/programmed to present MACRO part-2 signals, forgoing MICRO address signals enumerating a switching charge, in order to debit larger amounts directly to the cellular account. In one non-limiting embodiment, the Star IOT Vending System, may be utilized to present QR codes displayed next to items available for purchasing on so-called Star-Enabled Vending Machines, the codes encapsulating a Vendor URL referencing a unique Vendor ID (VID), IOT ID (IID), and a Token ID (TID) identifying the item displayed for selection and purchase. In one non-limiting embodiment, the VID may be prefixed with a series of leading zeroes (e.g. three zeroes) in order to distinguish an Vending address, and the resultant Star Internet Wallet (e.g. [*000B], where B=VID) from e.164 MSISDN addressed wallets (e.g. [*A]). In one non-limiting embodiment, IOT QR code example, an illustrative PURL may be configured to be presented as follows:

HTTPS://VENDOR-XYZ.COM/VID?IOT=IID . . .

In one non-limiting embodiment, the QR code (e.g. URL, Share codes etc.) may thus encapsulate a pre-addressed Vendor URL (VURL), that renders a virtual Meta Star IOT Services Panel for VENDOR-XYZ as illustrated, offering quick selection access to commonly purchased tokens, and/or the ability to enter a preferred token purchase amount. In one non-limiting example, scanning the QR code may present a VURL, where the IOT device ID (IID) may be addressed as illustrated.

In one non-limiting embodiment, on scanning and activating the QR code and on directing the IAPP/Browser to the encapsulated VURL, per the above, and on the user selecting/entering a token purchase amount, the Star IOT Platform may render, without a limitation, a MACRO Styled Colored (e.g. BLUE) payment button, as disclosed herein, setting up an IOT expectation record for a previously identified cellular device (e.g. [C24XYM-A: XXXXXX]) or an expectation record for an unknown cellular device, encapsulating a part-3 RAN as disclosed herein (e.g. [C24XYM-A: XXXXXXYYYYYYYYYYYY]) per Table 7 below.

TABLE 6

| PART-1 PREFIX SIGNAL: 0 | PART-2 MACRO BAND SIGNALS: 123456 |
| --- | --- |
| * ROUTE | XXXXXX $9999.99 |

, where:
a first part (Part-1) may be designed to serve a first function,
a second part (Part-2) may be designed to serve a second function

TABLE 7

| PART-1 PREFIX SIGNAL: 0 | PART-2 MACRO BAND SIGNALS: 123456 | PART-3 RAN CHALLENGE SIGNALS 7-> |
| --- | --- | --- |
| * ROUTE | XXXXXX $9999.99 | *YYY YYY YYY YYY RESPONSE |

In at least some embodiments, as indicated here, a Star expectation record may omit the star (*) symbol(s) (e.g. prefix and parameter delimiter(s)), and similarly strip these non-numeric symbols from the address signals received, before matching the signals to the numeric only expectation record.

In one non-limiting embodiment, the IAPP requesting the Star Payment button may be configured to pass payment meta-data, including without limitation, a Vending Target URL (TURL). On receiving the multi-part address signals per disclosed herein, and on meeting the Star expectation record, the IOT transaction may proceed as described below utilizing the MACRO Blue UX as disclosed.

In one non-limiting Star IOT embodiment, the STARKEY Platform may thus on receiving the multi-part signals activate the Vending Target URL (TURL), to communicate with a Vending Application Platform remotely controlling the associated Vending Machine, for example, a non-limiting TURL, where < > represents a data value, as follows:

HTTPS:/NendorXYZ.COM/STAR.HTML?CERT= <certificate>&CELLID=<xym4>&VID=<VID>&IOT= <IID>&TOTAL=<part-2 signals> . . .

In one non-limiting embodiment, the Star Vending System may dispense physical goods (e.g. drinks, condiments etc.). In one-non-limiting embodiment the Star Vending System may dispense digital goods (e.g. prepaid metered electricity, water, etc.).

In one non-limiting example, on receiving the multi-part signaling, the appropriately modified MNO controlling and billing element(s) may determine:

First, whether the caller CELL Wallet [*A] has sufficient macro credit (e.g. $XXXX.XX) to sustain the requested charge as enumerated in the part-2 signals;

Second, on determining credit sufficiency, instructing the network switching elements to CONTINUE with the call, routing the call toward the StarKey Platform, as disclosed herein, and on receiving the cellular signals from the MNO, the StarKey Platform may then:

Third, programmatically instruct the MNO to generate a MACRO CDR, per the HOOK FLASH signaling protocol as disclosed herein, recording the part-2 signaled macro transaction by debiting the CELL A wallet of the caller (e.g. [A]=[A]−$XXXX.XX);

Fourth, the StarKey Platform may then gate (lock) the pending transaction by recording an authoritative ephemeral Star Certificate (CERT), with a single Restrictive Read Requirement (i.e. RRR=1) and a year-long half-life (e.g. TTL=1 year) per the methods and systems disclosed herein;

Fifth, activate the TURL passing the transaction parameters, including without limitation, the Star Certificate (CERT), the cellular ID (e.g. MSISDN, XYM4), the Vending ID (VID), IOT device ID (IID), the MACRO currency units signaled in part-2;

Sixth, on the Vending Platform, addressed in the VURL, successfully receiving a positive authorization indication on accessing the Star CERT (e.g. querying the DNS Certificate Sub-Domain or HTTPS Get on the Star Certificate Sub-Directory, as disclosed herein), and on communicating a successful vending result (e.g. the TURL returning a code indicating the signaled item was approved and dispensed), the StarKey Platform may then programmatically communicate the successful transaction result to the IAPP; and Seven, the StarKey Platform, on receiving a successful transaction acknowledgement from the Vending Platform, may credit the MACRO transaction amount as enumerated in the part-2 signals, less a predetermined transactional switching fee (not shown), to the IOT Vendor STAR B (VID) wallet, (e.g. [*000B]=[*000B]+ ($XXXX.XX×0.YY)), where 0.YY is the net transaction multiplier, accounting for a switching fee (e.g. 0.YY=99% assuming a 1% transactional switching fee) thereby completing the wireless IOT transaction.

In one non-limiting example, a cellular user A may thus emit address signals "10000" to purchase "$100 electricity tokens" from IOT Vendor with address VID (e.g. 000123456789). In one non-limiting example, the TURL processing the tokens purchased, may remotely update the IOT device identified by the IID, with the credits available for consumption. In one non-limiting embodiment, the TURL may transmit an electronic token to the cellular device (e.g. sending an SMS to MSISDN-A), whereby the user may then enter the token identity received, into an input panel on the IOT device to update the credits available for consumption. For example, the illustrative multi-part signaled transaction, administered in accordance with the present disclosures, may result in the following itemized cellular phone bill entry as shown in Table 8 below.

TABLE 8

| Date Time | Dialed | Duration | Cost |
|---|---|---|---|
| 2022/01/01 10:30:15 | *10000 | 00:01 | $100.00 |

In one non-limiting embodiment, a user in one country may wirelessly and remotely deposit tokens into the IOT device as addressed per the QR code above, since the IID address together with the associated VURL, per this disclosure, may describe a globally unique IOT device address. Thus, in the above example, if caller A has cellular ID hash C2YXM-A, with C2="US", and the VID and VURL identifies a prepaid electricity metering unit IID located in South Africa, the above signaled example (e.g. *10000) may deposit USD100, converted by the StarKey Platform into local South African currency ZAR1500 (e.g. using a spot rate conversion, less applicable switching fees, for illustrative purposes). In at least some embodiments, the present disclosure provides an ability to wirelessly and remotely "Recharge a Home" thus (e.g. purchase electricity tokens from afar and abroad) has fundamental industrial, economic and life-enhancing applicability, since users may donate, contribute and/or support (i.e. loan, gift etc.) others in need of power who cannot afford to purchase tokens themselves.

Moreover, the disclosed Star IOT signaling systems and methods, applied at the MNO, may be efficiently deployed at scale, literally at a nominal cost (e.g. a "20 sticker", that may be a price of QR code stickers affixed to the IOT device encapsulating a VURL as described), and thus present a virtual online IOT Panel interface for dispensing token as disclosed herein.

In one non-limiting embodiment, the Star Vending System may dispense physical goods (e.g. drinks, condiments etc.). In one non-limiting example, the QR code may present a virtual graphical rendition of the vending machine, displaying, without limitation, each physical slot and associated item for dispensing, coupled with a BLUE Macro styled UX payment button, and wherein the payment button includes parameters identifying the item selected for dispensing.

[FIG. 44]

Figure 44:
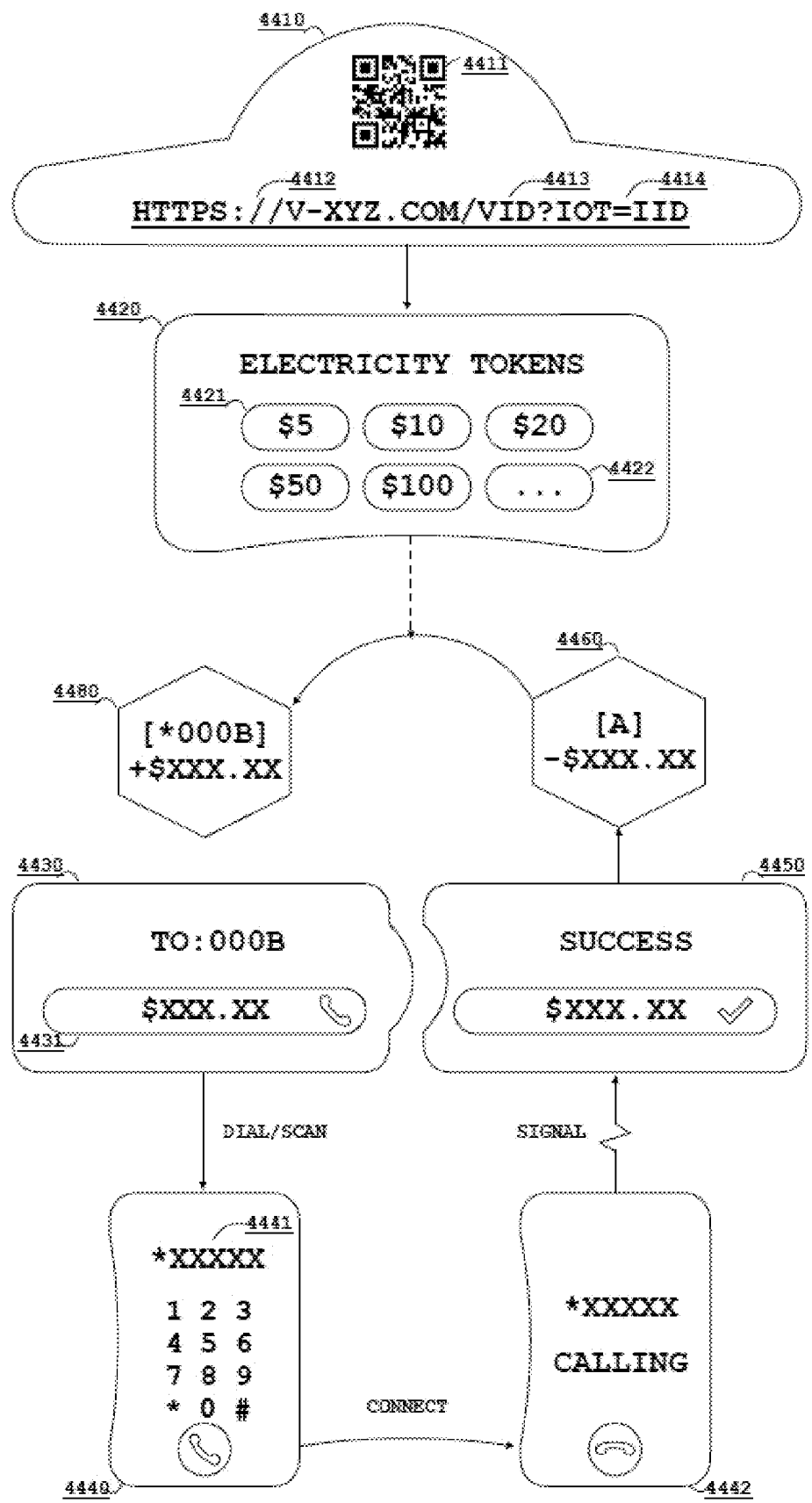
FIG. 44 is an illustrative non-restrictive example of a Star Internet Of Things Token Payment Schema (JOT).

FIG. 44 is an illustrative non-restrictive example of an illustrative Star Internet Of Things Token Payment Schema (IOT).

In at least some non-limiting embodiments, FIG. 44 illustrates an Virtual IOT interface for purchasing electricity tokens from Vendor-XYZ. For example, any IOT vendor may display the information in bubble 4410 on an IOT device. For example, a Vendor URL (VURL) 4412, including the Vendor ID (VID) 4413 and the IOT identity (IID) 4414, or an Internet QR code 4411 encoding and encapsulating the VURL 4412 link and associated parameter(s). This example assumes that the IAPP, launched and conducting this transaction on activating the VURL or scanning and accepting QR code, has been previously unlocked and paired with cellular device A (MSISDN-A) utilizing the disclosed Star Random Challenge and Response.

still refereeing to FIG. 44, on scanning QR code (4411) or receiving and activating the VURL (4412), the sending party IAPP on mobile device A, may, in one non-limiting embodiment, render and display a virtual IOT panel 4420 which displays a plurality of STARPAY buttons with common electricity token (voucher) denominations 4421, for example $5, $10, $20, $50, $100 and so on. In one embodiment, a button 4422 permits the user to specify an alternate token amount. In one embodiment the VURL presents an internet site branded and stylized to match the Corporate Identity of the Vending Supplier.

On activating (for example, by tapping or clicking) one of the buttons displayed in 4420, in one non-limiting embodiment, the STARKEY platform sets an expectation (e.g. [A:XXXXX]) for the MACRO signals anticipated from MSISDN-A, preaddressed to a STAR Internet Vendor Wallet (e.g. [*000B], where B=VID), per the URL link parameter 4413. Thus, in one embodiment, the STARKEY Platform renders the button with the MACRO signals (XXXXX) enumerating the amount to be charged for acquiring the selected electricity token.

On activation, in one non-limiting embodiment, the screen may present the transaction summary 4430, displaying the Vendor recipient (e.g. 000B), and the button may change to display the STARPAY telephone number to dial 4431 in order to signal and complete the transaction.

On tapping or clicking, in one non-limiting embodiment, the STARPAY button 4431, the IAPP launches the native cellular dialer 4440 with the expected star address signals automatically entered 4441.

On pressing CONNECT (e.g., Green Phone Button), the cellular device may switch from the dialer addressing screen 4440 to a calling screen 4442, where the cellular device MSISDN-A emits the address signals 4441. In one non-limiting embodiment, the dialing and/or calling screens 4440/4442 may only partially overlay the IAPP screen.

On receiving the address signals, in one non-limiting embodiment, an illustrative mobile network of the present disclosure performs the AAA procedure as described herein. In conducting the Accounting procedure, the OCS extracts the XXXXX digits enumerating the MACRO transaction from the star (*) prefixed address signals to determine whether a cellular account [A], associated with the caller has sufficient MACRO credit (e.g. $XXX.XX) to complete the transaction.

If the associated cellular account has sufficient credit, in one non-limiting embodiment, the call CONTINUES routing toward the STARKEY Platform on the symbolic prefix as disclosed herein. On receiving the call request the STARKEY Platform determines whether the address signals match the expectation set (e.g. clear cellular identity [A:XXXXX] when the star transaction is public, and hashed cellular identity [XYM4:XXXXX] when the star transaction is private). That is whether the XXXXX signals expected were emitted by the previously identified cellular device with MSISDN-A/XYM4-A. If a valid matching expectation exists, the STARPAY Platform performs the WINK protocol as disclosed, taking the call OFFHOOK and momentarily thereafter replacing the call ONHOOK in order to record the MACRO transaction CDR on the cellular network.

This HOOK FLASH signaling debits, in one non-limiting embodiment, the CELL wallet 4460 (e.g. [A]=[A]−$XXX.XX) for the token transaction. The STARPAY Platform may then complete the MACRO transaction by crediting the Vendor STAR wallet 4480, (e.g. [*000B]= [*000B]+$XXX.XX less any transaction processing fee, and where B=VID). On transaction completion, in one non-limiting embodiment, the STARKEY Platform may communicate the transaction success to the IAPP which may then present a success screen 4450. The purchased token may then update the credits available on the IOT device, as described above.

Additional Non-Limiting Illustrative Examples Utilizing Multi-Part Multi-Functional Signaling Communication Protocols In at least some embodiments multi-part multi-functional address signaling of the present disclosure may provide a fourth signaling band in order to unify a STAR MICRO+ MACRO+RAN signaling Challenge and Response. For example, without limitation, utilizing the ANSI/ITU CdPN Information Element (0x02) Specification permits, in one embodiment, at least up to 28 address signals. In at least some embodiments, utilizing such "extended" Star address realm, as disclosed herein, may permit at least a four multi-part address signal, star (*) delimited (separated) as depicted, without limitation, in Table 9 and an illustrative 23-address signals embodiment (including separators).

TABLE 9

| PART-1 (PREFIX) SIGNAL: 0 | PART-2 (MICRO BAND) SIGNALS: 12 | PART-3 (MACRO BAND) SIGNALS: 3456789 | PART-4 (RANDOM CHALLENGE DIGITS SIGNALS: 10 . . . (10^12) |
|---|---|---|---|
| * ROUTE | NN 99¢ | * XXXX XX $9999.99 | * YYY YYY YYY YYY VIRTUAL PHONE NUMBERS |

, Where:
Part-1/Part-2/Part-3/Part-4, are designed to serve at least four respective different functions:
a first part (Part-1) designed to serve a first function,
a second part (Part-2) designed to serve a second function,
a third part (Part-3) designed to serve a third function, and
a fourth part (Part-4) designed to serve a fourth function.

While Table 9 above depicts fixed length micro and macro (part-2 and part-3) signaling bands, these bands may by variable length when they are symbolically separated, permitting greater/lessor amounts to be enumerated by the address signals.t he Star Macro UX may present address signals padded to the right with a series of zeros (e.g. nine zeroes). This padded address signal, may permit the user to store a single MACRO signaling contact (e.g. Name=*BANK, Phone number=*000000000) in order to collectively and uniformly match and represent all Macro Signaled Star banking transaction under a single generic contact in the dial history/log (e.g. "Recents" List). In at least some embodiments, this padded generic contact may be based on the conventional telephone address book matching, which may be performed right to left. That is, absent an exact address signal match, in one non-limiting embodiment, the cellular telephone O/S may be programmed to match the closest contact from the right, by examining a sufficient number of distinct digits (e.g. 5 matching digits, 7 matching digits, 9 matching digits etc.) in order to avoid duplicate contact matches.

Thus, for example, in one non-limiting embodiment, even although a zero padded Starkey MACRO signaling embodiment may result in the cellular device signaling "*01*12345*000000000", such an address signal would match a contact with telephone number set as "*000000000", thereby avoiding a dialed history list "pollution", which absent such a generic "wildcard" contact (e.g. REGEX matching from the right) to catch all such Starkey signaled calls, would result in the dial history/log flooded with a plurality of distinct StarKey Signals, given that the macro part-3 (e.g. the transaction amount) as disclosed herein) may be variable, yet the variable signals may perform the one and same authorization function.

[FIG. 45]

FIG. 45 depicts an illustrative non-restrictive example of a Star Cellular Authorized Bank Switched session (e.g. transaction) in accordance to at least one non-limiting embodiment. In one non-limiting embodiment, the multi-part signaling describes a Cellular Authorized Bank Switched Transaction where the submission from a client device to a server may be "locked", pending a StarKey authorization and verification, which may authenticate and preauthorize a pending online transaction between a customer (associated with the client device) who has disclosed a financial instrument (e.g. VISA, Mastercard, AMEX, Debit/Credit Card) and a merchant who wishes to accept such payment for goods and/or services, for an amount enumerated in the MACRO (part-3) address signals.

In one non-limiting embodiment the bank switched transaction submission session may be executed on a successful multi-part access controlled address signaling, as disclosed herein, wherein a StarKey/StarPay button is rendered and displayed to the customer at checkout time, the StarKey/StarPay button may be programmed to encapsulate the micro part-1 and the macro part-2 signals, which upon button activation are communicated by the IAPP/Browser to the STARKEY access controlling platform, thereby recording, by the STARKEY access controlling platform, a signaling access controlling expectation record (e.g. [YXM4: NN*XXXXX] per the multi-part signaling protocol, and where XXXXX enumerates the macro transaction amount in a major and minor currency (e.g. $123.45), and upon successfully signaling and matching the expectation as recorded and, as disclosed herein, the STARKEY access controlling platform then instructing the bank switched transaction to be submitted and executed.

In one non-limiting embodiment, a illustrative target PURL redirection (e.g. HTTPS POST, JSON transmission, etc.), as disclosed herein, redirecting the IAPP/Browser to a target PURL (e.g. HTTPS POST), is communicated by the merchant, on requesting the said StarKey/STARPAY button, to the StarKey Access Controlling Platform on requesting the StarKey button, the said PURL containing all the transaction parameters (e.g. without limitation, customer identity, credit/debit card details, merchant identity transaction amount success URL etc.) to successfully process the bank switched transaction.

In one non-limiting embodiment, the target PURL (e.g. HTTPS POST, JSON transmission, etc.), which is thus locked from the submission by the StarKey button until a successful (expected) StarKey authentication is signaled and registered as disclosed herein. On successfully address signaling thus, the PURL is activated (e. g. executed), submitting the transaction between the client device and the merchant computing system. In one non-limiting embodiment, the PURL may be posted server-side, by the STARKEY access controlling platform, as proxy to the merchant, if the StarKey authorization was successful (e.g. the micro part-1 and the macro part-2 signals were received as expected from the expected cellular identity as recorded in the expectation record) and upon receiving a transaction result from the merchant server, communicating the same result to the IAPP/Client, thereby instructing the IAPP/Browser to further redirect to a transaction result page/screen.

In at least some embodiments, the Star Key Button and the Star Access Controlling Platform may setup and authorize the expected transaction in advance of submitting the transaction to the merchant banking server/platform, thereby locking the submission on the condition that the user verifies they are the legitimate card holder, as evidence by the cellular network hosted access controlling schema and as identified by the associated Cryptographically hashed identity (e.g. XYM4) associated to the IAPP/Browser, as disclosed herein. In at least some embodiments, thus bank switched transaction is only unlocked for submission when the user successfully completes the transaction authorization and verification signaling on the activation of the StarKey/StarPay/Star button as disclosed herein.

In one non-limiting embodiment, the target PURL redirection (e.g. HTTPS POST, JSON transmission, etc.) unlocking the transaction submission between the client and the server is posted client-side, in the browser/IAPP on a redirection instruction by the StarKey Access Controlling Platform once the user has successfully signaled the expected multi-part signals on activation of the Star Button, as disclosed herein/, whereupon the bank switched transaction is attempted.

The disclosed star key button, the expected (expectation record) and the disclosed signaling systems and methods detailed herein, thus signal and sign a pending bank switched transaction before submitting the transaction to the baking payment platform, using the secure network identified device and the secure OOB (Out Of Band) cellular network signaling protocols rather than the insecure user identified internet device and the less secure INB (IN Band) internet network protocols. In requiring the legitimate card holder to pre-authorize a pending bank switched transaction, utilizing the disclosed cellular access controlling signaling schemas and architectures, may render the transaction "Card Present" (i.e. in the rightful owners hands, at the time of the transaction), even though the transaction may be conducted remotely over the internet.

In at least some embodiments, the pending bank switched transaction may not proceed to execution unless the cellular device with network provided identity (e.g. XYM4) verified per the StarKey authentication platform, programmed as disclosed herein, first successfully signals and signs the transaction per the access controlling schema(s) and architecture(s) disclosed herein. In at least some embodiments, the cellular pre-authentication curtails/reduces fraudulent credit/debit card-not-present transactions since these transactions are now predicated on, and restricted to, the legitimate owner successfully digitally/cellular signaling and signing acceptance prior to executing the transaction.

In one non-limiting embodiment, a StarKey button, locking access to a macro bank switched transaction submission, may be rendered and stylized and delivers a user experience that would be distinct from StarKey buttons that locks access to restricted resources, requiring micro payments, as disclosed herein.

In one non-limiting embodiment, a MICRO Star Pay button may, for example, be colored RED, may display the MICRO part-2 signals as the transaction amount (e.g. 2¢), and on successful signaling completion may play a coin drop sound (i.e. "The Star Micro UX", per this disclosure).

In one non-limiting embodiment, a MACRO Star Pay button may, for example, be colored BLUE, and may display the MACRO part-3 signals transaction amount (e.g. $123.45), and on successful address signaling completion may play a "Ka-Ching", a register until "ringing up a sale" sound (e.g. "The Star Macro UX", per the disclosure herein).

In one non-limiting embodiment, the micro part-1, enumerating the transaction signaling fee (e.g. 01=1¢) that is to be debited against the cellular account of the bank card holder, may not be prominently displayed. In one non-limiting embodiment, the micro signaling fee may be displayed separately from the StarKey button (e.g. in visual proximity (e.g. as a button footnote)). In one non-limiting embodiment, the micro signaling fee may be waived (e.g. set to zero, 00) and the user is not charged for signaling and authorizing the bank switched transaction as disclosed herein. In one non-limiting embodiment, the micro signaling fee may be credited by the bank to the card holder (e.g., cellular wallet, internet wallet, banking account etc.), on successfully executing the pending transaction.

In one non-limiting embodiment, the disclosed pre-authorization and transaction verification, conducted by the legitimate card holder, prior to submitting and executing the transaction, thus, in effect, signals to the banking institution that the owner identified by the network (e.g. XYM4) is about to conduct a transaction for the macro signaled (part-2) amount, thus preempting the transaction in time, and thereby removing, for example, without limitation, all doubt and a need for artificial (intelligence) attempts to predict the likelihood of the transaction being fraudulent.

In one non-limiting embodiment, the pending bank switched transaction, governed and locked by the disclosed StarKey button, may not proceed to execution unless the cellular device with network provided identity (e.g. XYM4), verified as disclosed herein, first successfully signals and signs the transaction per the access controlling schema(s) and architecture(s) disclosed herein. In at least some embodiments, the cellular pre-authentication curtails/reduces fraudulent credit/debit card transaction since these transactions are now predicated on and restricted to the legitimate owner successfully digitally signaling and signing acceptance prior to executing the transaction.

In at least some embodiments, as disclosed, this digital signature of the present disclosure may overcome the technological deficiencies in the banking systems when card-not-present is indicated, which is typically the online affliction, since cards are presented digitally, not physically (analog), and whereby corporate data leaks may enable unauthorized transaction using stolen financial instruments. In at least some embodiments, the present disclosure in curtailing fraud thus may positively impact technologically improve electronic payment systems by mitigating risk and thereby permitting banks to reduce switching fees.

Referring back to FIG. 45, at Step 4501, User (A), using a Client IAPP/Browser Software (B), selects a previously recorded financial instrument (e.g. saved credit card) or enters a financial instrument (e.g. credit card details) at a checkout screen.

At Step 4502, the Client device (B) requests a MACRO Star Pay Button from the StarKey Access Controlling Platform (D), specifying transaction meta-data, including without limitation, any previously associated cellular identity (e.g. XYM4), the financial instrument to be utilized in the transaction (e.g. credit card), the transaction amount, and a target URL to activate on transaction completion.

At Step 4503, the StarKey Access Controlling Platform (D) returns programming instruction(s) to the Client, without limitation to render and display the StarKey MACRO Pay Button, which incorporates the transaction meta-data.

In one non-limiting embodiment, the StarKey Button may have a multi-part, MICRO (NN) and MACRO (XXXXX) address signal sequence as described above in Table 9. In one embodiment, when the IAPP Client (B) has not recorded a previously associated cellular Identity (e.g. XYM4), the StarKey Access Controlling Platform (D) extends the multi-part address signaling sequence to incorporate a Star Random Challenge (e.g. YYYYYYYYYYYY) to identify the associated cellular device, as disclosed herein. Thus, in one non-limiting embodiment, the StarKey Access Controlling Platform may render a Star Pay Button with associated StarKey Random Challenge, in a multi-part address signaling sequence, as described above, and as follows:

*NN*XXXXX*YYYYYYYYYYYY

In one non-limiting embodiment, the program instruction(s) may cause the Star Pay button to display the MACRO part-3 transaction total (e.g. $XXX.XX), and furthermore, programs the Client to display the MICRO part-2 switching fee (e.g. NN¢) in close proximity to the button (e.g. as a button footnote). Thus, in one non-limiting embodiment, while the Star address may include multi-part address signals, the button may only display the MACRO (part-3) address signals, since it is those signals which enumerate the MACRO transaction amount.

At Step 4504, the user activates the Star Pay Button, for example and without limitation, tapping or clicking the button. At Step 4505, on activating the Star Pay Button, the StarKey Access Controlling Platform (D) sets an expectation record from a known cellular identity (e.g. [XYM4: NNXXXXX]), when the IAPP communicates a previously associated cellular identity, else when the IAPP has not communicated a cellular device identity, as disclosed herein, the StarKey Access Controlling Platform (D) sets an expectation record that includes a Star Random Challenge (e.g. [?: NNXXXXXYYYYYYYYYYYY]), transmitted to the IAPP. In some non-limiting embodiments, as indicated here, the expectation record may omit the star (*) symbols (e.g. prefix and parameter delimiters), and similarly strip these non-numeric symbols from the address signals received, before matching the signals to the numeric only expectation record.

At Step 4506, on the Star Pay button activation, the IAPP (B) presents the native cellular telephone application dialer, with the multi-part address signals automatically entered (e.g. *NN*XXXXX,*NN*XXXXX*YYYY YYYYYYYY), as disclosed herein, wherein user (A) may then dial (e.g. press the Green Phone/Call icon) and thereby emit the expected address signals.

On receiving the star address signals, the MNO (not shown) may perform the AAA (Authentication Authorization and Accounting) procedure, as disclosed herein, and on passing the Accounting CHECK, which verifies the account associated with the caller has sufficient credit to sustain the NN¢ charge, may route the call towards the StarKey Access Controlling Platform, as disclosed herein.

At Step 4507, the StarKey Access Controlling Platform (D) verifies that the star address signals received match the expected series of address signals, in one non-limiting embodiment, from a known cellular identity (e.g. XYM4), as disclosed herein. In one non-limiting embodiment, when the cellular identity is unknown, the StarKey Access Controlling Platform extracts the cellular identity and per the disclosed systems and methods may hash the identity, to preserve user privacy, and return the hashed identity (e.g. XM4) to the IAPP for future reference. On verifying that the address signals received match the expected address signals, in one non-limiting embodiment, the StarKey Access Controlling Platform may instruct the MNO to perform the HOOK FLASH signaling to record a MICRO transaction record (CDR), per the disclosed systems and methods herein, and may then request the MACRO payment method from the Bank Switched Platform (E).

At Step 4508, in one non-limiting embodiment, the Bank Switched Platform (E) may return a payment method to the StarKey Access Controlling Platform (D). At Step 4509, the StarKey Access Controlling Platform (D) may POST the payment details, including the financial instrument to be utilized and the transaction amount, to the Bank Switched Platform (D). At Step 4510, in one non-limiting embodiment, if the requested transaction is successfully completed, the Bank Switched Platform (E) may return a payment success indication (e.g. Boolean TRUE), including without limitation, a transaction identifier (TXID), to the StarKey Access Controlling Platform (D).

At Step 4511, in one non-limiting embodiment, the StarKey Access Controlling Platform (D) records a Star Certificate (CERT), as disclosed herein, memorializing the successful transaction. In one non-limiting embodiment, the CERT may be associated with the XYM4 and TXID and other transactional meta-data. At Step 4512, in one non-limiting embodiment, the StarKey Access Controlling Platform (D) may return the CERT, TXID and, if newly detected and recorded, the XYM4, to the IAPP (B), and furthermore, may redirect the IAPP to the target URL (e.g. success URL).

At Step 4513, the IAPP (B) receives the transaction result data (e.g. success). In one non-limiting embodiment, the Blue MACRO Star Pay button may "nod" (e.g. animate by moving up, then down and back up) to indicate a successful transaction. In one non-limiting embodiment, the Blue MACRO Star Pay button may display a "tick" to confirm successful transaction completion and may play a "Ka-Ching" (until register ringing up sound), to audibly confirm the successful transaction.

At Step 4514, in one non-limiting embodiment, the IAPP StarKey Button may activate the Merchant Platform (C) target URL, passing without limitation the CERT and TXID parameters.

At Step 4515, in one non-limiting embodiment, the Merchant Platform (C) queries the Star Certificate (e.g. Star DNS query, Star HTTPS query) to validate the transaction, as disclosed herein. At Step 4516, in one non-limiting embodiment, on receiving an affirmative, valid Star CERT response, the Merchant Platform (C) may direct the Client (B) to the requested target URL (e.g. transaction landing page). At Step 4517, in one non-limiting embodiment, the Client (B) transaction is complete.

Additional Non-Limiting Illustrative Examples Utilizing SSHA-296 Augmentation

In at least some embodiments, a hashed identity (e.g. CGH(Star Secret Master Key+MSISDN), CGH(MSISDN), CGH(ICCID+MSISDN) etc.,) may include a Country Code (CC) determined by the e.164 ("+") international country designated prefix specification (e.g. +1=US, +27=ZA, +44=UK etc.). In at least some embodiments, the e.164 address prefix may be converted into the corresponding alphabetical abbreviations (e.g. ISO 3166 Alpha-2 and Alpha-3 codes). For example, a cellular identity+ 14154125111 may be hashed and augmented as follows (herein collectively titled the Star SSHA algorithm, i.e., SSHA-296):

First, the CGH is applied to the Star Secret Master Key (SKY) concatenated to the MSISDN (e.g. XYM);

Second the last four digits of the MSISDN are prepended (affixed) to the resultant XYM hash (e.g. 4XYM);

Third, the international dialing prefix identifying the cellular country (e.g. +1) is mapped to the ISO Alpha-2 code (e.g. US) and affixed to the 4XYM hash (e.g. C24YXM); and Fourth, a star (*) is prefixed to easily recognize a SSHA (e.g. *C24XYM).

For example, in one non-limiting embodiment resulting in an SSHA-296 hash as follows, where SKY="5t@R109iK#"+MSISDN="14154125111"" and where CC="us":

*us51115ee32fa1faceeafd04aa80738c3297362534a1cd7ffa3692eeb39ad614041d10.

In one non-limiting embodiment, the known SHA-256 bit hash may be augmented and enhanced, with meta data as follows:

the "*" symbol (+1octet=8 bits), the CC alpha codes (+2 octets=16 bits), the YYYY last for MSISDN digits (+4 hex=16 bits), and resulting in a Star SSHA-296 bit hash (SSHA-296=SHA-256+40).

This illustrative human readable, geo-tagged augmented hash serves to instantly identify the cellular country of origin, as well as to instantly permit the cellular owner to identify themselves.

In some embodiments, the present disclosure provides various exemplary technically improved methods, one method may include, without limitation, at least steps of:

causing, by a processor of a sender computing device, via an application program, to establish a peer-to-peer communication session with a recipient computing device, by at least:

receiving a personalized Universal Resource Locator link (PURL), including: a domain name associated with a session controlling Internet platform hosting a permission controlling schema, and at least one first identity linked to a recipient computing device;

where the PURL is communicatively coupled to the permission controlling schema of the session controlling Internet platform;

executing at least one application program instruction to display, based on the PURL, a graphical user interface (GUI), including a plurality of GUI elements, each GUI element programmed to allow a user of the sender computing device to select or input a MACRO band parameter associated with the peer-to-peer communication session;

transmitting, based on a user interaction with the GUI and via an Internet protocol based communication, the MACRO band parameter and the at least one first identity linked to the recipient computing device to the session controlling Internet platform;

receiving, in response to transmitting the MACRO band parameter and the at least one first identity, from the session controlling Internet platform, a multi-part multi-functional address signaling sequence, including:

a MICRO band part, corresponding to a MICRO band parameter and a MACRO band part, corresponding to the MACRO band parameter;

transmitting, within the peer-to-peer communication session and via a cellular communications network, a session request having data that includes:
the multi-part multi-functional address signaling sequence and
at least one second identity;
where the transmitting the session request causes, based on the domain name and the MACRO band parameter, an activity of the session controlling Internet platform between a first digital wallet associated with the at least one first identity and a second digital wallet associated with the at least one second identity after:
the MICRO band part of the multi-part multi-functional address signaling
sequence has been accepted by the cellular communications network and at least one portion of the data is confirmed to match an expected session record associated with the session controlling Internet platform.

In some embodiments, the present disclosure provides various exemplary technically improved methods, one method may include, without limitation, at least steps of: generating, by a session controlling Internet platform, a personalized Universal Resource Locator link (PURL), including:
where the PURL is:
communicatively coupled to the permission controlling schema and
configured to be utilized to establish a peer-to-peer communication session
between a sender computing device and a recipient computing device;
where the PURL includes:
a domain name associated with the session controlling Internet platform hosting a permission controlling schema, and
at least one first identity linked to the recipient computing device;
transmitting, by the session controlling Internet platform, the PURL to the recipient computing device;
receiving, by the session controlling Internet platform, after the transmitting the PURL to the recipient computing device, a mobile originating communication, having data including:
a multi-part multi-functional address signaling sequence, including:
a MICRO band part, corresponding to a MICRO band parameter and
a MACRO band part, corresponding to the MACRO band parameter, and at least one second identity;
executing, by the session controlling Internet platform, based on the domain name and the MACRO band parameter, an activity between a first digital wallet associated with the at least one first identity and a second digital wallet associated with the at least one second identity after:
the MICRO band part of the multi-part multi-functional address signaling sequence has been accepted by the cellular communications network and
at least one portion of the data is confirmed to match an expected session record.

As used herein, the terms "computer element," "network element," and "element" identify at least one software component and/or a combination of at least one software component and at least one hardware component which are designed/programmed/configured to manage/control other software and/or hardware components (such as the libraries, software development kits
(SDKs), objects, etc.).

In some embodiments, exemplary inventive computer-based systems/platforms, exemplary inventive computer-based devices, and/or exemplary inventive computer-based components of the present disclosure may be configured to output to distinct, specifically programmed graphical user interface implementations of the present disclosure (e.g., a desktop, a web app., etc.). In various implementations of the present disclosure, a final output may be displayed on a displaying screen which may be, without limitation, a screen of a computer, a screen of a mobile device, or the like. In various implementations, the display may be a holographic display. In various implementations, the display may be a transparent surface that may receive a visual projection. Such projections may convey various forms of information, images, and/or objects. For example, such projections may be a visual overlay for a mobile augmented reality (MAR) application.

In some embodiments, exemplary inventive computer-based systems/platforms, exemplary inventive computer-based devices, and/or exemplary inventive computer-based components of the present disclosure may be configured to be utilized in various applications which may include, but not limited to, gaming, mobile-device games, video chats, video conferences, live video streaming, video streaming and/or augmented reality applications, mobile-device messenger applications, and others similarly suitable computer-device applications.

As used herein, in at least some embodiments, the terms "if" and "when" shall have the same meaning.

As used herein, the term "user" shall have a meaning of at least one user. In some embodiments, the terms "user", "subscriber", "consumer", or "customer" should be understood to refer to a user of an application or applications as described herein and/or a consumer of data supplied by a data provider/source. By way of example, and not limitation, the terms "user" or "subscriber" can refer to a person who receives data provided by the data or service provider over the Internet in a browser session or can refer to an automated software application which receives the data and stores or processes the data.

Examples of hardware elements may include processors, microprocessors, circuits, circuit elements (e.g. transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. In some embodiments, the one or more processors may be implemented as a Complex Instruction Set Computer (CISC) or Reduced
Instruction Set Computer (RISC) processors; x86 instruction set compatible processors, multi-core, or any other microprocessor or central processing unit (CPU). In various implementations, the one or more processors may be dual-core processor(s), dual-core mobile processor(s), and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

In at least some embodiments, one or more systems, platforms, access controlling network architectures, elements, and/or components disclosed herein may be configured/programmed to perform in accordance with one or more methods/principles/rules and/or in cooperation with any system, device, component, and/or element detailed in at least one of U.S. Pat. Nos. 7,945,242; 8,275,119; 8,433,055; 8,526,598; 8,818,328; 9,264,552; 9,860,387; 10,187,528; 10,341,498; 10,728,385; 10,728,395; 10,868,918; 11,006,000; or 11,039,010; and/or at least one of U.S. patent applications with Ser. Nos. 16/938,236; 16/997,418; 17/173,756; 17/567,044; 17/567,051; 17/750,389; 17/750,392, or 17/829,145.

At least some aspects of the present disclosure will now be described with reference to the following numbered clauses.

Clause 1. A method includes at least steps of: receiving, by a processor of a computing device, via an application program and a communications network, at least one application program instruction to display an access controller interface element and an access code on a screen of the computing device; where the access controller interface element is: communicatively coupled to a cellular network hosted access controlling schema and operationally linked to an access-restricted digital resource; executing, by the processor of the computing device, the at least one application program instruction to display the access controller interface element and the access code on the screen of the computing device; detecting, by the processor of the computing device, at least one activity associated with the access controller interface element; transmitting, by the processor of the computing device, based on the detecting of the at least one activity, an access request having data that includes at least: the access code and an identity linked to the computing device; where at least one part of the data is configured to be accepted by the cellular network hosted access controlling schema; receiving, by the processor of the computing device, in response to the transmitting the access request and via the application program, at least one access program instruction to unlock the access-restricted digital resource for accessing via the computing device; where the receiving the at least one access program instruction to unlock the access-restricted digital resource is after the at least one part of the data has been accepted by the cellular network hosted access controlling schema; and executing, by the processor of the computing device, the at least one access program instruction to unlock the access-restricted digital resource for accessing via the computing device.

Clause 2. The method of clause 1 or any clause herein, where the transmitting the access request is in accordance with at least one of: a mobile originating cellular communications protocol or a communications protocol of a transmission control protocol/Internet protocol (TCP/IP) suite.

Clause 3. The method of clause 1 or any clause herein, further including: requesting, by the processor of the computing device, via the application program, the at least one application program instruction.

Clause 4. The method of clause 1 or any clause herein, where the access-restricted digital resource includes at least one of: an access-restricted internet content or an access-restricted internet service.

Clause 5. The method of clause 1 or any clause herein, where the identity is: a cellular identity or derived from the cellular identity; and where the cellular identity identifies: a cellular device that is programmatically associated with the computing device or the computing device that is a cellular service-enabled device.

Clause 6. The method of clause 5 or any clause herein, where the cellular identity is at least one of: an International Mobile Subscriber Identity (IMSI), a cryptographically hashed IMSI, a Mobile Station International Subscriber Directory Number (MSISDN), or a cryptographically hashed MSISDN, an Integrated Circuit Card Identification Number (ICCID) or cryptographically hashed ICCID, or any combinations of the aforementioned identities.

Clause 7. The method of clause 1 or any clause herein, where the at least one access program instruction includes a universal resource locator (URL), referencing an Internet address of the access-restricted digital resource.

Clause 8. The method of clause 1 or any clause herein, where the at least one application program instruction includes at least one of at least one JavaScript instruction, at least one HTML instruction, or at least one CSS instruction, to control an appearance, at least one functionality, or both, of the access controller interface element.

Clause 9. The method of clause 1 or any clause herein, where the access request includes symbolically prefixed address signals specifying the access code.

Clause 10. The method of clause 1 or any clause herein, where the cellular network hosted access controlling schema is configured to accept the at least one part of the data as an access charge to be applied to a cellular account associated with the identity.

Clause 11. The method of clause 11 or any clause herein, further including: executing, by the processor of the computing device, the at least one application program instruction to display the access code: on the access controller interface element or in a visual vicinity of the access controller interface element.

Clause 12. The method of clause 2 or any clause herein, where the mobile originating cellular communications protocol is one of: a Telephony call setup request, a Short Message Service request, or an Unstructured Supplementary Services Data request.

Clause 13. A method includes at least steps of: transmitting, by a processor of an access control server, via an application program and a communications network, to a computing device, at least one application program instruction to display an access controller interface element and an access code on a screen of the computing device; where the access controller interface element is: communicatively coupled to a cellular network hosted access controlling schema and operationally linked to an access-restricted digital resource, restricted from being accessed via the computing device; receiving, by the processor of the access control server, an access request based on at least one activity associated with the access controller interface element; where the access request having data that includes: the access code and an identity linked to the computing device; querying, by the processor of the access control server, based on at least one part of the data, the cellular network hosted access controlling schema for an affirmative access permission indication; where the at least one part of the data is configured to be accepted by the cellular network hosted access controlling schema; and transmitting, by the processor of the access control server, to the computing device, based on the affirmative access permission indication and via the application program, at least one access program instruction to unlock the access-restricted digital resource for accessing via the computing device.

Clause 14. The method of clause 13 or any clause herein, where the receiving the access request is in accordance with at least one of: a mobile originating cellular communications protocol or a communications protocol of a transmission control protocol/Internet protocol (TCP/IP) suite.

Clause 15. The method of clause 13 or any clause herein, where the affirmative access permission indication specifies that the at least one part of the data has been accepted by the cellular network hosted access controlling schema as an access charge to be applied to a cellular account associated with the cellular identity of the computing device.

Clause 16. The method of clause 13 or any clause herein, where the at least one application program instruction further instructs the computing device to: specify the access code as symbolically prefixed address signals of the access request and utilize a mobile originating cellular communications protocol to transmit the access request to the cellular network hosted access controlling schema.

Clause 17. A computing device including at least the following components: at least one processor in communication with a non-transitory computer readable medium storing at least one first application program instruction; where the at least one first application program instruction, when executed, cause the at least one processor to: receive at least one second application program instruction to display an access controller interface element and an access code on a screen of the computing device; where the access controller interface element is: communicatively coupled to a cellular network hosted access controlling schema and operationally linked to an access-restricted digital resource, restricted from being accessed via the computing device; execute the at least one second programming instruction to display the access controller interface element and the access code on the screen of the computing device; detect at least one activity associated with the access controller interface element; transmit, based on the detecting of the at least one activity, an access request having data that includes: the access code and an identity linked to the computing device; wherein at least one part of the data is configured to be accepted by the cellular network hosted access controlling schema; receive, in response to the access request, at least one access program instruction to unlock the access-restricted digital resource for accessing via the computing device; where the receiving the at least one access program instruction to unlock the access-restricted digital resource is after the at least one part of the data has been accepted by the cellular network hosted access controlling schema; and execute the at least one access program instruction to unlock the access-restricted digital resource for accessing via the computing device.

Clause 18. The computing device of clause 17 or any clause herein, where the computing device is further configured to transmit the access request in accordance with at least one of: a mobile originating cellular communications protocol or a communications protocol of a transmission control protocol/Internet protocol (TCP/IP) suite.

Clause 19. The computing device of clause 17 or any clause herein, where the access-restricted digital resource includes at least one of: an access-restricted internet content, or an access-restricted internet service.

Clause 20. The computing device of clause 17 or any clause herein, where the identity is: a cellular identity or derived from the cellular identity; and where the cellular identity identifies: a cellular device that is programmatically associated with the computing device or the computing device that is a cellular service-enabled device.

Clause 21. The computing device of clause 17 or any clause herein, where the cellular identity is one of: an International Mobile Subscriber Identity (IMSI), a cryptographically hashed IMSI, a Mobile Station International Subscriber Directory Number (MSISDN), or a cryptographically hashed MSISDN.

Clause 22. The computing device of clause 17 or any clause herein, where the cellular network hosted access controlling schema is configured to accept the at least one part of the data as an access charge to be applied to a cellular account associated with the identity.

Clause 23. The computing device of clause 17 or any clause herein, where the at least one second application program instruction further instructs the computing device to display the access code: on the access controller interface element or in a visual vicinity of the access controller interface element.

Clause 24. A method including: recording, by an access controlling platform, an expectation data record as an access control mechanism to access an access-restricted digital resource, the expectation data record including: an access code and an identity linked to the computing device; where the access code is associated with the access-restricted digital resource, restricted from being accessed via a computing device; where the expectation data record has been generated while an access controller interface element is displayed on a screen of the computing device; where the access controller interface element is operationally linked to the access-restricted digital resource; receiving, by the access controlling platform, while the access controller interface element is displayed, a mobile originating communication having data that includes: the access code and the identity; performing, by the access controlling platform, a confirmation of the expectation data record with the mobile originating communication; when the confirmation is successful: instructing, by the access controlling platform, based on at least one part of the data, the cellular communications network to perform at least one action with the cellular network hosted access controlling schema to generate a session record associated with the identity; and authorizing, by the access controlling platform, the computing device to unlock the access-restricted digital resource for accessing via the computing device.

Clause 25. A system including: at least one processor of an access controlling platform; where the at least one processor is in communication with a non-transitory computer readable medium storing software instructions that, when being executed by the at least one processor, instruct the access controlling platform to: recording an expectation data record as an access control mechanism to access an access-restricted digital resource, the expectation data record including: an access code and an identity linked to a computing device; where the access code is associated with the access-restricted digital resource, restricted from being accessed via the computing device; where the expectation data record has been generated while an access controller interface element is displayed on a screen of the computing device; where the access controller interface element is operationally linked to the access-restricted digital resource; receive, via the cellular network hosted access controlling schema and while the access controller interface element is displayed, a mobile originating communication having data that includes: the access code and the identity; perform a confirmation of the expectation data record with the mobile originating communication; when the confirmation is successful: instruct the cellular communications network to perform, based on at least one part of the data, at least one action with the cellular network hosted access controlling schema to generate a session record associated with the identity; and authorize the computing device to unlock the access-restricted digital resource for the accessing via the computing device.

Clause 26. The method of clause 24, the system of clause 25, or any clause herein, where the mobile originating communication is a telephone call; and where the instructing, by the access controlling platform, the cellular communications network to perform at least one action further includes: instructing, by the access controlling platform, the cellular communications network to: answer the telephone call and release the telephone call momentarily thereafter, once sufficient time passes to generate the session record associated with the identity.

Clause 27. The clause 26 or any clause herein, where the sufficient time is less than 1 second.

Clause 28. The method of clause 24, the system of clause 25, or any clause herein, where the identity is: a cellular identity or derived from the cellular identity; and where the cellular identity identifies: a cellular device that is programmatically associated with the computing device or the computing device that is a cellular service-enabled device.

Clause 29. The clause 28 or any clause herein, where the cellular identity is one of: an International Mobile Subscriber Identity (IMSI) or a Mobile Station International Subscriber Directory Number (MSISDN).

Clause 30. The method of clause 24, the system of clause 25, or any clause herein, where the access-restricted digital resource includes at least one of: an access-restricted internet content or an access-restricted internet service.

Clause 31. The method of clause 24, the system of clause 25, or any clause herein, where the mobile originating communication is in accordance with a mobile originating cellular communications protocol.

Clause 32. The clause 31 or any clause herein, where the mobile originating cellular communications protocol is one of: a Telephone call setup request, a Short Message Service request, or an Unstructured Supplementary Services Data request.

Clause 33. The method of clause 24, the system of clause 25, or any clause herein, where the mobile originating communication includes symbolically prefixed address signals specifying the access code.

Clause 34. The method of clause 24, the system of clause 25, or any clause herein, where the cellular network hosted access controlling schema is configured to accept the at least one part of the data for generating the session record in a cellular account associated with the identity.

Clause 35. The clause 34 or any clause herein, where the session record includes an access charge for accessing the access-restricted digital resource via the computing device.

Clause 36. The method of clause 24, or any clause herein, further including: transmitting, by the access controlling platform to the computing device, prior to the receiving the expectation data record, at least one application program instruction to display the access controller interface element and the access code on the screen of the computing device.

Clause 37. The method of clause 36, or any clause herein, where the at least one application program instruction further instructs the computing device to display the access code: on the access controller interface element or in a visual vicinity of the access controller interface element.

Clause 38. The method of clause 24, or any clause herein, where the authorizing the computing device to unlock the access-restricted digital resource for accessing via the computing device, further including: transmitting, by the access controlling platform to the computing device, based on the confirmation, at least one access program instruction to unlock the access-restricted digital resource for accessing via the computing device.

Clause 39. The method of clause 38, or any clause herein, where the at least one access program instruction includes a universal resource locator (URL), referencing an Internet address of the access-restricted digital resource.

Clause 40. The method of clause 24, or any clause herein, where the performing of the confirmation further including: confirming, by the access controlling platform, that the expectation data record and the mobile originating communication have been received within a predetermined time period from each other.

Clause 41. The system of clause 25, or any clause herein, where the software instructions, when being executed by the at least one processor, further instruct the access controlling platform to transmit to the computing device, prior to the receiving the expectation data record, at least one application program instruction to display the access code on the access controller interface element.

Clause 42. The system of clause 25, or any clause herein, where the software instructions, when being executed by the at least one processor, further instruct the access controlling platform to transmit to the computing device, based on the confirmation, at least one access program instruction to unlock the access-restricted digital resource for accessing via the computing device.

Clause 43. The system of clause 25, or any clause herein, where the software instructions, when being executed by the at least one processor, further instruct the access controlling platform to confirm that the expectation data record and the mobile originating communication have been received within a predetermined time period from each other.

Clause 44. A method including: receiving, by an access controlling platform, from a computing device, an expectation data record as an access control mechanism to access an access-restricted digital resource, the expectation data record including: an access code and an identity linked to the computing device; where the access code is associated with the access-restricted digital resource, restricted from being accessed via the computing device; where the expectation data record has been generated while an access controller interface element is displayed on a screen of the computing device; where the access controller interface element is operationally linked to the access-restricted digital resource; receiving, by the access controlling platform, while the access controller interface element is displayed, a mobile originating communication having data that includes: the access code and the identity; performing, by the access controlling platform, a confirmation of the expectation data record with the mobile originating communication; when the confirmation is successful: instructing, by the access controlling platform, based on at least one part of the data, the cellular communications network to perform at least one action with the cellular network hosted access controlling schema to generate a session record associated with the identity; and authorizing, by the access controlling platform, the computing device to unlock the access-restricted digital resource for accessing via the computing device.

Clause 45. A system including: at least one processor of an access controlling platform; where the at least one processor is in communication with a non-transitory computer readable medium storing software instructions that, when being executed by the at least one processor, instruct the access controlling platform to: receive, from a computing device, an expectation data record as an access control mechanism to access an access-restricted digital resource, the expectation data record including: an access code and an identity linked to the computing device; where the access code is associated with the access-restricted digital resource, restricted from being accessed via the computing device; where the expectation data record has been generated while an access controller interface element is displayed on a screen of the computing device; where the access controller interface element is operationally linked to the access-restricted digital resource; receive, while the access controller interface element is displayed, a mobile originating communication having data that includes: the access code and the identity; perform a confirmation of the expectation data record with the mobile originating communication; when the confirmation is successful: instruct the cellular communications network to perform, based on at least one part of the data, at least one action with the cellular network hosted access controlling schema to generate a session record associated with the identity; and authorize the computing device to unlock the access-restricted digital resource for the accessing via the computing device.

Clause 46. A method includes at least steps of: generating, by an access controlling platform, an expected access control digital key for authenticating a computing device that is operationally linked to at least one access-restricted digital resource for accessing the at least one access-restricted digital resource; storing, by the access controlling platform, the expected access control digital key in a computer memory associated with the access controlling platform; causing, by the access controlling platform, to display the expected access control digital key at the computing device; receiving, by the access controlling platform, a mobile originating communication, having: a particular access control digital key and an identity linked to the computing device; performing, by the access controlling platform, a confirmation of the particular access control digital key of the access requesting data with the expected access control digital key, stored in the computer memory associated with the access controlling platform; transmitting, by the access controlling platform, when the confirmation is successful, an access authentication indicator; and where the access authentication indicator is configured to cause to unlock the at least one access-restricted digital resource for accessing at the computing device.

Clause 47. A system includes the following components: at least one processor in communication with a non-transitory computer readable medium storing application program instructions; where the application program instructions, when executed, cause the at least one processor to: generate an expected access control digital key for authenticating a computing device that is operationally linked to at least one access-restricted digital resource for accessing the at least one access-restricted digital resource; record the expected access control digital key in a computer memory associated with the access controlling platform; cause to display the expected access control digital key at the computing device; receive a mobile originating communication, having: a particular access control digital key and an identity linked to the computing device; perform a confirmation of the particular access control digital key of the access requesting data with the expected access control digital key, stored in the computer memory associated with the access controlling platform; transmit, when the confirmation is successful, an access authentication indicator; and where the access authentication indicator is configured to cause to unlock the at least one access-restricted digital resource for accessing at the computing device.

Clause 48. The method of clause 46, the system of clause 47, or any clause herein, where the mobile originating communication is a telephone call; and where the method further includes: answering, by the access controlling platform, the telephone call and releasing, by the access controlling platform, the telephone call momentarily thereafter, once a sufficient time passes for generating a session data record associated with the identity.

Clause 49. The method of clause 46, the system of clause 47, or any clause herein, where the sufficient time is less than or equal to 1 second.

Clause 50. The method of clause 46, the system of clause 47, or any clause herein, where the mobile originating communication is in accordance with a mobile originating cellular communications protocol.

Clause 51. The method of clause 46, the system of clause 47, or any clause herein, where the mobile originating cellular communications protocol is one of: a Telephone call setup request, a Short Message Service request, or an Unstructured Supplementary Services Data request.

Clause 52. The method of clause 46, the system of clause 47, or any clause herein, where the mobile originating communication is received based on a symbolic routing prefix, including at least one symbol; and where the mobile originating communication includes symbolically prefixed address signals, specifying a combination of the symbolic routing prefix and the particular access control digital key.

Clause 53. The method of clause 46, the system of clause 47, or any clause herein, where the mobile originating communication is received when the mobile originating communication includes address signals, specifying the particular access control digital key that exceeds a pre-determined maximum number of digits.

Clause 54. The method of clause 46, the system of clause 47, or any clause herein, where the pre-determined number of digits exceeds the maximum 15 digits in accordance with a e.164 telephone number address specification.

Clause 55. The method of clause 46, the system of clause 47, or any clause herein, where the identity linked to the computing device is: a cellular identity or derived from the cellular identity; and where the cellular identity identifies: a cellular device that is programmatically associated with the computing device or the computing device that is a cellular service-enabled device.

Clause 56. The method of clause 46, the system of clause 47, or any clause herein, where the cellular identity is at least one of: a Mobile Station International Subscriber Directory Number (MSISDN), an International Mobile Subscriber Identity (IMSI), an Integrated Circuit Card Identification Number (ICCID), or an International Mobile Equipment Identity (IMEI).

Clause 57. The method of clause 46, the system of clause 47, or any clause herein, where the expected access control digital key is a sequence of numbers or alphanumeric characters.

Clause 58. The method of clause 46, the system of clause 47, or any clause herein, where the generating the expected access control digital key further includes: utilizing, by the access controlling platform, a random generator to generate the sequence of numbers or alphanumeric characters.

Clause 59. The method of clause 46, the system of clause 47, or any clause herein, where the causing to display the expected access control digital key at the computing device, further including: returning, by the access controlling platform, the expected access control digital key or a combination of a symbolic routing prefix and the expected access control digital key to the computing device in response to an application programming interface (API) call.

Clause 60. The method of clause 46, the system of clause 47, or any clause herein, where the causing to display the expected access control digital key at the computing device, further including: transmitting, by the access controlling platform, the expected access control digital key or a combination of a symbolic routing prefix and the expected access control digital key to a provider computing device that is: operationally linked to the at least one access-restricted digital resource to allow for accessing the at least one access-restricted digital resource by the computing device, and configured to instruct the computing device to display the combination of the symbolic routing prefix and the expected access control digital key or a link encoded with the combination of the symbolic routing prefix and the expected access control digital key.

Clause 61. The method of clause 46, the system of clause 47, or any clause herein, further including: encoding, by the access controlling platform, the expected access control digital key or the combination of the symbolic routing prefix and the expected access control digital key into a barcode; where the retuning the expected access control digital key to the computing device in response to the API call, further including: retuning the barcode to the computing device or instructing the computing device to generate the barcode encapsulating the access control digital key; where the causing, by the access controlling platform, to display the expected access control digital key at the computing device, further including: the causing to display the barcode.

Clause 62. The method of clause 46, the system of clause 47, or any clause herein, further including: encoding, by the access controlling platform, the expected access control digital key or the combination of the symbolic routing prefix and the expected access control digital key into a barcode; where the transmitting the expected access control digital key to the provider computing device, further including: transmitting the barcode to the provider computing device; where the provider computing device is further configured to instruct the computing device to display the barcode.

Clause 63. The method of clause 46, the system of clause 47, or any clause herein, where the barcode is a quick response (QR) code or a n-dimension code.

Clause 64. The method of clause 46, the system of clause 47, or any clause herein, where the at least one access-restricted digital resource includes at least one of: an access-restricted internet content or an access-restricted internet service.

Clause 65. The method of clause 46, the system of clause 47, or any clause herein, further including: associating, by the access controlling platform, the access authentication data with an entity that is associated with the provider computing device.

Clause 66. The method of clause 46, the system of clause 47, or any clause herein, further including: generating, by the access controlling platform, when the confirmation is successful, an access authentication expectation data, including an identity data based on the identity; and where the access authentication expectation data, including: a first component that is the identity data and, and a second component that is at least one static symbol; and transmitting, by the access controlling platform, the access authentication expectation data; when the computer device receives an input of the second component of the access authentication expectation data, the input is associated with a request for accessing at least one subsequent access-restricted digital resource: receiving, by the access controlling platform, at least: another mobile originating communication having a particular identity linked to a particular computing device, and an internet-based communication having the first component of the access authentication expectation data; performing, by the access controlling platform, another confirmation of the particular identity to the first component of the access authentication expectation record; transmitting, by the access controlling platform, when the another confirmation is successful, another access authentication indicator that is configured to cause to unlock the at least one subsequent access-restricted digital resource for accessing at the computing device.

Clause 67. The method of clause 46, the system of clause 47, or any clause herein, further including: generating, by the access controlling platform, an access authentication expectation record based on the access authentication expectation data.

Clause 68. The method of clause 46, the system of clause 47, or any clause herein, where the at least one symbol and the at least one static symbol is the same.

Clause 69. The method of clause 46, the system of clause 47, or any clause herein, further including: utilizing, by the access controlling platform, at least one cryptographic hash function to encrypt the identity linked to the computing device into an unique cryptographically hashed identity linked to the computing device; and utilizing, by the access controlling platform, the unique cryptographically hashed identity linked to the computing device to generate at least one component of the identity data.

Clause 70. The method of clause 46, the system of clause 47, or any clause herein, further including: adding, by the access controlling platform, at least one number, at least one alphabetic character, the at least one static symbol, or any combination thereof, to a front of the unique cryptographically hashed identity, to a back of the unique cryptographically hashed identity, or both, to generate the at least one component of the identity data.

Clause 71. The method of clause 46, the system of clause 47, or any clause herein, where the identity linked to the computing device is a cellular identity or derived from the cellular identity; where cellular identity is at least one of: a Mobile Station International Subscriber Directory Number (MSISDN), an International Mobile Subscriber Identity (IMSI), an Integrated Circuit Card Identification Number (ICCID), or an International Mobile Equipment Identity (IMEI); where the adding the at least one number, the at least one alphabetic character, the at least one static symbol, or any combination thereof, to the front of the cryptographically hashed identity, the back of the cryptographically hashed identity, or both, further including: selecting, by the access controlling platform, the at least one number, the at least one alphabetic character, or both, from the IMSI, the MSISDN, the ICCID, the IMEI, or any combination thereof.

Clause 72. A method that includes at least steps of: receiving, by a computing platform, over a computer network, from an online entity, an action performance request, requesting a performance of at least one action with the computer platform; requesting, by the computing platform, from an access controlling platform, an expected access control digital key to be presented to the online entity; receiving, by the computing platform, from the access controlling platform, the expected access control digital key; transmitting, by the computing platform, a computer instruction configured to: instruct to display the expected access control digital key at a computing device; cause a mobile originating communication to be received by the access controlling platform, where the mobile originating communication includes: the expected access control digital key and an identity linked to the computing device; and cause the access controlling platform to generate an access authentication indicator when the access controlling platform receives the expected access control digital key and the identity linked to the computing device; determining, by the computing platform, in response to the transmitting the computer instruction, a lack of a receipt of the access authentication indicator associated with the online entity from the access controlling platform; and performing, by the computing platform, at least one of: modifying at least one visual parameter of a visual schema of the online entity to visually identify the lack of the receipt of the access authentication indicator, disabling the online entity, or suspending at least one of: a performance of the online entity or the performance of the at least one action by the online entity.

Clause 73. A computer platform that includes at least components of: at least one processor in communication with a non-transitory computer readable medium storing application program instructions; where the application program instructions, when executed, cause the at least one processor to: receive, over a computer network, from an online entity, an action performance request, requesting a performance of at least one action with the computer platform; request, from an access controlling platform, an expected access control digital key to be presented to the online entity; receive, from the access controlling platform, the expected access control digital key; transmit a computer instruction configured to: instruct to display the expected access control digital key at a computing device; cause a mobile originating communication to be received by the access controlling platform, where the mobile originating communication includes: the expected access control digital key and an identity linked to the computing device; and cause the access controlling platform to generate an access authentication indicator when the access controlling platform receives the expected access control digital key and the identity linked to the computing device; determine, in response to the transmitting the computer instruction, a lack of a receipt of the access authentication indicator associated with the online entity from the access controlling platform; and perform at least one of: modifying at least one visual parameter of a visual schema of the online entity to visually identify the lack of the receipt of the access authentication indicator, disabling the online entity, or suspending at least one of: a performance of the online entity or the performance of the at least one action by the online entity.

Clause 749. The method of clause 72, the computer platform of clause 73, or any clause herein, where the modifying the at least one visual parameter of the visual schema of the online entity to visually identify the lack of the receipt of the access authentication indicator, further including: modifying, by the computing platform, the at least one visual parameter of the visual schema to visually identify the online entity to be a BOT.

Clause 75. The method of clause 72, the computer platform of clause 73, or any clause herein, where the at least one action is to establish a user profile in an online environment managed by the computer platform.

Clause 76. The method of clause 72, the computer platform of clause 73, or any clause herein, where the at least one action is to submit an electronic submission to an online environment managed by the computer platform.

Clause 77. The method of clause 72, the computer platform of clause 73, or any clause herein, where the computer platform is a social medial platform; where the electronic submission is an electronic posting; and where the modifying the at least one visual parameter of the visual schema of the online entity to visually identify the lack of the receipt of the access authentication indicator, further including: modifying, by the computing platform, the at least one visual parameter of the posting to visually identify the posting to be from the BOT.

Clause 78. The method of clause 72, the computer platform of clause 73, or any clause herein, where the at least one visual parameter is selected from at least one color theme.

Clause 79. The method of clause 72, the computer platform of clause 73, or any clause herein, where the modifying the at least one visual parameter of the online schema of the online entity to visually identify the lack of the receipt of the access authentication indicator, further including: obtain, by the computing platform, BOT activity data for the BOT; utilizing, by the computing platform, a trained machine-learning model to determine, based on the BOT activity data, at least one classification, at least one ranking, or both, for at least one of: the BOT or the electronic submission; and modifying, by the computing platform, based on the at least one classification, the at least one ranking, or both, at least one of: the at least one visual parameter of the visual schema of the BOT or the at least one visual parameter of the electronic submission by the BOT.

Clause 80. The method of clause 72, the computer platform of clause 73, or any clause herein, where the at least one classification is associated with at least one of: a classification of a plurality of domains, a classification of a plurality of activity categories, or a classification of a plurality of source categories.

Clause 81. The method of clause 72, the computer platform of clause 73, or any clause herein, where the modifying the at least one visual parameter of the visual schema of the BOT, further including: identifying, by the computing platform, based on the at least one classification, a particular theme; and modifying, by the computing platform, the at least one visual parameter based on the particular theme.

Clause 82. The method of clause 72, the computer platform of clause 73, or any clause herein, where the trained machine-learning model that includes a ranking algorithm configured to score the BOT, the electronic submission by the BOT, or both, based on at least one ranking metric selected from at least one of: a number of links referencing the electronic submission, another electronic submission by the BOT, or both; a number of citations referencing the electronic submission, another electronic submission by the BOT, or both; a number of likes associated with the electronic submission, another electronic submission by the BOT, or both; a number of real user follower who follows the BOT; a number of links referencing at least one real-user electronic submission of at least one real user; a number of citations referencing the at least one real-user electronic submission of the at least one real user; a number of likes associated with the at least one real-user electronic submission of the at least one real user; a number of real-user electronic submissions by real users, authenticated at least by, without limitation, per the disclosed Star RAN Challenge Response, when the real-user electronic submissions are similar (e.g., a similarity score that is based on, for example, without limitation, a word appearance frequency, theme, etc.) in type and/or content to the electronic submission by the BOT, or any combination thereof.

Clause 83. The method of clause 72, the computer platform of clause 73, or any clause herein, where the at least one ranking metric is a confidence ranking.

Clause 84. The method of clause 72, the computer platform of clause 73, or any clause herein, where the at least one confidence ranking is based on a confidence score measured at a particular scale; where the modifying of the at least one visual parameter of the visual schema of the BOT, the at least one visual parameter of the electronic submission, or both, further including: determining, by the computing platform, based on the at least one classification and the confidence score, a particular theme; and modifying, by the computing platform, the at least one visual parameter of the visual schema of the BOT, the at least one visual parameter of the visual schema of the electronic submission, or both, based on the particular theme.

Clause 85. The method of clause 72, the computer platform of clause 73, or any clause herein, where the confidence score is a percent value.

Clause 86. The method of clause 72, the computer platform of clause 73, or any clause herein, where the visual schema of the BOT, the visual schema of the electronic submission, or both, include a schema element having a visual appearance corresponding to the percent value of the confidence score.

Clause 87. The method of clause 72, the computer platform of clause 73, or any clause herein, where the schema element is an arc of a circle; and where a visual completeness of the circle corresponding to the percent value of the confidence score.

Clause 88. The method of clause 72, the computer platform of clause 73, or any clause herein, further including: designating, by the computing platform, prior to transmitting the computer instruction (e.g. providing a STAR Challenge), an initial account status such as, without limitation, a default BOT classification (e.g., as BOT), for example, without limitation, upon an account opening request; activating, by the computing platform, in response to the transmitting the computer instruction, a timer having a pre-determine duration; and where the determining the lack of the receipt of the access authentication indicator associated with the online entity from the access controlling platform, further including: determining, by the computing platform, in response to the transmitting the computer instruction and after the time expires, the lack of the receipt of the access authentication indicator associated with the online entity from the access controlling platform or a presence of the receipt of the access authentication indicator; and when the receipt of the access authentication indicator is present, upgrading, by the computing platform, the initial status to specify a human/real user being associated with the account/transaction, etc.

Clause 89. A method for determining a cellular identity at an internet hosted service including at least steps of: generating a series of random decimal digits presented by the Internet hosted service; receiving from a cellular device, address signals matching the series of randomly generated digits; extracting the cellular identity of the device emitting the matching signals; and transmitting the cellular identity, or transmitting a unique identity derived from the cellular identity, to the Internet hosted service.

Clause 90. The method of clause 89 or any clause herein, the signals received from the cellular device are address signals in a telephony call setup request.

Clause 91. The method of clause 89 or any clause herein, the extracted cellular identity is at least one of: the MSISDN, ICCID, IMEI, IMSI, of the cellular device.

Clause 92. The method of clause 89 or any clause herein, the extracted cellular identity is the CLI of the cellular device.

Clause 93. The method of clause 89 or any clause herein, the Internet hosted service presents on a display terminal or in a web page or component thereof.

Clause 94. The method of clause 89 or any clause herein, the Internet service is a component in an internet enabled application.

Clause 95. The method of clause 89 or any clause herein, the address signals are symbolically prefixed with a star (*), a pound (#), an at (@) or other symbol, or any combinations of symbols or combination of symbols and routing digits identifying an access controlling platform.

Clause 96. The method of clause 89 or any clause herein, extracting the cellular identity includes storing an association between the cellular identity and internet hosted service or IAPP.

Clause 97. The method of clause 89 or any clause herein, the internet hosted service is unlocked for access when the expected cellular signals originate from a cellular identity matching the stored and associated cellular identity or an identity derived from a cellular identity.

Clause 98. A method of encrypting a personal identification (PI) number that includes at least steps of: applying a cryptographic hash function to the PI; augmenting the cryptographically hashed PI with a series of the ending digits of the PI, thereby enabling the hashed PI to be easily recognizable to a human. In some embodiments, based on one or more principles disclosed herein, the cryptographically hashed PI may be held in volatile computer memory for ad hoc actions.

Clause 99. The method of clause 98 or any clause herein, the PI is at least one of an MSISDN, ICCID, IMEI, IMSI, a passport number, a social security number, a national identity number or any globally unique number.

Clause 100. The method of clause 98 or any clause herein, the augmenting is by pre-fixing or post-fixing to the cryptographically hashed PI.

Clause 101. The method of clause 98 or any clause herein, the PI is a public or private cryptographic key and the augmented digits are taken from the end (e.g. from the right hand side) of MSISDN.

Clause 102. The method of clause 98 or any clause herein, the PI is presented or referenced by the augmented digits.

Clause 103. A method includes at least steps of: receiving, by a processor of a computing device, via an application program and a communications network, at least one application program instruction to display an access controller interface element and a multi-part multi-functional access control sequence on a screen of the computing device; where the access controller interface element is: communicatively coupled to a cellular network hosted access controlling schema; and operationally linked to at least one access-restricted digital resource; where the multi-part multi-functional access control sequence includes: at least one symbol, an access code and a particular access control digital key; where the access code is configured to be accepted by the cellular network hosted access controlling schema; executing, by the processor of the computing device, the at least one application program instruction to display the access controller interface element and the multi-part multi-functional access control sequence on the screen of the computing device; detecting, by the processor of the computing device, at least one activity associated with the access controller interface element; transmitting, by the processor of the computing device, based on the detecting of the at least one activity, an access request having data that includes: the multi-part multi-functional access control sequence and at least one identity linked to the computing device; receiving, by the processor of the computing device, in response to the transmitting the access request and via the application program, at least one access program instruction to unlock the at least one access-restricted digital resource for accessing via the computing device; where the receiving the at least one access program instruction to unlock the at least one access-restricted digital resource is after: the access code of the multi-part multi-functional access control sequence has been accepted by the cellular network hosted access controlling schema and the particular access control digital key of the multi-part multi-functional access control sequence is confirmed to match an expected access control digital key; and executing, by the processor of the computing device, the at least one access program instruction to unlock the at least one access-restricted digital resource for accessing via the computing device.

Clause 104. A computing device including at least the following components: at least one processor in communication with a non-transitory computer readable medium storing at least one first application program instruction; where the at least one first application program instruction, when executed, cause the at least one processor to: receive at least one second application program instruction to display an access controller interface element and a multi-part multi-functional access control sequence on a screen of the computing device; where the access controller interface element is: communicatively coupled to a cellular network hosted access controlling schema and operationally linked to at least one access-restricted digital resource, restricted from being accessed via the computing device; where the multi-part multi-functional access control sequence includes: at least one symbol, an access code, and a particular access control digital key; execute the at least one second programming instruction to display the access controller interface element and the multi-part multi-functional access control sequence on the screen of the computing device; detect at least one activity associated with the access controller interface element; transmit, based on the detecting of the at least one activity, an access request having data that includes: the multi-part multi-functional access control sequence and at least one identity linked to the computing device; receive, in response to the access request, at least one access program instruction to unlock the at least one access-restricted digital resource for accessing via the computing device; where the receiving the at least one access program instruction to unlock the at least one access-restricted digital resource is after: the access code of the multi-part multi-functional access control sequence has been accepted by the cellular network hosted access controlling schema and the particular access control digital key of the multi-part multi-functional access control sequence has been confirmed to match an expected access control digital key; and execute the at least one access program instruction to unlock the at least one access-restricted digital resource for accessing via the computing device.

Clause 105. The method of clause 103, the computing device of clause 104, or any clause herein, where the transmitting the access request is in accordance with at least one of: a mobile originating cellular communications protocol or a communications protocol of a transmission control protocol/Internet protocol (TCP/IP) suite.

Clause 106. The method of clause 103, the computing device of clause 104, or any clause herein, where the at least one access-restricted digital resource includes at least one of: an access-restricted internet content or an access-restricted internet service.

Clause 107. The method of clause 103, the computing device of clause 104, or any clause herein, where the at least one identity is: at least one cellular identity or derived from the at least one cellular identity; and where the at least one cellular identity identifies: a cellular device that is programmatically associated with the computing device or the computing device that is a cellular service-enabled device.

Clause 108. The method of clause 103, the computing device of clause 104, or any clause herein, where the at least one cellular identity is at least one of: an International Mobile Subscriber Identity (IMSI), a cryptographically hashed IMSI, a Mobile Station International Subscriber Directory Number (MSISDN), a cryptographically hashed MSISDN, an Integrated Circuit Card Identification Number (ICCID), a cryptographically hashed ICCID, an International Mobile Equipment Identity (IMEI), a cryptographically hashed IMEI, or any combination thereof.

Clause 109. The method of clause 103, the computing device of clause 104, or any clause herein, where the at least one access program instruction includes a universal resource locator (URL), referencing a time-limited digital certificate that is configured to: validate the computing device for accessing the at least one access-restricted digital resource and expire after a pre-determined time period; and where the time-limited digital certificate includes at least one derived identity that is derived from the at least one identity linked to the computing device.

Clause 110. The method of clause 103, the computing device of clause 104, or any clause herein, where the access request is configured to specify the multi-part multi-functional access control sequence in a format of a symbolically prefixed multi-part multi-functional address signaling sequence.

Clause 111. The method of clause 103, the computing device of clause 104, or any clause herein, where the cellular network hosted access controlling schema is configured to accept the access code as an access charge to be applied to a cellular account associated with the at least one identity.

Clause 112. The method of clause 103, the computing device of clause 104, or any clause herein, where the mobile originating cellular communications protocol is one of: a Telephony call setup request, a Short Message Service request, or an Unstructured Supplementary Services Data request.

Clause 113. A method includes at least steps of: determining, by an access controlling platform, an expected access control digital key and an access code for authenticating a computing device that is operationally linked to at least one access-restricted digital resource for accessing the at least one access-restricted digital resource; storing, by the access controlling platform, the expected access control digital key in a computer memory associated with the access controlling platform; causing, by the access controlling platform, to display a multi-part multi-functional access control sequence with an access controller interface element at the computing device; where the multi-part multi-functional access control sequence includes: at least one symbol, the access code, and the expected access control digital key; where the access controller interface element is: communicatively coupled to a cellular network hosted access controlling schema and operationally linked to the at least one access-restricted digital resource; receiving, by the access controlling platform, after the access code of the multi-part multi-functional access control sequence has been accepted by the cellular network hosted access controlling schema for generating a session record associated with at least one identity linked to the computing device, a mobile originating communication, having: a particular access control digital key and the at least one identity; performing, by the access controlling platform, a confirmation of the particular access control digital key of the access requesting data with the expected access control digital key of multi-part multi-functional access control sequence, stored in the computer memory associated with the access controlling platform; when the confirmation is successful: transmitting, by the access controlling platform, an access authentication indicator; and where the access authentication indicator is configured to cause to unlock the at least one access-restricted digital resource for accessing at the computing device.

Clause 114. The method of clause 113, or any clause herein, where the mobile originating communication is a telephone call; and where the method further includes: answering, by the access controlling platform, the telephone call and releasing, by the access controlling platform, the telephone call momentarily thereafter, once a sufficient time passes for generating the session data record associated with the at least one identity.

Clause 115. The method of clause 113, or any clause herein, where the mobile originating communication is in accordance with a mobile originating cellular communications protocol; and where the mobile originating cellular communications protocol is one of: a Telephone call setup request, a Short Message Service request, or an Unstructured Supplementary Services Data request.

Clause 116. The method of clause 113, or any clause herein, where the mobile originating communication is configured to specify the multi-part multi-functional access control sequence in a format of a symbolically prefixed multi-part multi-functional address signaling sequence.

Clause 117. The method of clause 113, or any clause herein, where the at least one identity is: at least one cellular identity or derived from the at least one cellular identity; and where the at least one cellular identity identifies: a cellular device that is programmatically associated with the computing device or the computing device that is a cellular service-enabled device.

Clause 118. The method of clause 113, or any clause herein, where the at least one cellular identity is at least one of: an International Mobile Subscriber Identity (IMSI), a cryptographically hashed IMSI, a Mobile Station International Subscriber Directory Number (MSISDN), a cryptographically hashed MSISDN, an Integrated Circuit Card Identification Number (ICCID), a cryptographically hashed ICCID, an International Mobile Equipment Identity (IMEI), a cryptographically hashed IMEI, or any combination thereof.

Clause 119. The method of clause 113, or any clause herein, where the mobile originating communication is received when the symbolically prefixed multi-part multi-functional address signaling sequence includes address signals, specifying the particular access control digital key that exceeds a pre-determined maximum number of digits.

Clause 120. The method of clause 113, or any clause herein, where the pre-determined number of digits exceeds the maximum 15 digits in accordance with a e.164 telephone number address specification.

Clause 121. The method of clause 113, or any clause herein, where the transmitting the access authentication indicator further includes: utilizing, by the access controlling platform, at least one cryptographic hash function to encrypt the at least one identity linked to the computing device into at least one unique cryptographically hashed identity linked to the computing device; generating, by the access controlling platform, at least one time-limited digital certificate, specifying a successful transaction for accessing the at least one access-restricted digital resource; where the at least one time-limited digital certificate is configured to: validate the computing device associated with the at least one unique cryptographically hashed identity for accessing the at least one access-restricted digital resource, and expire after a pre-determined time period; and where the at least one time-limited digital certificate is associated with at least one of: a unique cryptographically hashed identity of the at least one unique cryptographically hashed identity, a reference to the at least one access-restricted digital resource.

Clause 122. A method includes at least steps of: transmitting, by a processor of an access control server, via an application program and a communications network, to a computing device, at least one application program instruction to display an access controller interface element and a multi-part multi-functional access control sequence on a screen of the computing device; where the access controller interface element is: communicatively coupled to a cellular network hosted access controlling schema and operationally linked to at least one access-restricted digital resource, restricted from being accessed via the computing device; where the multi-part multi-functional access control sequence includes: an access code and an expected access control digital key; receiving, by the processor of the access control server, an access request based on at least one activity associated with the access controller interface element; where the access request having data that includes: a particular access code, a particular access control digital key, and at least one identity linked to the computing device; performing, by the processor of the access control server, a confirmation of: the particular access code with the access code and the particular access control digital key with the expected access control digital key; when the confirmation is successful: instructing, by the processor of the access control server, a cellular communications network to perform, based on the access code, at least one action with the cellular network hosted access controlling schema to generate a session record associated with the at least one identity; where the access code is configured to be accepted by the cellular network hosted access controlling schema; transmitting, by the processor of the access control server, an access authentication indicator; and where the access authentication indicator is configured to cause to unlock the at least one access-restricted digital resource for accessing at the computing device.

Clause 123. The method of clause 122, or any clause herein, where the session record is a call data record (CDR), identifying an access charge to be applied to a cellular account associated with the at least one identity.

Clause 124. The method of clause 122, or any clause herein, where the access request is a telephone call; where the method further includes: when the confirmation is successful: instructing, by the processor of the access control server, the cellular communications network to: answer the telephone call and release the telephone call momentarily thereafter, once a sufficient time passes to generate the CDR associated with the at least one identity.

Clause 125. The method of clause 122, or any clause herein, where the sufficient time is less than 1 second.

Clause 126. The method of clause 122, or any clause herein, where the method further includes: when the confirmation is successful: querying, by the processor of the access control server, based on the access code, the cellular network hosted access controlling schema for an affirmative access permission indication; and instructing, by the processor of the access control server, the cellular communications network to perform, based on the access code and the affirmative access permission indication, the at least one action with the cellular network hosted access controlling schema to generate the session record associated with the at least one identity.

Clause 127. The method of clause 122, or any clause herein, where the affirmative access permission indication specifies that the access code has been accepted by the cellular network hosted access controlling schema as an access charge to be applied to a cellular account associated with the at least one identity.

Clause 128. A method includes at least steps of: causing, by a processor of a sender computing device, via an application program, to establish a peer-to-peer communication session with a recipient computing device, by at least:
receiving a personalized Universal Resource Locator link (PURL), including:
  a domain name associated with a session controlling Internet platform hosting a permission controlling schema, and
  at least one first identity linked to a recipient computing device;
  where the PURL is communicatively coupled to the permission controlling schema of the session controlling Internet platform;
executing at least one application program instruction to display, based on the PURL, a graphical user interface (GUI), including a plurality of GUI elements, each GUI element programmed to allow a user of the sender computing device to select or input a MACRO band parameter associated with the peer-to-peer communication session;
transmitting, based on a user interaction with the GUI and via an Internet protocol based communication, the MACRO band parameter and the at least one first identity linked to the recipient computing device to the session controlling Internet platform;
receiving, in response to transmitting the MACRO band parameter and the at least one first identity, from the session controlling Internet platform, a multi-part multi-functional address signaling sequence, including:
a MICRO band part, corresponding to a MICRO band parameter and
a MACRO band part, corresponding to the MACRO band parameter;
transmitting, within the peer-to-peer communication session and via a cellular communications network, a session request having data that includes:
the multi-part multi-functional address signaling sequence and
at least one second identity;
where the transmitting the session request causes, based on the domain name and the MACRO band parameter, an activity of the session controlling Internet platform between a first digital wallet associated with the at least one first identity and a second digital wallet associated with the at least one second identity after:
the MICRO band part of the multi-part multi-functional address signaling sequence has been accepted by the cellular communications network and at least one portion of the data is confirmed to match an expected session record associated with the session controlling Internet platform.

Clause 129. A method includes at least steps of: generating, by a session controlling Internet platform, a personalized Universal Resource Locator link (PURL);
where the PURL is:
  communicatively coupled to the permission controlling schema and
  configured to be utilized to establish a peer-to-peer communication session between a sender computing device and a recipient computing device;
where the PURL includes:
  a domain name associated with the session controlling Internet platform hosting a permission controlling schema, and
  at least one first identity linked to the recipient computing device;
transmitting, by the session controlling Internet platform, the PURL to the recipient computing device;
receiving, by the session controlling Internet platform, after the transmitting the PURL to the recipient computing device, a mobile originating communication, having data including:
  a multi-part multi-functional address signaling sequence, including:
    a MICRO band part, corresponding to a MICRO band parameter and
    a MACRO band part, corresponding to the MACRO band parameter, and
    at least one second identity;
executing, by the session controlling Internet platform, based on the domain name and the MACRO band parameter, an activity between a first digital wallet associated with the at least one first identity and a second digital wallet associated with the at least one second identity after:
  the MICRO band part of the multi-part multi-functional address signaling sequence has been accepted by the cellular communications network and
  at least one portion of the data is confirmed to match an expected session record.

Clause 130. The method of clause 128, clause 129, or any clause herein, where the transmitting the session request is in accordance with at least one of:
a mobile originating cellular communications protocol or
a communications protocol of a transmission control protocol/Internet protocol (TCP/IP) suite.

Clause 131. The method of clause 128, clause 129, or any clause herein, where the mobile originating cellular communications protocol is one of:
a Telephone call setup request,
a Short Message Service request, or
an Unstructured Supplementary Services Data request.

Clause 132. The method of clause 128, clause 129, or any clause herein, where the activity is an electronic transfer a monetary equivalent of the MACRO band parameter between the first digital wallet associated with the at least one first identity and the second digital wallet associated with the at least one second identity.

Clause 133. The method of clause 128, clause 129, or any clause herein, where the multi-part multi-functional address signaling sequence further includes:
an expected access control digital key for authenticating the sender computing device; and
where the an expected session record includes the expected access control digital key.

Clause 134. The method of clause 128, clause 129, or any clause herein, where the at least one first identity is:
at least one first cellular identity or
derived from the at least one first cellular identity; and
where the at least one first cellular identity identifies:
a first cellular device that is programmatically associated with the recipient computing device or
the recipient computing device that is a cellular service-enabled device.

Clause 135. The method of clause 128, clause 129, or any clause herein, where the at least one first cellular identity is at least one of:
an International Mobile Subscriber Identity (IMSI),
a cryptographically hashed IMSI,
a Mobile Station International Subscriber Directory Number (MSISDN),
a cryptographically hashed MSISDN,
an Integrated Circuit Card Identification Number (ICCID),
a cryptographically hashed ICCID,
an International Mobile Equipment Identity (IMEI),
a cryptographically hashed IMEI, or
any combination thereof.

Clause 136. The method of clause 128, clause 129, or any clause herein, where the at least one second identity is:
at least one second cellular identity or
derived from the at least one second cellular identity; and
where the at least one second cellular identity identifies:
a second cellular device that is programmatically associated with the sender computing device or
the sender computing device that is a cellular service-enabled device.

Clause 137. The method of clause 128, clause 129, or any clause herein—where the at least one second cellular identity is at least one of:
an International Mobile Subscriber Identity (IMSI),
a cryptographically hashed IMSI,
a Mobile Station International Subscriber Directory Number (MSISDN),
a cryptographically hashed MSISDN,
an Integrated Circuit Card Identification Number (ICCID),
a cryptographically hashed ICCID,
an International Mobile Equipment Identity (IMEI),
a cryptographically hashed IMEI, or
any combination thereof.

Clause 138. The method of clause 128, clause 129, or any clause herein—further including:
receiving, by the processor of the sender computing device, via the application program, a confirmation communication that the activity has been performed; and
where the confirmation communication includes:
a confirmation PURL, including:
a second domain name associated with an electronic location designated for storing a data record confirming the performance of the activity,
the at least one first identity linked to the recipient computing device, and and the MACRO band parameter.

Clause 139. The method of clause 128, clause 129, or any clause herein, where the data record is a time-limited digital certificate that is configured to:
validate the performance of the activity, and
expire after a pre-determined time period; and
where the time-limited digital certificate includes:
at least one first derived identity that is derived from the at least one first identity
at least one second derived identity that is derived from the at least one second identity.

Clause 140. The method of clause 128, clause 129, or any clause herein,
where the session request is a telephone call;
where, when the at least one portion of the data is confirmed to match the expected session record associated with the session controlling Internet platform, the transmitting of the session request causes the session controlling Internet platform to instruct the cellular communications network to:
answer the telephone call and release the telephone call momentarily thereafter, once a sufficient time passes to generate a call data record (CDR), identifying a monetary equivalent of the MICRO band parameter to be applied to a cellular account associated with the at least one first identity, the at least one second identity or both.

Clause 141. The method of clause 128, clause 129, or any clause herein, where the sufficient time is less than 1 second.

Clause 142. The method of clause 128, clause 129, or any clause herein, where the session request is configured to specify the multi-part multi-functional address signaling sequence in a format of a symbolically prefixed multi-part multi-functional address signaling sequence.

While one or more embodiments of the present disclosure have been described, it is understood that these embodiments are illustrative only, and not restrictive, and that many modifications may become apparent to those of ordinary skill in the art, including that various embodiments of the inventive methodologies, the inventive systems/platforms, and the inventive devices described herein can be utilized in any combination with each other. Further still, the various steps may be carried out in any desired order (and any desired steps may be added and/or any desired steps may be eliminated).

What is claimed is:
1. A method comprising:
causing, by a processor of a sender computing device, via an application program, to establish a peer-to-peer communication session with a recipient computing device, by at least:
receiving a personalized Universal Resource Locator link (PURL), comprising:
a domain name associated with a session controlling Internet platform hosting a permission controlling schema, and at least one first identity linked to a recipient computing device;
wherein the PURL is communicatively associated with the permission controlling schema of the session controlling Internet platform;
executing at least one application program instruction to display, based on the PURL, a graphical user interface (GUI), comprising a plurality of GUI elements, each GUI element programmed to allow a user of the sender computing device to select or input a MACRO band parameter associated with the peer-to-peer communication session;
transmitting, based on a user interaction with the GUI and via an Internet protocol based communication, the MACRO band parameter and the at least one first identity linked to the recipient computing device to the session controlling Internet platform;
receiving, in response to transmitting the MACRO band parameter and the at least one first identity, from the session controlling Internet platform, a multi-part multi-functional address signaling sequence, comprising:
a MICRO band part, corresponding to a MICRO band parameter and a MACRO band part, corresponding to the MACRO band parameter;
transmitting, within the peer-to-peer communication session and via a cellular communications network, a session request having data that comprises: the multi-part multi-functional address signaling sequence and at least one second identity;
wherein the transmitting the session request causes, based on the domain name and the MACRO band parameter, an activity of the session controlling Internet platform between a first digital wallet associated with the at least one first identity and a second digital wallet associated with the at least one second identity after:
the MICRO band part of the multi-part multi-functional address signaling sequence has been accepted by the cellular communications network and at least one portion of the data is confirmed to match an expected session record associated with the session controlling Internet platform;
wherein the multi-part multi-functional address signaling sequence further comprises: the expected access control digital key for authenticating the sender computing device; and wherein the an expected session record comprises the expected access control digital key.

2. The method of claim 1, wherein the transmitting the session request is in accordance with at least one of:
a mobile originating cellular communications protocol or
a communications protocol of a transmission control protocol/Internet protocol (TCP/IP) suite.

3. The method of claim 2, wherein the mobile originating cellular communications protocol is one of:
a Telephone call setup request,
a Short Message Service request, or
an Unstructured Supplementary Services Data request.

4. The method of claim 1, wherein the activity is an electronic transfer a monetary equivalent of the MACRO band parameter between the first digital wallet associated with the at least one first identity and the second digital wallet associated with the at least one second identity.

5. The method of claim 1, wherein the at least one first identity is:
at least one first cellular identity or
derived from the at least one first cellular identity; and
wherein the at least one first cellular identity identifies:
a first cellular device that is programmatically associated with the recipient computing device or
the recipient computing device that is a cellular service-enabled device.

6. The method of claim 5, wherein the at least one first cellular identity is at least one of:
an International Mobile Subscriber Identity (IMSI),
a cryptographically hashed IMSI,
a Mobile Station International Subscriber Directory Number (MSISDN),
a cryptographically hashed MSISDN,
an Integrated Circuit Card Identification Number (ICCID),
a cryptographically hashed ICCID,
an International Mobile Equipment Identity (IMEI),
a cryptographically hashed IMEI, or
any combination thereof.

7. The method of claim 1, wherein the at least one second identity is:
at least one second cellular identity or
derived from the at least one second cellular identity; and
wherein the at least one second cellular identity identifies:
a second cellular device that is programmatically associated with the sender computing device or
the sender computing device that is a cellular service-enabled device.

8. The method of claim 7, wherein the at least one second cellular identity is at least one of:
an International Mobile Subscriber Identity (IMSI),
a cryptographically hashed IMSI,
a Mobile Station International Subscriber Directory Number (MSISDN),
a cryptographically hashed MSISDN,
an Integrated Circuit Card Identification Number (ICCID),
a cryptographically hashed ICCID,
an International Mobile Equipment Identity (IMEI),
a cryptographically hashed IMEI, or
any combination thereof.

9. The method of claim 1, further comprising:
receiving, by the processor of the sender computing device, via the application program, a confirmation communication that the activity has been performed; and
wherein the confirmation communication comprises:
a confirmation PURL, comprising:
a second domain name associated with an electronic location designated for storing a data record confirming the performance of the activity,
the at least one first identity linked to the recipient computing device, and and the MACRO band parameter.

10. The method of claim 9, wherein the data record is a time-limited digital certificate and validates the performance of the activity and expires after a pre-determined time period; and wherein the time-limited digital certificate comprises: at least one first derived identity that is derived from the at least one first identity at least one second derived identity that is derived from the at least one second identity.

11. The method of claim 3,
wherein the session request is a telephone call;
wherein, when the at least one portion of the data is confirmed to match the expected session record associated with the session controlling Internet platform, the transmitting of the session request causes the session controlling Internet platform to instruct the cellular communications network to:
answer the telephone call and release the telephone call momentarily thereafter, once a sufficient time passes to generate a call data record (CDR), identifying a monetary equivalent of the MICRO band parameter to be applied to a cellular account associated with the at least one first identity, the at least one second identity or both.

12. The method of claim 11, wherein the sufficient time is less than 1 second.

13. The method of claim 1, wherein the session request comprises the multi-part multi-functional address signaling sequence in a format of a symbolically prefixed multi-part multi-functional address signaling sequence.

14. A method comprising:
generating, by a session controlling Internet platform, a personalized Universal Resource Locator link (PURL);

wherein the PURL is: communicatively coupled to the permission controlling schema and utilized to establish a peer-to-peer communication session between a sender computing device and a recipient computing device;
wherein the PURL comprises:
a domain name associated with the session controlling Internet platform hosting a permission controlling schema, and at least one first identity linked to the recipient computing device;
transmitting, by the session controlling Internet platform, the PURL to the recipient computing device;
receiving, by the session controlling Internet platform, after the transmitting the PURL to the recipient computing device, a mobile originating communication, having data comprising:
a multi-part multi-functional address signaling sequence, comprising:
a MICRO band part, corresponding to a MICRO band parameter and a MACRO band part, corresponding to the MACRO band parameter, and at least one second identity;
executing, by the session controlling Internet platform, based on the domain name and the MACRO band parameter, an activity between a first digital wallet associated with the at least one first identity and a second digital wallet associated with the at least one second identity after: the MICRO band part of the multi-part multi-functional address signaling sequence has been accepted by the cellular communications network and at least one portion of the data is confirmed to match an expected session record;
wherein the multi-part multi-functional address signaling sequence further comprises: the expected access control digital key for authenticating the sender computing device; and wherein the an expected session record comprises the expected access control digital key.

15. The method of claim 14, wherein the mobile originating communication is in accordance with at least one of:
a mobile originating cellular communications protocol or
a communications protocol of a transmission control protocol/Internet protocol (TCP/IP) suite.

16. The method of claim 15, wherein the mobile originating cellular communications protocol is one of:
a Telephone call setup request,
a Short Message Service request, or
an Unstructured Supplementary Services Data request.

17. The method of claim 14, wherein the activity is an electronic transfer a monetary equivalent of the MACRO band parameter between the first digital wallet associated with the at least one first identity and the second digital wallet associated with the at least one second identity.

18. The method of claim 14, wherein the at least one first identity is:
at least one first cellular identity or
derived from the at least one first cellular identity; and
wherein the at least one first cellular identity identifies:
a first cellular device that is programmatically associated with the recipient computing device or
the recipient computing device that is a cellular service-enabled device.

19. The method of claim 18, wherein the at least one first cellular identity is at least one of:
an International Mobile Subscriber Identity (IMSI),
a cryptographically hashed IMSI,
a Mobile Station International Subscriber Directory Number (MSISDN),
a cryptographically hashed MSISDN,
an Integrated Circuit Card Identification Number (ICCID),
a cryptographically hashed ICCID,
an International Mobile Equipment Identity (IMEI),
a cryptographically hashed IMEI, or
any combination thereof.

20. The method of claim 14, wherein the at least one second identity is:
at least one second cellular identity or
derived from the at least one second cellular identity; and
wherein the at least one second cellular identity identifies:
a second cellular device that is programmatically associated with the sender computing device or
the sender computing device that is a cellular service-enabled device.

21. The method of claim 20, wherein the at least one second cellular identity is at least one of:
an International Mobile Subscriber Identity (IMSI),
a cryptographically hashed IMSI,
a Mobile Station International Subscriber Directory Number (MSISDN),
a cryptographically hashed MSISDN,
an Integrated Circuit Card Identification Number (ICCID),
a cryptographically hashed ICCID,
an International Mobile Equipment Identity (IMEI),
a cryptographically hashed IMEI, or
any combination thereof.

22. The method of claim 14, further comprising:
generating, by the session controlling Internet platform, a confirmation communication that the activity has been performed; and
wherein the confirmation communication comprises:
a confirmation PURL, comprising:
a second domain name associated with an electronic location designated for storing a data record confirming the performance of the activity,
the at least one first identity linked to the recipient computing device, and and the MACRO band parameter.

23. The method of claim 22, wherein the data record is a time-limited digital certificate that validates the performance of the activity and expires after a pre-determined time period; and wherein the time-limited digital certificate comprises: at least one first derived identity that is derived from the at least one first identity at least one second derived identity that is derived from the at least one second identity.

24. The method of claim 14,
wherein the mobile originating communication is a telephone call;
wherein, when the at least one portion of the data is confirmed to match the expected session record, the method further comprises:
instructing, by the session controlling Internet platform, the cellular communications network to:
answer the telephone call and
release the telephone call momentarily thereafter, once a sufficient time passes to generate a call data record (CDR), identifying a monetary equivalent of the MICRO band parameter to be applied to a cellular account associated with the at least one first identity, the at least one second identity or both.

25. The method of claim 24, wherein the sufficient time is less than 1 second.

26. The method of claim 14, wherein the mobile originating communication comprises the multi-part multi-functional address signaling sequence in a format of a symbolically prefixed multi-part multi-functional address signaling sequence.

* * * * *